United States Patent
Pu et al.

(10) Patent No.: US 12,532,805 B2
(45) Date of Patent: Jan. 27, 2026

(54) MOWER BLADE CARRIER ADJUSTMENT

(71) Applicant: Greenworks (Jiangsu) Co., Ltd, Changzhou (CN)

(72) Inventors: Zhigao Pu, Changzhou (CN); Wanghao Li, Changzhou (CN); Jie Gao, Changzhou (CN); Jin Cao, Changzhou (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

(21) Appl. No.: 18/755,661

(22) Filed: Jun. 26, 2024

(65) Prior Publication Data
US 2024/0415050 A1    Dec. 19, 2024

Related U.S. Application Data

(63) Continuation of application No. 17/218,193, filed on Mar. 31, 2021, now Pat. No. 12,058,957.

(30) Foreign Application Priority Data

| May 14, 2020 | (CN) | 202020799218.9 |
| Dec. 21, 2020 | (CN) | 202011518322.7 |
| Dec. 21, 2020 | (CN) | 202011518340.5 |
| Dec. 21, 2020 | (CN) | 202011518373.X |
| Dec. 21, 2020 | (CN) | 202011518417.9 |

(Continued)

(51) Int. Cl.
*A01D 34/00* (2006.01)
*A01D 34/64* (2006.01)
(Continued)

(52) U.S. Cl.
CPC ......... *A01D 34/008* (2013.01); *A01D 34/64* (2013.01); *A01D 34/733* (2013.01); *A01D 34/74* (2013.01);
(Continued)

(58) Field of Classification Search
CPC .... A01D 34/008; A01D 34/64; A01D 34/733; A01D 34/74; A01D 34/78; A01D 34/81;
(Continued)

(56) References Cited

U.S. PATENT DOCUMENTS

| 1,336,257 A | * | 4/1920 | Muzzy | A01D 34/63 |
| | | | | 56/250 |
| 2,485,984 A | * | 10/1949 | Newman | A01D 34/63 |
| | | | | 56/17.1 |

(Continued)

FOREIGN PATENT DOCUMENTS

| CN | 206533741 U | * | 10/2017 | ........... A01D 34/008 |
| CN | 109618646 A | * | 4/2019 | ............ A01D 34/74 |

(Continued)

*Primary Examiner* — Arpad Fabian-Kovacs

(57) ABSTRACT

A mower includes: a housing; a cutting mechanism, disposed on the housing. The cutting mechanism includes a cutting blade, a blade carrier, a blade carrier height-adjustment assembly and a prime mover. The blade carrier height adjustment assembly includes at least two blade carrier connectors for connecting the blade carrier and the prime mover, and an adjusting part for adjusting the relative position of the at least two blade carrier connectors.

20 Claims, 78 Drawing Sheets

(30) Foreign Application Priority Data

| Date | Country | Number |
|---|---|---|
| Dec. 21, 2020 | (CN) | 202011518419.8 |
| Dec. 21, 2020 | (CN) | 202011518432.3 |
| Dec. 21, 2020 | (CN) | 202011519711.1 |
| Dec. 21, 2020 | (CN) | 202011519713.0 |
| Dec. 21, 2020 | (CN) | 202011519837.9 |
| Dec. 21, 2020 | (CN) | 202011533027.9 |
| Dec. 21, 2020 | (CN) | 202011533041.9 |
| Dec. 21, 2020 | (CN) | 202023094522.2 |
| Dec. 21, 2020 | (CN) | 202023094544.9 |
| Dec. 21, 2020 | (CN) | 202023094603.2 |
| Dec. 21, 2020 | (CN) | 202023094639.0 |
| Dec. 21, 2020 | (CN) | 202023094646.0 |
| Dec. 21, 2020 | (CN) | 202023096114.0 |
| Dec. 21, 2020 | (CN) | 202023096201.6 |
| Dec. 21, 2020 | (CN) | 202023096221.3 |
| Dec. 21, 2020 | (CN) | 202023096269.4 |
| Dec. 21, 2020 | (CN) | 202023096313.1 |
| Dec. 24, 2020 | (CN) | 202011546656.5 |
| Dec. 24, 2020 | (CN) | 202023155951.6 |

(51) Int. Cl.
*A01D 34/73* (2006.01)
*A01D 34/74* (2006.01)
*A01D 34/78* (2006.01)
*A01D 34/81* (2006.01)
*A01D 69/02* (2006.01)
*A01D 101/00* (2006.01)

(52) U.S. Cl.
CPC ............ *A01D 34/78* (2013.01); *A01D 34/81* (2013.01); *A01D 69/02* (2013.01); *A01D 2101/00* (2013.01)

(58) Field of Classification Search
CPC . A01D 69/02; A01D 2101/00; H01M 50/256; H01M 2220/20; Y02E 60/10
See application file for complete search history.

(56) References Cited

U.S. PATENT DOCUMENTS

| | | | | |
|---|---|---|---|---|
| 2,669,826 | A * | 2/1954 | Watrous | A01D 34/63 56/13.4 |
| 3,114,229 | A * | 12/1963 | Wilson | A01D 34/74 56/11.8 |
| 4,077,191 | A * | 3/1978 | Pittinger, Sr. | A01D 34/416 30/276 |
| 6,666,009 | B1 * | 12/2003 | Brandon | A01D 34/4166 30/276 |
| 11,206,759 | B2 * | 12/2021 | Gust | A01D 34/74 |
| 2002/0157368 | A1 * | 10/2002 | Scott | A01D 34/74 56/12.7 |
| 2017/0181375 | A1 * | 6/2017 | Hashimoto | A01D 34/74 |
| 2021/0084815 | A1 * | 3/2021 | Li | A01D 34/74 |
| 2022/0151149 | A1 * | 5/2022 | Forsman | A01D 34/008 |
| 2023/0345870 | A1 * | 11/2023 | Johansson | A01D 34/74 |

FOREIGN PATENT DOCUMENTS

| | | | | |
|---|---|---|---|---|
| CN | 110933986 | A * | 3/2020 | ............ A01D 34/74 |
| CN | 111543168 | A * | 8/2020 | ............ A01D 34/63 |
| CN | 111543169 | A * | 8/2020 | ............ A01D 34/63 |
| CN | 112449845 | A * | 3/2021 | ............ A01D 34/008 |
| CN | 212753303 | U * | 3/2021 | ............ A01D 34/63 |
| CN | 112970415 | A * | 6/2021 | ............ A01D 34/63 |
| CN | 215122145 | U * | 12/2021 | ............ A01D 34/74 |
| CN | 114430987 | A * | 5/2022 | ............ A01D 34/63 |
| CN | 115362818 | A * | 11/2022 | ............ A01D 34/006 |
| CN | 218337176 | U * | 1/2023 | ............ A01D 34/74 |
| CN | 218499598 | U * | 2/2023 | ............ A01D 34/74 |
| CN | 116097971 | A * | 5/2023 | ............ A01D 34/001 |
| DE | 102021128365 | A1 * | 5/2022 | ............ A01D 34/74 |
| EP | 3342268 | A1 * | 7/2018 | ............ A01D 34/008 |
| WO | WO-2014007694 | A1 * | 1/2014 | ............ A01D 34/008 |
| WO | WO-2021091972 | A1 * | 5/2021 | ............ A01D 34/008 |
| WO | WO-2022095897 | A1 * | 5/2022 | ............ A01D 34/74 |

* cited by examiner

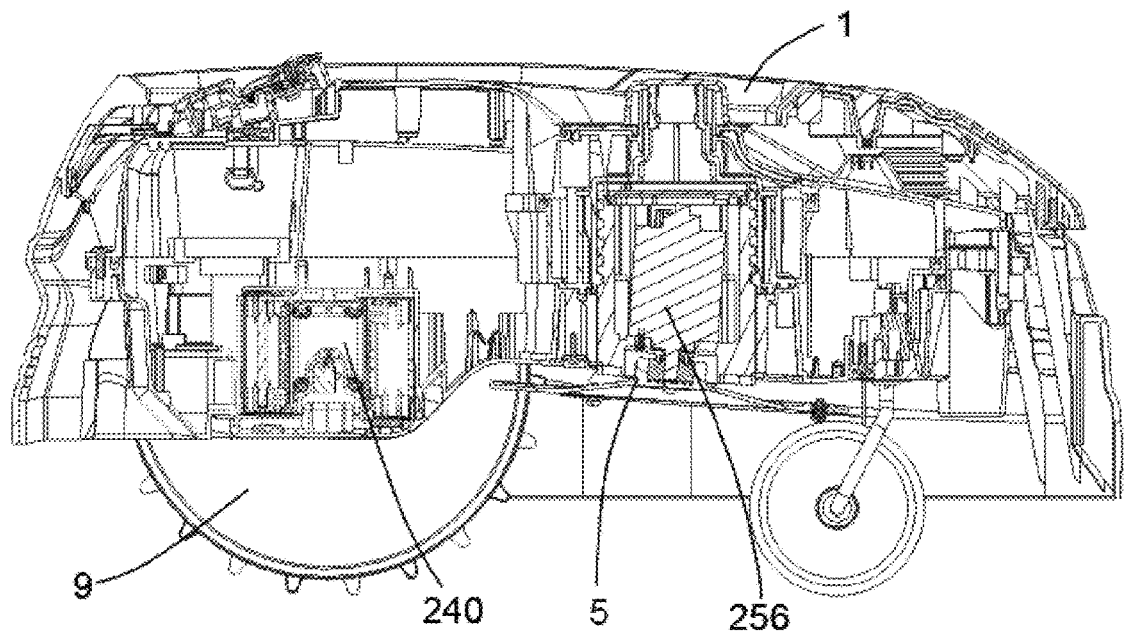

Fig. 92

| |
|---|
| Providing a first battery cell group composed of a number of identical first battery cell units connected in series, and electrically connecting the first battery cell group with a battery management system |

↓

| |
|---|
| Providing a second battery cell group composed of a number of identical second battery cell units connected in series, and the number of the second battery cell unit being same as that of the first battery cell units |

↓

| |
|---|
| Using a connecting wire to make the second battery cell units of the second battery cell group be connected in parallel with the first battery cell units of the first battery cell group in one-by-one manner |

↓

| |
|---|
| Using a connecting wire to make the battery cell units at head and tail ends of the second battery cell group be electrically connected with the battery cell units at head and tail ends of the first battery cell group, to thereby make the first battery cell group be connected in parallel with the second battery cell group |

↓

| |
|---|
| The battery management system simultaneously managing and controlling power outputs of the first battery cell group and the second battery cell group |

Fig. 93

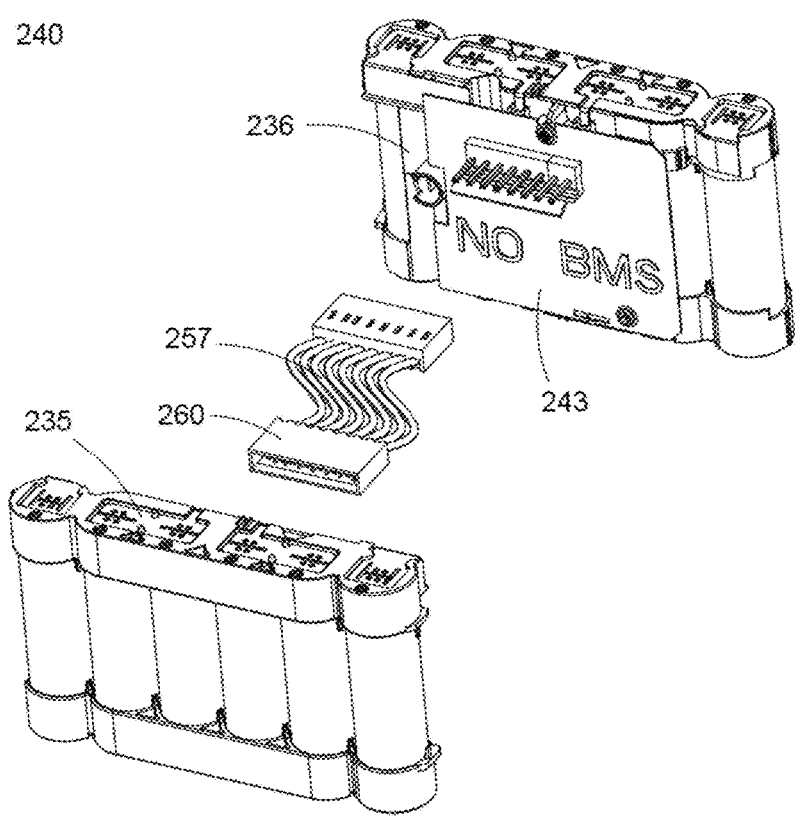
Fig. 96
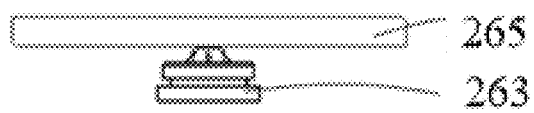
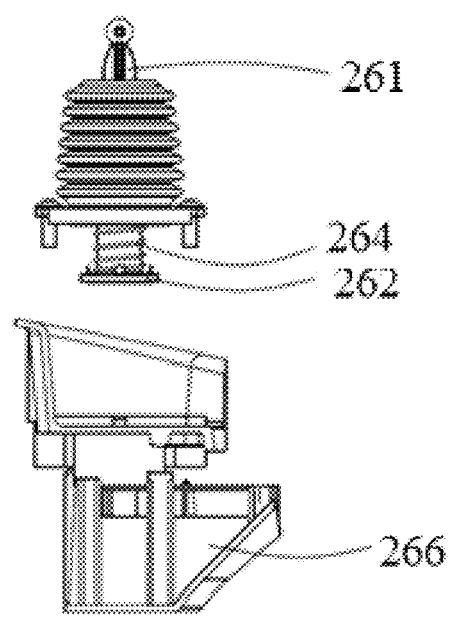
Fig. 97

373

374

475

479

MOWER BLADE CARRIER ADJUSTMENT

CROSS REFERENCE TO RELATED APPLICATION

The present application is a continuation Application of U.S. patent application Ser. No. 17/218,193 filed on Mar. 31, 2021, which claims the benefit of CN202020799218.9, filed May 14, 2020; CN202011533027.9, CN202023096114.0, CN202011518373.X, CN202023094639.0, CN202011533041.9, CN202011533027.9, CN202011519711.1, CN202023096221.3, CN202011518340.5, CN202023094646.0, CN202011518432.3, CN202023096201.6, CN202011518419.8, CN202023096313.1, CN202011519713.0, CN202023096269.4, CN202011518322.7, CN202023094544.9, CN202011519837.9, CN202023094522.2, CN202011518417.9, CN202023094603.2, filed Dec. 21, 2020; and CN202011546656.5, CN202023155951.6, filed Dec. 24, 2020. All the above are hereby incorporated by reference for all purposes.

TECHNICAL FIELD

The disclosure relates to the technical field of garden tools, and more particularly to a robotic mower.

BACKGROUND

A lawn mower is a kind of special equipment for mechanized lawns mowing. When the lawn mower is working, it is full of noise, dust, bumps and fatigue caused in the long-term operation. The harsh working environment is harmful to the operator's body. The user needs to frequently control the handle when operating the mower, but the long-term operation of the handle would bring serious physical fatigue and would often cause accidents.

SUMMARY

An objective of the disclosure provides a mower. The mower can include a housing, a movable upper cover disposed on the housing, and a cutting assembly disposed on the housing.

In summary, the mower provided by the disclosure may be an intelligent/smart/robotic mower, which can automatically carry out a mowing operation, so that a user can be far away from a working/operation site, and therefore the harm to the user may be reduced and a mowing efficiency can be improved.

BRIEF DESCRIPTION OF THE DRAWINGS

FIG. 91 and FIG. 92 are schematic views of a smart mower in a specific embodiment of the disclosure.

FIG. 93 is a flowchart of a method for expanding a capacity of a battery pack system according to a specific embodiment of the disclosure.

FIG. 95 and FIG. 96 are schematic exploded views of FIG. 94.

FIG. 97 is a schematic structural view of a lifting detection device of a mowing robot of the disclosure, and the lifting detection device being arranged between a main body and a chassis.

DETAILED DESCRIPTION

Figure 1:
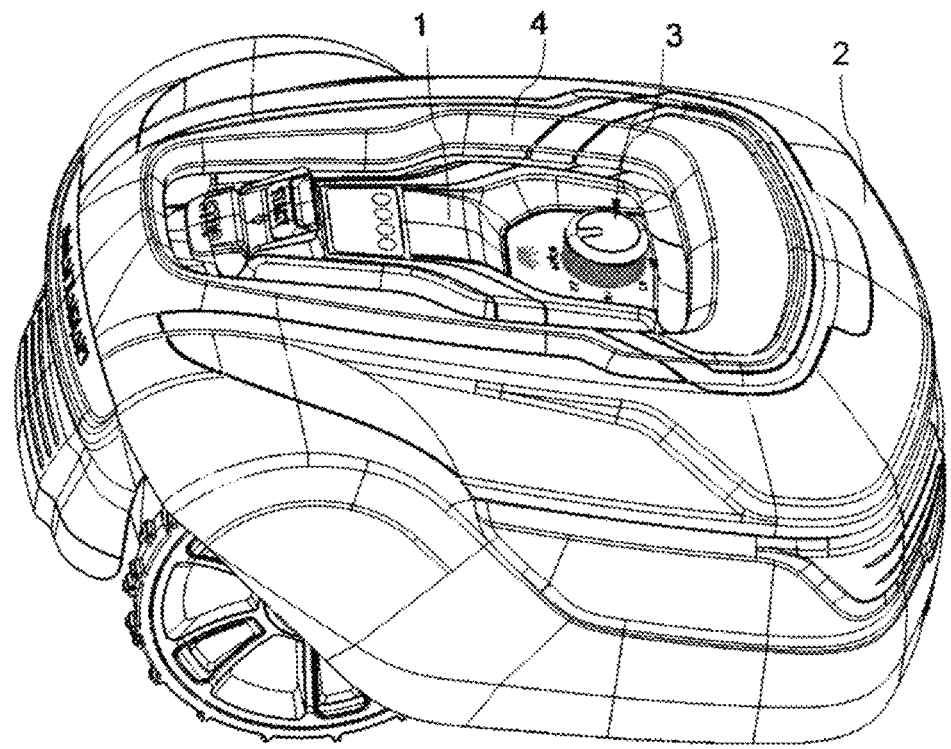
FIG. 1 through FIG. 10 are schematic views of a mower of the disclosure observed from different viewing angles.
Figure 2:
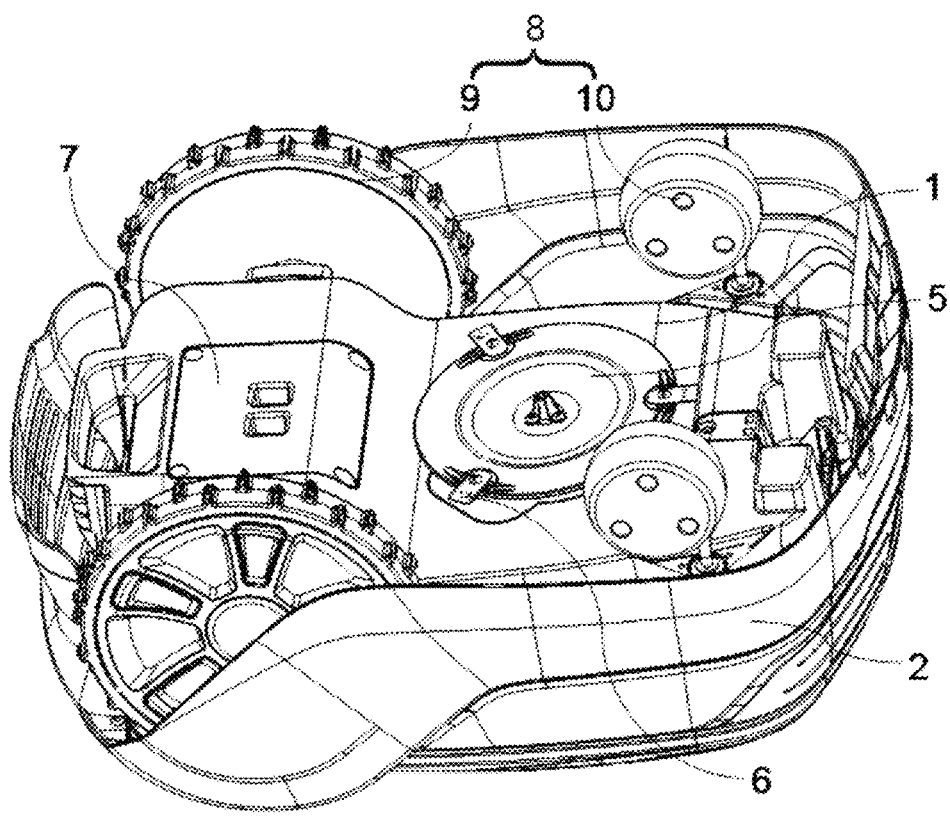
Figure 3:
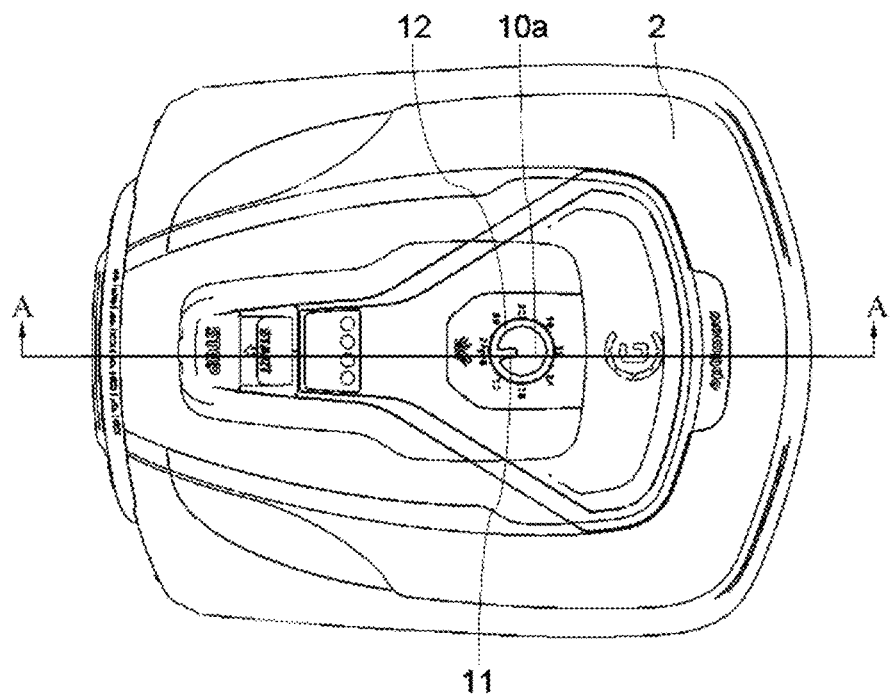

Embodiments of the disclosure will be described below through specific examples, and those skilled in the art can easily understand other advantages and effects of the disclosure from the content disclosed in this specification. The disclosure can be implemented or applied through other different specific embodiments, and various details in the specification can be modified or changed based on different viewpoints and applications without departing from the spirit of the disclosure.

The following embodiments are referring to the accompanying drawings for exemplifying specific implementable embodiments of the disclosure. Furthermore, directional terms described by the disclosure, such as upper, lower, front, back, left, right, inner, outer, side, etc., are only directions by referring to the accompanying drawings, and thus the used directional terms are used to describe and understand the disclosure, but the disclosure is not limited thereto.

The drawings and description are to be regarded as illustrative in nature and not restrictive. Like reference numerals designate like elements throughout the specification. In addition, the size and thickness of each component shown in the drawings allow ease of understanding and ease of description, but the disclosure is not limited thereto.

Referring to FIG. 1 through FIG. 10, in an embodiment of the disclosure, a mower is provided and can include a housing 1, a movable upper cover 2, a control assembly and a cutting mechanism 3. The movable upper cover 2 is disposed above the housing 1. The control assembly is disposed in the housing 1. The cutting mechanism 3 is disposed on the housing 1. The control assembly is configured (i.e., structured and arranged) for controlling the cutting mechanism to work. The movable upper cover 2 is disposed with a main body flip cover 4. The control assembly is for example, but not limited to, a single-chip microcomputer (e.g., MCU) or a processor module, and may control various mechanisms to work through corresponding driving circuits.

Referring to FIG. 4, FIG. 5 and FIG. 11 through FIG. 29C, the cutting mechanism 3 can include a blade carrier lifting assembly 79, a prime mover (prime motor) 36, a blade carrier height-adjustment assembly 37 and the blade carrier 5. The blade carrier lifting assembly 79 is mounted/installed on the housing 1 and configured (i.e., structured and arranged) for adjusting a height of the blade carrier 5. The prime mover 36 is disposed on the blade carrier lifting assembly 79 and configured for driving the blade carrier 5 to rotate. The blade carrier height-adjustment assembly 37 is fixedly installed on an output shaft of the prime mover 36. The blade carrier 5 is disposed on a bottom of the blade carrier height-adjustment assembly 37 and configured for installing blades 6 or providing blade installation locations. The blade carrier lifting assembly 79 and the blade carrier height-adjustment assembly 37 are suitable for adjusting a height of the blade carrier 5 individually or jointly.

As shown in FIG. 11 through FIG. 17b, the blade carrier lifting assembly 79 can include a blade carrier lifting bracket 29, a blade carrier connecting part 24, and an adjusting part 25. The blade carrier lifting bracket 29 is configured for fixing the prime mover 36. The blade carrier connecting part 24 is fixed onto the bottom of the blade carrier lifting bracket 29 and configured for mounting/installing the blade carrier 5 driven by the prime mover. The adjusting part 25 is fixed onto the top of the blade carrier lifting bracket 29 and configured for driving the blade carrier 5 by the blade carrier lifting bracket to move up and down, thereby adjusting the height of the blade carrier 5.

Figure 11:
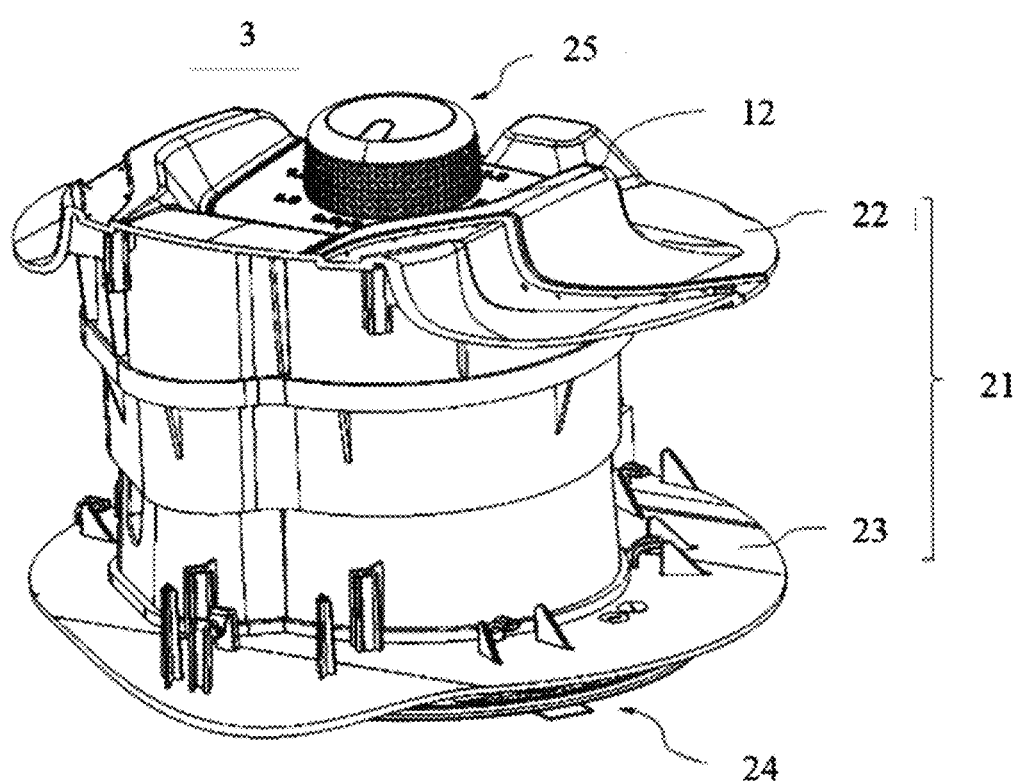
FIG. 11 through FIG. 13 are schematic views of a blade carrier lifting assembly.
Figure 12:
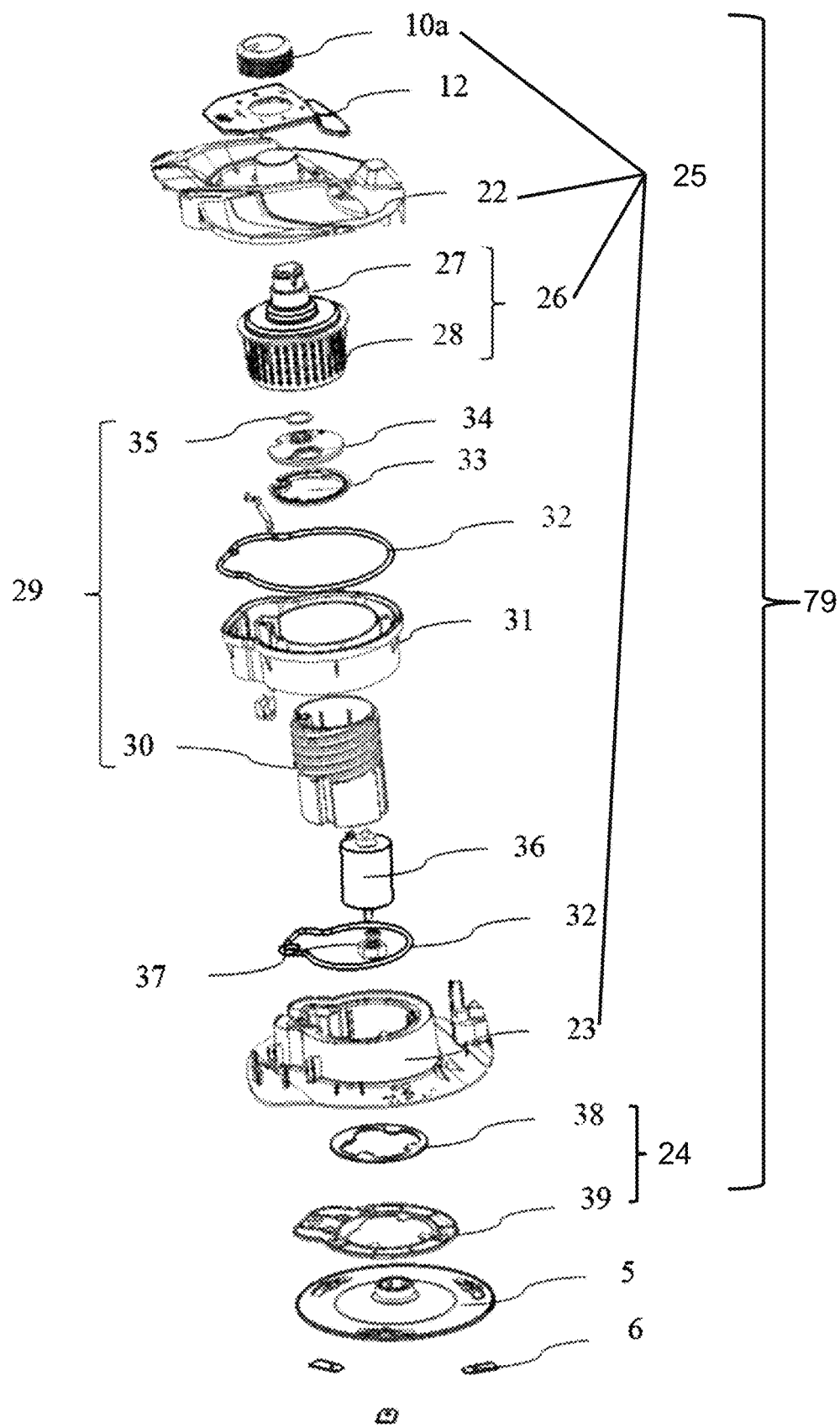
Figure 13:
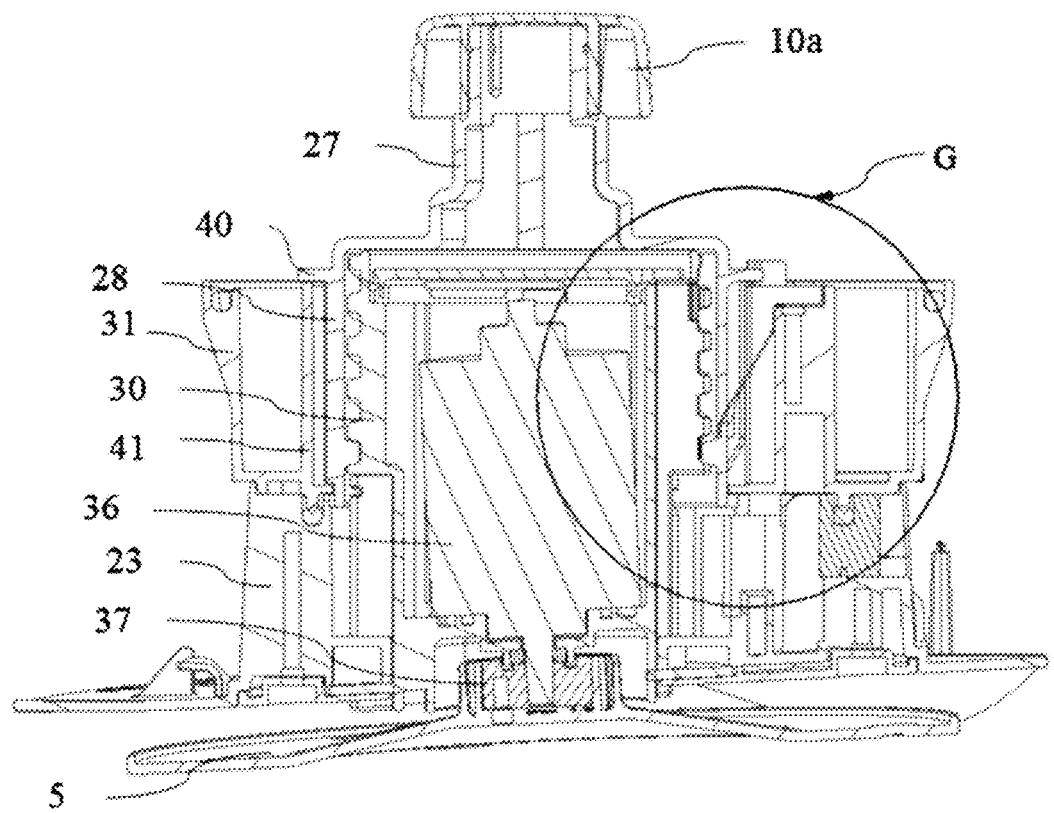
Figure 14:
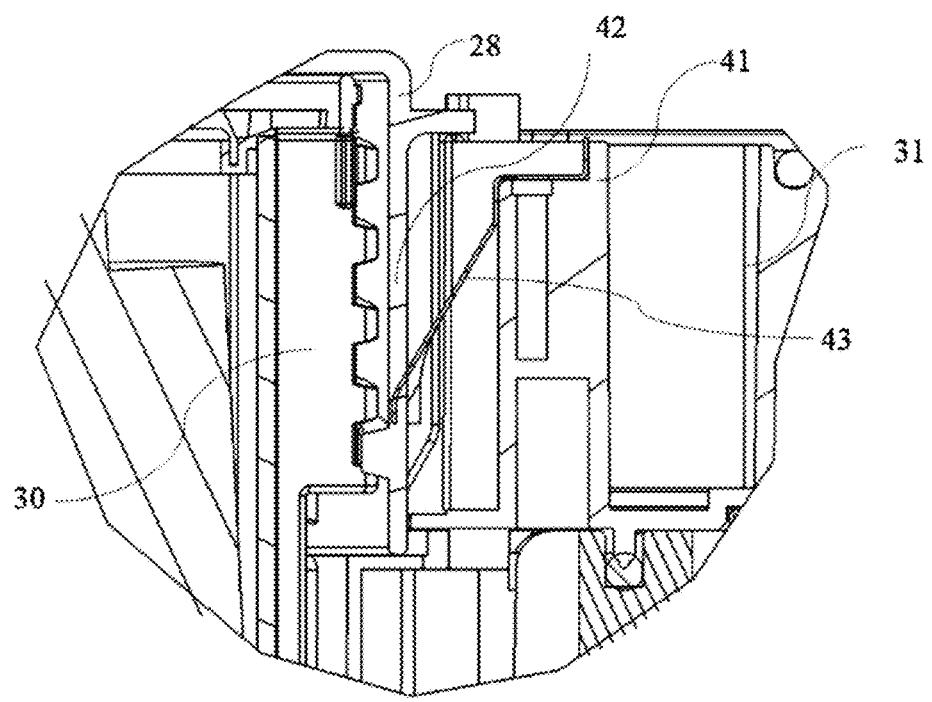
FIG. 14 is a schematic enlarged view of the portion G in FIG. 13.
Figure 15:
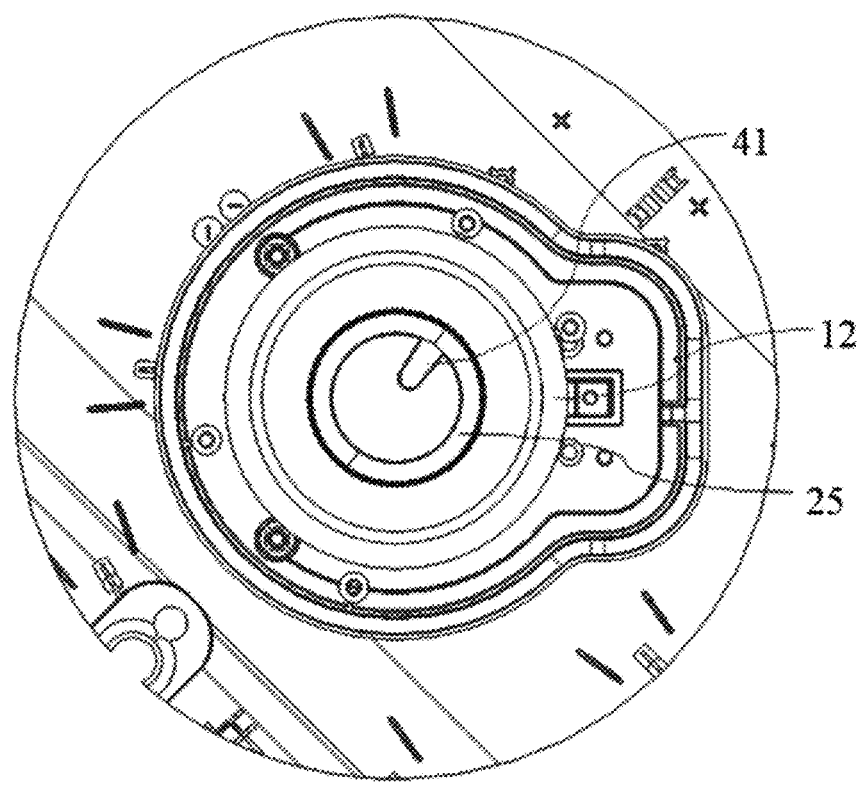
FIG. 15 and FIG. 16 are schematic structural views of the blade carrier lifting assembly observed from different viewing angles.

As illustrated in FIG. 11 through FIG. 13, the adjusting part 25 can include a fixing casing 21, a height-adjustment rod 26, and a height-adjustment knob 10a. The fixing casing 21 is used for accommodating the blade carrier lifting bracket 29. The height-adjustment rod 26 is interposed between the blade carrier lifting bracket 29 and the fixed housing 21 and connected to the top of the blade carrier lifting bracket 29. The height-adjustment knob 10a is fixed on the top of the height adjustment rod 26. By rotating the height-adjustment knob 10a, the blade carrier 5 is driven by the height-adjustment rod 26 to move upwards or downwards through the blade carrier lifting bracket 29.

In one embodiment, as shown in FIG. 11 and FIG. 12, the fixing casing 21 can include a face/top shell 22 and a bottom shell 23 which are separately arranged up and down. The height-adjustment rod 26 is arranged between the blade carrier lifting bracket 29 and the face shell 22. Optionally, the face shell 22 and the bottom shell 23 can be fixedly installed inside the housing through corresponding fasteners or limiters, and a space for accommodating the bracket is formed between the face shell 22 and the bottom shell 23.

In one embodiment, as shown in FIG. 12 and FIG. 13, the height-adjustment rod 26 can include a knob mounting portion 27 and a hollow connecting portion 28. The knob mounting portion 27 is used for mounting the height-adjustment knob 10a. The hollow connecting portion 28 is sleeved on an outer side of the blade carrier lifting bracket 29 through internal threads. Optionally, the knob mounting portion 27 can be, but not limited to, snapped or threaded or screwed to the height-adjustment knob 10a, so that when the height-adjustment knob 10a is rotated, the height-adjustment rod 26 can be driven to move upwards or downwards. The hollow connecting portion 28 is sleeved on the outer side of an upper part of the blade carrier lifting bracket 29 through the internal threads, and can drive the bracket to move by the height-adjustment rod.

In addition, as shown in FIG. 1, FIG. 3, FIG. 6 and FIG. 15, the adjusting part 25 further can include a dial 12 for displaying the height of the blade carrier 5. The dial is horizontally arranged on a surface of the face shell. The height-adjustment knob 10a is provided with a pointer 44 on a side thereof. When the height-adjustment knob is rotated, a value on the dial 12 corresponding to the pointer is the height of the blade carrier distant from the ground.

As shown in FIG. 12 and FIG. 13, the blade carrier lifting assembly 79 further includes a tightening member 31. Two ends of the tightening member 31 are respectively snapped with the face shell 22 and the bottom shell 23. The tightening member 31 is used for supporting the blade carrier lifting bracket 29. The top of the hollow connecting portion 28 is provided with a height-adjustment rod flange 40 extending outwards. The tightening member 31 is in a hollow ring shape, and its inner wall 41 is suitable for supporting the height-adjustment rod flange, so as to hold the height-adjustment rod 26 tightly between the blade carrier lifting bracket 29 and the face shell 22 to thereby prevent it from shaking up and down. In addition, sealing members 32 are provided at two ends of the tightening member 31 respectively, thereby preventing water from entering a cover end of the prime mover 36.

In one embodiment, as shown in FIG. 13, FIG. 14, FIG. 17a and FIG. 17b, the blade carrier lifting assembly 79 further includes a resilient piece 43 located between the tightening member 31 and the hollow connecting portion 28. One end of the resilient piece 43 is fixed onto the inner wall 41 of the tightening member 31, and the other end is snapped into one of height-adjustment rod grooves 42 at the outer side of the hollow connecting portion 28, so as to prevent the height-adjustment rod from rotating radially during a working of the mower. The height-adjustment rod grooves on the outer side of the hollow connecting portion 28 are in the shape of spaced strips.

When the height-adjustment rod rotates upwards or downwards, the resilient pieces can be sequentially inserted/snapped into the respective height-adjustment rod grooves along the height-adjustment rod grooves 42, so that a rotation force of the height-adjustment knob is always kept consistent to avoid jamming of the resilient piece and affecting the normal operation of the height-adjustment knob. Optionally, a mounting end 45 of the resilient piece 43 is for example, but not limited to, fixed on the tightening member by a screw, and a snapping end 46 is snapped into one of the height-adjustment rod grooves 42. In some embodiments, the resilient piece can be a spring, a torsion spring, and so on.

Optionally, as shown in FIG. 12, the blade carrier lifting bracket 29 can include a bracket body 30, and dust-proof nets 35 disposed on two ends of the bracket body 30 respectively. The dust-proof net 35 is assembled onto the cover end 34 of the prime mover 36 through a sealant 33, and is fastened onto the bracket body 30 by screws, which can provide waterproof and dust-proof for the prime mover. Meanwhile, the dust-proof nets have effects of ventilation and cooling to thereby prevent a motor from heating and expanding.

In one embodiment, as shown in FIG. 12 and FIG. 13, the blade carrier connecting part 24 can include a felt cover 39 and a dust-proof felt ring 38. The felt cover 39 is located/arranged between the blade carrier height-adjustment assembly 37 and the blade carrier 5. The dust-proof felt ring 38 is located on the felt cover 39 and configured to prevent grass cuttings from entering the blade carrier height-adjustment assembly 79 from the blade carrier 5.

Figure 4:
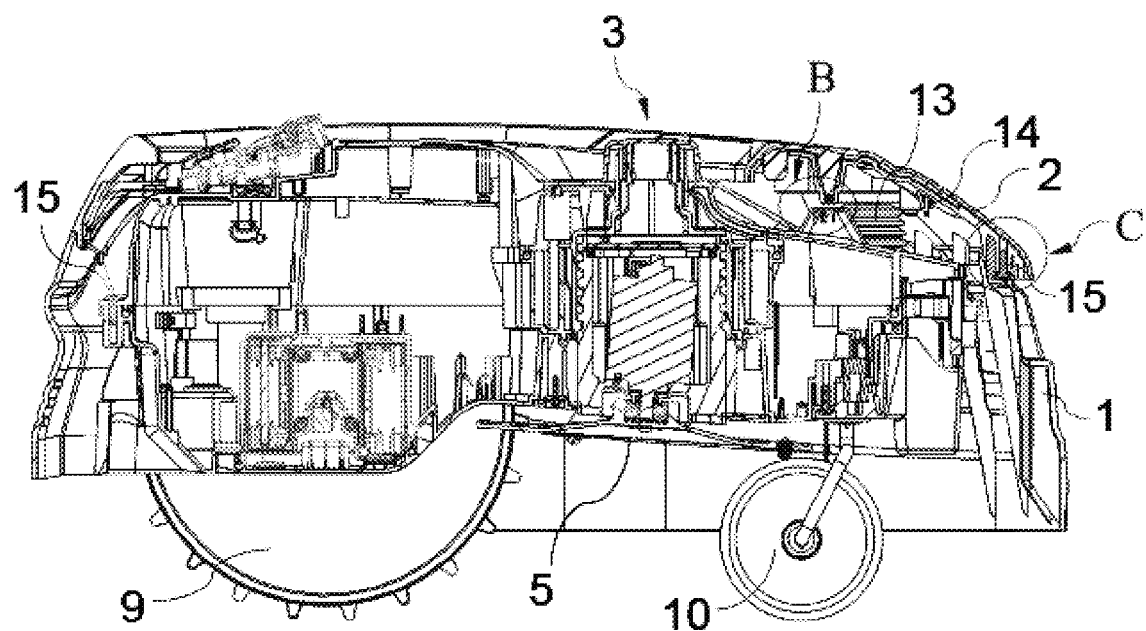
Figure 5:
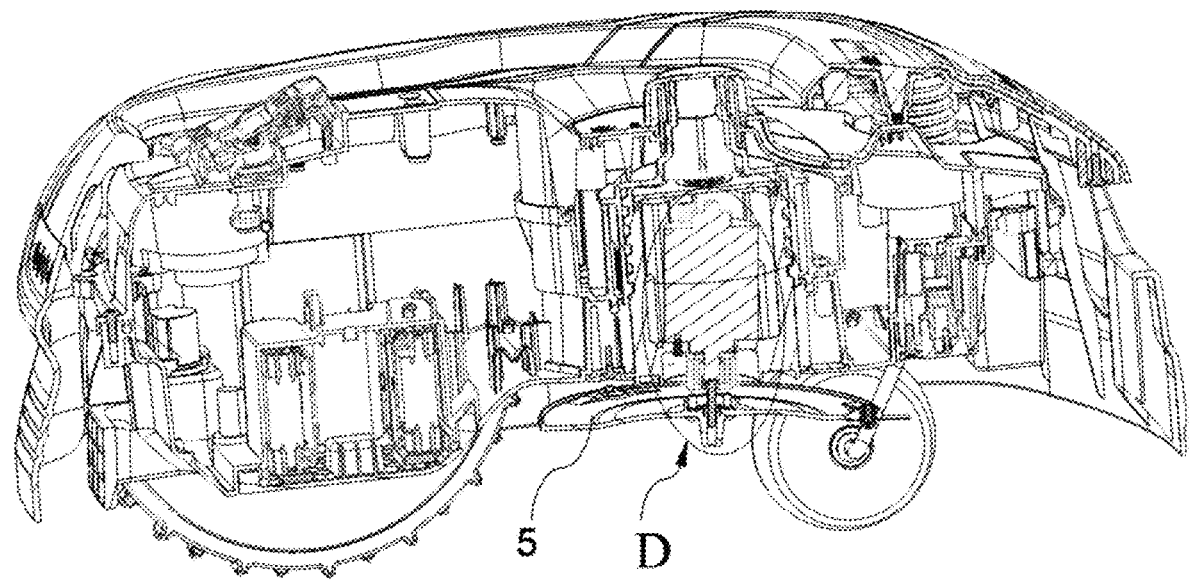
Figure 16:
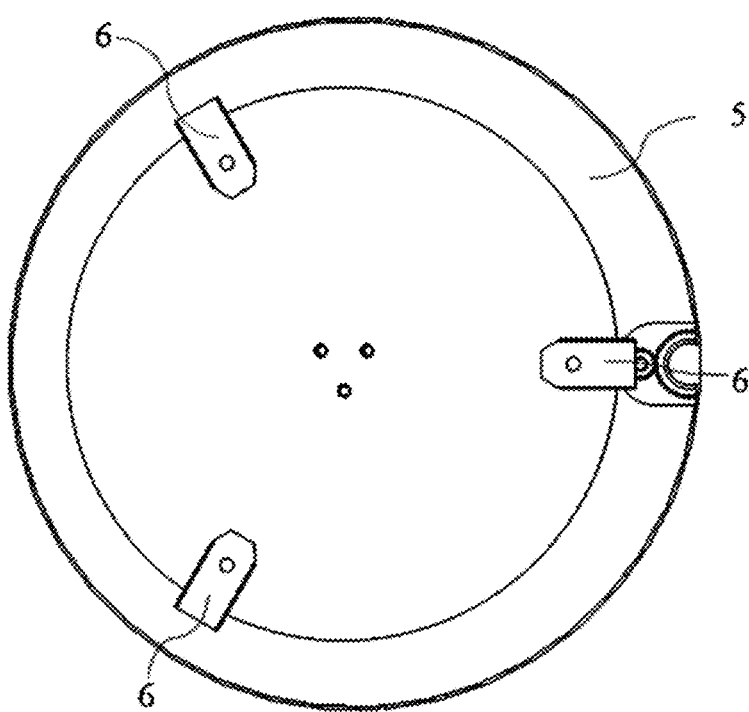
Figure 17A:
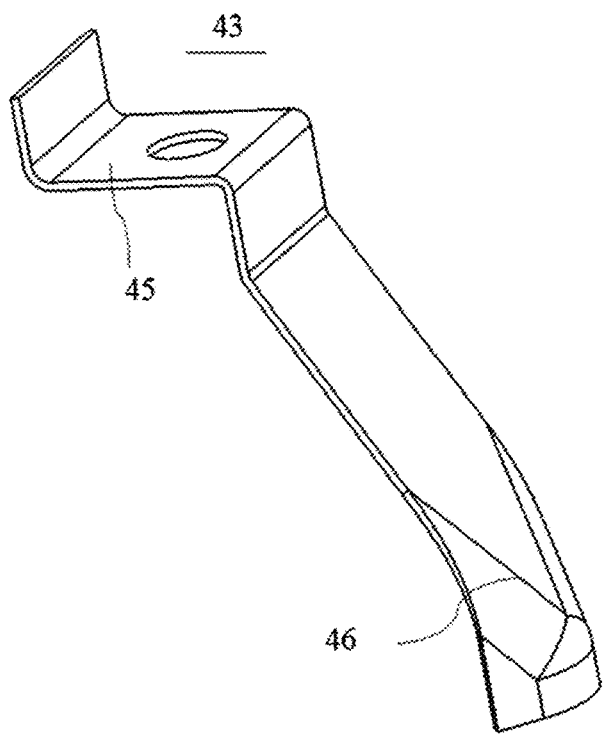
FIG. 17A and FIG. 17B are schematic perspective views of a resilient piece observed from different viewing angles.
Figure 17B:
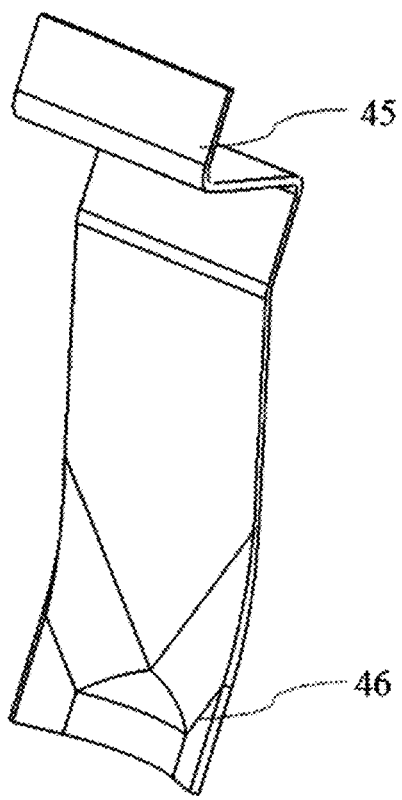

In one embodiment, as shown in FIG. 4, FIG. 5 and FIG. 16, the blade carrier height-adjustment assembly 37 is for example, but not limited to, installed on an output shaft of the prime mover 36 in a tight-fitting manner. A bottom surface of the height-adjustment assembly 37 can be attached to the blade carrier disk 5, which may be fitted with at least one blade 6 for cutting grass. In the illustrated embodiment, there may be three or more blades 6, and the three or more blades 6 may be evenly arranged/distributed on a circumference of the blade carrier disc 5. In other embodiments, the number of the blades 6 may be adjusted as required.

Specifically, as shown in FIG. 16, when it is necessary to increase the height of the blade carrier 5 or the blade 6 distant from the ground, by rotating the height-adjustment knob in a manual manner or other manner, the height-adjustment knob is rotated to drive the height-adjustment rod to rotate and rise, because the height-adjustment rod is threadedly connected with the bracket, the bracket is driven to rotate and rise correspondingly, the bracket then drives the prime mover 36 inside it to rise vertically, and consequently the blade carrier 5 is driven to rise through the blade carrier connector. That is, the height of the blade 6 distant from the ground is increased and can be displayed by the dial. When rotating the height-adjustment knob in an opposite direction, the height of the blade 6 distant from the ground can be reduced. After adjusting the height of the blade 6 from the ground, the prime mover 36 (such as a motor) can be controlled by the control assembly to start, and drive the blade 6 to rotate to thereby perform the mowing action.

Referring to FIG. 18 through FIG. 29*c*, the blade carrier height-adjustment assembly 37 can include at least two blade carrier connectors, and an adjusting part 50. The at least two blade carrier connectors movably sleeved from inside to outside in sequence. A first blade carrier connector 47 is located at the innermost side and fixedly mounted on the output shaft of the prime mover 36. A second blade carrier connector 57 is located on the outermost side and used to connect the blade carrier 5. The adjusting part 50 is used/configured to drive the second blade carrier connector 57 to move along a surface of the first blade carrier connector 47, so as to adjust the height of the blade carrier 5.

There may be two or more blade carrier connectors. When the number of blade carrier connectors is two, that is, the second blade carrier connector 57 is directly movably sleeved on the surface of the first blade carrier connector 47. When the number of blade carrier connectors is more than two, the remaining blade carrier connector(s) is/are all a third blade carrier connector(s), and all the third blade carrier connector(s) is/are arranged between the first blade carrier connector and the second blade carrier connector, and movably sleeved from the inside to the outside in sequence. For example, in the drawings of the disclosure, there are three blade carrier connectors, but additional number of blade carrier connectors may be included.

Figure 23A:
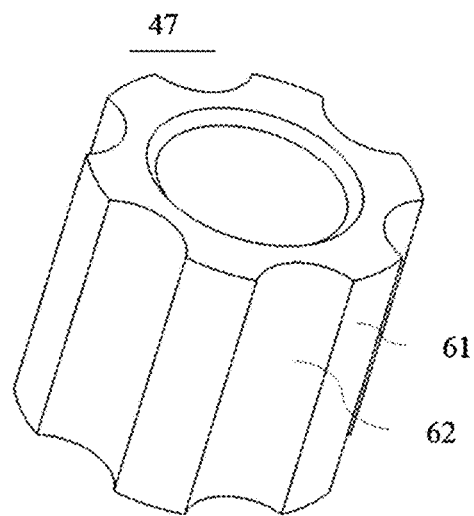
FIG. 23A and FIG. 23B are schematic perspective views of a first blade carrier connector observed from different viewing angles.
Figure 23B:
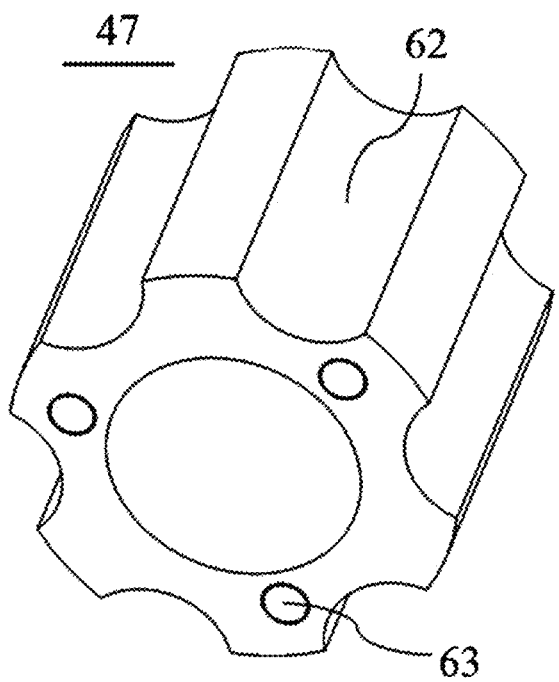

As shown in FIG. 23*a* and FIG. 23*b*, the first blade carrier connector 47 can include a hollow first body 61, and at least one first guide groove 62. The at least one first guide groove 62 is provided on an outer side of the first body 61. The first body 61 is tightly sleeved onto the outer side of the output shaft of the prime mover 36, and used for guiding the blade carrier connector adjacent to the outer side thereof to move via the first guide grooves 62.

As shown in FIG. 23*a* and FIG. 23*b*, the first body 61 is in a hollow cylindrical shape and opened at both ends, so as to facilitate to be sleeved onto the output shaft of the prime mover 36 and the mounting of the height-adjusting rod. The first guide grooves 62 are evenly distributed on the surface of the first body 61. The first guide grooves 62 each are the same height as the first body 61, that is, each of the first guide grooves 62 is a through groove.

In one embodiment, as shown in FIG. 23*b*, a lower end of the first body 61 is further provided with at least one first mounting hole 63 for mounting first limiters 55. The first limiters 55 are for example, but not limited to, screws or bolts, and are installed in the first mounting holes 63 by threads. A wide head 56 of each of the first limiters 55 protrudes into a groove end of the first guide groove, so as to restrict the guide portion adapted thereto from sliding out, that is, to restrict/limit the blade carrier connector adjacent to the outer side of the first blade carrier connector from escaping from the surface of the first blade carrier connector. In the illustrated embodiment, when there are two blade carrier connectors, the wide head of the first limiter 55 is used to restrict the second blade carrier connector from separating/detaching from the surface of the first blade carrier connector. When there are at least three blade carrier connectors, the wide head 56 of the first limiter 55 is used to restrict the third blade carrier connector from separating from the surface of the first blade carrier connector.

Figure 24A:
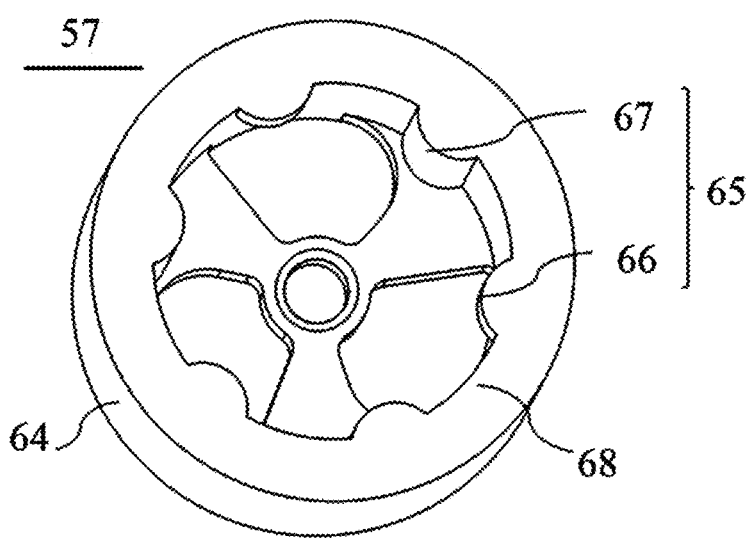
FIG. 24A and FIG. 24B are schematic perspective views of a second blade carrier connector observed from different viewing angles.
Figure 24B:
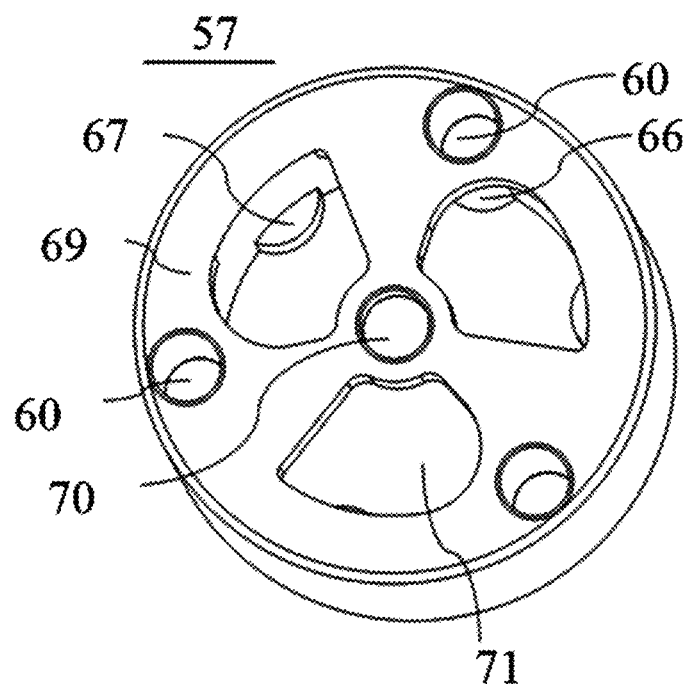

As illustrated in FIG. 24*a* and FIG. 24*b*, the second blade carrier connector 57 can include a hollow second body 64, at least one protruding second guide portion 65, an open end 68, and a closed end 69. The at least one protruding second guide portion 65 is disposed on an inner side of the second body 64. The open end 68 is located at an end of the second body 64 and used to be sleeved by the blade carrier connector on the inner side thereof. The closed end 69 is located at the other end of the second body 64 and used to install the adjusting part 50. The second guide portion(s) 65 is/are fitted with the guide groove(s) adjacent thereto, as so to guide the second blade carrier connector 57 to move along the blade carrier connector adjacent to the inner side of the second blade carrier connector 57.

In one embodiment, as shown in FIG. 24*a* and FIG. 24*b*, the second body 64 has a hollow cylindrical shape. One end of the second body 64 is opened (i.e., open end 68), so as to be sleeved on the blade carrier connector in the inner side thereof, such as the first blade carrier connector 47 or the third blade carrier connector 48. The other end of the second body 64 is closed (namely, closed end 69), and is used to install the blade carrier and the adjusting end of the height-adjustment rod. The second guide portions 65 are evenly distributed on the inner surface of the second body 64. The second guide portions 65 includes at least one second long-protrusion 66 and at least one second short-protrusion 67 arranged in an alternate manner. The second long-protrusion 66 has a height substantially equal to a height of the second body 64. A height of the second short-protrusion 67 is smaller than the height of the second body 64, and is arranged close to the open end 68 of the second body 64 to cooperate with the corresponding limiter/stopper, thereby preventing the second blade carrier connector 57 from detaching from the surface of the third blade carrier connector 48 or the first blade carrier connector 47.

In one embodiment, as shown in FIG. 24b, the closed end of the second body 64 is further provided with at least one blade carrier mounting hole 60 to be tightly fastened to the blade carrier 5 by fasteners. The at least one blade carrier mounting hole 60 is located at a bottom of the at least one second long-protrusion 66.

Figure 18:
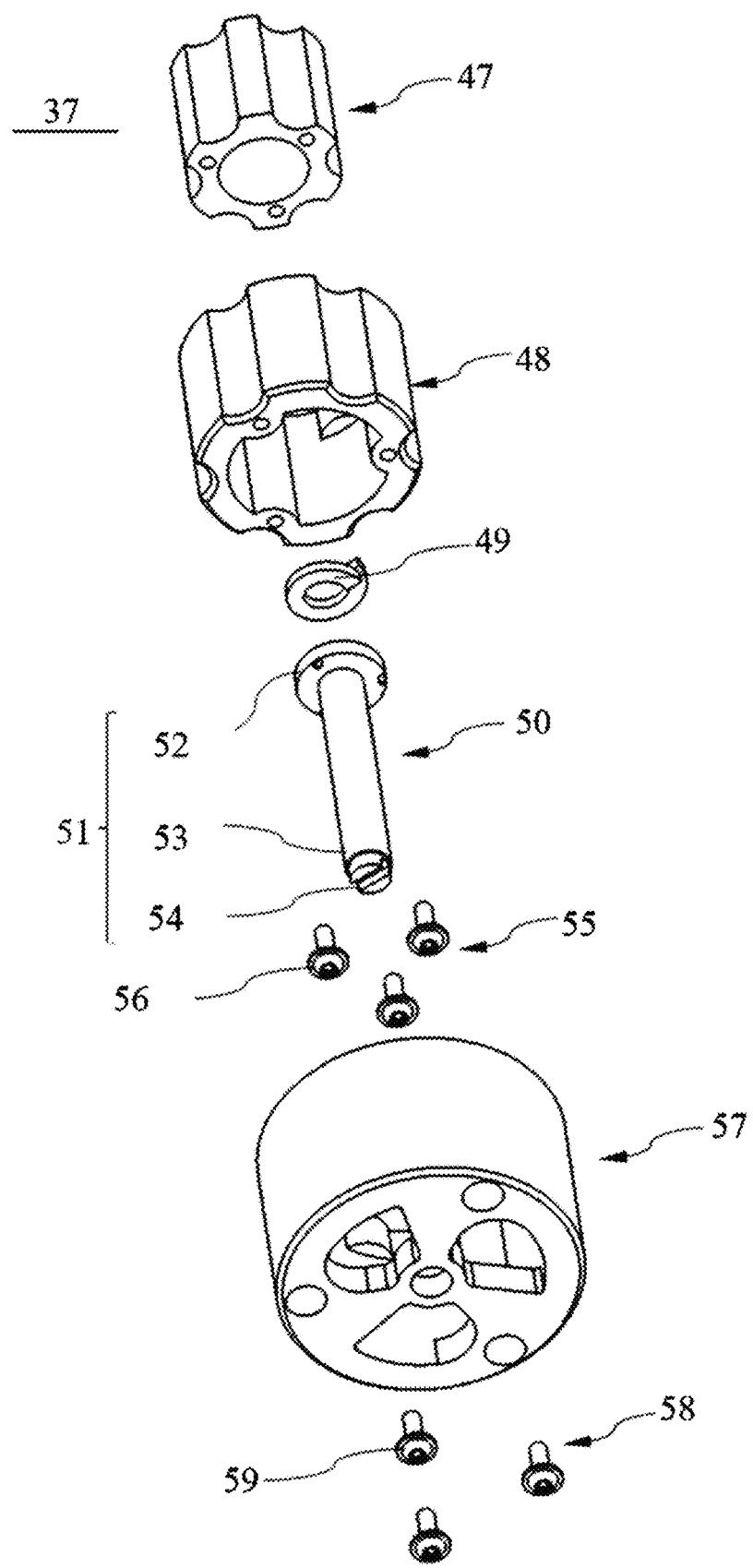
FIG. 18 through FIG. 21 are schematic views of a blade carrier height-adjustment assembly.

In one embodiment, as shown in FIG. 18, at least one third blade carrier connector 48 is provided between the first blade carrier connector 47 and the second blade carrier connector 57. When there is at least one third blade carrier connector 48, the number of the blade carrier connectors in the blade carrier height-adjustment assembly may be three. When there are at least two third blade carrier connectors 48, that is, the number of the blade carrier connectors in the blade carrier height-adjustment assembly may be at least four, and the third blade carrier connectors 48 may have the structure, but sizes thereof are different, so as to be movably sleeved from the inside to the outside.

Figure 25A:
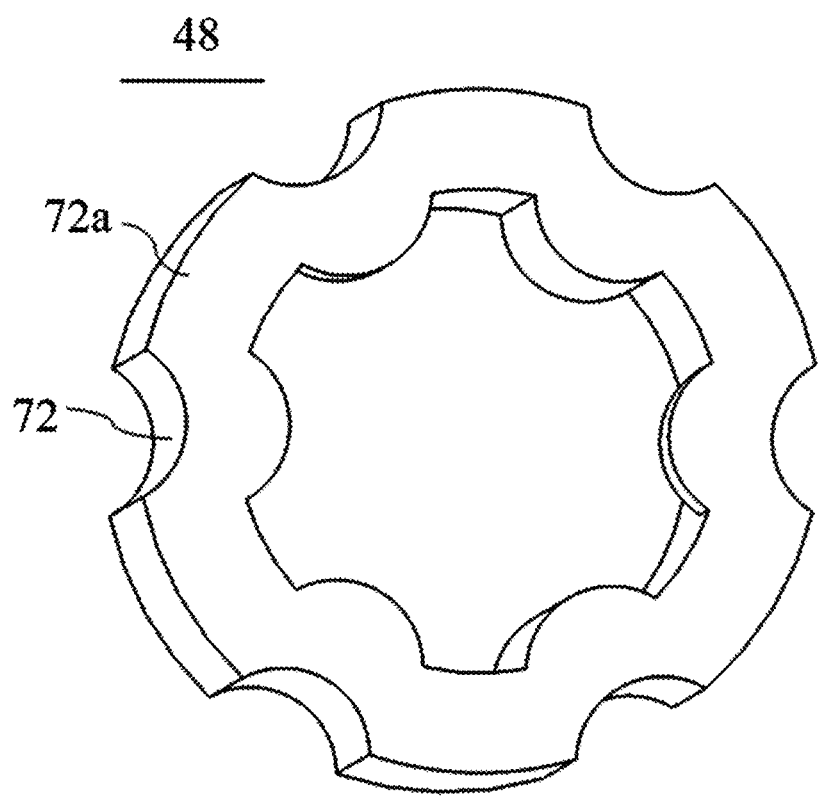
FIG. 25A and FIG. 25B are schematic perspective views of a third blade carrier connector observed from different viewing angles.
Figure 25B:
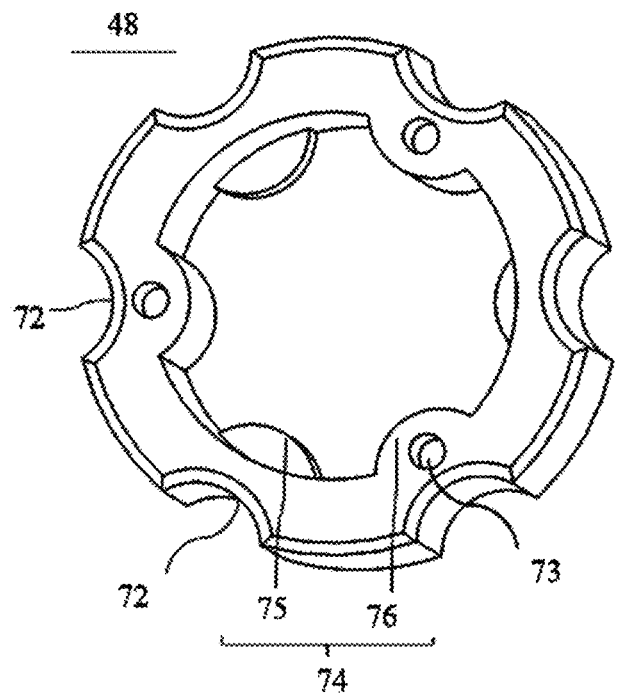

As illustrated in FIG. 25a and FIG. 25b, the third blade carrier connector 48 can include a hollow third body 72a, at least one protruding third guide portion 74, and at least one third guide groove 72. The at least one protruding third guide portion 74 is located on an inner side of the third body 72a and adapted to at least one guide groove internally adjacent thereto. The at least one third guide groove 72 is located on an outside of the third body 72a and adapted to at least one guide portion externally adjacent thereto.

In one embodiment, as shown in FIG. 25a and FIG. 25b, the third body 72a can be hollow cylindrical. Two ends of the third body 72a are opened, so as to be sleeved onto the blade carrier connector inside the third body 72a. The third guide grooves 72 are evenly distributed on a surface of the third body 72a. The third guide grooves 72 each have a height same as that of the third body 72a, that is, the third guide grooves 72 are through grooves. The third guide portions 74 are evenly distributed on the inner surface of the third body 72a. The third guide portions 74 each include at least one third long-protrusion 75 and at least one third short-protrusion 76 arranged in an alternate manner. A height of the third long-protrusion 75 may be equal to a height of the third body 72a.

The third short-protrusion 76 can have a height smaller than the height of the third body 72a, and is arranged near the lower end of the third body 72a to cooperate with the corresponding limiter, thereby preventing the second blade carrier connector or the other third blade carrier connector from detaching from the surface of the third blade carrier connector. In the disclosure, the third guide portion and the third guide groove may correspond one-to-one, and are oppositely arranged on the inner and outer sides of the third body. The third guide portion and the third guide groove can be arranged staggered, as long as it can met assembling requirements.

Figure 21:
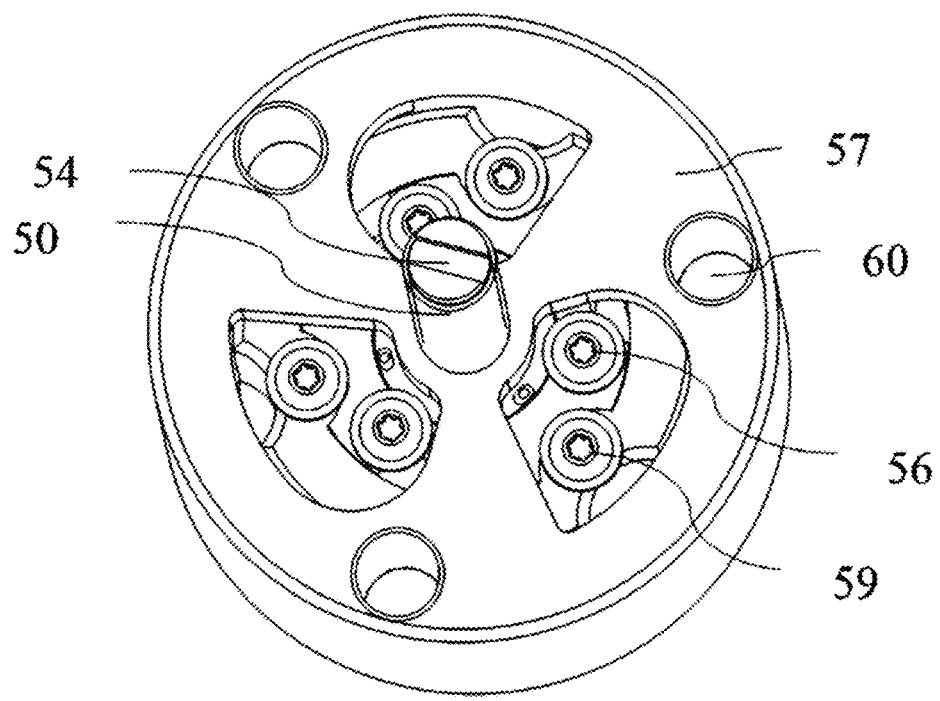

In one embodiment, as shown in FIG. 21 and FIG. 25b, the lower end of the third body 72a is further provided with at least one third mounting hole 73 for mounting the third limiter 58. The third mounting hole 73 is located at the bottom of the third long-protrusion. The third limiter 58 is for example, but not limited to, a screw or a bolt, and may have a structure same as or different from that of the first limiter, and further is installed in the third mounting hole 73 through threads. A wide head 59 of the third limiter 58 protrudes out of the groove end of the third guide groove 72 to restrict the guide portion that fits with it from sliding out, that is, to prevent the blade carrier connector adjacent to the outside of the third blade carrier connector from being separated from the surface of the third blade carrier connector.

In the disclosure, as shown in FIG. 4, the wide head 56 of the first limiter 55 is used to restrict the first blade carrier connector 47 from separating from the surface of the third blade carrier connector 48. When there are three blade carrier connectors, the wide head 59 of the third limiter 58 is used to restrict the second blade carrier connector 57 from being separated from the surface of the third blade carrier connector 48 from the bottom. When there are at least four blade carrier connectors, the wide head 59 of the third limiter 58 is used to restrict the blade carrier connector on the outside from being separated from the surface of the third blade carrier connector.

Figure 19:
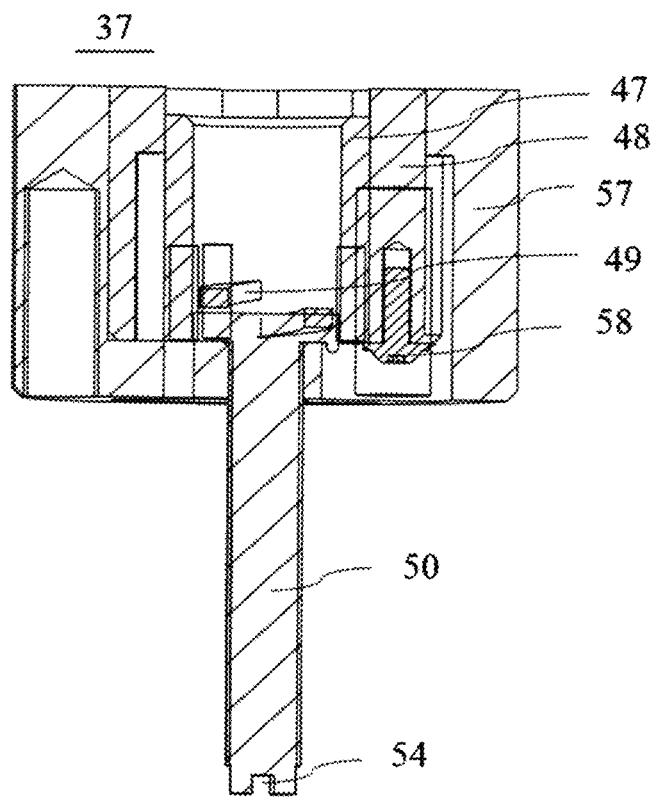
Figure 20:
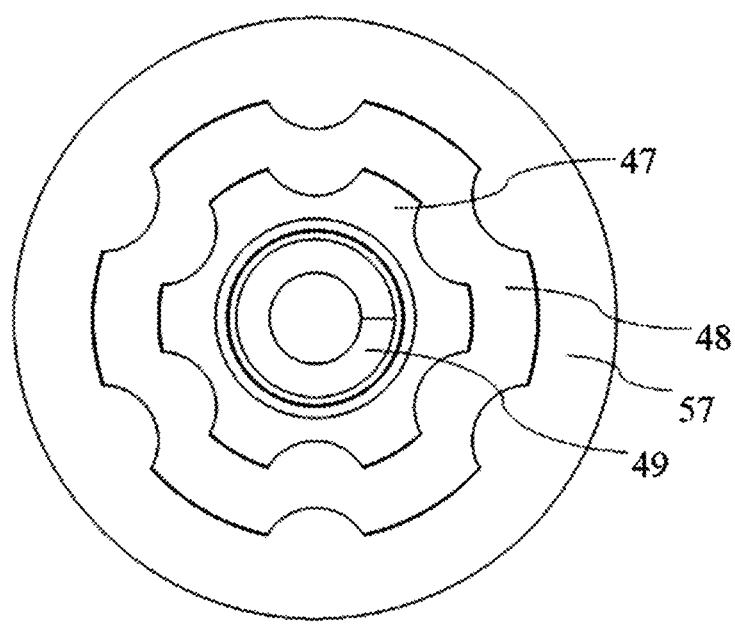
Figure 26:
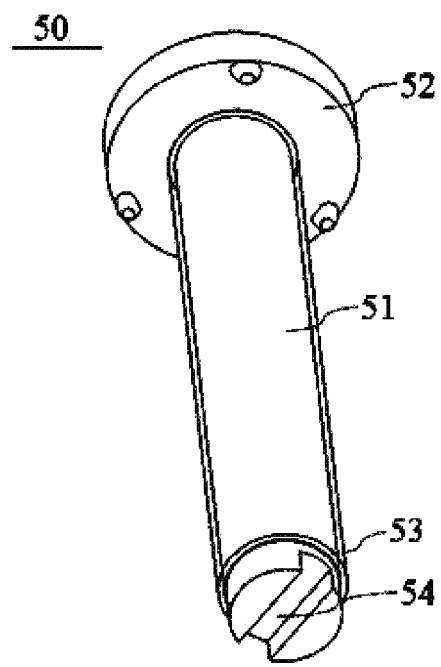
FIG. 26 is a schematic perspective view of a height-adjustment rod observed from a bottom viewing angle.
Figure 27:
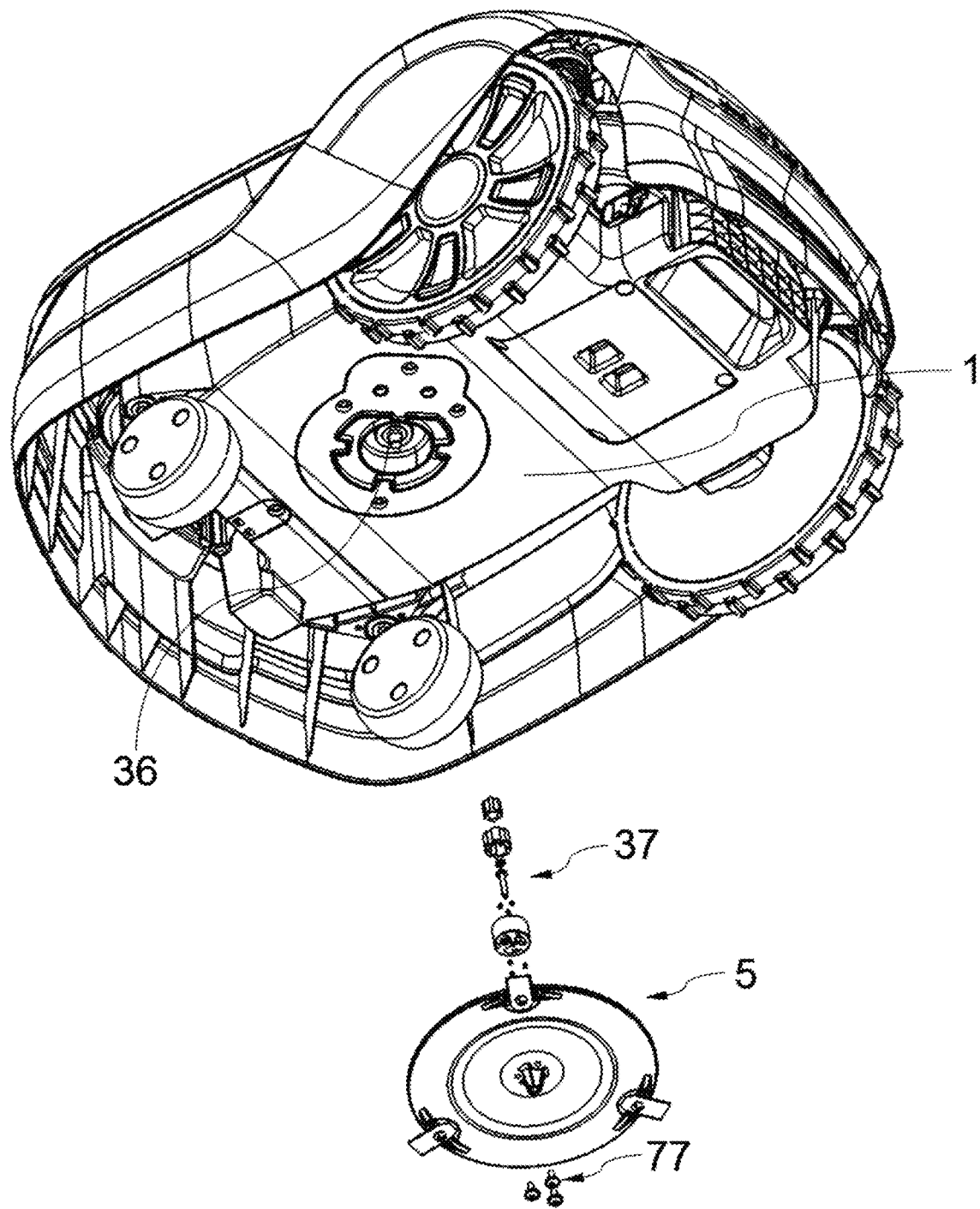
FIG. 27 is a schematic perspective view of the blade carrier height-adjustment assembly of the mower after being exploded.

As illustrated in FIG. 19 and FIG. 26, the adjusting part 50 includes a height-adjustment rod 51. A mounting end 52 of the height-adjustment rod 51 touches against the output shaft of the prime mover 36, and an adjusting end 53 of the height-adjustment rod 51 penetrates through each the blade carrier connector and is threadedly connected the blade carrier 5. By rotating the height-adjustment rod 51, the blade carrier 5 drives the second blade carrier connector 57 to move. The closed end 69 of the second body is provided with a through hole 70 for the height-adjustment rod 51 to extend/penetrate through. The closed end 69 of the second body may further be provided with other structural holes 71 to play the role of assembling or observation or weight reduction.

Figure 28:
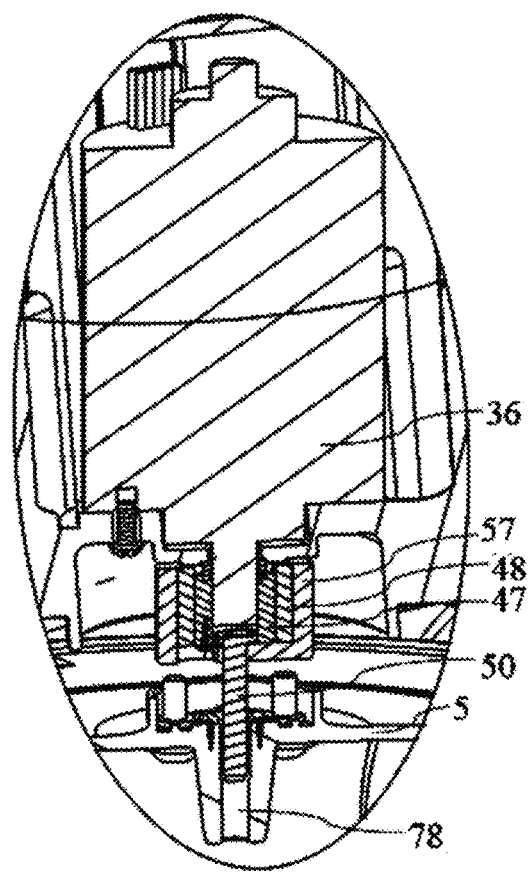
FIG. 28 is a schematic enlarged view of the portion D in FIG. 5.

In one embodiment, as shown in FIG. 18 and FIG. 28, the mounting end 52 of the height-adjustment rod 51 is fitted in the first body 61 through the first limiters 55. An adjustment groove is disposed on the adjustment end 53 of the height-adjustment rod 51. The blade carrier 5 is provided with a threaded through hole 78 suitable for the movement of the adjustment end 53. A spring washer 49 is provided between the height-adjustment rod 51 and the output shaft of the prime mover 36.

As shown in FIG. 18 and FIG. 28, a process of adjusting the height of the blade carrier through the blade carrier height-adjustment assembly 37 is for example summarized as the following two cases, but other possible implementations for adjusting the height of the blade carrier by the blade carrier height-adjustment assembly 37 should also be within the protection scope of the disclosure.

In case (1), the process of adjusting the height of the blade carrier by two blade carrier connectors is as follows: manually or by other means, such as using a screwdriver or other tool to snap into an adjustment groove 54 and rotating the height-adjustment rod 51, so that the blade carrier is driven to move up or down by the height-adjustment rod 51 during the rotating. In this case, the second blade carrier connector is driven by the blade carrier to move along the first blade carrier connector, thereby completing the height adjustment action of the blade carrier. Since the adjustment process of the blade carrier and the movement process of the blade carrier connector are relatively simple, they will not be illustrated with reference to accompanying drawings.

In case (2), since the processes of adjusting the height of the blade carrier by three and more than three blade carrier connectors are similar, taking three blade carrier connectors as an example to explain the height adjustment action of the blade carrier, and a specific adjustment process is as follows: as shown in FIG. 22a and FIG. 22b, or FIG. 29a through FIG. 29c, the first blade carrier connector 47, the third blade carrier connector 48 and the second blade carrier connector 57 are movably sleeved from inside to outside.

Figure 22A:
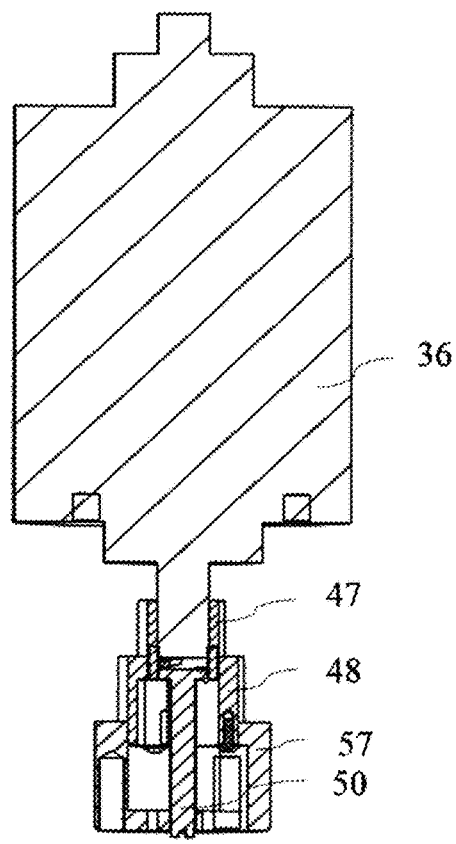
FIG. 22A and FIG. 22B are schematic views of lowering and lifting a height of a blade carrier by the blade carrier height-adjustment assembly.
Figure 22B:
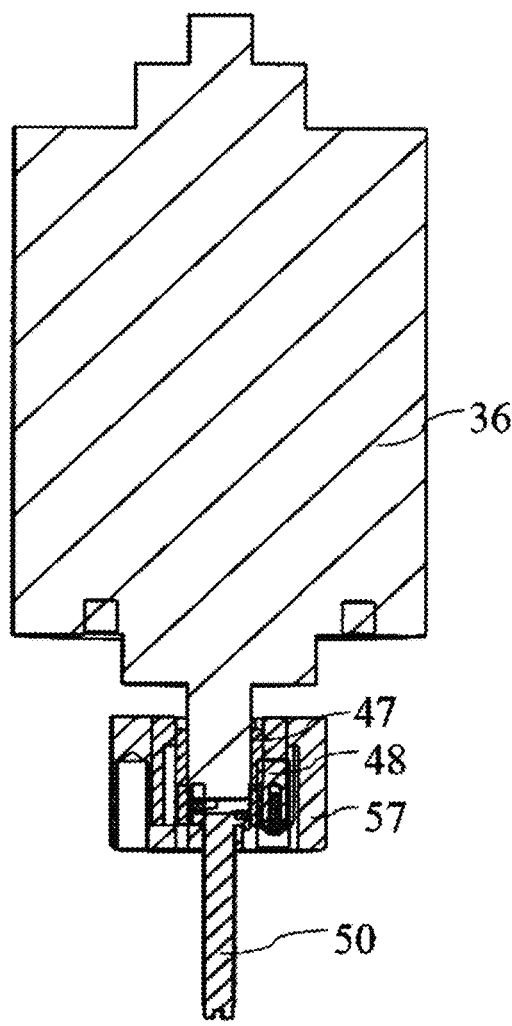
Figure 29A:
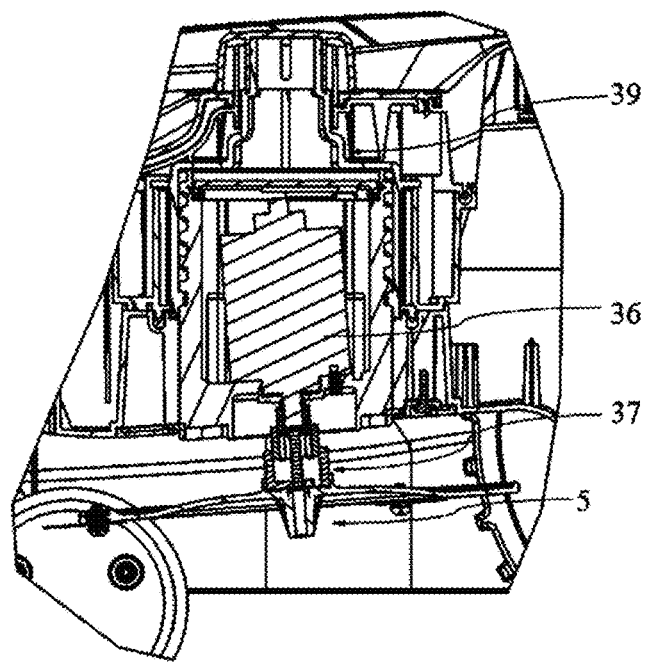
FIG. 29A through FIG. 29C are schematic views of lowering, adjusting and lifting the height of the blade carrier in the mower.

To facilitate the adjustment of the blade carrier, an adjustment process may include: Step 1: first assume that the blade carrier 5 initially is at a lowest height (as shown in FIG. 22a or FIG. 29a). In this case, the first limiters 55 are installed into the first mounting holes 63, the wide head 56 of the limiter 55 protrudes out of the first guide groove 62 and touches against the bottom of the third short-protrusion 76 to restrict the third blade carrier connector from detaching from the outside of the first blade carrier connector 47. Further, the wide head 56 of the first limiter 55 also protrudes out of the hollow portion of the first body 61 and touches against the bottom of the mounting end 52 of the height-adjustment rod 51, so as to restrict the height-adjustment rod 51 from being detached from the inner side of the first blade carrier connector 47. The third limiters 58 are installed into the third mounting holes 73, and the wide head 59 of the third limiter 58 protrudes out of the third guide groove 72 and touches against the bottom of the second short-protrusion 67, so as to limit the second blade carrier from detaching from the outside of the third blade carrier connector 48.

Step 2: rotate the height-adjusting rod 51 as per the above-described method. In this case, the blade carrier 5 is driven by the height-adjusting rod 51 to rise during the rotating; and in this case, the blade carrier 5 firstly drives the second blade carrier connector 57 to move along a surface of the third blade carrier connector 48, so as to increase the height of the blade carrier distant from the ground.

Step 3: when the closed end 69 (bottom end) of the second blade carrier connector 57 touches against the third limiter 58 or the bottom of the third body 72a, the second blade carrier connector 57 is completely sleeved on the outside of the third blade carrier connector 48.

Figure 29B:
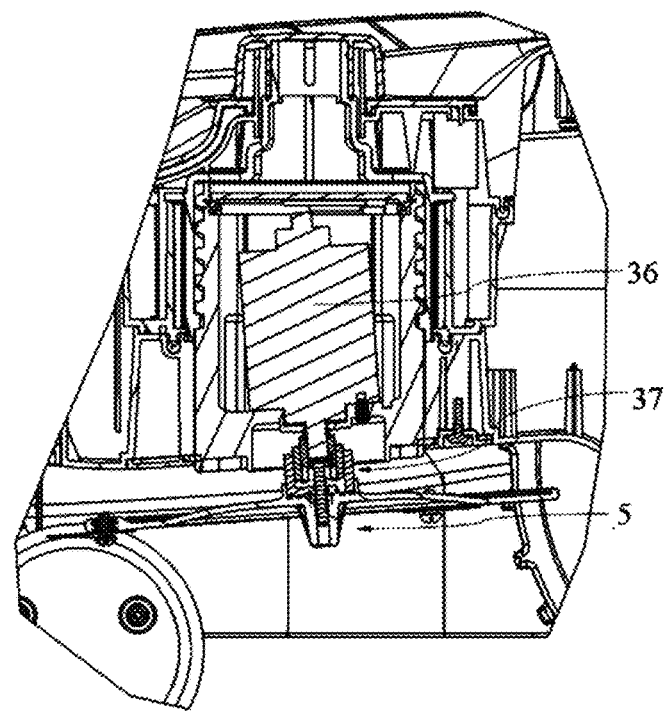
Figure 29C:
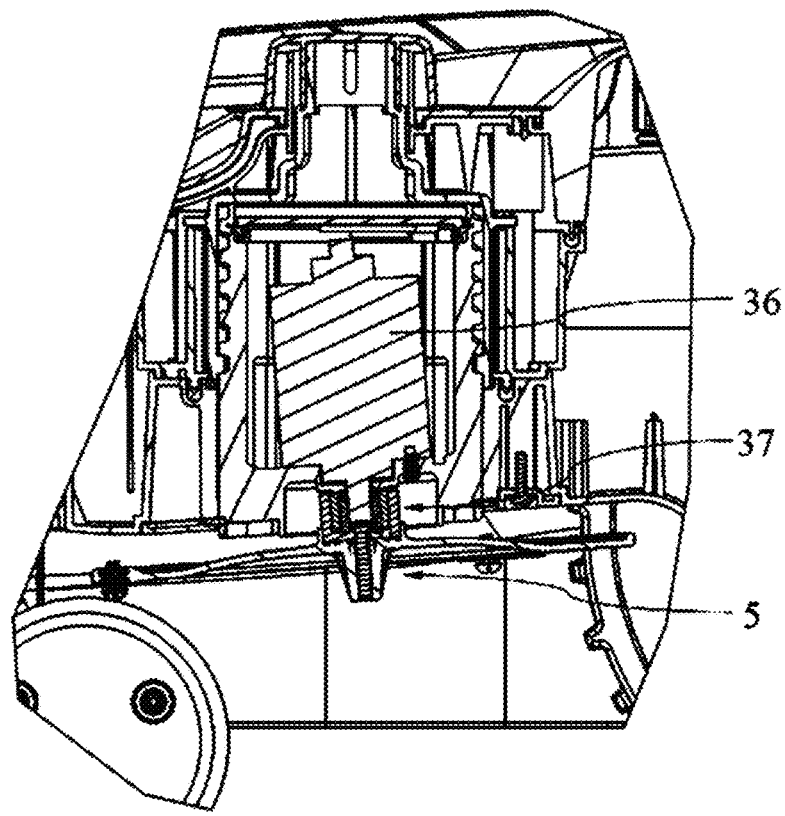

Step 4: the second blade carrier connector 57 continues to move upwards, and the third blade carrier connector 48 is driven to move along the surface of the first blade carrier connector 47 by the second blade carrier connector 57 (as shown in FIG. 29b), so that the height of the blade carrier from the ground is further increased until the third blade carrier connector 48 is completely sleeved on the outside the first blade carrier connector 47. In this case, the first blade carrier connector 47, the third blade carrier connector 48 and the second blade carrier connector 57 are completely sleeved one after another in that order from inside to outside, the closed end of the second blade carrier connector 57 touches against the bottom of the first blade carrier connector 47, so that the blade carrier 5 is adjusted to a higher position.

Referring to FIG. 30 through FIG. 33, the detecting mechanism can include at least one suspension-lifting detection assembly 20 and at least one collision detection assembly 93. The at least one suspension-lifting detection assembly 20 is located on the housing 1 and configured to detect a relative displacement between the movable upper cover 2 and the housing 1 in a vertical direction. The at least one collision detection assembly 93 is located on the housing 1 and configured to detect a relative displacement between the movable upper cover 2 and the housing 1 in a horizontal direction. The control assembly is adapted to adjust a working state of the mower according to detection signals. The control assembly may include a processor, various control circuits, sensing units, and corresponding driving circuits, etc., and can detect changes in current signals to control shutdown or work of the mower.

Figure 6:
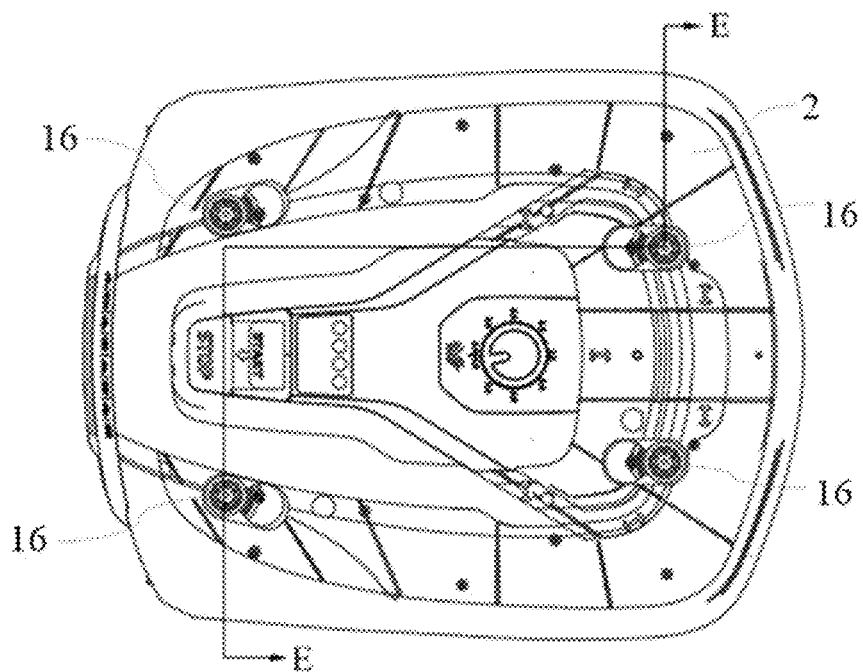
Figure 7:
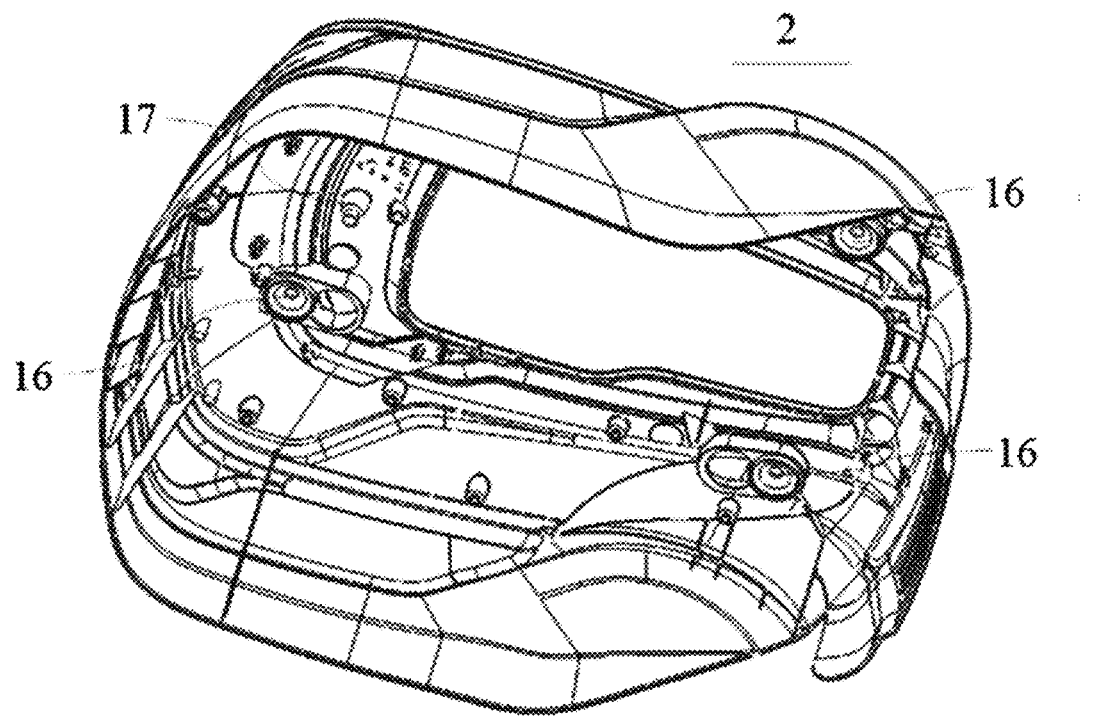
Figure 8:
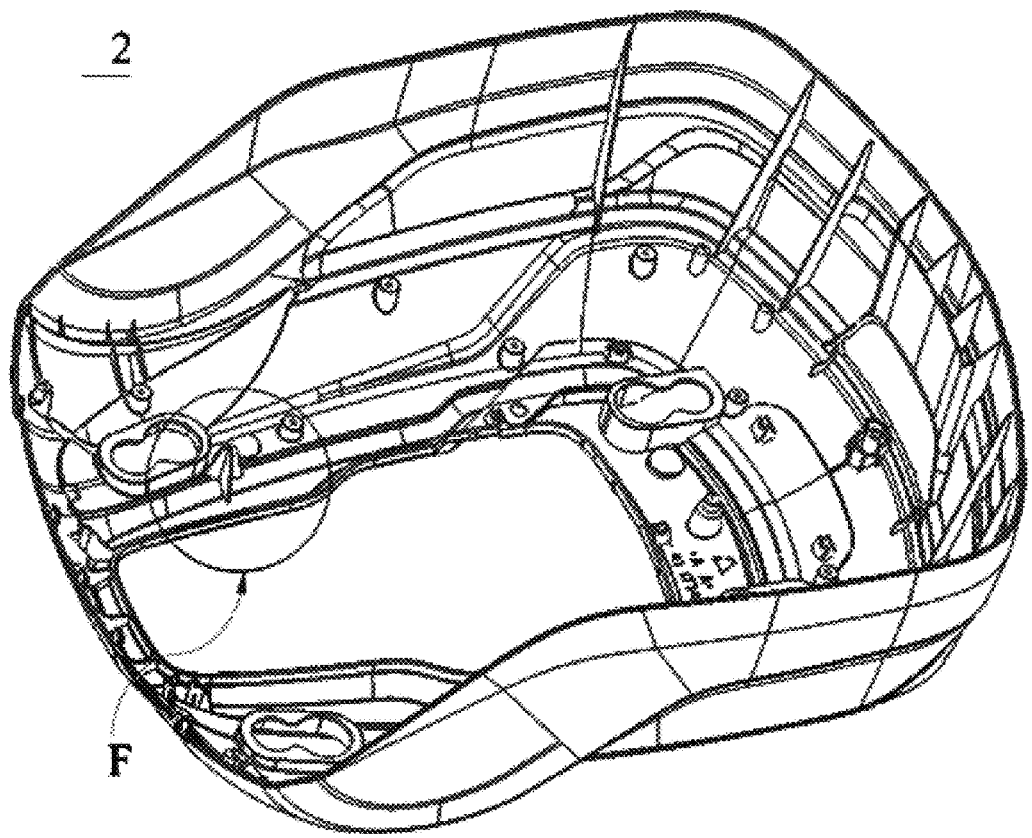
Figure 9:
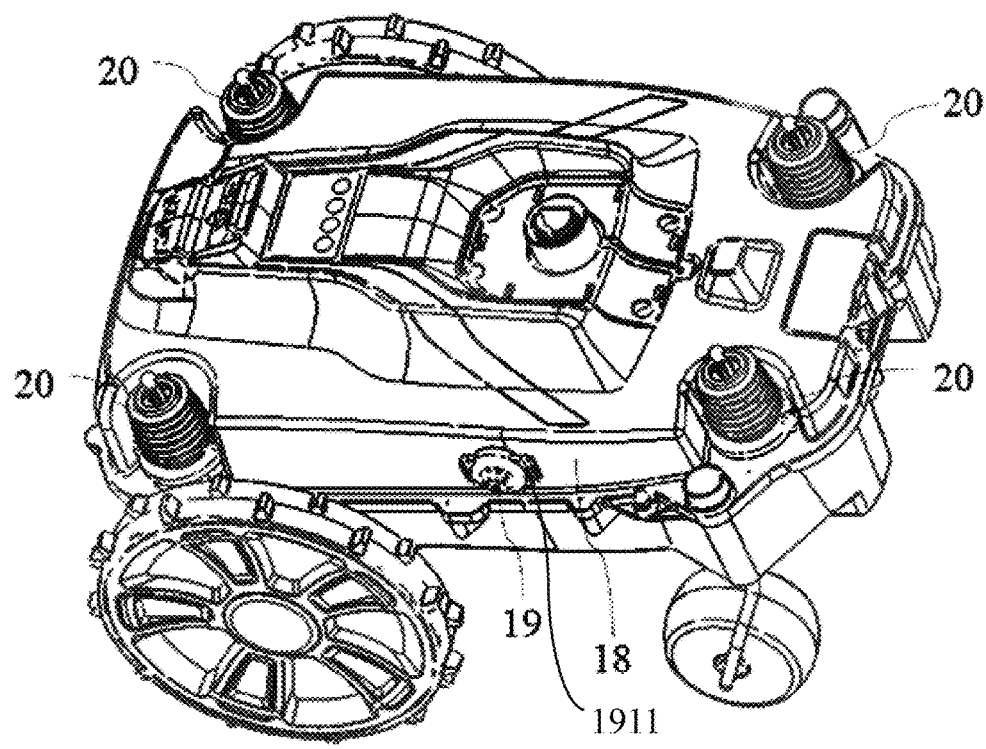
Figure 10:
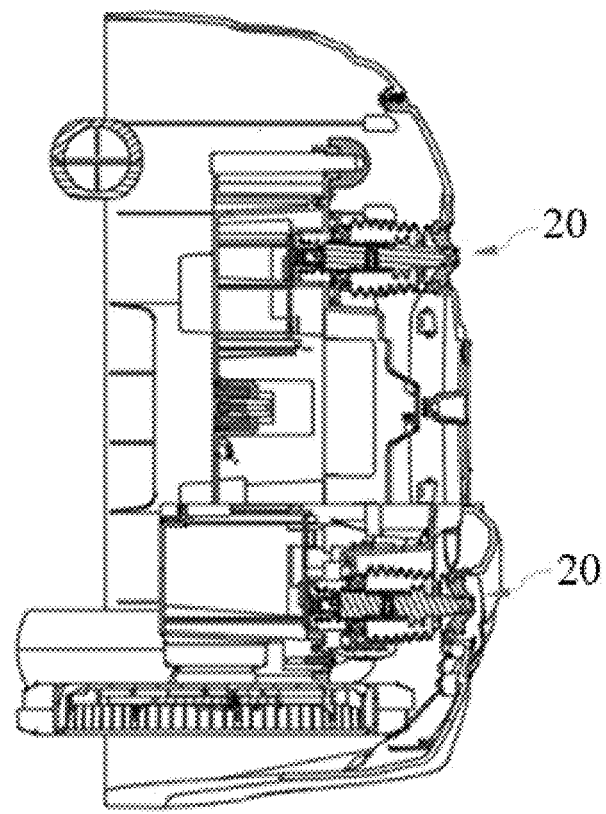

In one embodiment, as shown in FIG. 6 and FIG. 7, there are two suspension-lifting detection assemblies 20 respectively arranged at diagonal positions of the housing 1 through first mounting positions 16 of the movable upper cover 2. Alternatively, there may be four suspension-lifting detection assemblies 20 respectively arranged at corners of the housing 1 through first mounting positions 16 of the movable upper cover 2. There may be two or more collision detection assemblies 93 respectively arranged on two ends of the housing 1 through second mounting positions 17 of the movable upper cover 2. The number of the suspension-lifting detection assembly and the number of the collision detection assembly can also be adjusted according to machine models and structural requirements, and at the same time, their distribution positions on the housing can be changed correspondingly.

Figure 30:
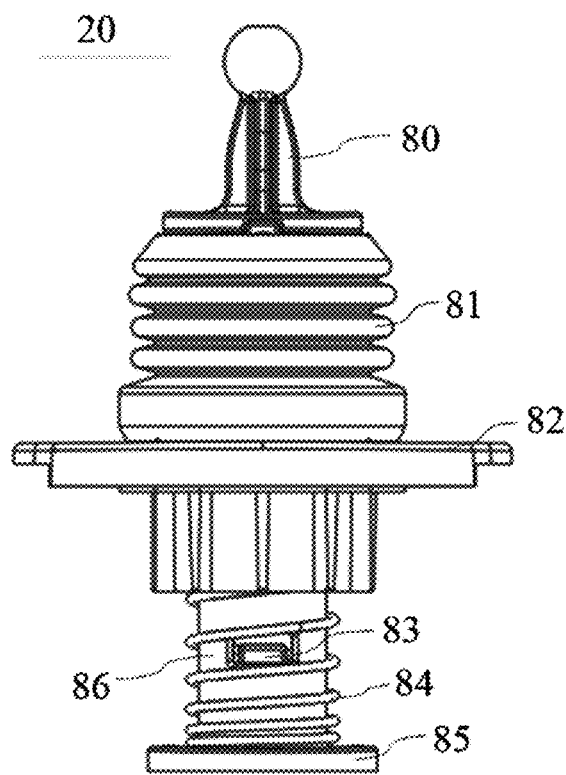
FIG. 30 and FIG. 31 are schematic views of a suspension-lifting detection assembly.
Figure 32:
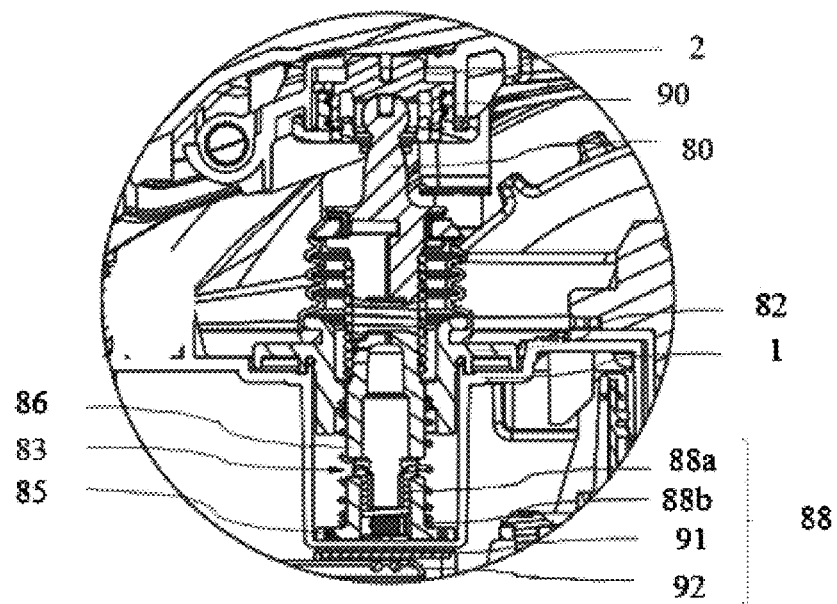
FIG. 32 is a schematic view of the suspension-lifting detection assembly being assembled in the mower.

Referring to FIG. 30 and FIG. 32, the suspension-lifting detection assembly 20 can include a suspension ball head 80, a lifting limiter 86, a suspension spring 87, and a signal trigger 88. The suspension ball head 80 is fixed on the movable upper cover of the mower. The lifting limiter 86 arranged below and separated from the suspension ball head 80. Two ends of the suspension spring 87 are fixedly connected to the suspension ball head 80 and the lifting limiter 86, respectively. The signal trigger 88 is located at the bottom of the lifting limiter 86. When the suspension ball head 80 is displaced upwards, the suspension spring 87 pulls the lifting limiter 86 to move upwards, causing the signal trigger 88 to issue/send a detection signal.

As shown in FIG. 32, a side surface of the suspension ball head 80 is disposed with a ball joint 89, and thereby the suspension ball head 80 is fixed onto the movable upper cover 2 of the mower by a snap-fit structure. The two ends of the suspension spring 87 fixedly connected with the suspension ball head 80 and the lifting limiter 86 through threads, respectively. When the movable upper cover of the mower moves upwards, the suspension ball head 80 is driven to move upwards correspondingly; and in this case, the suspension spring 87 can pull the lifting limiter 86 to move upwards, thereby causing the signal trigger 88 to issue a detection signal. In addition, a limiting groove 90 is disposed at the top of the suspension ball head 80 and is used in conjunction with a limiting post on the movable upper cover, so as to avoid horizontal shaking between the suspension ball head and the movable upper cover.

As shown in FIG. 32, the suspension spring 87 is a spring with relatively high rigidity, and such spring is not easy to produce large deformation in the vertical direction. It can not only meet the requirement of the suspension spring 87 pulling the lifting limiter 86 to move upwards, but also make the suspension spring play a role of horizontal damping as well as allow a certain relative displacement between the suspension ball head and the lifting stopper in the horizontal direction. When the mower is collided, the suspension-lifting detection assembly would not be damaged or a false alarm would not be produced. In other embodiments, the suspension spring can be fixedly connected to the suspension ball head 80 and the lifting limiter 86 by means of a buckle or a pin lock.

In one embodiment, as shown in FIG. 32, the signal trigger 88 can include a first magnetic block 88a, a first lifting detection board 88b, and a first reed switch 91. The first magnetic block 88a is fixed at the lower end of the lifting limiter 86. The first lifting detection board 88b is located under the lifting limiter 86. The first reed switch 91 is disposed on the detection board 88b. When the lifting limiter 86 moves upwards, the first magnetic block 88a leaves away from the first reed switch 91, and the first reed switch 91 is opened or closed to change a current signal on the first lifting detection board 88b, that is, the signal trigger sends out a detection signal. The first lifting detection board and a second lifting detection board are for example, but not limited to, Hall boards, and are electrically connected to the control assembly.

Figure 31:
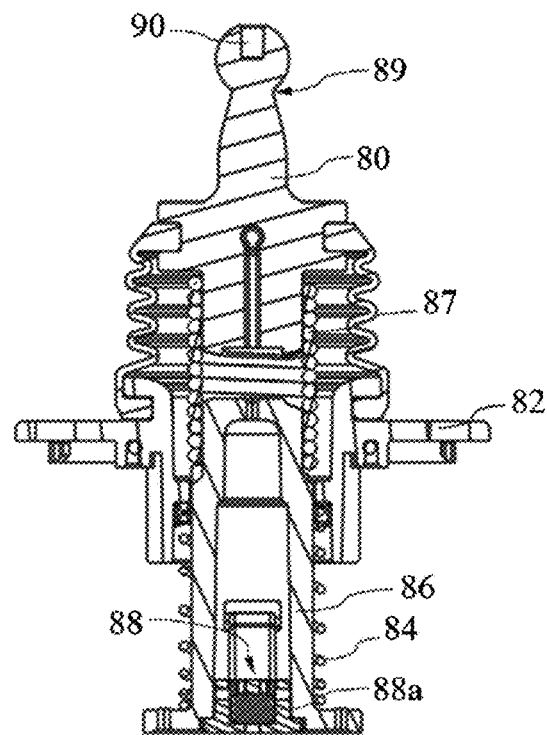

In one embodiment, as shown in FIG. 31 and FIG. 32, the suspension-lifting detection assembly further includes a suspension-fixing corrugated sleeve 81 sleeved onto the outside of the suspension spring 87. One end of the suspension-fixing corrugated sleeve 81 is snapped onto the suspension ball head 80, and the other end is fixedly installed/mounted on the housing 1 of the mower by a suspension-fixing frame 82. When the lifting stopper moves upwards, the suspension-fixing corrugated sleeve 81 is stretched, which not only can generate a restoring tensile force, but also can play a role of sealing protection.

In order to increase the restoring force of the suspension-lifting detection assembly, the suspension-lifting detection assembly 20 of the mower further includes a suspension return spring 84 sleeved on outside the lifting limiter 86. Two ends of the suspension return spring 84 are touch against bottoms of the suspension-fixing frame 82 and the lifting limiter 86, respectively. When the lifting limiter moves upwards, the suspension-fixing frame 82 remains stationary/still, resulting in a smaller distance between the bottoms of the suspension-fixing frame 82 and the lifting limiter; and the suspension return spring 84 is compressed to generate a restoring elastic force. After the mower stops working, the suspension-lifting detection assembly is restored to avoid jamming.

In one embodiment, as shown in FIG. 32, the lifting limiter 86 may be hollow rod-shaped, and a side thereof is provided with an engaging groove 83. The signal trigger 88 further can include a magnet bracket 92 located in the hollow interior of the lifting limiter 86. The magnet bracket 92 is hung in the engaging groove 83 via its ears. The first magnetic block 88a is fixed on the bottom of the magnet bracket 92, so as to ensure that the first magnetic block 88a is fixed at the bottom of the hollow interior of the lifting limiter 86. Meanwhile, the bottom of the lifting limiter 86 is provided with an outwardly extending lifting limiter flange 85, and an outer diameter of the lifting limiter flange 85 is larger than an inner diameter of the suspension-fixing frame 82, so that the lifting limiter flange 85 can limit a stroke of the first magnetic block 88a in the vertical direction, and thereby ensure an overall stability of the suspension-lifting detection assembly.

Figure 33:
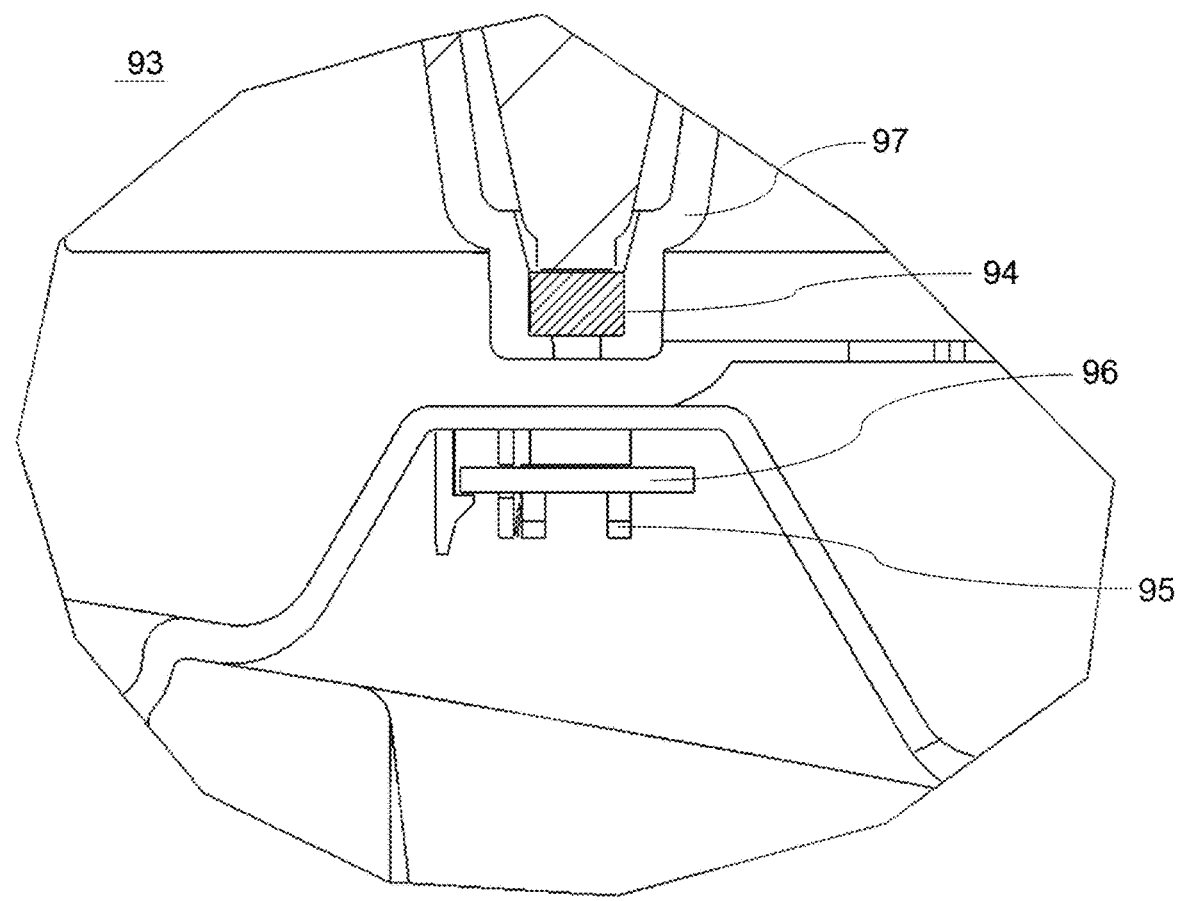
FIG. 33 is a schematic enlarged view of the portion B in FIG. 4.
Figure 34:
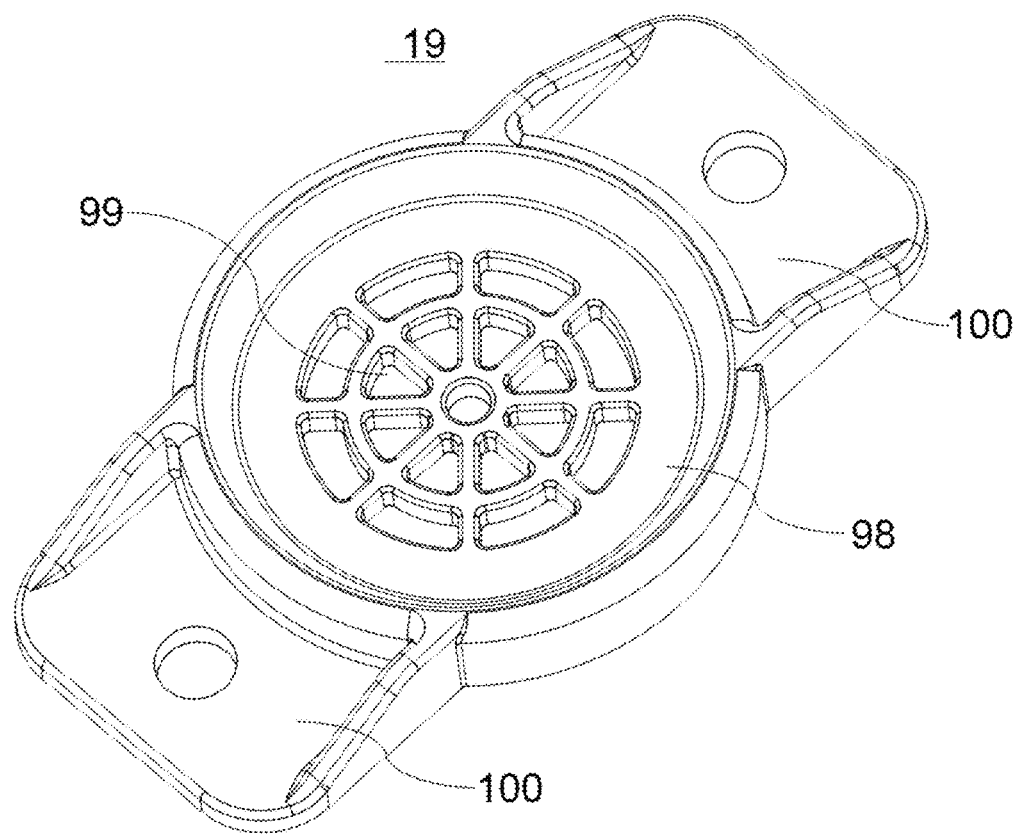
FIG. 34 through FIG. 37 are schematic structural views of an air filter hood in different directions.

As illustrated in FIG. 4 and FIG. 33, the collision detection assembly 93 can include a second magnetic block 94, a second reed switch 95 and a second lifting detection board 96. The second magnetic block 94 is arranged on the movable upper cover 2. The second reed switch 95 is arranged on the housing 1 and below the second magnetic block 94. The second lifting detection board 96 is arranged between the second magnetic block 94 and the second reed switch 95. When a relative displacement in the horizontal direction between the movable upper cover 2 and the housing 1 occurs, the second magnetic block 94 approaches or leaves away from the second reed switch 95, the second reed switch 95 is opened or closed, so that a current signal on the second lifting detection board 96 is changed. The second lifting detection board 96 is electrically connected to the control assembly and sends the current signal to the control assembly as a detection signal.

As shown in FIG. 33, the collision detection assembly 93 further includes a magnetic-block support 97 fixed on the movable upper cover 2. The magnetic-block support 97 is pocket-shaped and used for holding up the second magnetic block 94, leaving a certain gap between the second magnetic block 94 and the second reed switch 95.

Referring to FIG. 9, FIG. 34 through FIG. 41, the housing 1 can include an internally sealed casing 18 (i.e., its inside is sealed), a function hole 1911 or function mounting position (covered/hidden by air filter hood 19, not shown), and a functional module. The function hole 1911 or function mounting position is formed on the casing 18 and connects the interior and exterior of the casing 18. The functional module is selectively detachably installed at the function hole 1911, to detect a sealing state of the casing or maintain an air pressure balance between inside and outside of the casing.

In one embodiment, Referring to FIG. 34 through FIG. 37, when the functional module is an air filter hood 19, the air pressure between inside and outside of the casing 18 can be balanced when the mower is working. The air filter hood 19 can include a ventilation base 98 mounted at the function hole 1911 for ventilation, and air filter hood mounting portions 100 outwardly extending from the ventilation base 98. The ventilation base 98 is disposed with corresponding vent holes 99 and may be made of a breathable material instead to achieve the purpose of breathability. There may be two or more air filter hood mounting portions 100 respectively extend from the ventilation base 98 along two opposing directions and thus symmetrically arranged at two sides of the ventilation base 98. As to the air filter hood 19, the air filter hood mounting portions 100 are mechanically fixed onto the casing 18 through fasteners. The fasteners can be suitable parts such as screws, bolts or engaging members, and are not limited herein. Optionally, the air filter hood mounting portions 100 are provided with corresponding air filter hood mounting holes 101, so that the air filter hood mounting portions 100 are mechanically fixed onto the casing 18 by screws.

Figure 35:
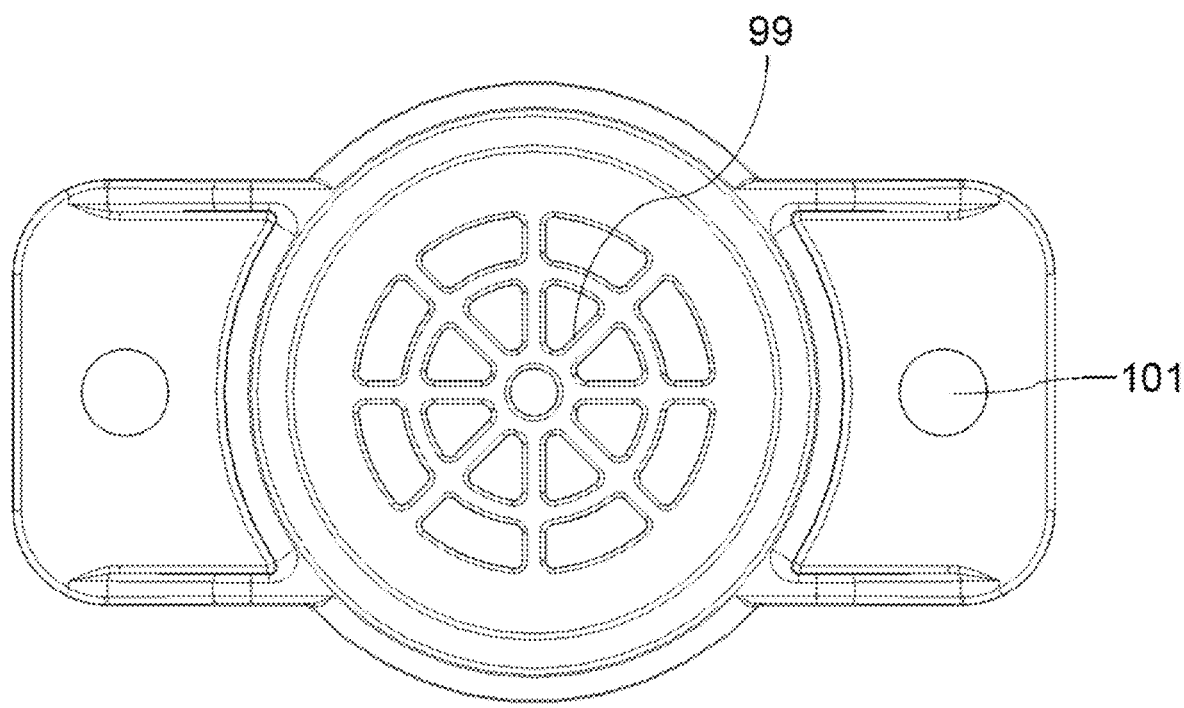
Figure 36:
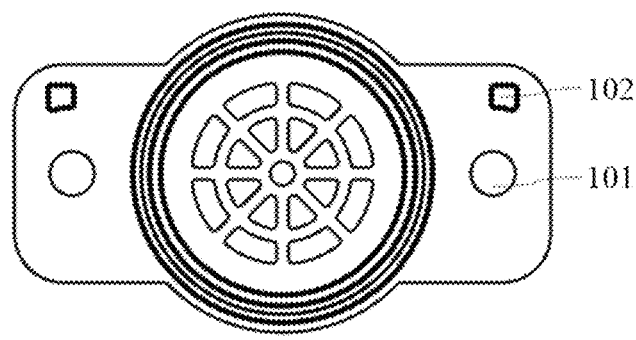

In one embodiment, as shown in FIG. 35, an inner side of the air filter hood 19 (i.e., a side near the casing) is further provided with raised columns 102. The raised columns 102 are located at edges of the air filter hood mounting portions 100 and matched with holes on the casing, so as to positionally limit the air filter hood 19 during installation. As shown in FIG. 36, the air filter hood mounting portions 100 each are provided with a slope on the outside of the air filter hood 19 (i.e., the side facing away from the casing), and after the air filter hood 19 is installed, the ventilation base 98 gradually protrudes out of the casing.

Figure 39:
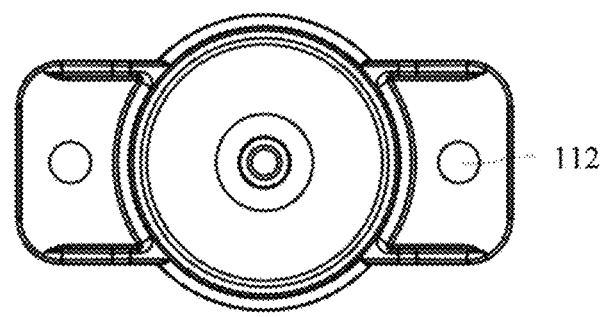
Figure 40:
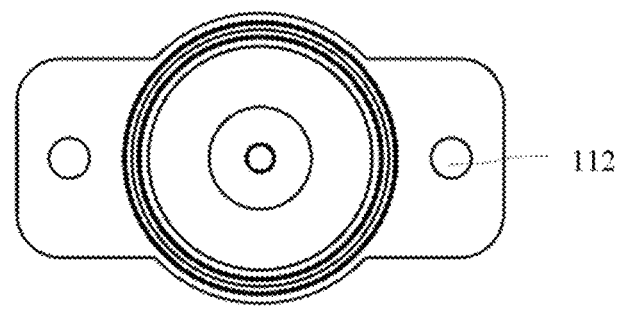
Figure 41:
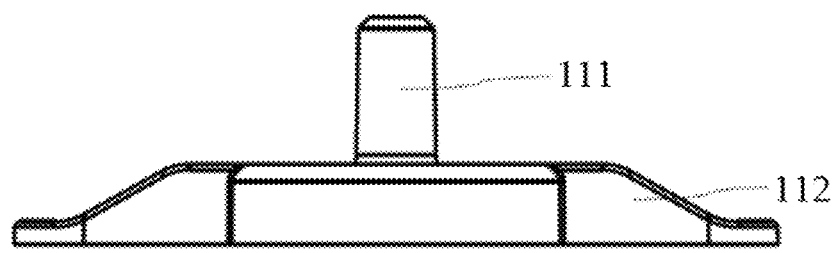

In one embodiment, as illustrated in FIG. 38 through FIG. 41, when the functional module is an airtight nozzle 108, an air-tightness of the housing can be detected by a barometer. The airtight nozzle 108 includes a body part 109 installed at the function hole 1911 and mounting parts extending outwards from the body part 109. There may be two mounting parts 100 respectively extend from the body part 109 along two opposing directions and thus are symmetrically arranged on two sides of the body part. As shown in FIG. 40, an outer side (i.e., a side facing away from the casing) of the body part 109 is provided with a conduct pipe 111 protrudes outwardly, and the conduct pipe 111 is suitable for connecting with the barometer to detect air tightness of the mower. Extending directions of the mounting parts 110 are perpendicular to an extending direction of the conduct pipe 111.

As to the airtight nozzle 108, the mounting parts 110 and the casing 18 are mechanically fixed by fasteners (not shown), and the fasteners may be suitable parts such as screws or bolts, and are not limited herein. Optionally, as shown in FIG. 39, the mounting parts 110 are provided with corresponding mounting holes 112, and the mounting parts 110 are mechanically fixed onto the casing 18 by screws. The outer side (i.e., a side facing away from the casing) of each of the mounting parts 110 is provided with a slope, and after the airtight nozzle 108 is installed, the body part 109 gradually protrudes out of the casing.

Referring to FIG. 38 through FIG. 41, different functional modules can be installed at the function hole 1911 manually or by other means to facilitate the detection of the sealing state or realization of the air pressure balance between inside and outside of the casing 18, so as to meet the functional requirements of the mower in different working conditions. For example, in the working state, the mower uses the air filter hood 19 to balance the air pressure between inside and outside of the casing 18 of the mower; for another example, when it is necessary to detect the air tightness, the air filter hood 19 is replaced by the airtight nozzle 108, and then a rubber sleeve is sheathed on the conduct pipe 111 of the airtight nozzle 108, and a barometer is used to check whether an upper limit of inflation air pressure and a pressure holding capacity meet the standards or not, thereby checking that the seal whether is reliable or not.

Referring to FIG. 4, and FIG. 42 through FIG. 46, the mower further includes a shock-absorbing assembly located/arranged between the movable upper cover 2 and the housing 1. The shock-absorbing assembly can include a damper 113, provided with a hollow portion 114*a*; and, a connector 115, adapted to pass through the hollow portion 114*a* and install the damper 113 between the housing 1 and the movable upper cover 2 of the mower. When a relative displacement between the movable upper cover and the housing in the horizontal direction is generated, the damper is squeezed to generate deformation elastic force.

Figure 44:
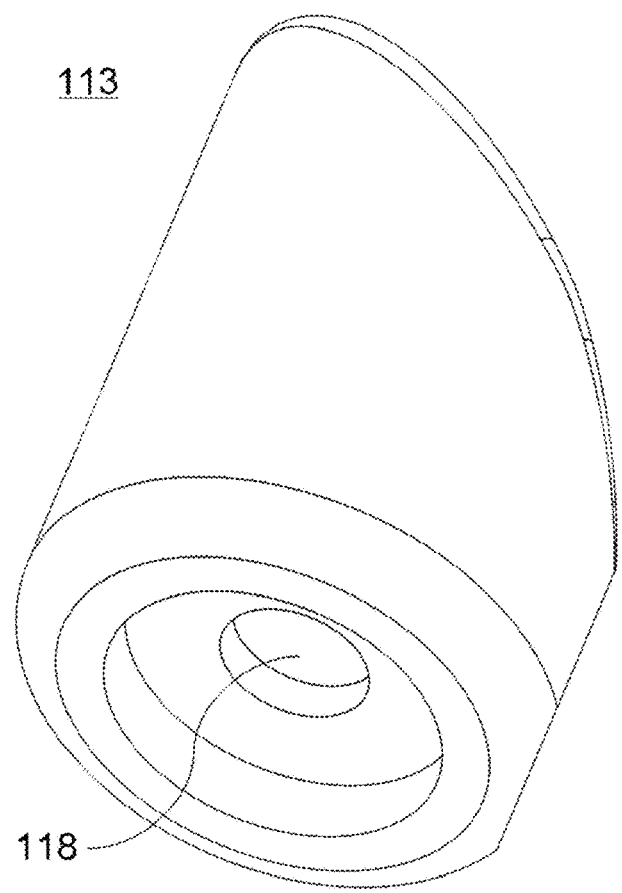
Figure 45:
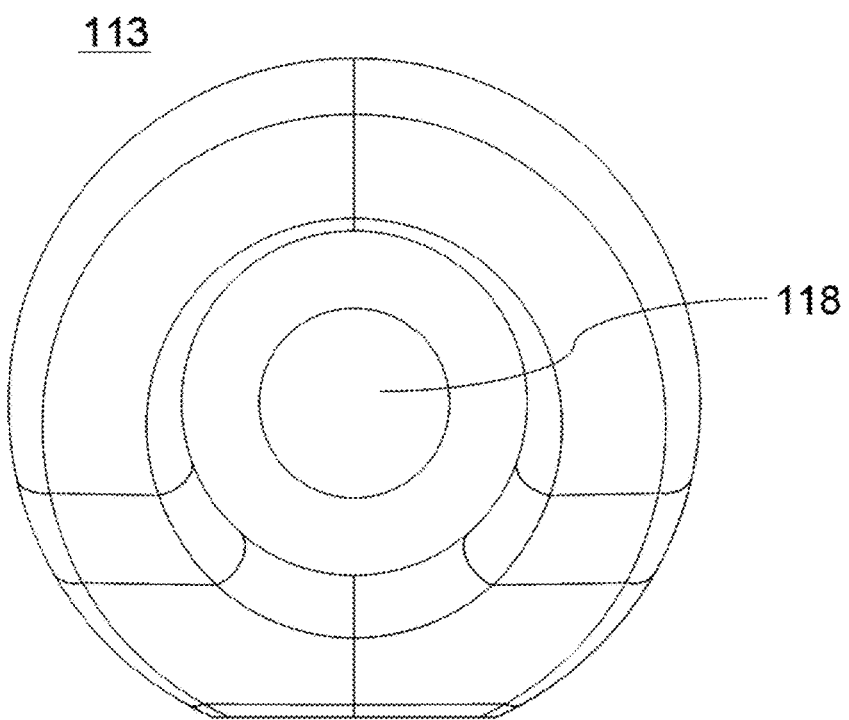
Figure 46:
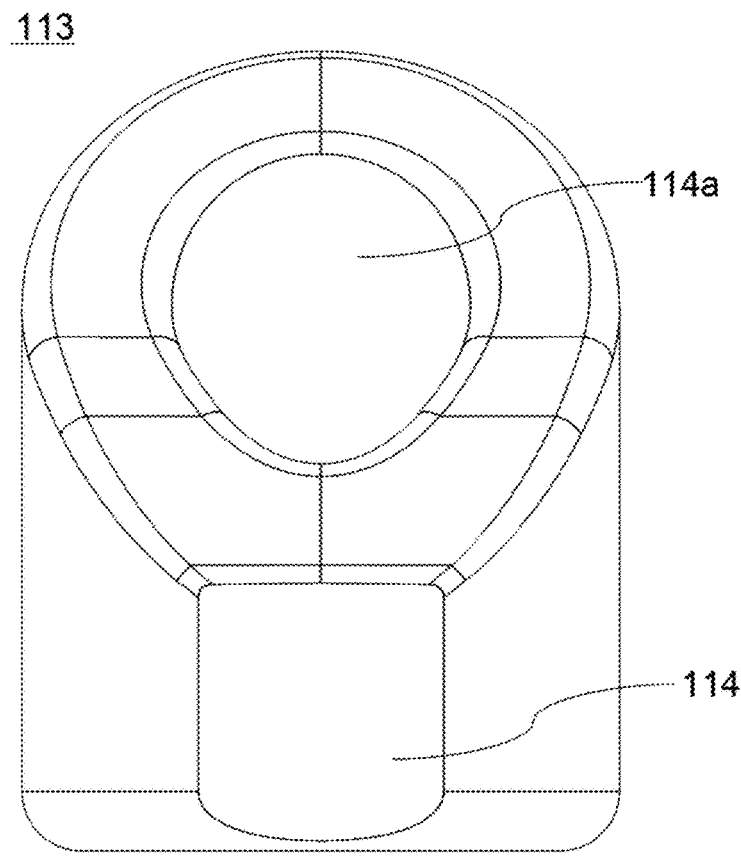
Figure 47:
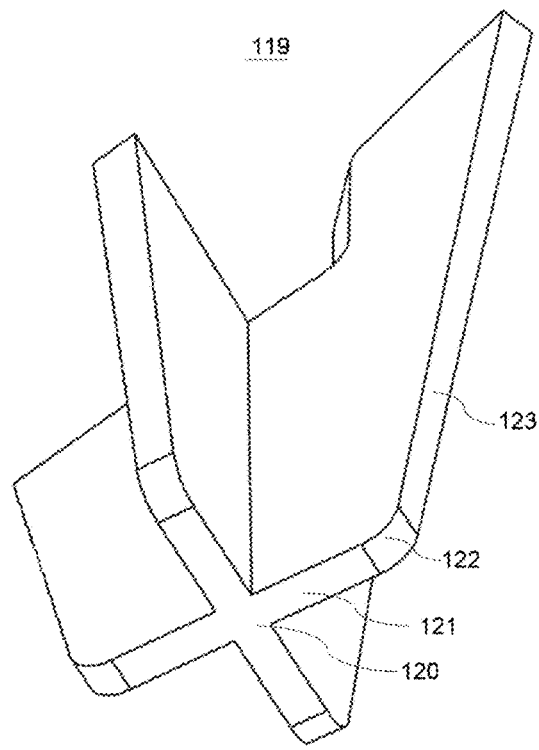
FIG. 47 through FIG. 50 are schematic structural views of a supporter in different directions.

As illustrated in FIG. 44 and FIG. 46, the damper 113 is columnar or cylindrical. One end of the damper 113 is closed and provided with a damper mounting hole 118 with a diameter smaller than the hollow portion. The connector 115 is suitable for being inserted into or left away from the hollow portion 114*a* of the damper 113 through the damper mounting hole, that is, a gap for deformation of the damper is left between the damper and the connector. Optionally, a material of the damper may be elastic rubber, so that a degree of deformation mainly comes from the gap, and the compressibility of the damper itself can help compress the gap and generate a deforming elastic force.

Figure 42:
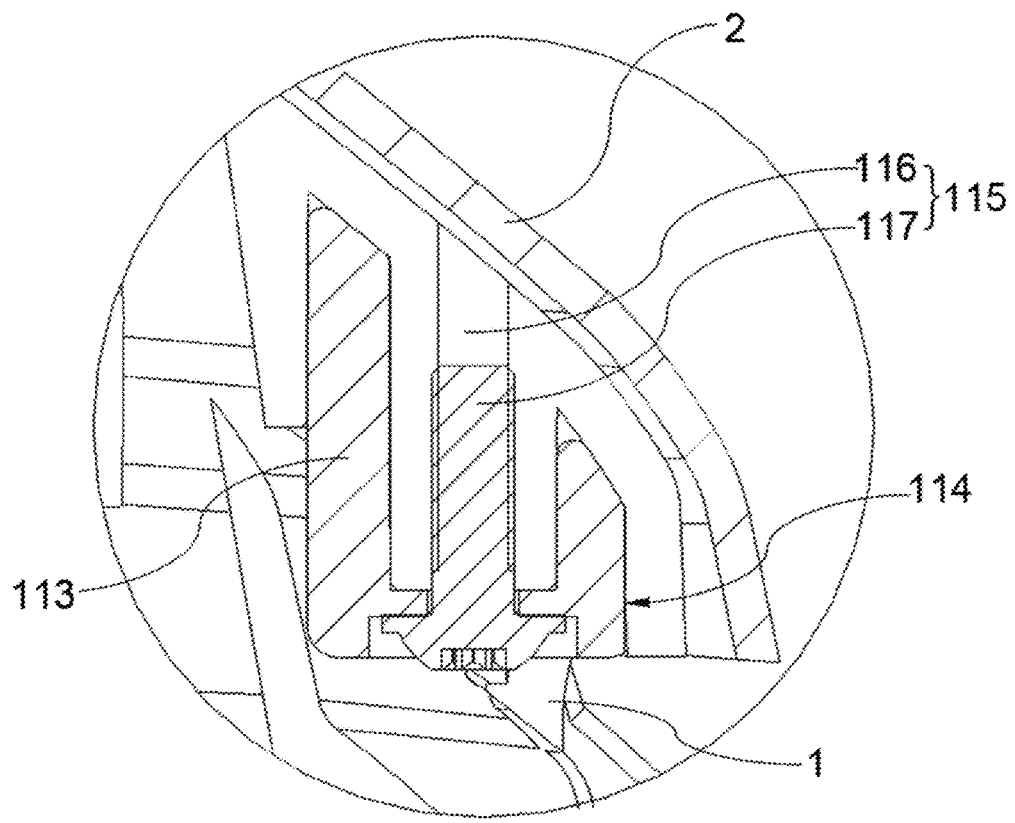
FIG. 42 is a schematic structural view of the portion C in FIG. 4.

In order to fix the damper 113, as shown in FIG. 42, the connector 115 can include a damper fastener 117, and a mounting post 116 located on the movable upper cover 2. The damper fastener 117 passes through the damper mounting hole and is threadedly connected with the mounting post 116 to fix the damper onto the mounting post. The damper fastener 117 may be a screw screwed into the mounting column through a thread, or a threaded sleeve sleeved on the outside of the mounting column through a thread, so as to prevent the damper from loosening. In other embodiments, the damper 113 may be fixedly installed on the movable upper cover 2 or the housing 1 in other ways.

Figure 43:
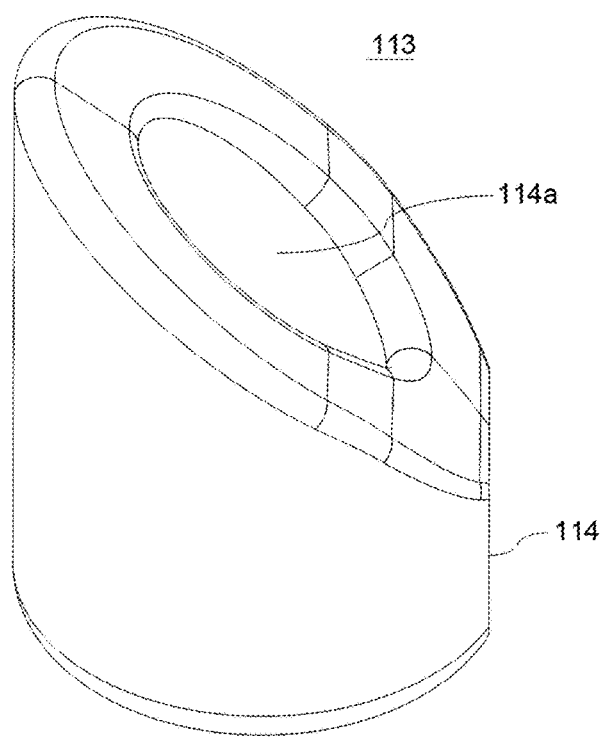
FIG. 43 through FIG. 46 are schematic views of a damper observed from different viewing angles.

In the disclosure, a fixed installation manner of the damper 113 is not limited. In order to make the damper meet the assembling and design requirements, optionally, as shown in FIG. 43 and FIG. 46, the other end of the damper 113 is opened and provided with an inclined surface. A limiting wall is provided on a side of the damper 113 near the movable upper cover and fitted with the inner wall of the movable upper cover to prevent the damper 113 from rotating around the mounting post 116. In other embodiments, the damper 113 may be a spring, a torsion spring, a tension spring, a damping element, etc., with a similar structure.

As illustrated in FIG. 8, FIG. 47 through FIG. 52, the mower further includes at least one supporter 119 arranged between the housing 1 and the movable upper cover 2. The supporter 119 is used to support the movable upper cover 2 to thereby prevent the movable upper cover 2 from pressing the housing 1 downwards. The supporter 119 includes a pillar 120 and at least one stiffener 124 extending outwards and divergently from the pillar 120. There may be four or more stiffeners 124, and the four stiffeners are evenly distributed on the outside of the pillar 120. The stiffeners 124 are distributed in a cross shape to form a cross bone structure together with the pillar 120 to thereby give the movable upper cover 2 with a larger supporting force. The stiffener 124 is a right-angled trapezoid in shape, and a width of a top portion 125 of the stiffener 124 is larger than that of a bottom portion 121 of the stiffener 124 to improve stability and supporting force for the supporter. The bottom portion 121 of the stiffener 124 and a side portion 123 of the stiffener 124 are transitioned by a chamfer 122, and the chamfer 122 is a circular arc chamfer, so that when the supporter is supporting the movable upper cover, bottom corners of the supporter can prevent from damaging the housing.

Figure 48:
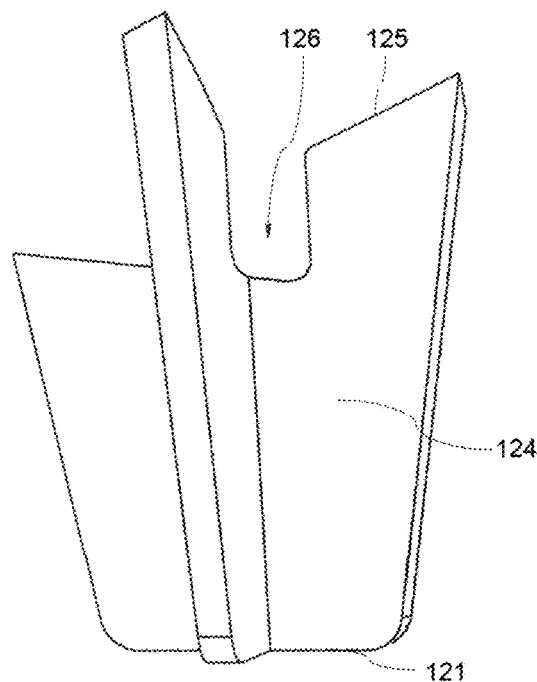
Figure 49:
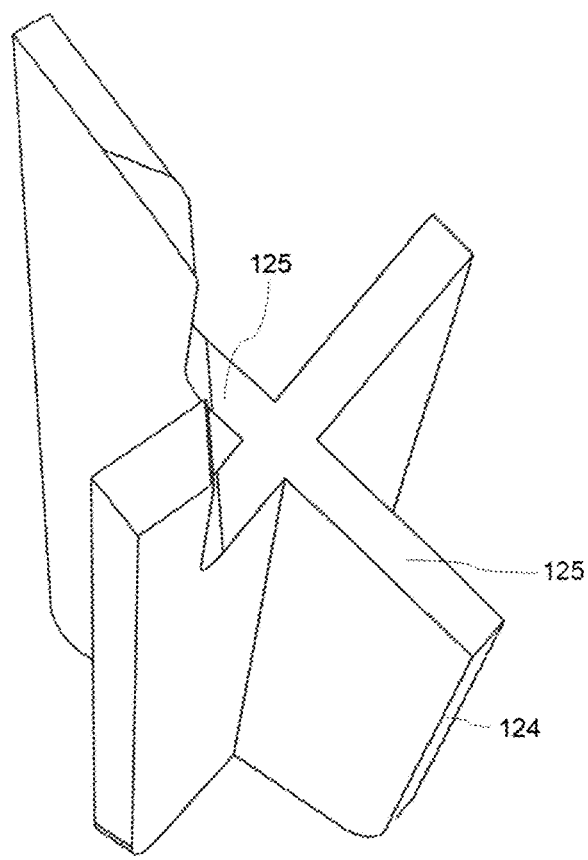
Figure 50:
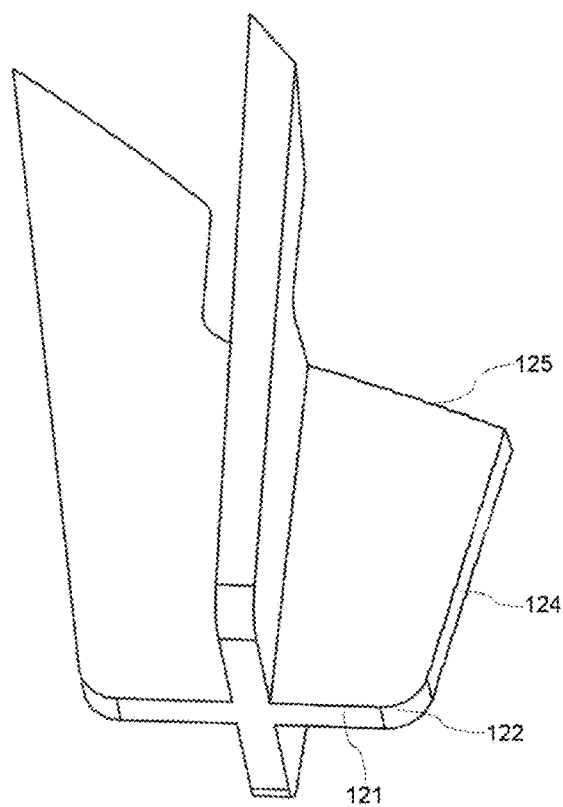
Figure 51:
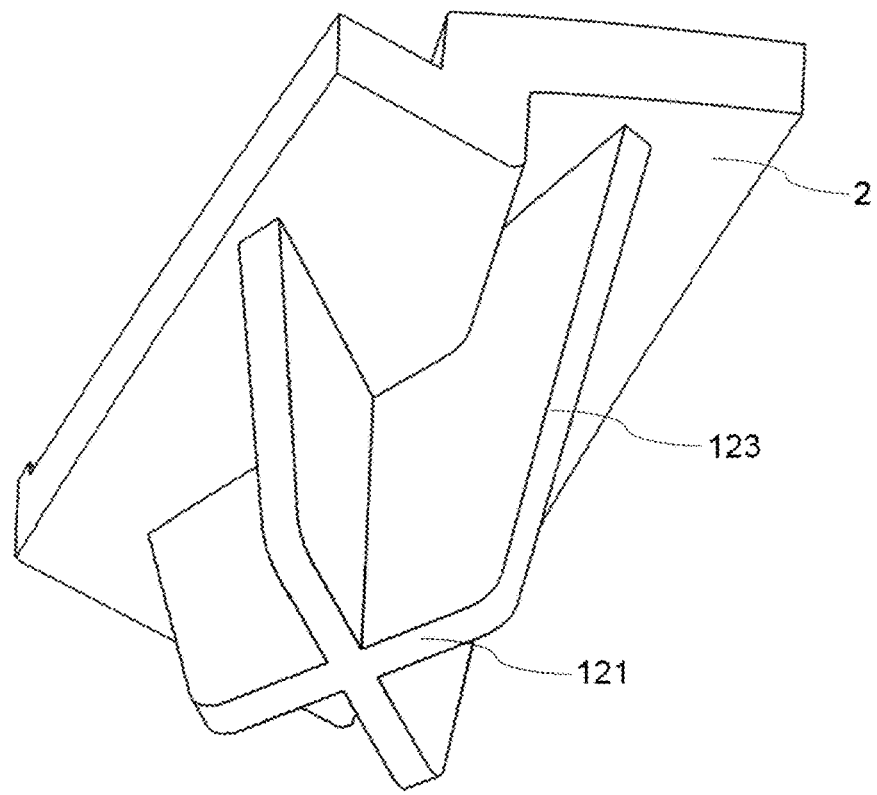
FIG. 51 is a schematic view of the supporter being assembled in the mower.
Figure 52:
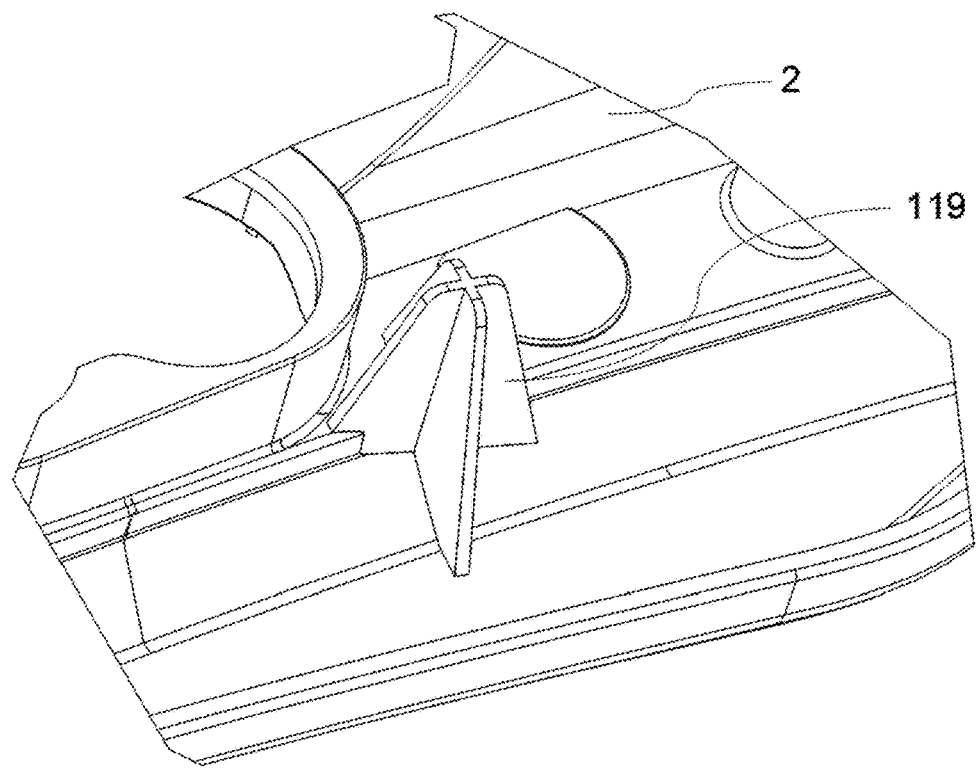
FIG. 52 is a schematic enlarged view of the portion F in FIG. 8.
Figure 53:
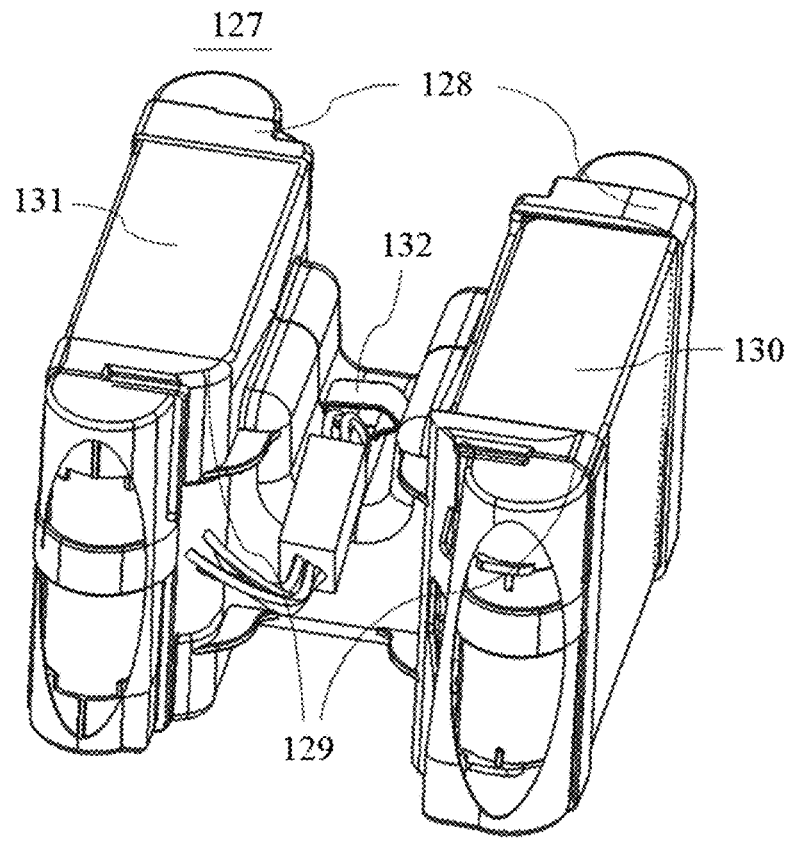
FIG. 53 and FIG. 54 are schematic views of a battery pack assembly of the disclosure.
Figure 54:
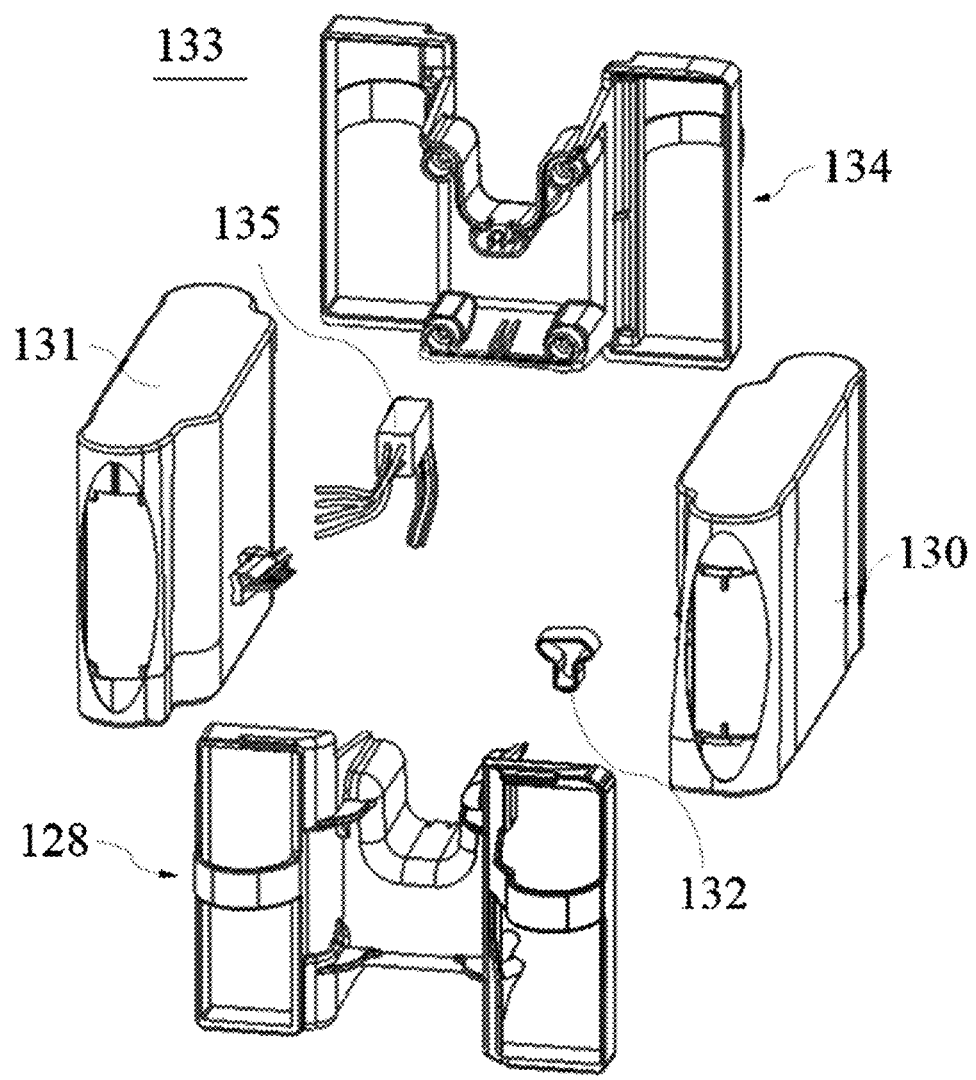
Figure 55:
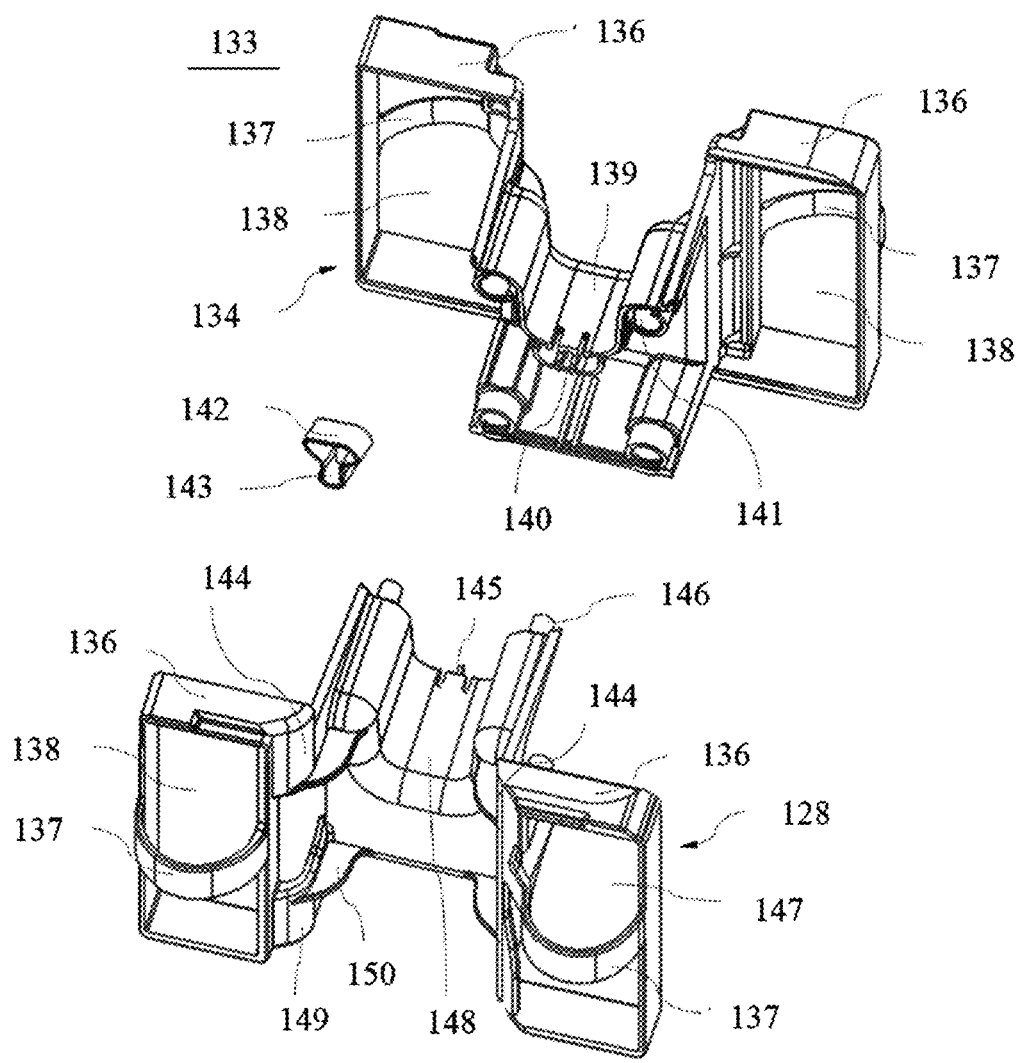
FIG. 55 and FIG. 56 are schematic exploded views of a battery pack fixing frame in FIG. 54.

In one embodiment, as shown in FIG. 48, the top portion 125 of the stiffener 124 is further provided with a mounting groove 126 to fit with the inner side of the movable upper cover and install on the movable upper cover by fasteners such as screws and bolts. It is possible to use integral molding technology such as injection molding to make the pillar, the stiffeners and the movable upper cover be integrally formed (i.e., forming a one-piece structure).

Referring to FIG. 2 and FIG. 53 through FIG. 59, the mower further includes a battery pack assembly 127 for providing electrical energy. The battery pack assembly 127 can include at least one battery pack fixing frame 133. Each battery pack fixing frame 133 is provided with a first battery pack 130 and a second battery pack 131 arranged opposite to each other. The battery pack assembly 127 can be installed inside the housing and can be detachably packaged by a battery pack cover 7.

Figure 59:
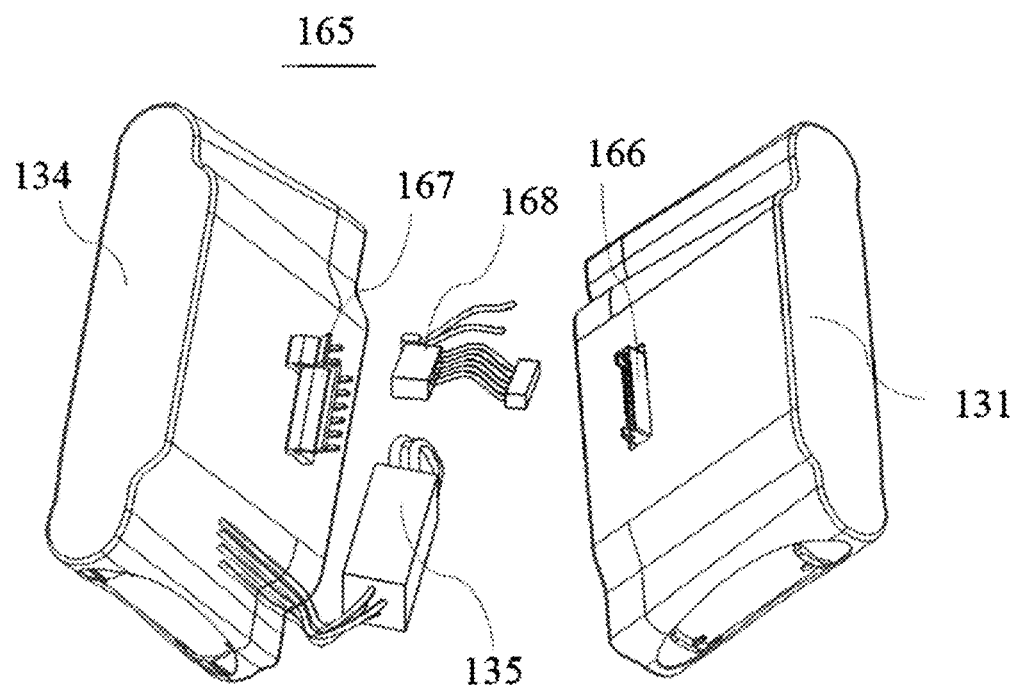
FIG. 59 is a schematic exploded view of the two battery packs in FIG. 53 when being connected to each other.

As shown in FIG. 59, the battery pack assembly 127 may include multiple battery pack fixing frames. Each battery pack fixing frame is provided with the first battery pack 130 and the second battery pack 131 arranged opposite to each other. The plurality of battery pack fixing frames can be, but not limited to, arranged in a side-by-side manner or in a stacked manner. The first battery pack 130 and the second battery pack 131 are electrically connected by a connecting wire 168 (the two battery packs can be used in parallel to provide a require output current). The first battery pack 130 and the second battery pack 131 are respectively accommodated in two battery accommodating spaces of the aforementioned battery pack fixing frame 133.

The first battery pack 130 includes a first terminal 167, a BMS system (battery management system) 135, and a DMS (distribution management system) circuit board placed inside the first battery pack 130. The second battery pack 131 is provided with a second terminal 166. When connecting, the first terminal 167 and the second terminal 166 are placed opposite each other, and are electrically connected through the connecting wire 168, thereby realizing the electrical connection between the first battery pack 130 and the second battery pack 131. The connecting wire 168 is housed in the battery accommodating space of the aforementioned battery pack fixing frame 133.

In one embodiment, as shown in FIG. 53 through FIG. 58, the battery pack fixing frame 133 includes two brackets, namely a first bracket 128 and a second bracket 129; and, a handle 132, located at a junction of the two brackets. The two brackets each include: an assembling part and receiving parts arranged on two sides of the assembling part. The assembly parts of the two brackets are suitable for being assembled together. The receiving parts of the two brackets/supports are separated and arranged opposite to each other to form battery accommodating spaces for placing the battery packs.

As illustrated in FIG. 55 through FIG. 58, the first bracket 128 can include a first assembling part 148 (that is, the assembling part of the first bracket) and first receiving parts 147. There may be two first receiving parts 147 distributed on left and right sides of the first assembling part 148. The second bracket 129 includes a second assembling part 139 (that is, the assembling part of the second bracket) and second receiving parts 138. There may also be two second receiving parts 138 distributed on left and right sides of the second assembling part 139. The first assembling part 148 and the second assembling part 139 cooperate with each other to make the first bracket 128 and the second bracket 129 be fixedly connected with each other. The first bracket 128 and the second bracket 129 are arranged oppositely. The first assembling part 148 and the second assembling part 139 are also arranged oppositely.

A handle installation position is formed inside of the first assembling part 148 and the second assembling part 139. A direction of the first assembling part 148 toward the second assembling part 139 is an opening direction of the first assembling part 148, and a direction of the second assembling part 139 toward the first assembling part 148 is an opening direction of the second assembling part 139. The first receiving parts 147 and the second receiving parts 138 are also arranged opposite to each other to form battery accommodating spaces between the first receiving parts 147 and the second receiving parts 138. Because there may be two first receiving parts 147 and two second receiving parts 138 in the illustrated embodiment, two battery accommodating spaces can be formed between the first bracket 128 and the second bracket 129, so that two battery packs 165 can be accommodated conveniently.

As illustrated in FIG. 55 through FIG. 58, the first receiving parts 147 and the second receiving parts 138 each include a limiting frame 136 and a limiting strip 137. The limiting frame 136 is in a hollow cuboid shape. A side of the limiting frame 136 connected with the first assembling part 148 or the second assembling part 139 is a connecting side 144. The connecting side 144 is an inclined plane or in a stepped shape to limit the position of the battery pack 165 in the battery accommodating space and thereby prevent the battery pack 165 from moving randomly. An outer surface of the connecting side 144 is provided with a reinforcing strip(s) 150, so that a connection strength of the connecting side 144 can be improved, and the service life of the battery pack fixing frame 133 can be increased.

Figure 56:
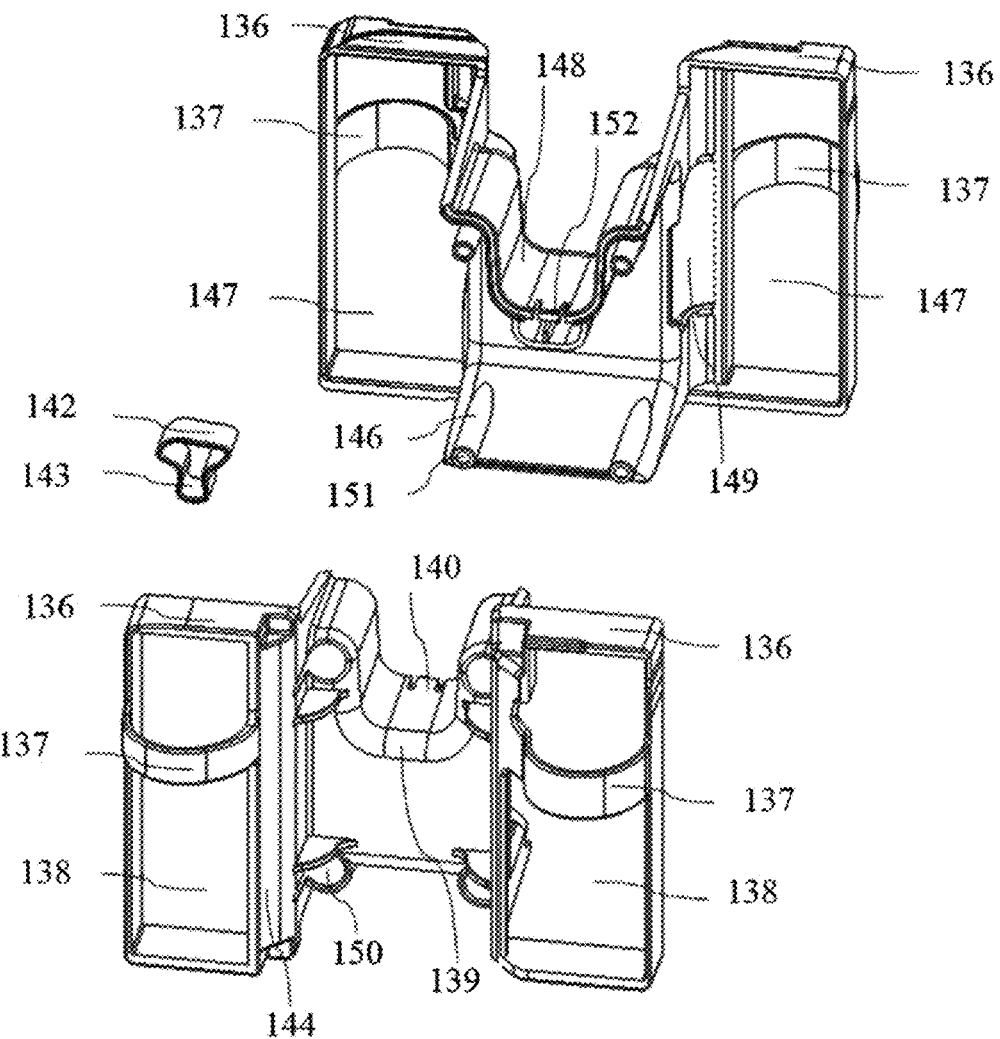

Referring to FIG. 56, the connecting side 144 of the first assembling part 148 located on the limiting frame 136 on the left side is provided with a perforation/through-hole 149. The BMS system 135 is electrically connected to the battery pack 165 through the perforation 149, without limiting herein, as long as the purpose of connecting the BMS system 135 with the battery pack 165 is satisfied. There may be one or more perforations 149 set on one or multiple limiting frames 136, without limiting herein.

As shown in FIG. 55 through FIG. 58, the limiting strip 137 is connected to the limiting frame 136, especially can be arranged in the middle of a side surface of the limiting frame. The limiting strip 137 is in an arc shape, and a direction of the arc is the same as the opening direction of the first assembling part 148 or the second assembly part 139 where the arc is located, so that an end of the battery pack 165 can be restrained and fixed in the battery accommodating space by the limiting strip 137, thereby preventing damage to the battery pack 165 from sliding back and forth during movement or using.

Figure 57:
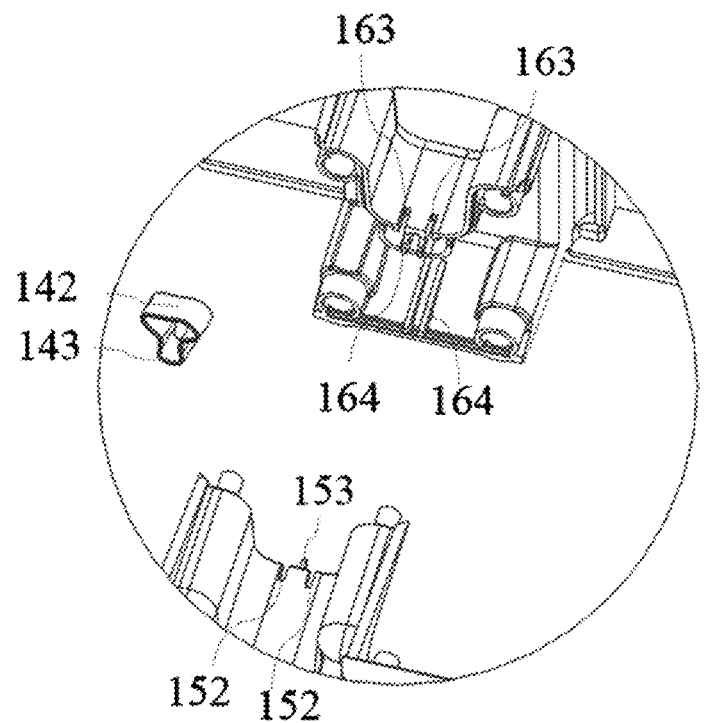
FIG. 57 and FIG. 58 are schematic partial enlarged views of a handle, a first connection part and a second connection part in FIG. 55/FIG. 56.
Figure 58:
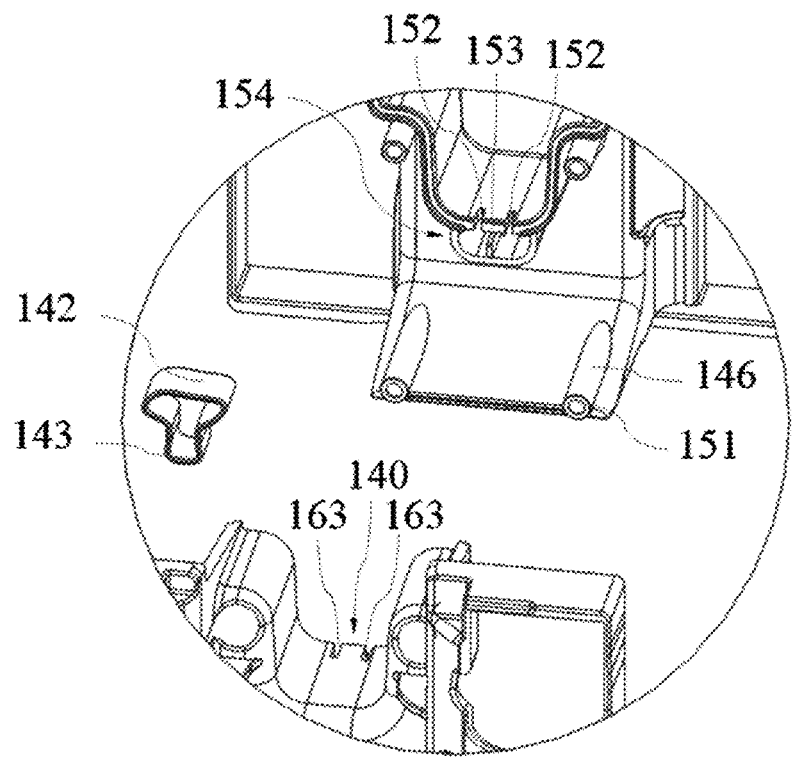

As shown in FIG. 57 and FIG. 58, the first assembling part 148 is provided with bracket protrusions 146 and a first connecting portion 154. The second assembling part 139 is provided with bracket connecting holes 141 and a second connecting portion 140. The bracket protrusions 146, the bracket connecting holes 141, the first connecting portion 154 and the second connecting portion 140 are all arranged on opposing surfaces of the first assembling part 148 and the second assembling part 139. The first assembling part 148 and the second assembling part 139 each are arranged in a "concave" shape. There may be two or more bracket protrusions 146 and two or more bracket connecting holes 141, which may be respectively located at corners of the "concave" shaped structure, for example at right-angled corners. The first connecting portion 154 and the second connecting portion 140 are arranged at the bottom or a lower recessed portion of the "concave" shaped structure. Optionally, there are four bracket protrusions 146 and four bracket connecting holes 141, respectively located at four right-angled corners of the "concave" shaped structure, so that the connection stability is the best at this case.

As shown in FIG. 55 through FIG. 58, a shape and a size of the bracket protrusions 146 respectively match a shape and a size of the bracket connecting hole 141. The bracket connecting hole 141 penetrates through the second assembling part 139 along the opening direction of the second assembling part 139. The bracket protrusion is provided with a bracket positioning hole 151. The bracket connecting hole 141 is a circular hole, and the bracket protrusion 146 is in a shape of a hollow cylinder. In the illustrated embodiment, during connecting, the first bracket 128 and the second bracket 129 can be fixedly connected by placing the bracket protrusions 16 into the bracket connecting holes, without limiting herein, as long as the fixed connection between the first bracket 128 and the second bracket 129 is achieved.

As illustrated in FIG. 57 and FIG. 58, the first connecting portion 154 includes a first protruding member 151 and a first groove 152. The second connecting portion 140 includes a second protruding member 164 and a second groove 163. There may be two second protruding members, and the two second protruding members may have a gap existed therebetween. The first protruding member 151 extends outwards from the first assembling part 148, and an extending direction thereof is the same as the opening direction of the first assembling part 148. A recessing direction of the first groove 152 is opposite to the extending direction of the first protruding member 151. The second protruding member 164 extends outwards from the second assembling part 139, and an extending direction thereof is the same as the opening direction of the second assembling portion 139. A recessing direction of the second groove 163 is opposite to the extending direction of the second protruding member 164.

As shown in FIG. 55 through FIG. 58, there may be two or more first grooves 152 distributed on two sides of the first protruding member 151. There may be two or more second grooves 163 distributed on two sides of the second protruding member 164. The first grooves 152 and the second grooves 163 each are in a "U" shape. When connecting, the first connecting portion 154 and the second connecting portion 140 are inserted toward each other until the first protruding member 151 is inserted into the gap between the two second protruding members 164, and the two second protruding members 164 are respectively located on two sides of the first protruding member 151. In other words, the first protruding member 151 and the two second protruding members 164 are mutually inserting and fitting; that is, the two second protruding members 164 are parallel to each other, and the first protruding member 151 extends between the two second protruding members 164. After the connecting is completed, open ends of the first grooves 152 and the second grooves 163 are assembled and matched with each other to form a U-shaped space (i.e., a handle mounting position) in which the first connecting portion 154 and the second connecting portion 140 are fixed in the middle for the install of the handle 132.

As illustrated in FIG. 55 through FIG. 58, the handle 132 is arranged between the first connecting portion 154 and the second connecting portion 140. The handle 132 is a hollow "T"-shaped structure in cross section. The handle 132 includes a handle portion 142 for grasping and a handle mounting portion extending downwards from the bottom of the handle portion 142 and for fixing. When connecting, the handle mounting portion 143 is positionally limited and received in the U-shaped space formed by the connection of the first grooves 152 and the second grooves 163, and at the same time, the mutual connection of the first protruding member 151 and the second protruding members 164 enables the handle mounting portion 143 to be contained in the U-shaped space and keep the handle portion 142 to be exposed above the first connecting portion 154 and the second connecting portion 154. The handle 132 is used for moving, installing or disassembling the battery pack assembly 127.

Referring to FIG. 2 and FIG. 60 through FIG. 67, the mower further includes a walking/travelling assembly 8 for driving the mower to move. The walking assembly 8 can include at least one walking wheel 9 (i.e., driving wheel), and at least one universal wheel 10. The at least one walking wheel 9 is located on the housing 1. The at least one universal wheel 10 is located on the housing 1. The walking wheel 9 can include a tire 171, a wheel hub 178, and a wheel balance weight 173. The wheel hub 178 is configured for mounting the tire 171. The wheel balance weight 173 is mounted on a side of the wheel hub 178 and is coaxially arranged with the wheel hub 178.

In one embodiment, as shown in FIG. 60 through FIG. 67, the walking wheel 9 includes the tire 171, the wheel hub 178, and the wheel balance weight 173. The tire 171 is sleeved on the wheel hub 178. The wheel balance weight 173 is installed and fixed onto the wheel hub 178. An outer surface of the wheel hub 178 is provided with wheel hub protrusions 201, and an inner surface of the tire 171 is provided with grooves 181 corresponding to the wheel hub protrusions 201. When installing, the wheel hub protrusions 201 on the wheel hub 178 are placed in the grooves 181 on the inner surface of the tire 171. The arrangement of the wheel hub protrusions 201 can realize the installation of the tire 171 and the wheel hub 178 on the one hand, and can increase a gripping force between the tire 171 and the ground on the other hand.

Figure 61:
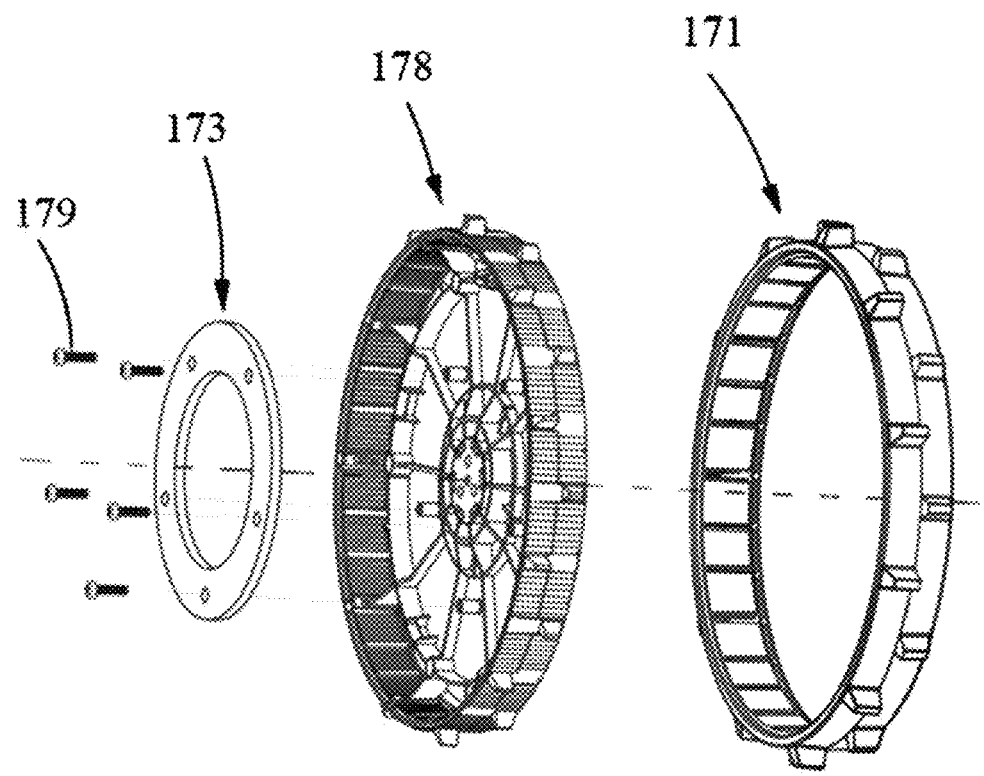
Figure 62:
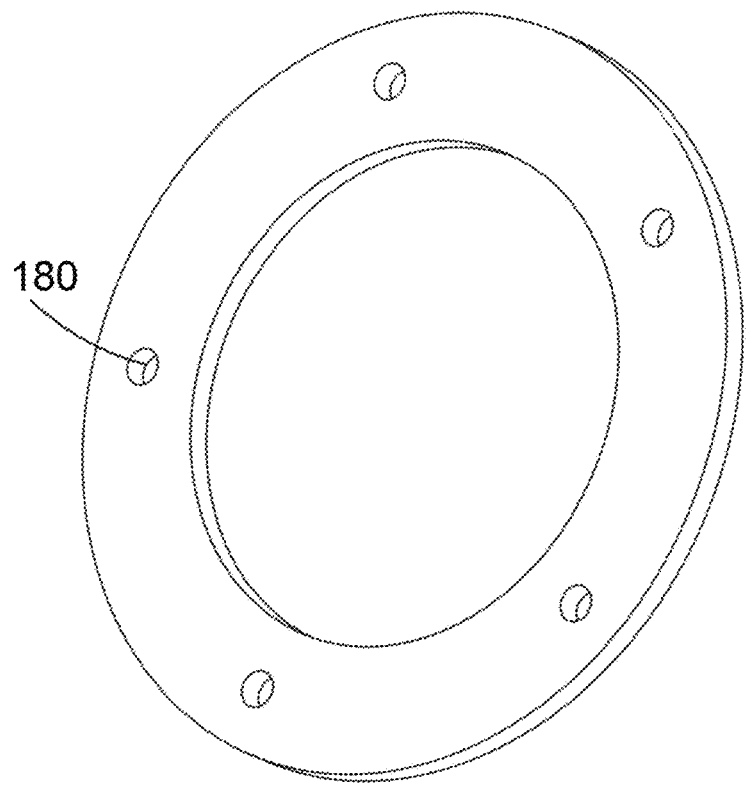
FIG. 62 through FIG. 64 are schematic perspective views of a wheel balance weight, a tire and a wheel hub respectively.

Referring to FIG. 61 and FIG. 62, the wheel balance weight 173 is a hollow ring structure, and the wheel balance weight 173 and the hub 178 are arranged coaxially. The wheel balance weight 173 is provided with through holes 180. The through holes 180 penetrate through the wheel balance weight 173 along a center axis direction of the wheel balance weight 173. In the illustrated embodiment, there may be five through holes 175 evenly distributed on the wheel balance weight 173 as per the same radius, so that screws 179 can pass through the through holes 175 to fix the wheel balance weight 173 onto the wheel hub 178.

Figure 63:
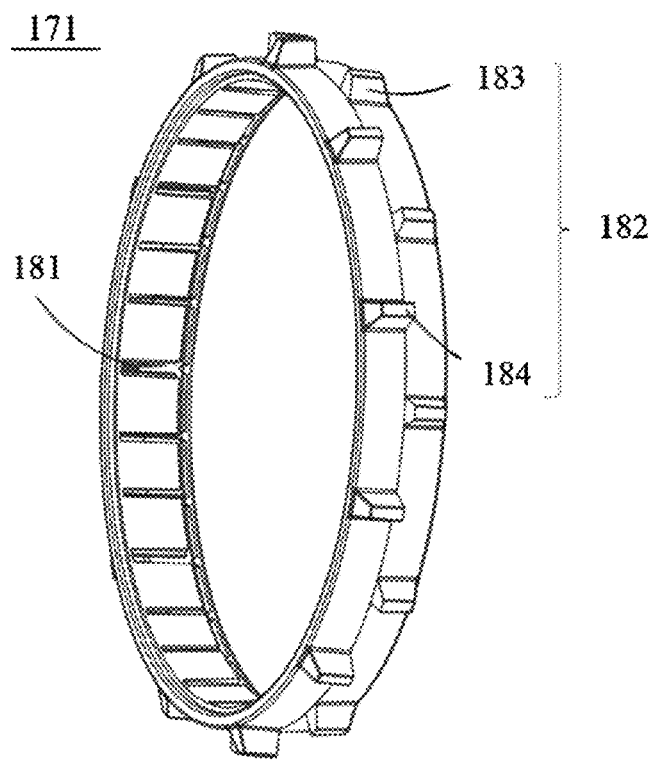
Figure 64:
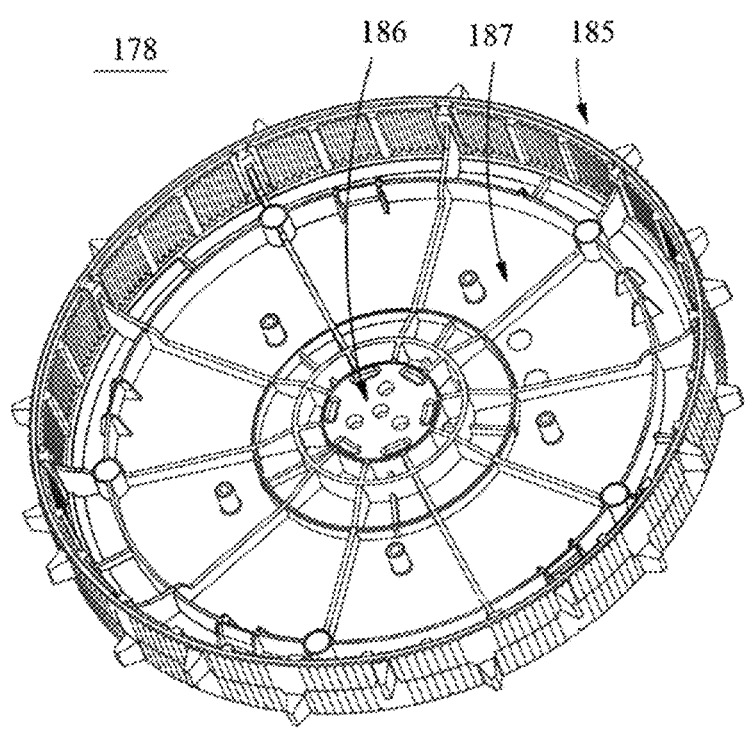
Figure 65:
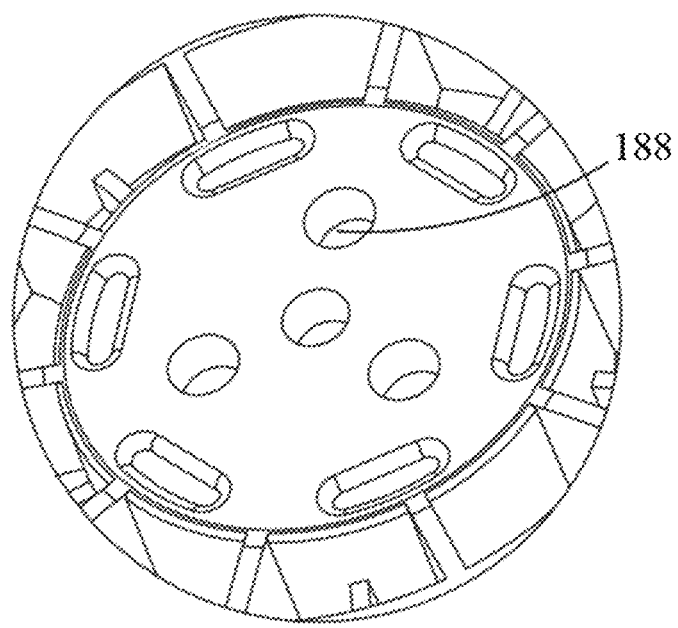
FIG. 65 through FIG. 67 are schematic partial enlarged views of the wheel hub shown in FIG. 64.

Referring to FIG. 63, an outer surface of the tire 171 is provided with a number of anti-skid blocks 182. The anti-skid blocks 182 protrude outwards from the outer surface of the tire 171 in a radial direction of the tire 171. In the illustrated embodiment, the anti-skid blocks 172 each are a trapezoidal structure, and interiors of the anti-skid blocks 172 are recessed to form the aforementioned grooves 181. That is to say, after the wheel hub 178 and the tire 171 are assembled together, the wheel hub protrusions 201 are snaped into the grooves 181 and can be used to support the anti-skid blocks 172 on the outer surface of the tire 171, so that a bead seat on the wheel hub used to positionally limit or install the tire can be saved/omitted.

As shown in FIG. 63, the anti-skid blocks 172 are spaced apart on the outer surface of the tire 171. In the axial direction of the tire 171, the anti-skid blocks 172 are distributed in two rows on the left and right, the left row of anti-skid blocks 184 and the right row of anti-skid blocks 183 have the same number/amount and are evenly distributed. A main difference is that the right row of anti-skid blocks 183 are aligned with middle positions of every two adjacent anti-skid blocks 183 of the left row of anti-skid blocks 183 to realize the left row of anti-skid blocks 184 and the right row of anti-skid blocks 183 on the outer walls of the tires 171 are spaced apart and arranged in a staggered manner, thereby forming a staggered arrangement. A friction between the tire 171 and the ground can be increased, and meanwhile the gripping force of the tire 171 can be improved and the tire 171 can be avoided from slipping during driving.

Referring to FIG. 64 through FIG. 67, the wheel hub 178 includes a hub mounting portion 186, a wheel spoke 187 and a wheel rim 185. The hub mounting portion 186 is cylindrical in shape and arranged at a center of the wheel hub 178. The hub mounting portion 186 is provided with hub mounting holes 188. The hub mounting holes 188 penetrate through the hub mounting portion 186 along a central axis of the hub mounting portion 186. The wheel balance weight is provided with multiple through holes 180 corresponding to the hub mounting holes 188, and the wheel balance weight is mounted on the wheel hub by the screws 179.

The spoke 187 is used to connect the hub mounting portion 186 with the wheel rim 185. The spoke 187 is annular in shape, an inner ring surface of the spoke 187 is connected with the hub mounting portion 186, and an outer ring surface thereof is connected with the wheel rim 185. The spoke 187 includes connecting columns 194, positioning columns 202 and reinforcing ribs 189. The connecting column 194 is provided with a hub connecting hole 195. Extending directions of the connecting column 194 and the hub connecting hole 195 are the same as a direction of the central axis of the wheel hub 178. The connecting columns 194 are arranged close to an edge of the outer ring of the spoke 187, and the connecting columns 194 each are in a cylindrical shape.

Figure 66:
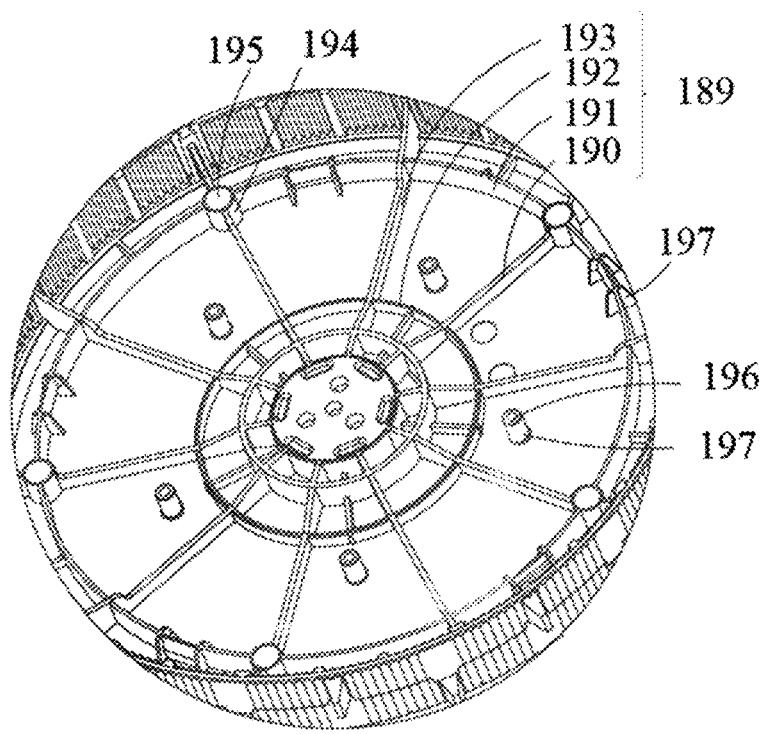

Referring to FIG. 66, the reinforcing ribs 189 include main reinforcing ribs 190, auxiliary reinforcing ribs 193, a first reinforcing rib 192 and a second reinforcing rib 191. Protruding directions of the main reinforcing ribs 190, the auxiliary reinforcing ribs 193, the first reinforcing rib 192 and the second reinforcing rib 1901 are the same as the extending direction of the connecting column 194. The main reinforcing ribs 190 and the auxiliary reinforcing ribs 193 extend in a radial direction of the spoke 187. Protruding heights of the main reinforcing ribs 190 and the auxiliary reinforcing ribs 193 gradually decrease from the hub mounting portion 186 toward the wheel rim 185, and after they are reduced to certain heights, they continue to extend outwards at the same height. Such arrangement increases the structural strength of the wheel hub 178. In other embodiments, the protruding heights of the main reinforcing ribs 190 and the auxiliary reinforcing ribs 193 can be set according to actual conditions, and they are not limited herein.

As shown in FIG. 66, as to the spoke 187, the inner ring surface and the outer ring surface are connected through the main reinforcing ribs 190 and the auxiliary reinforcing ribs 193. The main reinforcing ribs 190 are connected to the connecting columns 194 at the edge of the outer ring, and the auxiliary reinforcing rib 193 is located at an angle bisector of the two main reinforcing ribs 190. The first reinforcement rib 192 and the second reinforcement rib 191 each are circular and are arranged coaxially with the spoke 187. The first reinforcement rib 192 is located at a position where the protruding heights of the main reinforcement ribs 190 and the auxiliary reinforcement ribs 193 tend to be constant. Adjacent two of connecting columns 194 are connected by the second reinforcing rib 191.

As shown in FIG. 66, the second reinforcing rib 191 are provided with support pillars 197. The support pillar 197 is a right-angled triangle in shape, and two right-angled sides are respectively attached to the bottom of the spoke 187 and the second reinforcing rib 191. An inner side and an outer side of the second reinforcing rib 191 both are provided with the support pillars 197, and the two support pillars 197 on the inner and outer sides are symmetrically arranged and combined into a pair. Each two pairs of support pillars 197 are placed adjacent to each other to form a set of support pillars 197. Optionally, the spoke 187 is provided with five sets of support pillars 197, and the five sets of support pillars 197 are evenly distributed on the second reinforcing rib 191.

As shown in FIG. 66, the spoke 187 is further provided with spoke positioning holes 196. An extending direction of the spoke positioning hole 196 is the same as the extending direction of the connecting column/post 194. In the illustrated embodiment, the spoke 187 is further provided with positioning columns/posts 202. The spoke positioning hole 196 is formed on the positioning column 202 and is recessed from the top of the positioning column 202. The numbers of the positioning columns 202 and the spoke positioning holes 196 are both set to be five. A shape of the positioning column 202 is cylindrical, and a shape of the spoke positioning hole 196 is also circular, without limiting herein, as long as the purpose of positioning the wheel balance weight 173 on the wheel hub 178 can be achieved.

Figure 67:
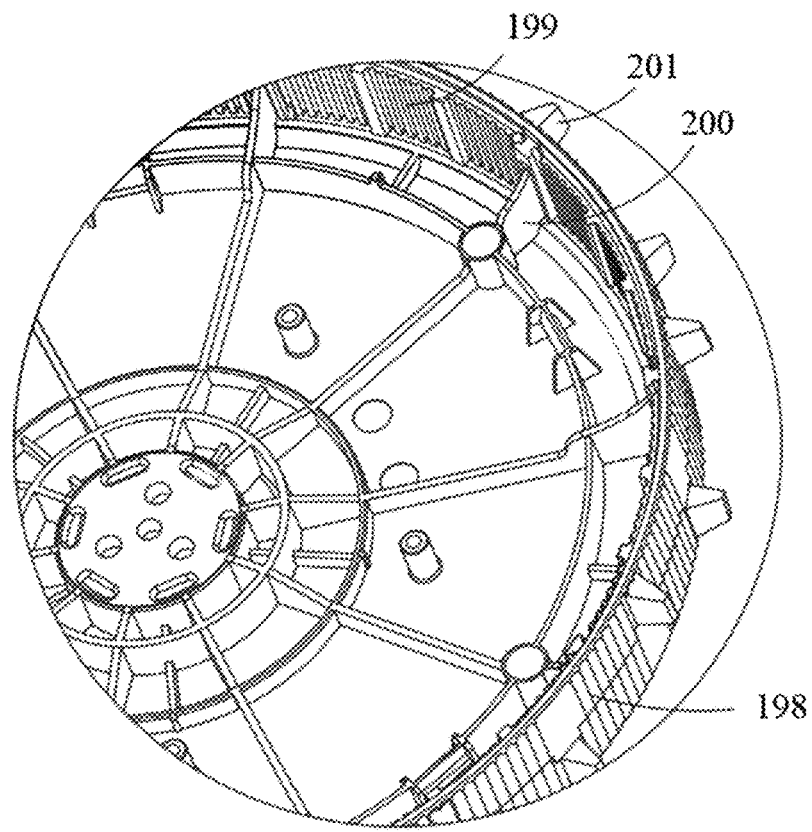

As shown in FIG. 67, the hub protrusions 201 are arranged on the outer surface of the wheel rim 185. The wheel rim 185 further includes outer serrated surfaces 198, inner serrated surfaces 199, and connecting ribs 200. One end of the connecting rib 200 is connected to the wheel rim 185, and the other end is connected to the connecting column 194 to thereby increase the connection strength between the spoke 187 and the wheel rim 185. The shape of the hub protrusion 201 is a trapezoid. The hub protrusion 201 on the wheel hub 178 is received in the groove 181 on the inner surface of the tire 171 during installation, so that the stability and air tightness between the tire 171 and the wheel hub 178 are improved.

The outer serrated surfaces 198 are evenly distributed on the outer surface of the wheel rim 185, and the inner serrated surfaces 199 are evenly distributed on the inner surface of the wheel rim 185. Both the outer serrated surface 198 and the inner serrated surface 199 are in a triangular prism shape. When being installed, the outer serrated surfaces 198 are in contact with the inner surface of the tire 171. The arrangement of the outer serrated surfaces 198 increases the friction with respect to the inner surface of the tire 171 and improves the gripping force of the wheel hub 178.

As shown in FIG. 67, the wheel hub 178 is connected with the tire 171 through the cooperation of the hub protrusions 201 and the grooves 181. The wheel balance weight 173 can be fixedly installed on the wheel hub 178 through the cooperation of the hub mounting holes 188 and the screws 179. The wheel hub 178 is installed/mounted on the bottom of the housing 1, so that a power transmission assembly can transmit a force to the walking wheel 9, the walking wheel 9 is rotated by the force, and then the mower can walk forward or backward.

Figure 60:
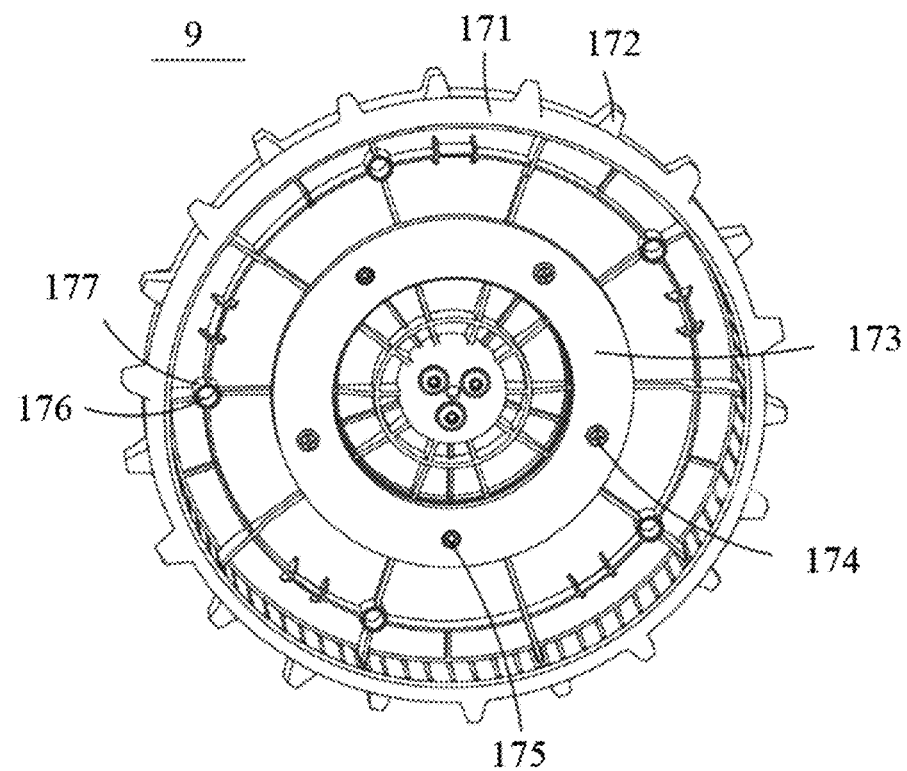
FIG. 60 and FIG. 61 are schematic views of a walking wheel.

Referring to FIG. 60, in the direction of the central axis of the wheel hub 178, a cross-sectional width of the wheel balance weight 173 is $1/6$-$2/6$ of a cross-sectional width of the tire 171. In the radial direction perpendicular to the central axis of the wheel hub 178, an inner diameter of the wheel balance weight 173 is $3/10$-$4/10$ of a cross-sectional height of the tire, and an outer diameter of the wheel balance weight 173 is $5/10$-$7/10$ of the cross-sectional height of the tire. A mass of the wheel balance weight 173 is $3/5$-$4/5$ of an overall mass of the walking wheel 9, without limiting herein, as long as it can achieve the purpose of increasing the weight of the walking wheel 9 and preventing the tire 171 from slipping.

Optionally, in the direction of the central axis of the wheel hub 178, the cross-sectional width of the wheel balance weight 173 is $1/6$ of the cross-sectional width of the tire; and in the radial direction perpendicular to the central axis of the wheel hub 178, the inner diameter of the wheel balance weight 173 is $3/10$ of the cross-sectional height of the tire, and the outer diameter of the wheel balance weight 173 is $6/10$ of the cross-sectional height of the tire; and further the mass of the wheel balance weight 173 is $3/5$ of the overall mass of the walking wheel.

Referring to FIG. 2 and FIG. 68 through FIG. 78, the walking wheel 9 further can include a wheel cover 202 and a wheel cover trim 203. The wheel cover 202 is located on the wheel hub 178. The wheel cover trim 203 is detachably mounted on the wheel cover 202.

Figure 68:
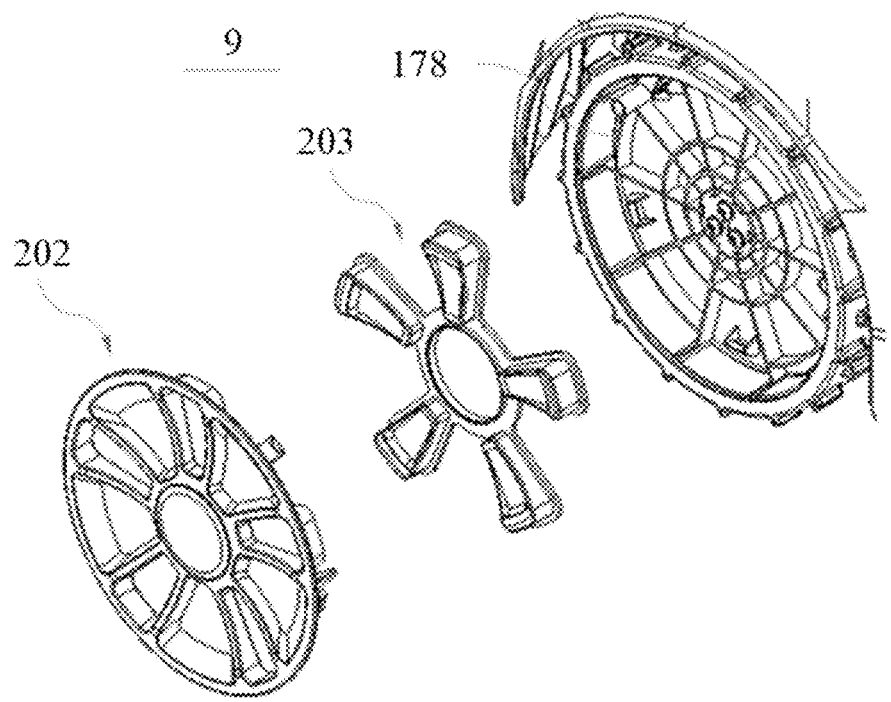
FIG. 68 is a schematic exploded view of the walking wheel.

In one embodiment, as shown in FIG. 68, the wheel cover 202 and the wheel hub 178 are detachably assembled. The wheel cover trim 203 is interposed between the wheel hub 178 and the wheel cover 202. When replacing the wheel cover trim 203, the wheel cover 202 can be removed from the wheel hub 178 first, and then a new wheel cover trim 203 is assembled on the wheel cover 202, and finally the wheel cover 202 and the wheel hub 178 are assembled together. The wheel cover trim can be replaced individually to realize the purpose of changing a color of the walking wheel.

Figure 69:
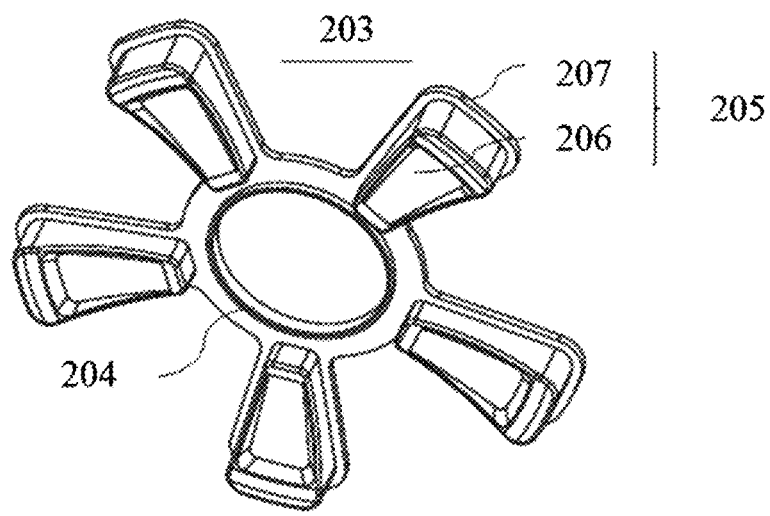
FIG. 69 and FIG. 70 are schematic views of a wheel cover trim.
Figure 70:
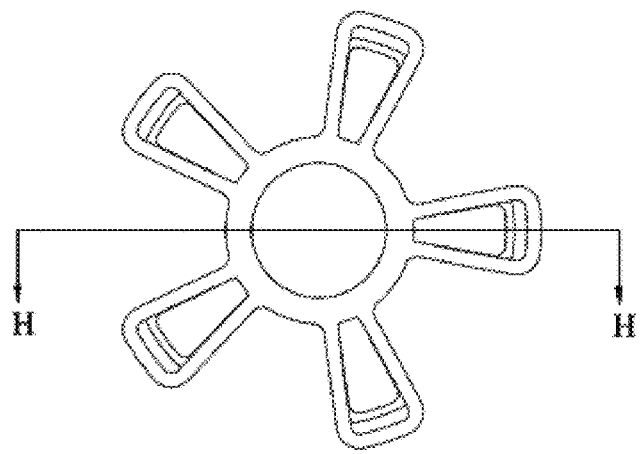
Figure 71:
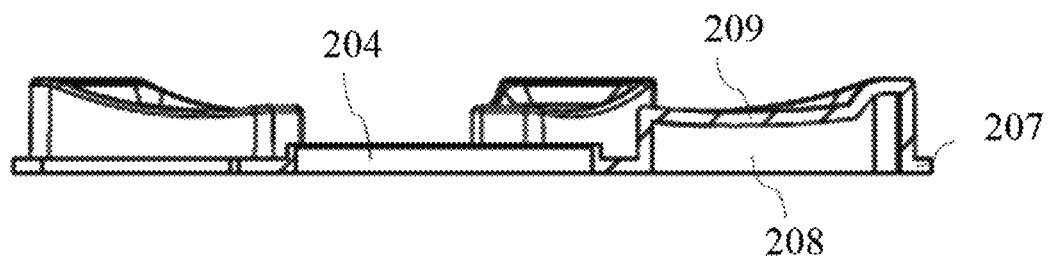
FIG. 71 is a schematic cross-sectional view taken along the line H-H in FIG. 70.

Referring to FIG. 69 through FIG. 71, the wheel cover trim 203 can include a middle part 204, and multiple protruding parts 205 extending outwards from the middle part 204 in the circumferential direction. The protruding parts 205 are embedded in corresponding wheel cover mounting holes 210.

In one embodiment, as shown in FIG. 69, the middle part 204 is a ring body and is arranged coaxially with the wheel hub 178 and the wheel cover 202. As shown in FIG. 71, the protruding part 205 can include a decorative block 206 adapted to the wheel cover mounting hole 210; and a rib 207 located on a side of the decorative block 206 and protruding from the decorative block 206. When the protruding part 205 is embedded in the corresponding wheel cover mounting hole 210, the decorative block 206 is snapped into the corresponding wheel cover mounting hole 210 to be exposed from the outside of the wheel cover 202, and the rib 207 touches against the periphery of the wheel cover mounting hole 210.

As illustrated in FIG. 70 and FIG. 71, a rear side (i.e., a side near the wheel hub 178) of the wheel cover trim 203 is flat, and a front side (i.e., a side near the wheel cover 202) of the wheel cover trim 203 is protruded by the decorative block 206 so as to fit into the wheel cover mounting holes. In order to reduce the weight of the decorative block, a rear/back side of the decorative block 206 is provided with a weight-reduction groove 208. A front side of the decorative block 206 is provided with a color matching groove, and a bottom of the color matching groove is provided with a corresponding color plate 209. The color board is recessed in the color matching groove to prevent the color board from being worn and discolored, and thereby protecting the color board. The color plate 209 can be designed separately or integrated with the color matching groove to ensure consistent colors.

Figure 72:
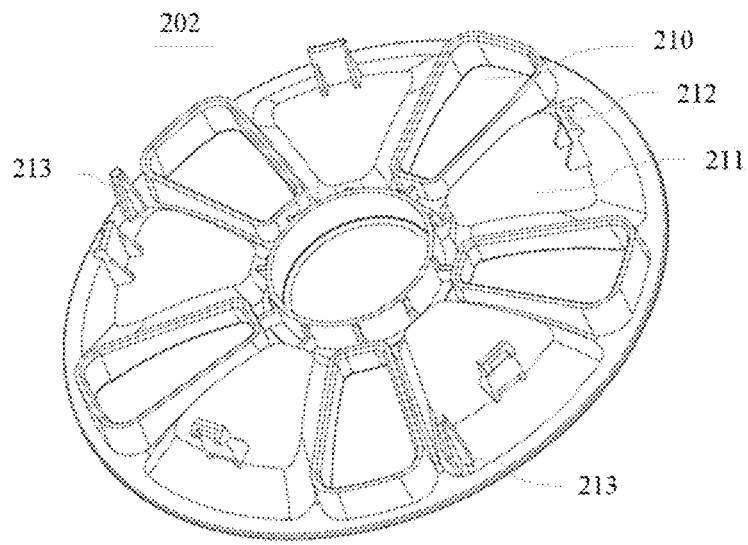
FIG. 72 and FIG. 73 are schematic views of a wheel cover.
Figure 73:
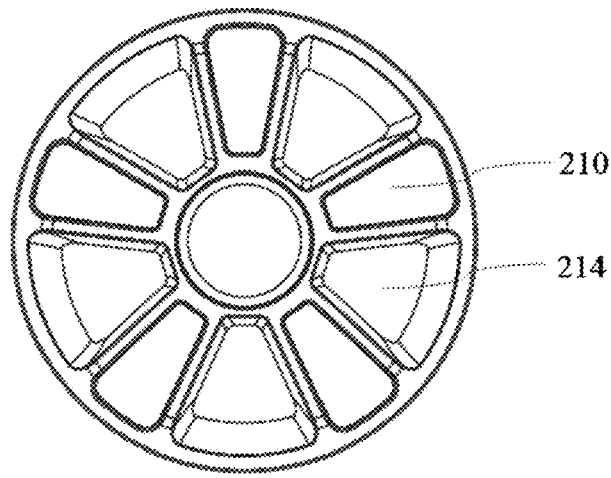

As shown in FIG. 72 and FIG. 73, multiple wheel cover mounting holes 210 are formed in the circumferential direction of the wheel cover 202 and used to engage with the protruding parts 205 of the wheel cover trim 203. Inner protrusions 211 (located on the inner side of the wheel cover 202, that is, on the side close to the wheel cover trim) and outer grooves 214 (located on the outer side of the wheel cover 202 in FIG. 7, that is, the side away from the wheel cover trim) are provided at intervals/spacings among the wheel cover mounting holes 210. A snapping head 212 is provided at an edge of each inner protrusion 211 and used for snapping with the wheel hub 178. Specifically, the inner protrusion 211 and the outer groove 214 can be designed with the same shape and structure, or can be designed with different shapes and structures, but they cannot form a through hole to ensure that the wheel cover 202 is covered on the outer side of the walking and ensure the sealing of internal structure of the walking wheel.

Figure 74:
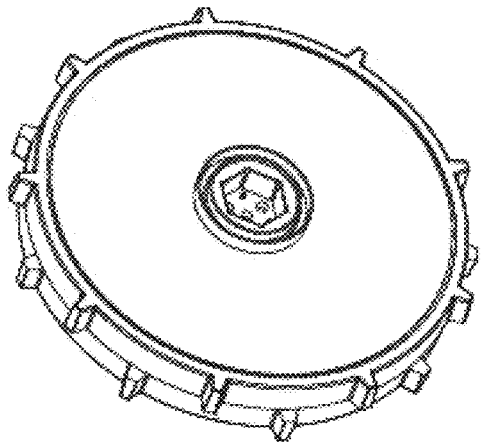
FIG. 74 through FIG. 76 are schematic views of the wheel hub.
Figure 75:
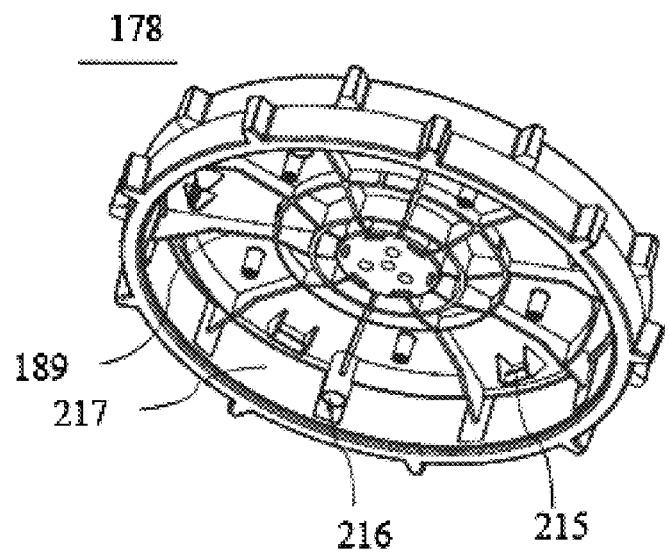
Figure 76:
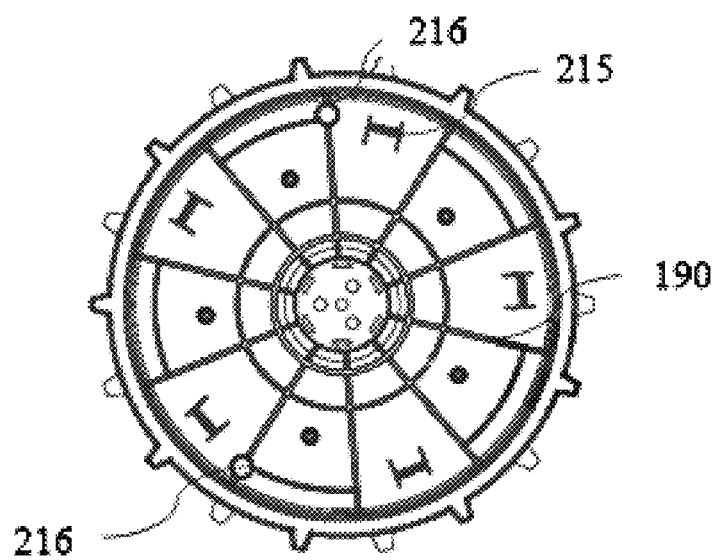

Referring to FIG. 74 through FIG. 76, an inner side (the side close to the housing) of the wheel hub 178 is flat to meet an overall assembly requirement of the mower. An outer side (the side close to the wheel cover trim) of the wheel hub 178 is provided with a wheel cover mounting location 217 and used for mounting the wheel cover. A number of the reinforcing ribs 192 are provided in the wheel cover mounting location 217 to support the wheel hub 178.

Figure 77:
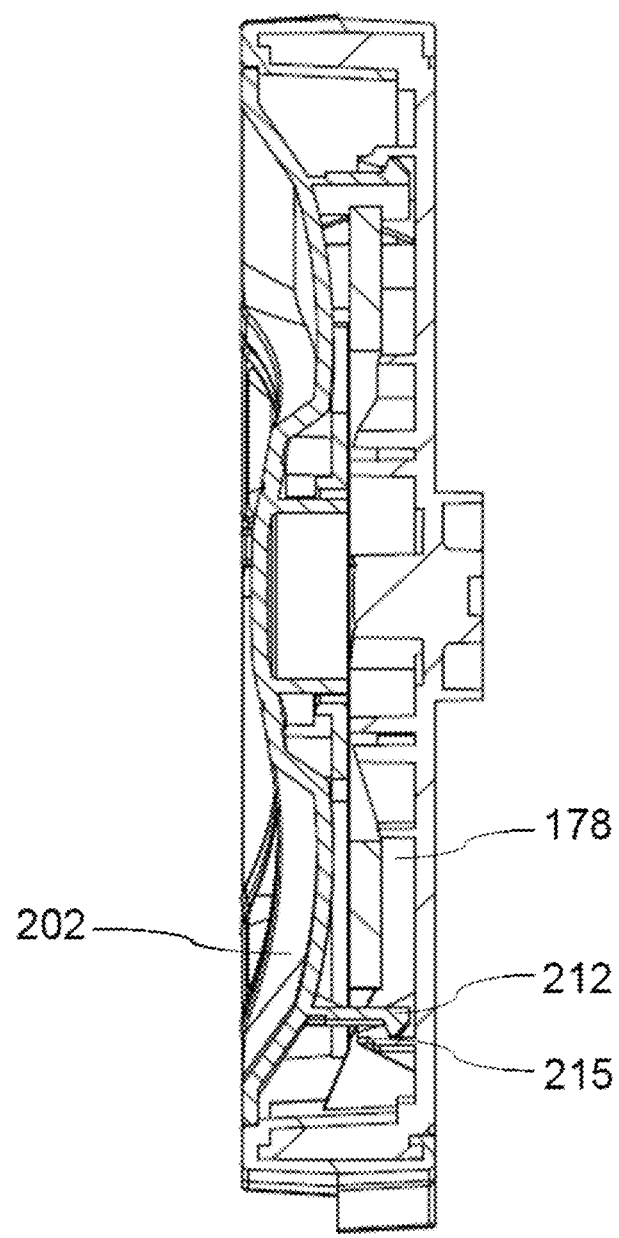
FIG. 77 is a schematic view of an engaging member being assembled.

As shown in FIG. 77, a number of hub buckling grooves 215 are provided in the wheel cover mounting location 217. The hub engaging grooves 215 are evenly distributed on the circumference of the wheel hub 178 to form an engaging member together with the snapping head 212 on the wheel cover 202. The wheel cover is detachably installed on the wheel hub through the engaging member.

Figure 78:
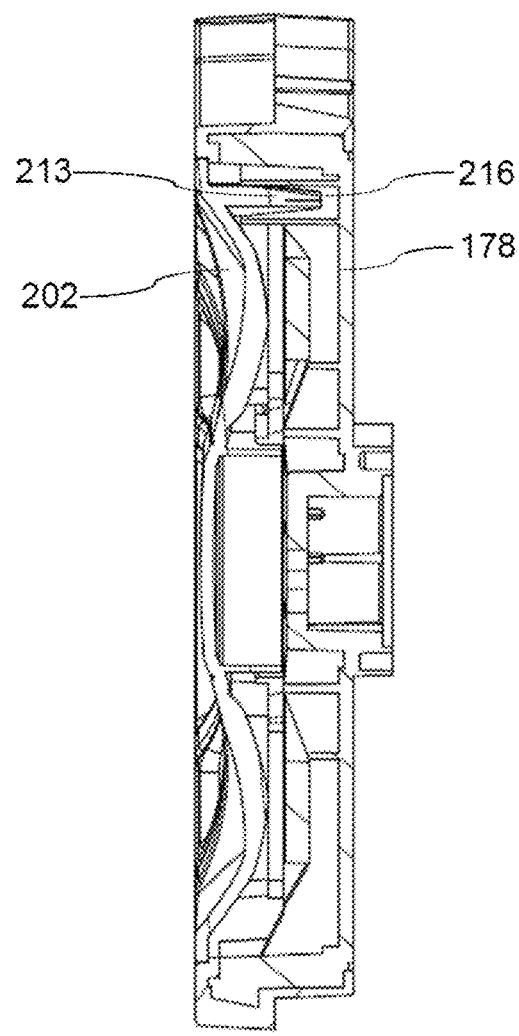
FIG. 78 is a schematic view of a positioning member being assembled.

As shown in FIG. 78, the wheel cover 202 and the wheel hub 178 are positioned and installed by at least two asymmetrically-arranged positioning members. The positioning member can include a positioning rod 213 located on the circumference of the wheel cover 202; and, a hub positioning hole 216 located on the circumference of the wheel hub 178 and adapted to the positioning rod 213. The positioning rod 213 can be inserted into the corresponding hub positioning hole 216 to position the wheel cover 202 and the wheel hub 178, and then assemble the wheel cover 202 and the wheel hub 178.

Figure 79:
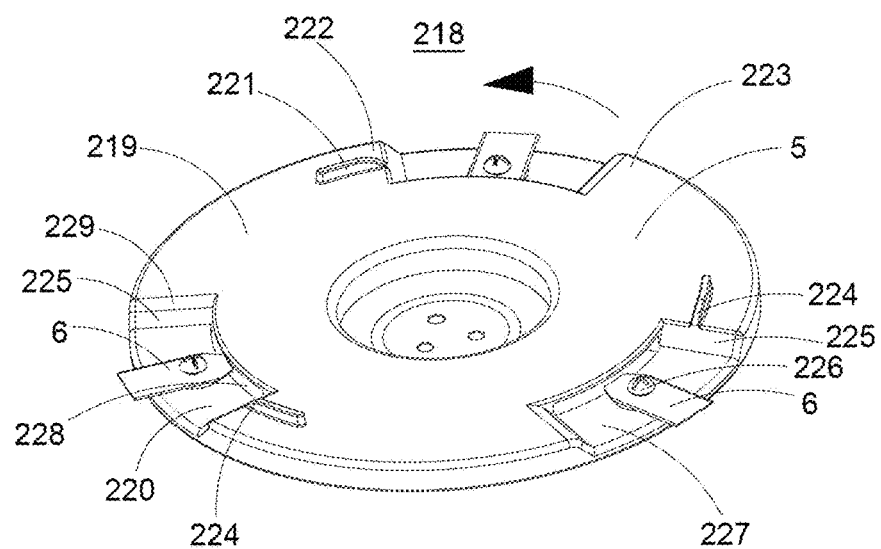
FIG. 79 and FIG. 80 are schematic perspective views of a blade carrier assembly of the disclosure.
Figure 80:
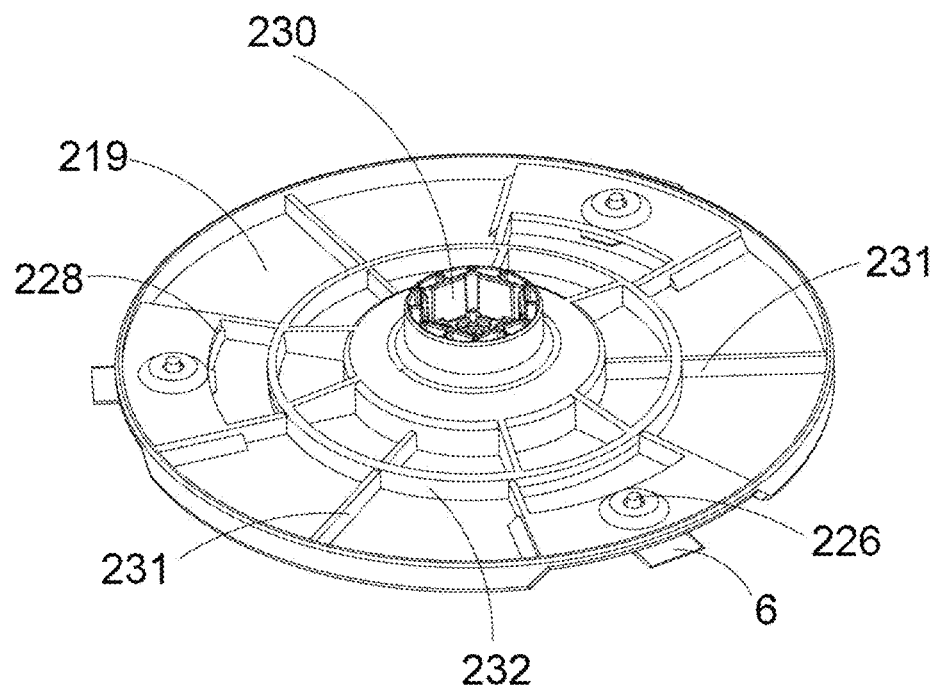

Referring to FIG. 79 and FIG. 80, in the disclosure, a blade carrier assembly 218 is provided and used for mowing lawns. The blade carrier assembly 218 can include a blade carrier 5, and blades 6 mounted on the blade carrier 5.

Figure 81:
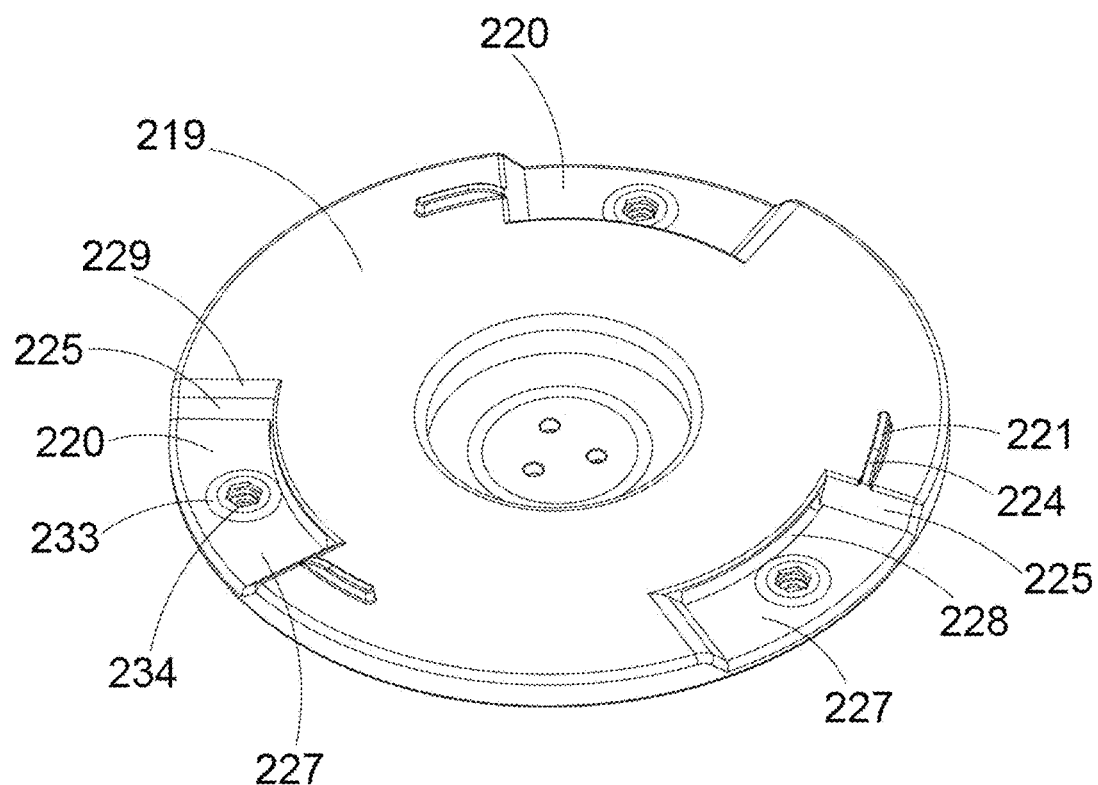
FIG. 81 is a schematic perspective view of the blade carrier.

Referring to FIG. 79, FIG. 80 and FIG. 81, the blade carrier assembly 218 can include a disc body 219 and blade mounting grooves 220 recessed inwardly from the edge of the disc body 219 along an axial direction of the disc body 219. In the illustrated embodiment, the disc body 219 is circular. In other embodiments, the disc body 219 can also be set in other shapes as needed, such as a regular polygon. The disc body 219 is provided with guide platforms 221 on the side facing the lawn. An axle sleeve 230 and reinforcing ribs 231 are provided on the side of the disc body 219 facing away from the lawn.

Each the guide platform 221 is formed by protruding outward from the side of the disc body 219 facing the lawn. The guide platform 221 is adjacent to the blade mounting groove 220 and is located on the first grass-incoming side of the blade mounting groove 220. As shown in FIG. 79, when the blade carrier assembly 218 rotates counterclockwise in the direction of the arrow shown in FIG. 79, the first grass-incoming side of the blade mounting groove 220 is the first side 222, and the second side 223 is a secondary grass-incoming side. When the blade carrier assembly 218 rotates clockwise in the opposite direction of the arrow shown in FIG. 79, the first grass-incoming side is the second side 223, and the secondary grass-incoming side is the first side 222.

With this arrangement, the guide platform 221 can catch the grass before the blade mounting groove 220, so that the guide platform 221 first straightens and cleans the long grass on the lawn before the blade 6 cuts the grass, so as to prevent long grass, long vines, etc. from being entangled on the blade 6. A guiding wall 224 is provided on the side of the guide platform 221 facing away from the rotation direction of the disc body 219. In the illustrated embodiment, each blade mounting groove 220 corresponds to one guide platform 221, and the guide platform 221 is located on the first grass-incoming side of the blade mounting groove 220.

In other embodiments, the first grass-incoming side of the blade mounting groove 220 may be provided with multiple guide platforms 221 as required, or the guide platforms 221 may be provided on both the first grass-incoming grass side and the secondary grass-incoming side of the blade mounting groove 220. In the illustrated embodiment, the side of the guide platform 221 facing away from the disc body 219 is a smooth protrusion. In other embodiments, the side of the guide platform 221 facing away from the disc body 219 can be provided cutting edges (not shown) so as to enhance the ability of the guide platform 221 to straighten out and clean up long grass and long vines.

In the illustrated embodiment, the guide platform 221 is in the shape of an arc. In other embodiments, the guide platform 221 may also be configured in other shapes, such as a V-shape. Referring to FIG. 80, the axle sleeve 230 is located at a center of the side of the disc body 219 facing away from the lawn. The axle sleeve 230 is used to cooperate with an output shaft of a power mechanism, so that the blade carrier assembly 218 rotates under the action of the output shaft. The reinforcing ribs 231 are arranged along the radial direction of the disc body 219 and are evenly distributed around the axle sleeve 230 along the circumference of the disc body 219. Optionally, the side of the disc body 219 facing away from the lawn further has secondary reinforcing ribs 232 arranged in the circumferential direction, so as to further enhance the strength of the disc body 219.

Figure 82:
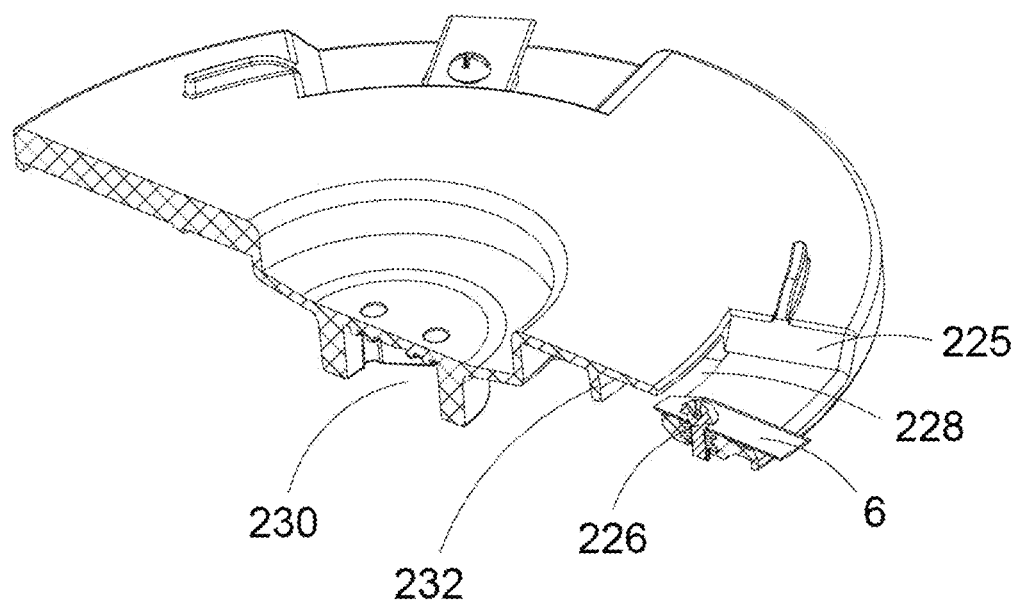
FIG. 82 is a schematic cross-sectional view of the blade carrier assembly shown in FIG. 79.
Figure 83:
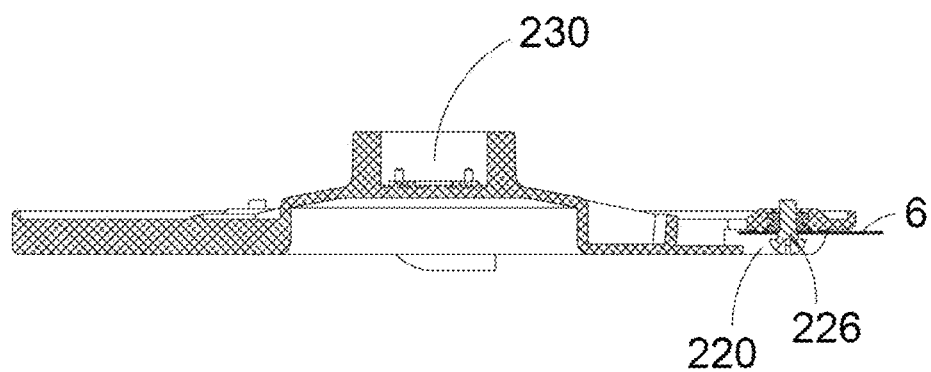
FIG. 83 is a schematic plan view of a cross-section of the blade carrier assembly shown in FIG. 82.

Referring to FIG. 81 through FIG. 83. Each the blade mounting groove 220 is formed by recessing inwards from a side of the disc body 219 facing toward the lawn, and located between the adjacent two reinforcing ribs 221. The blade 6 is installed in the blade mounting groove 220 by a fastener 226 and arranged such that: in an axial direction of the disc body 219, the blade 6 and the fastener 226 do not protrude out of the blade mounting groove 220. With this arrangement, the blade 6 can be hidden in the blade mounting groove 220, so as to prevent the blade 6, the fastener 226 from colliding with hard objects on the lawn and thereby the fastener 226 cannot be removed. Moreover, such arrangement can also prevent the blade 6 from directly contacting broken grass and soil on the lawn, thereby effectively preventing the broken grass from being entangled on the blade 6, and effectively preventing the soil from getting stuck between the blade 6 and the fastener 226.

The blade mounting groove 220 includes a groove bottom wall 227 and groove side walls 225 located on both sides of the groove bottom wall 227. The groove bottom wall 227 is provided with a boss 233 and a mounting hole 234 recessed inwards from the boss 233. The blade 6 is detachably mounted on the boss 233 through the fastener 226 and the mounting hole 234. Such configuration can effectively reduce the friction between the blade 6 and the disc body 219, thereby avoiding a large friction disadvantage of the existing blades being directly mounted on the disc body 219, and effectively improving a working efficiency of the blade carrier assembly 218.

An included angle between the groove bottom wall 227 and the groove side wall 225 is an obtuse angle, and a chamfer 229 is provided at an intersection of the groove side wall 225 and the disc body 219. Such configuration can effectively reduce the friction between the disc body 219 and the lawn, thereby effectively improving the working efficiency of the blade carrier assembly 218. In the radial direction of the disc body 219, a through groove 123 is provided on a side of the blade mounting groove 220 close to the axis of the disc body 219 so as to facilitate the blade 6, grass, stones, etc. to pass through.

The guide platform 221 and the fastener 226 can be in a circle. In the illustrated embodiment, the fastener 226 is a screw. In other embodiments, the fastener 226 may be other connecting components without limiting. In some embodiments, the blade mounting groove 220 may be further provided with a groove cover (not shown) disposed opposite to the groove bottom wall 227 to prevent grass, vines, and soil from jamming the blade 6. The groove cover and the blade mounting groove 220 may be integrally formed, or may be separately formed.

Figure 84:
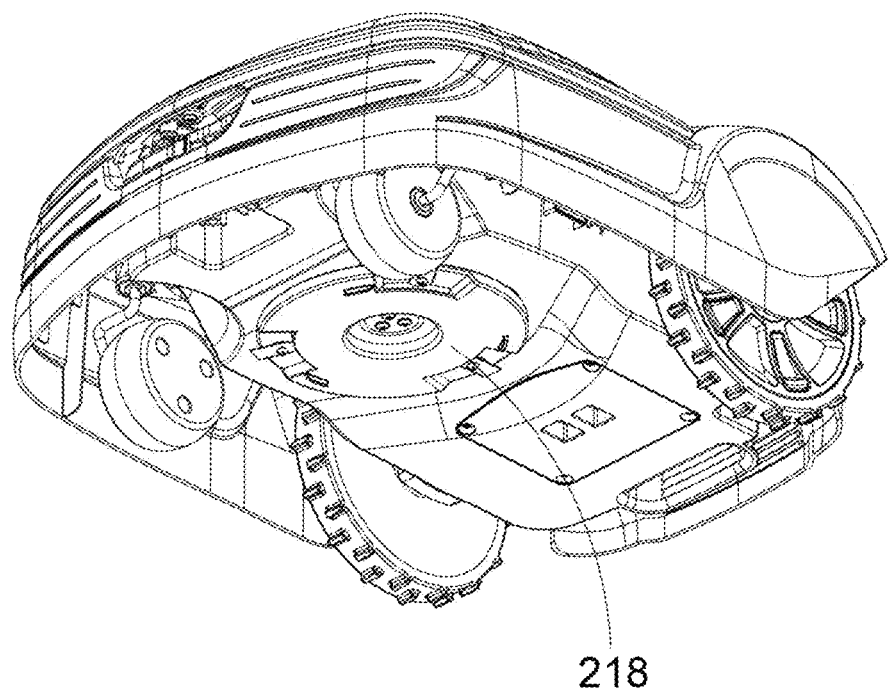
FIG. 84 is a schematic perspective view of a mower of the disclosure.

Referring to FIG. 84, in the disclosure, a mower as provided includes a power mechanism (not shown) and the blade carrier assembly 218. The power mechanism includes a motor and an output shaft that outputs power to the outside. The motor may be an electric motor or a gasoline engine. The blade carrier assembly 218 is mounted on the output shaft.

As shown in FIG. 84, as to the blade carrier assembly 218 of the disclosure, the blades 6 are installed/mounted in the respective blade mounting grooves 220 of the blade carrier 5, so that the blades 6 are hidden in the blade carrier 5, thereby avoiding the blades 6 from clamping grass or sticking mud, and effectively improving the working efficiency of the blade carrier assembly 218. Moreover, the blade carrier assembly 218 is provided with the guide table 221 on the disc body 219, so that the blade carrier 5 can straighten out and clean up long grass, long vines, etc., and thus can effectively prevent long grass and long vines from being entangled on the blades 6.

Figure 85:
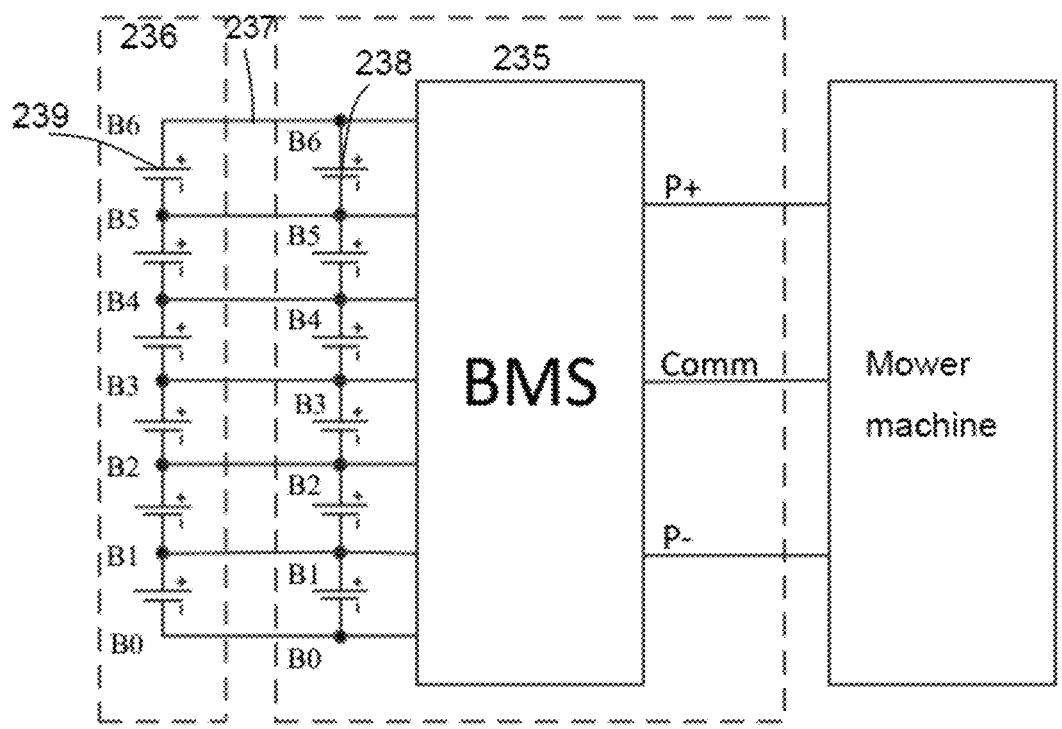
FIG. 85 and FIG. 86 are schematic principal block diagram and structural diagram of a battery pack system according to a specific embodiment of the disclosure.
Figure 86:
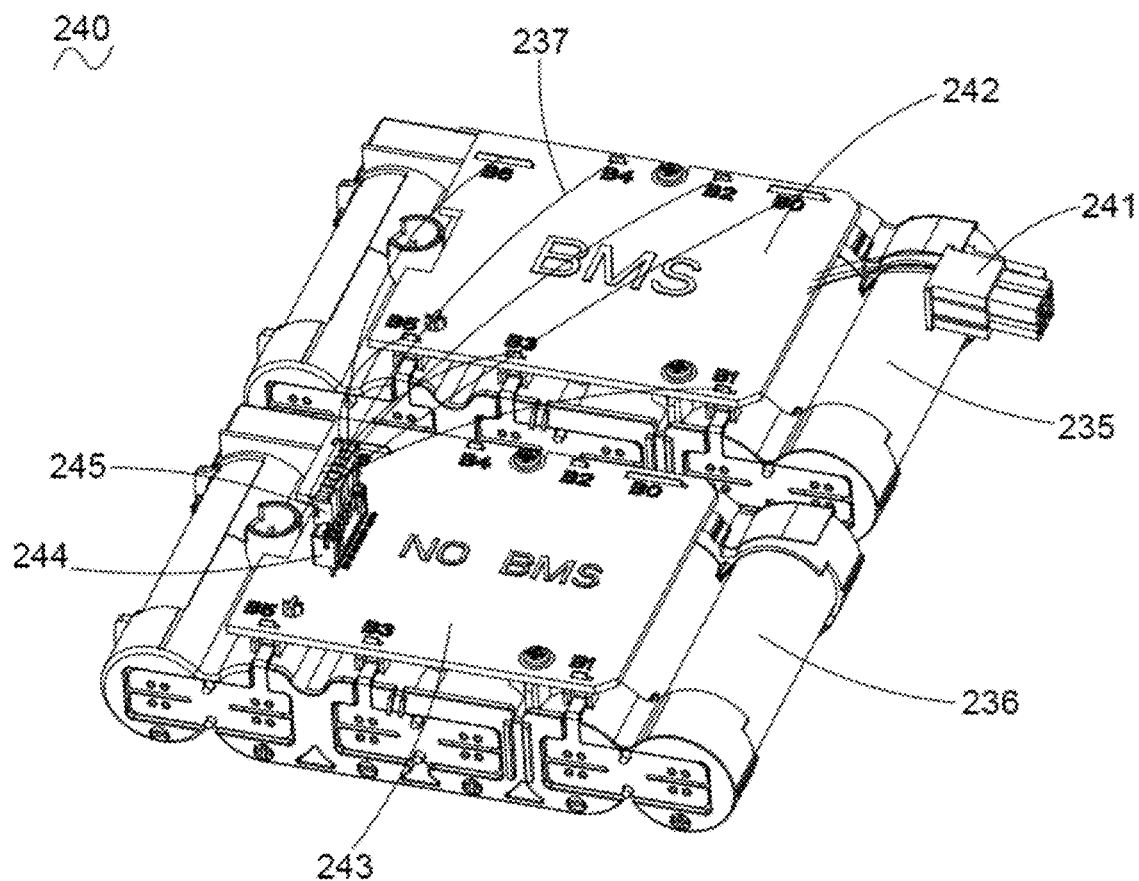

Referring to FIG. 85 and FIG. 86, in the disclosure, a battery pack system 240 is provided. The battery pack system 240 includes a first battery cell group 235, a second battery cell group 236, a connecting wire 237 and a battery management system (BMS). The connecting wire 237 electrically connects the first battery cell group 235 with the second battery cell group 236. The battery management system is connected to the first battery cell group 235. In the illustrated embodiment, the battery management system (BMS) can simultaneously manage and control power outputs of the first battery cell group 235 and the second battery cell group 236, so that one battery management system (BMS) can be used to simultaneously manage and control the power outputs of the two battery cell groups.

As illustrated in FIG. 85 and FIG. 86, the first battery cell group 235 is composed of multiple identical first battery cell units 238 connected in series, that is, positive and negative electrodes of the first battery cell units 238 in the first battery cell group 235 are connected in a head-to-tail manner to form a series connection. The second battery cell group 236 is also composed of multiple same second battery cell units 239 connected in series, that is, positive and negative electrodes of the plurality of second battery cell units 239 in the second battery cell group 236 are connected in a head-to-tail manner to form a series connection. It should be noted that the number of first battery cell units 238 in the first battery cell group 235 is the same as the number of second battery cell units 239 in the second battery cell group 236, for example both of which are 6. That is, the first battery cell group 235 is substantially the same as the second battery cell group 236.

As shown in FIG. 85 and FIG. 86, one end of the connecting wire 237 is connected to the first battery cell group 235, and the other end is connected to the second battery cell group 236, so as to realize a parallel connection of the first battery cell group 235 with the second battery cell group 236. That is, the battery cell units respectively at two ends of the first battery cell group 235 and the battery cell units respectively at two ends of the second cell group 236 are electrically connected by the connecting wire 237, so that the first battery cell group 235 and the second battery cell group 236 are connected in parallel. In the illustrated embodiment, rated voltage values of the first battery cell group 235 and the second battery cell group 236 may be about 22.2V, without limiting herein.

As shown in FIG. 85 and FIG. 86, in order to make electric energy of the first battery cell group 235 and the second battery cell group 236 be used more effectively and evenly, each second battery cell unit 239 in the second battery cell group 236 is electrically connected to a corresponding first battery cell units 238 in the battery cell group 235 in parallel, a potential difference between the battery cells at the same position can be reduced or eliminated, and electric powers are used more uniformly rather than preferring one another.

Referring to FIG. 85 and FIG. 86, the battery pack system 240 further includes a first circuit board 242 electrically connected to the first battery cell group 235 and a second circuit board 242 electrically connected to the second battery cell group 236. The battery management system (BMS) is integrated on the first circuit board 242, and the second circuit board 243 is without battery management system (BMS). The first circuit board 242 is provided with soldering points (e.g., B0~B6 in FIG. 85). One end of the connecting wire 237 is soldered onto the soldering points on the first circuit board 242, so as to realize an electrical connection between the connecting wire 237 and the first circuit board 242.

As shown in FIG. 85 and FIG. 86, a connection device 244 is integrated on the second circuit board 243, and the other end of the connecting wire 237 is electrically connected to the connection device 244. Optionally, a plug-in device 245 is provided at the other end of the connecting wire 237, and the plug-in device 245 is fixed with the connection device 244 by plugging to realize the electrical connection between the connecting wire 237 and the second battery cell group 236. In the illustrated embodiment, the connection device 244 and the plug-in device 245 are both electrical connectors. The electrical connector includes an insulating body and conductive terminals fixed in the insulating body. The other end of the connecting wire 237 is connected to the conductive terminals of the plug-in device 245. With this arrangement, the electrical contact between the connection device 244 and the plug-in device 245 can realize the electrical connection between the connecting wire 237 and the second circuit board 243, and thereby the electrical connection between the first circuit board 242 and the second circuit board 243 can be realized.

Figure 87:
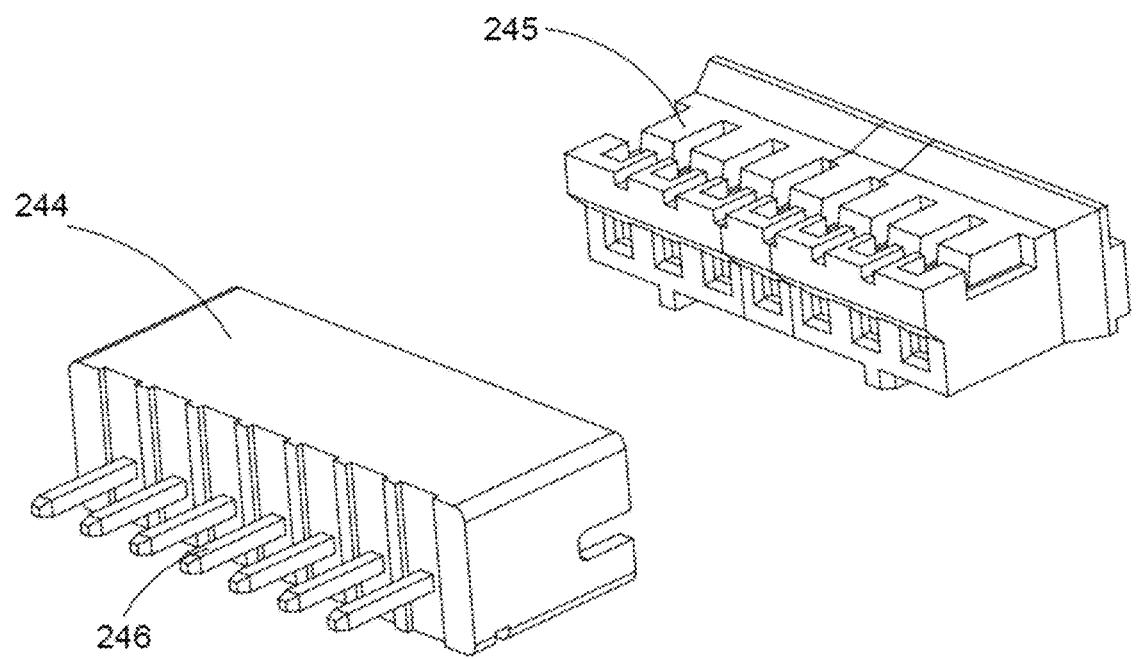
FIG. 87 and FIG. 88 are schematic partially disassembled views of a connection device and a plug-in device in FIG. 86.
Figure 88:
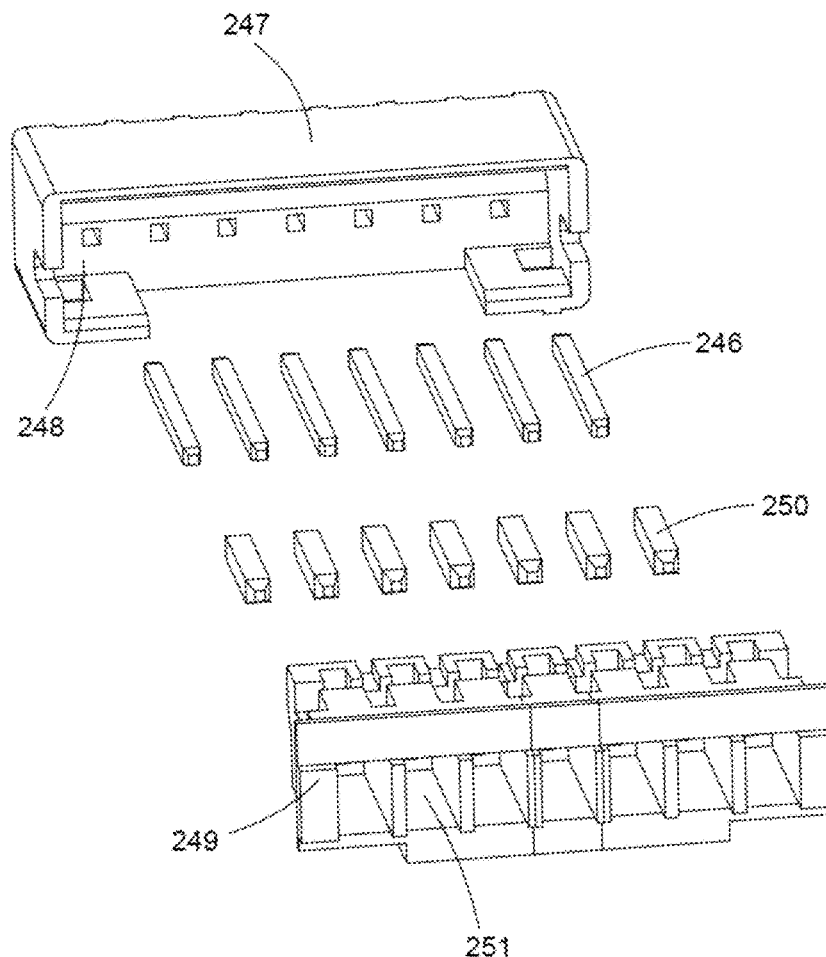

As illustrated in FIG. 87 and FIG. 88, the connection device 244 includes a first insulating body 247 and first conductive terminals 246 fixed in the first insulating body 247. A docking space 248 is formed in the first insulating body 247, and the first conductive terminals 246 are received the inside of the first insulating body 247 and partially exposed to the docking space 248. The plug-in device 245 includes a second insulating body 249 and second conductive terminals 250 fixed in the second insulating body 249. A receiving space 251 for receiving the second conductive terminals 250 is formed in the second insulating body 249. The second conductive terminals 250 all are accommodated in the receiving space 251.

As shown in FIG. 87 and FIG. 88, when the connection device 244 and the plug-in device 245 are plugged and fixed together, since the connection device 244 is integrated on the second circuit board 243, the plug-in device 245 is directly inserted into the docking space 248 of the connection device 244, so that the first conductive terminals 246 extend into the receiving space 251 and are in electrically contact with the second conductive terminals 250. As a result, the electrical conduction between the connection device 244 and the plug-in device 245 is realized, and correspondingly the connecting wire 237 is electrically connected to the second circuit board 243. In this way, the battery management system (BMS) integrated on the first circuit board 242 can be used to manage and control the power outputs of the first battery cell group 235 and the second battery cell group 236 at the same time. The battery management system (BMS) is further used to monitor states of each cell unit of the first battery cell group 235 and the second battery cell group 236. The states include temperature, over-charge voltage, over-discharge voltage and so on.

As illustrated in FIG. 87 and FIG. 88, the first circuit board 242 is further integrated with a transmission device 241. The transmission device 241 is provided with a charging and discharging interface and a communication interface. The charging and discharging interface and the communication interface are used to communicate with an external equipment, so as to realize charging and discharging functions and a communication function. It should be noted that a specific structure of the transmission device 241 can be designed according to existing technical solutions, without limiting herein. The external equipment can be any type of electric tool, such as an electric lawn mower, without limiting herein.

Figure 90:
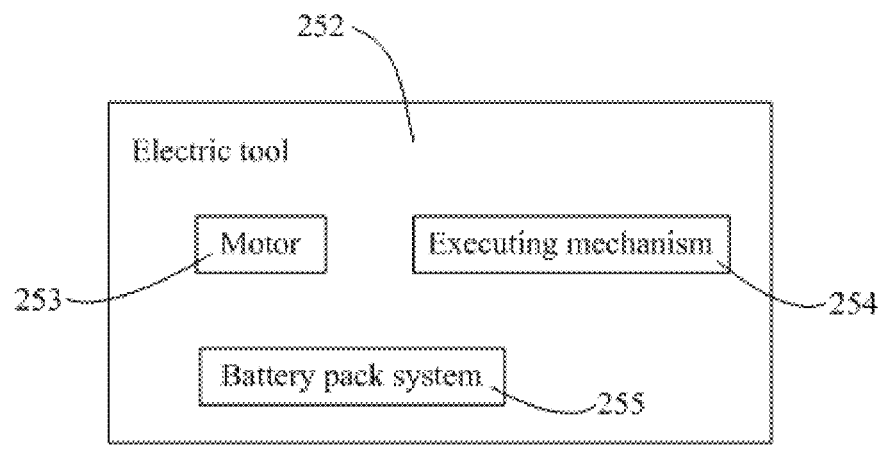
FIG. 90 is a schematic block diagram of an electric tool according to a specific embodiment of the disclosure.

As shown in FIG. 90, in the disclosure, an electric tool 252 is also provided. The electric tool 252 includes a motor 253, an executing mechanism 254 driven by the motor 253, and a battery pack system 255. The battery pack system 255 and the motor 253 are electrically connected with each other. Specifically, the motor 253 can drive the executing mechanism 254 to complete a work, and the battery pack system 255 can provide power to the motor 253 and thus can greatly increase the use time. A specific structure and a corresponding working principle of the battery pack system 255 are the same as those of the battery pack system 240 shown in FIG. 85 through FIG. 88, and the specific content can be referred to the foregoing description associated with FIG. 85 through FIG. 88, and thus will not be repeated herein.

As shown in FIG. 90, the executing mechanism 254 is a cutting blade suitable for a mower, that is, the electric tool 252 is an electric mower. At this situation, the first battery cell group 235 and the second battery cell group 236 are directly placed in the power tool 252 and then fixed. Since the first battery cell group 235 and the second battery cell group 236 have no shell, they cannot be disassembled separately. When the electric mower 200 is working, the first battery cell group 235 and the second battery cell group 236 work in parallel and share one battery management system (BMS).

Figure 91:
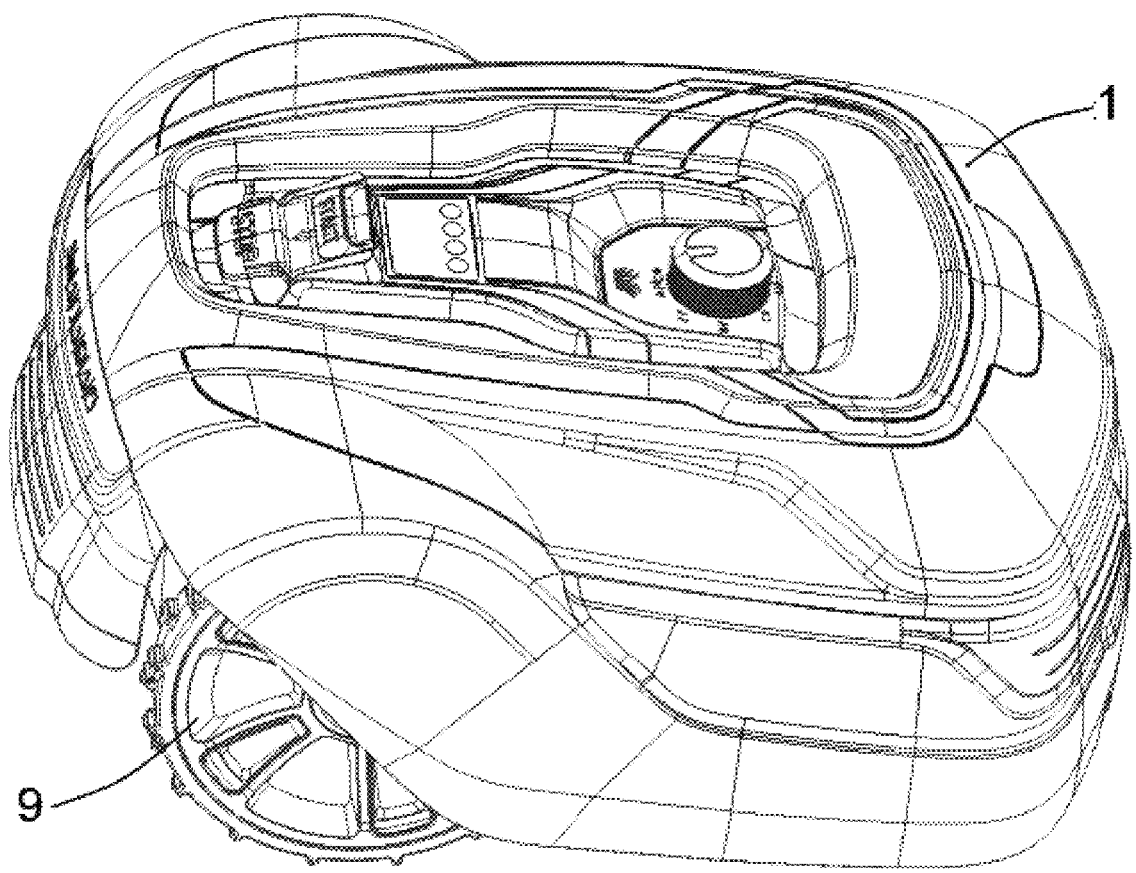

Referring to FIG. 91 and FIG. 92, a smart mower is provided according to an embodiment of the disclosure. The smart mower includes a housing 1, walking wheels 9, a motor 256 and a cutting blade 5. The walking wheels 9 are installed on the bottom of the housing 1 to support the entire smart mower and drive the entire smart mower to walk. The motor 256 is housed in the housing 1. The cutting blade 5 is exposed to an outer side of the bottom of the housing 1. The cutting blade 5 is connected to a motor shaft of the motor 256. When the motor 256 rotates, the cutting blade 5 can be driven to rotate by the motor shaft so as to realize a cutting function. The housing 1 further houses a battery pack system 240. The battery pack system 240 has the same structure and working principle as the above-mentioned battery pack system 240, and is used to provide power to the motor 256 to ensure that the motor 256 has sufficient power to rotate and drive the cutting blade 5 to carry out a continuous cutting action.

As shown in FIG. 91 and FIG. 92, after the smart mower 300 adopts the battery pack system 240, it not only realizes an expansion of electric energy, improves a use time of a single charge (that is, prolongs a cruising range) and prolongs a service life of the battery pack system 240, but also can obtain a relatively high voltage, and thereby obtain a relatively small current and sufficient output power to meet needs of working.

As shown in FIG. 93, an expansion method of battery pack system according to an embodiment of the disclosure is provided and may include the following operations/steps:

A first battery cell group 235 is provided. The first battery cell group 235 is composed of multiple identical/same first battery cell units 238 connected in series. The first battery cell group 235 is electrically connected with a battery management system (BMS);

A second battery cell group 236 is provided. The second battery cell group 236 is composed of multiple identical second battery cell units 239 connected in series. The number of the second battery cell units 239 is the same as the number of the first battery cell units 238.

The second battery cell units 239 in the second battery cell group 236 are electrically connected in parallel with corresponding first battery cell units 238 in the first battery cell group 235 in one-by-one manner by using a connecting wire 237.

The battery cell units at head and tail ends of the first battery cell group 235 are electrically connected with the battery cell units at head and tail ends of the second battery cell group 236 by the connecting wire 237, so that the first battery cell group 235 and the second batter cell group 236 are electrically connected in parallel.

Finally, the battery management system (BMS) manages and controls the power outputs of the first battery cell group 235 and the second battery cell group 236 at the same time.

Figure 89:
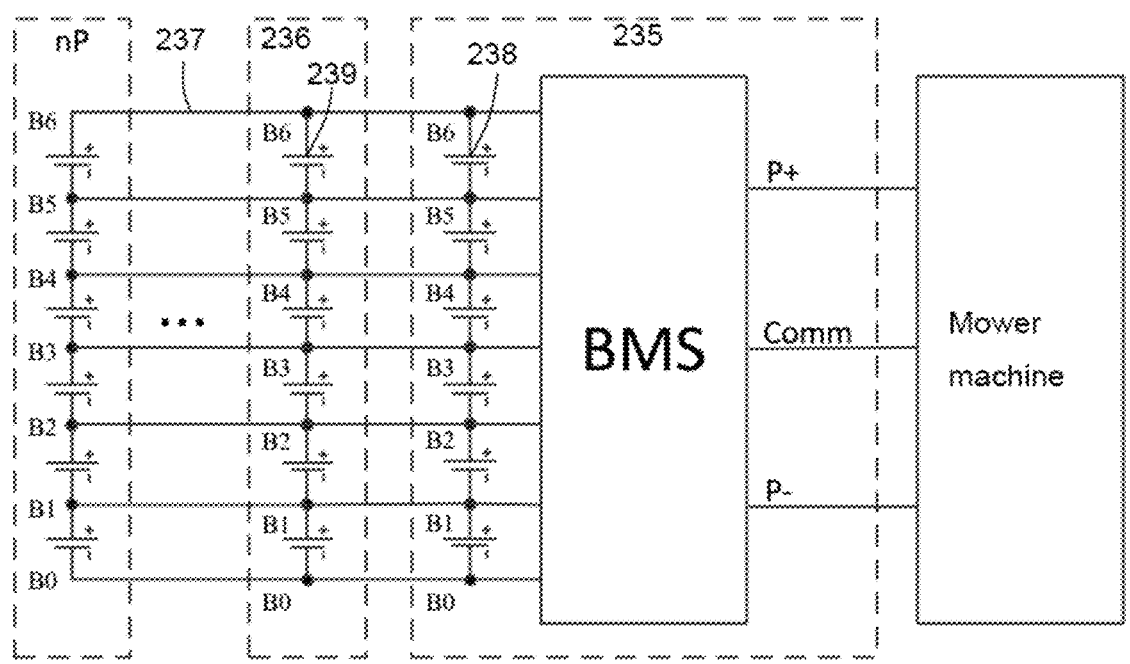
FIG. 89 is a schematic principal block diagram of a battery pack system adopting multiple battery cell groups.

As shown in FIG. 89, when the battery cell groups are provided with n groups, the battery pack system 240 can use one battery management system (BMS) to simultaneously manage and control the n battery cell groups, so that a capacity of the battery pack system 240 is further improved and thus can better meet a using requirement of a long-term power electric tool.

As shown in FIG. 89, no matter how much n is equal to, the battery management system (BMS) is only connected to the first battery cell group 235, and all the other battery cell group(s) except the first battery cell group 235 form(s) an in-parallel connection through the connecting wire 237. Meanwhile, multiple battery cell units with the same sorting position in different battery cell groups are connected in parallel, that is, in FIG. 89, the second battery cell unit 239 at the first position in the second battery cell group 236 and the battery cell unit at the first position in the nth battery cell group are connected in parallel, and the second battery cell unit 239 at the second position in the second battery cell group 236 and the battery cell unit at the second position in the nth battery cell group are connected in parallel, and so on. In this way, a potential difference between the battery cell units at the same position can be better eliminated, and power can be used more evenly rather than favoring one another.

As illustrated in FIG. 89, the connecting wire 237 and the first circuit board 242 are fixed by soldering. In other embodiments, the connecting wire 237 and the first circuit board 242 can be plugged into each other through two connectors instead, and the electrical connection is achieved in a manner similar to the connection manner of the connecting wire 237 with the second circuit board 243 as described above.

Referring to FIG. 85 and FIG. 86, the battery pack system is provided in one embodiment. In this embodiment, a structure of the battery pack system 240 is substantially the same as the structure of the battery pack system 240 in the above first embodiment, and a main difference is that: the connecting wire 237 in the first embodiment is soldered and fixed on the first circuit board 242. In this embodiment, the connecting wire 257 and the first circuit board 258 are plugged and fixed to each other through two connectors. Specifically, a first docking device 259 is integrated on the first circuit board 258, a second docking device 260 is provided at one end of the connecting wire 257, and the first docking device 259 and the second docking device 260 are plugged into each other, so as to achieve an electrical conduction between the connecting wire 257 and the first battery cell group 235.

Figure 94:
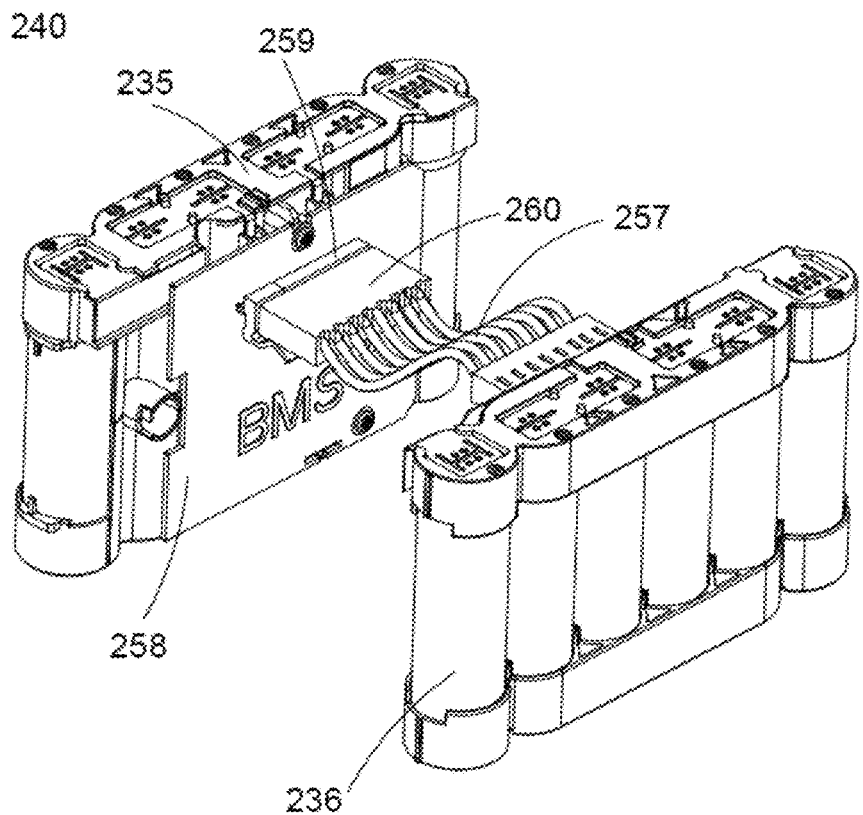
FIG. 94 is a schematic structural view of a battery pack system according to another specific embodiment of the disclosure.
Figure 95:
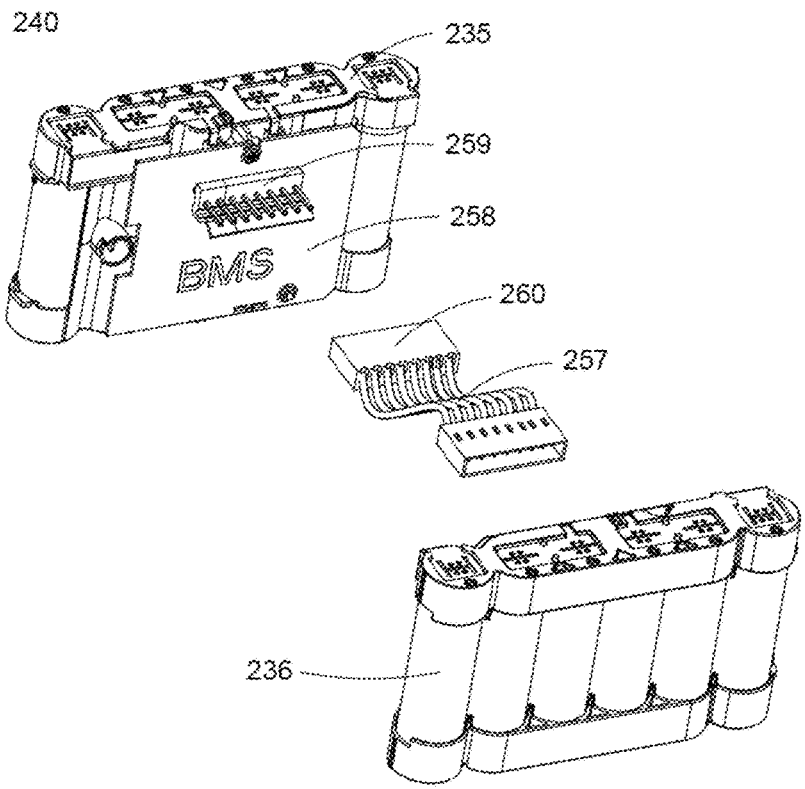

Referring to FIG. 94 through FIG. 96, the first docking device 259 and the second docking device 260 are both electrical connectors. The electrical connector includes an insulating body and conductive terminals fixed in the insulating body. One end of the connecting wire 257 is fixed to the conductive terminals of the second docking device 260. With this arrangement, the electrical contact between the first docking device 259 and the second docking device 260 can be used to achieve the electrical conduction between the connecting wire 257 and the first circuit board 258. Specific structures of the first docking device 259 and the second docking device 260 can be designed according to actual needs.

As shown in FIG. 85 and FIG. 86, the battery pack system 240 of the disclosure utilizes one battery management system (BMS) to simultaneously manage the first battery cell group 235 and the second battery cell group 236. As a result, it not only realizes the expansion of the battery pack system 240 and improves the use time of a single-time charge, but also prolongs the service life of the battery pack.

Referring to FIG. 97 through FIG. 101, a lifting detection device 267 of a mowing robot (e.g., lawn mower) is provided. The lifting detection device 267 is used to detect a lifting displacement of a main body 265 of the mowing robot relative to a chassis 266 of the mowing robot. The main body 265 is located directly above the chassis 266, and the main body 265 can be lifted upwards and is displaced in a vertical direction relative to the chassis 266.

As shown in FIG. 97, the lifting detection device 267 of the mowing robot can include a shock absorber 261, a sliding member 262, a metal plate 278, a sensor 281 and a connector 268. The shock absorber 261 is connected to the main body 265. The sliding member 262 is connected to the shock absorber 261. The metal plate 278 is arranged at the bottom of the sliding member 262. The sensor 281 is arranged on a printed circuit board (PCB) inside the chassis 266. The connector 268 connects the main body 265 with the shock absorber 261. Through the connection of the connector 268, the shock absorber 261, the sliding member 262 and the metal plate 278 can move upwards along with the main body 265.

Figure 98:
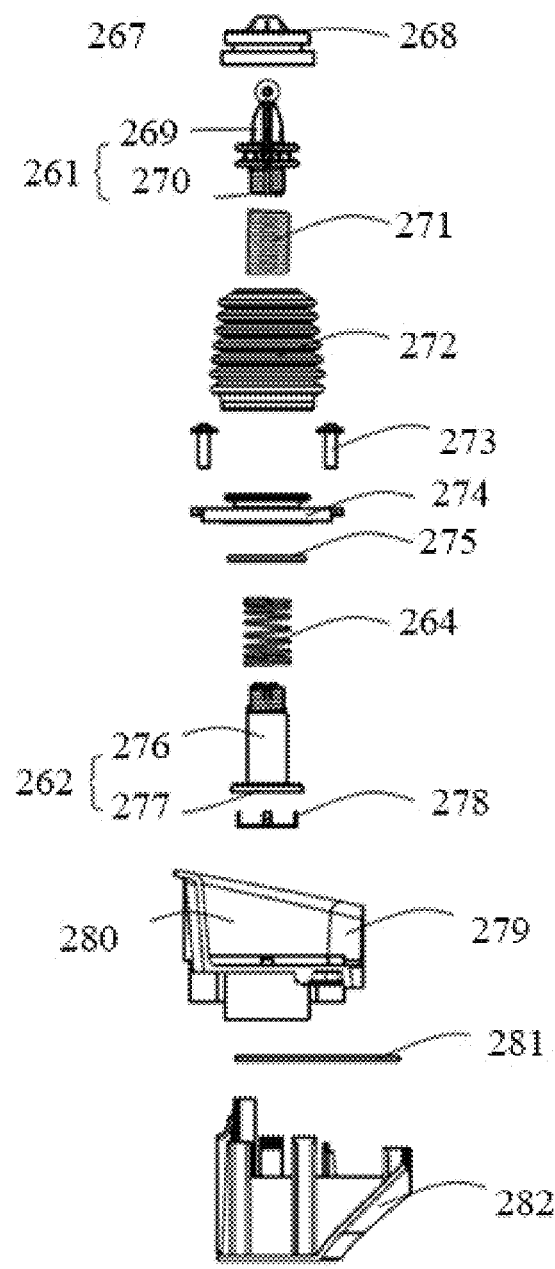
FIG. 98 and FIG. 99 are schematic perspective exploded views of the lifting detection device of the mowing robot of the disclosure.

As shown in FIG. 98, the metal plate 278 can be buckled or fixed by screws to the bottom of the sliding member 262. The sensor 281 is used to detect a distance D between the chassis 266 and the metal plate 278 in the vertical direction. When the main body 265 is lifted relative to the chassis 266, the metal plate 278 moves upwards correspondingly. When the distance between the metal plate 278 and the chassis 266 in the vertical direction exceeds a preset value, the sensor 281 sends a trigger signal to a control device of the mowing robot (not shown) to control the mowing robot to stop working, so as to prevent the mowing robot from injuring the operator.

As shown in FIG. 98, a material of the shock absorber 261 is rubber. The shock absorber 261 includes a first connecting end 269 facing toward the main body 265 and a second connecting end 270 facing toward the sliding member 262. The connector 268 has a receiving groove 285 with an opening facing toward the shock absorber 261 and used for receiving the first connecting end 269. The connection method of the connector 268 and the shock absorber 261 is not limited herein, and it can be realized by bolt connection, or by snap connection, or other commonly used connection method, as long as the two are tightly connected.

As illustrated in FIG. 98, the sliding member 262 is firmly connected to the shock absorber 261, that is, movement states of the sliding member 262 and the shock absorber 261 are kept consistent. A material of the sliding member 262 may be a plastic material. The sliding member 262 includes a connecting portion 276 extending in the vertical direction and a fixing portion 277 perpendicular to the connecting portion 276. The connecting portion 276 is connected to the second connecting end 270 of the shock absorber 261. The fixing portion 277 is located at the bottom and protrudes toward the periphery relative to the connecting portion 276 to form an enlarged end. The metal plate 278 is fixed on the bottom surface of the fixing portion 277.

Figure 99:
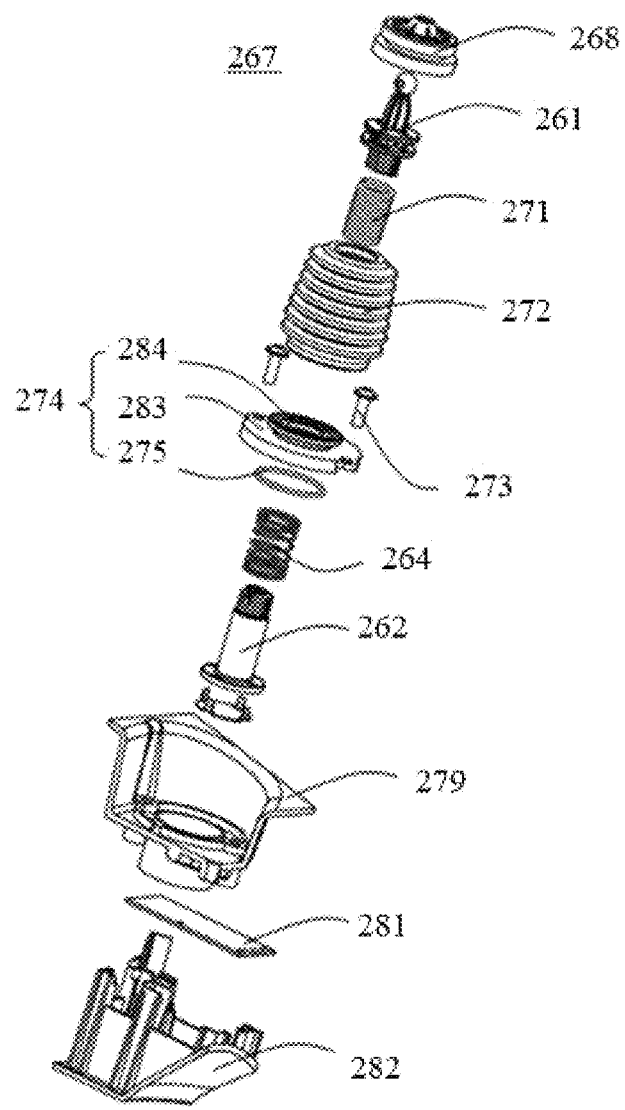

Referring to FIG. 98 and FIG. 99, the lifting detection device 267 of the mowing robot further includes a connecting plate 274 fixed on the chassis 266. The connecting plate 274 includes a mounting plate 283 provided with a through hole, a sleeve 284 fixed in the through hole, and a sealing ring 275 between the mounting plate 283 and the sleeve 284. The connecting portion 276 of the sliding member 262 passes upward through the sleeve 284 and is slidably arranged. The mounting plate 283 is fixed to the chassis 266 by fastening devices 273. The fastening device 273 is a screw or other commonly used connection element.

As illustrated in FIG. 98, the lifting detection device 267 of the mowing robot further includes a first spring 264 and a second spring 271. The first spring 264 is sleeved between the sleeve 284 and the fixing portion 277 of the sliding member 262, and is sleeved on the outer circumference of the connecting portion 276 of the sliding member 262. Since the sleeve 284 is fixed, when the sliding member 262 moves upwards along with the main body 265, the first spring 264 is compressed.

As shown in FIG. 98, the second spring 271 is disposed between the shock absorber 261 and the sliding member 262. Both the shock absorber 261 and the sliding member 262 are made of plastic. An upper end of the second spring 271 is threadedly connected to a lower end of the shock absorber 261. A lower end of the second spring 271 is threadedly connected to a top end of the connecting portion 276 of the sliding member 262. The shock absorber 261 provides a stable zero position by using the second spring 271, which makes it easy to install the main body 265, this is because the second spring 271 is fixed by the shock absorber 261 and the sliding member 262 in an initial position and therefore is not easy to deform.

As illustrated in FIG. 98 and FIG. 99, a plane where the mowing robot (e.g., mower) collides with an obstacle is defined as a collision plane. When the mower robot collides horizontally, a deflection elastic force of the second spring 271 absorbs the horizontal movement. With this arrangement, when the mower collides with the obstacle, for example, when the mower hits a tree, the shock absorber 261 can be used to reduce a vertical displacement caused by a displacement of the main body 265 relative to the chassis 266 on the collision plane. Therefore, it is ensured that the mower will not move up the main body 265 when occurs a collision with the obstacle, and the situation that the mower stops working due to the vertical displacement caused by the collision with the obstacle is avoided. That is, the shock absorber 261 allows the main body 265 to be displaced only in the vertical direction relative to the chassis 266 during the collision of the mower robot. The collision plane is approximately parallel to a plane to be mowed, that is, roughly a horizontal plane.

Referring to FIG. 98 and FIG. 99, when the mowing robot is in a normal working state, the first spring 264 is in a freely extended state, and the sliding member 262 needs to overcome the elastic force of the first spring 264 to move toward the main body 265, that is, to move away from the chassis 266. With this arrangement, when the mower is slightly collided or bumpy (when the mower passes a ramp, a stone or other obstacle), the sliding member 262 receives less force than the elastic force of the first spring 264, the sliding member 262 will not move in the vertical direction, avoiding the sliding member 262 moving up due to slight bumps which cause the sensor 281 errors and thereby causes the mower to stop working, the working stability of the mower is improved consequently.

As illustrated in FIG. 98 and FIG. 99, the lifting detection device 267 of the mowing robot further includes a protective cover 272 covering the outer periphery of the shock absorber 261. In the illustrated embodiment, the protective cover 272 is a bellows. One end of the bellows 13 is connected to the shock absorber 261, and the other end is connected to the mounting plate 283 of the connecting plate 274. This arrangement prevents the shock absorber 261 from being contaminated and damaged, and the service life of the shock absorber 261 is prolonged. A material of the metal plate 278 is aluminum. The sensor 281 is a Hall sensor, an inductive sensor or a magnetic sensor.

Figure 101:
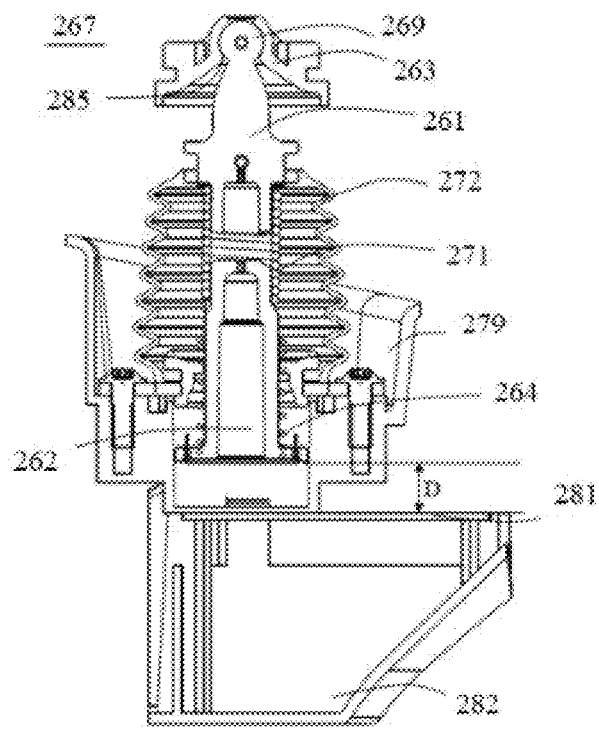

Referring to FIG. 101, the chassis 266 includes a lower base 282 and an upper base 279. The sensor 281 is disposed on the lower base 282 and is tightly attached to a bottom surface of the upper base 279. The connecting plate 274 is fixed on the upper base 279 by the fastening devices 273. The upper base 279 is further provided with a receiving cavity 280 for receiving and supporting the bottom of the sliding member 262. The metal plate 278 touches against the bottom surface of the receiving cavity 280.

Figure 100:
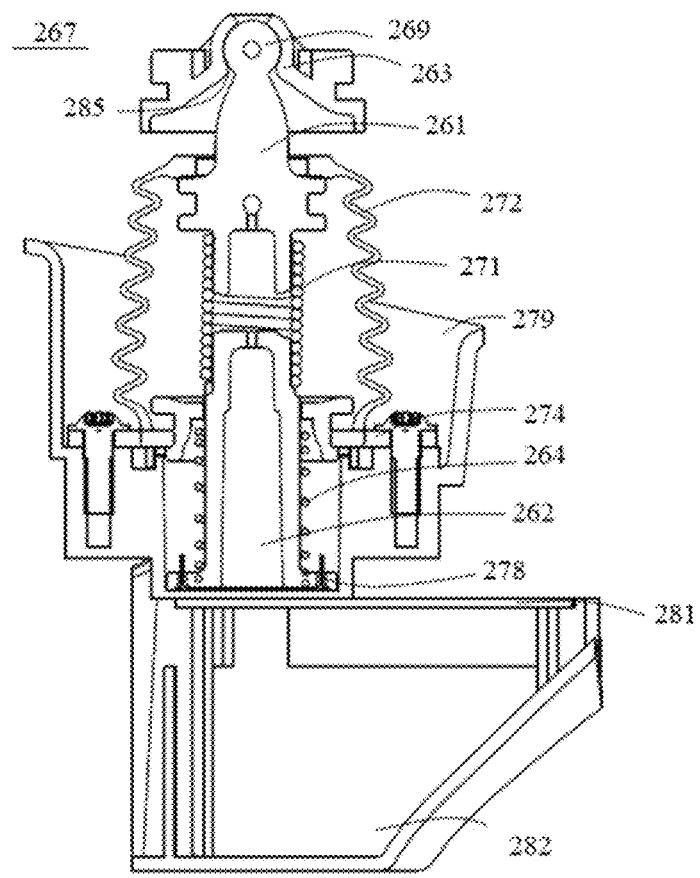
FIG. 100 and FIG. 101 are schematic cross-sectional structural views of the lifting detection device of the mowing robot of the disclosure in a normal working state and a lifting state respectively.

Referring to FIG. 100, a working process of the lifting detection device 267 of the mower will be described below: when the mower is in a normal working state, the first spring 264 is in a naturally extended state, and the metal plate 278 is positionally close to the sensor 281; when the mower is lifted, the main body 265 moves upwards, the shock absorber 261 and the sliding member 262 are driven to move upwards relative to the chassis 266, as shown in FIG. 101. In this case, the first spring 264 is in a compressed state, the metal plate 278 located at the bottom of the sliding member 262 moves upward, the sensor 281 detects the distance D between the metal plate 278 and the sensor 281; when the distance D reaches the preset value, the sensor 281 sends a trigger signal to the control device of the mower to control the blade(s) of the mower to stop rotating, so as to prevent the operator from being injured.

When the mower is only colliding with an obstacle instead of being lifted (for example, when hitting a tree), the shock absorber 261, the first spring 264 and the second spring 271 can play a role in damping vibration, so that the sliding member 262 will not move upwards. That is, the positions of the metal plate 278 and the sensor 281 are kept close to each other, which can prevent the sliding member 262 from moving up due to slight bumps which cause the sensor 281 error and thereby cause the mower to stop working, the working stability of the mower is improved consequently.

Therefore, as to the lifting detection device 267 of the disclosure, the sensor 281 is installed in the chassis 266, and the sensor 281 detects the distance between the metal plate 278 provided on the sliding member 262 and the chassis 266 to determine the distance between the main body 265 of the mowing robot and the chassis 266. The lifting detection device 267 of the mowing robot has a simple structure and saves space. There is no need to form a hole on the chassis 266 for the wire connecting the lifting detection device and the chassis to pass through, and thus the waterproof performance is good. The shock absorber 261 can reduce the occurrence of the situation that the mower is mistakenly to stop working resulting from the displacement in the vertical direction caused by the collision of objects, the stability of the mowing robot is improved consequently.

Figure 102:
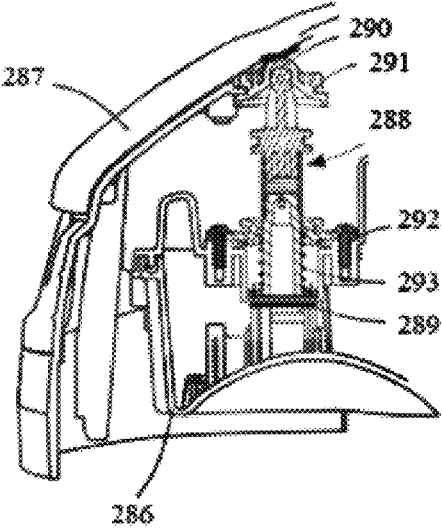
FIG. 102 is a schematic cross-sectional view of a part of the structure of the mower of the disclosure.

Referring to FIG. 102, in the disclosure, a mower is provided. The mower can be an intelligent/robotic/smart lawn mower and can automatically work on a grassland. The mower can include a body 286, a casing 287, and a suspension device 288. The casing 287 is disposed covering the body 286. The suspension device 288 is movably connected with the body 286 and the casing 287.

As illustrated in FIG. 102, the body 286 is provided with a walking wheel(s) (not shown), a driving motor (not shown), a cutting assembly/tool (not shown), a control assembly (not shown), and a battery pack. The walking wheel(s) is/are used for driving the mower to travel. The driving motor (not shown) is used for driving the walking wheel to travel. The cutting assembly/tool is used for mowing. The control assembly is used for controlling operations of the driving motor and the cutting assembly. The battery pack is used for providing power to the mower.

As shown in FIG. 102, the casing 287 covers the outside of the body 286, which can protect the body 286 as well as the operator. For example, it can play the role of dustproof and waterproof to protect the structures such as the driving motor, the cutting assembly, the control assembly and the battery pack, the service life of each of the structures is prolonged. Meanwhile, it can also prevent the operator from accidents when using the mower, the safety factor of the mower is improved consequently.

Figure 103:
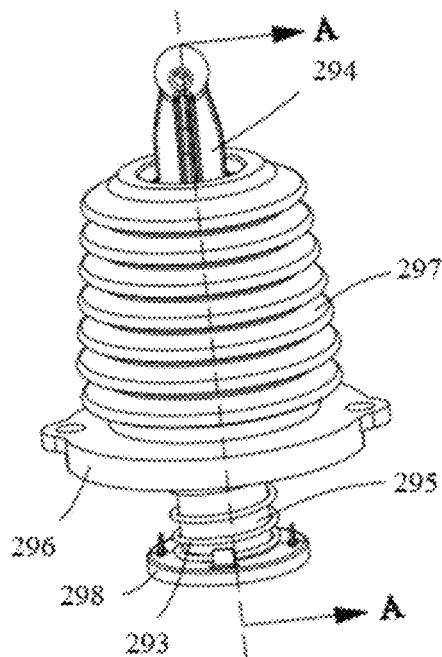
FIG. 103 is a schematic perspective view of a suspension device in FIG. 102.
Figure 104:
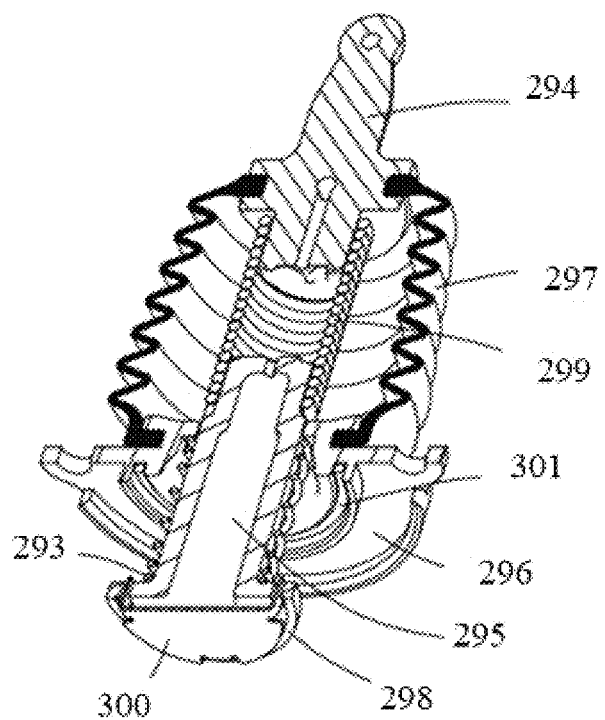
FIG. 104 is a schematic cross-sectional view of the suspension device shown in FIG. 103 in the A-A direction.
Figure 105:
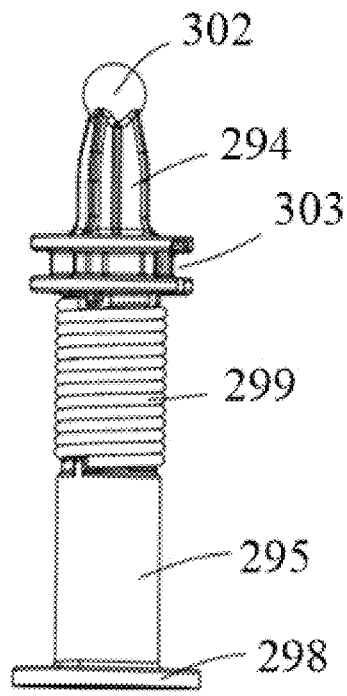
FIG. 105 is a schematic perspective view of a part of the structure of the suspension device shown in FIG. 103.

Referring to FIG. 102 through FIG. 104, the suspension device 288 includes a first support column 294, a second support column 295, and a flexible connecting member 299. The first support column 294 is connected to the casing 287. The second support column 295 is connected to the body 286. The flexible connecting member 299 connects the first support column 294 and the second support column 295. Specifically, one end of the flexible connecting member 299 is connected to the first support column 294, and the other end is connected to the second support column 295, so that the casing 287 can move relative to the body 286 in a direction perpendicular to the body 286 and/or in a horizontal direction.

As illustrated in FIG. 102 through FIG. 104, in the direction perpendicular to the body 286, the first support column 294 is opposite to the second support column 295, and the first support column 294 is located above the second support column 295. It can be defined as that: the horizontal direction may be a direction parallel to the ground, and the direction perpendicular to the body 286, which is a direction perpendicular to the ground, may be deemed the vertical direction.

Referring to FIG. 102 and FIG. 105 through FIG. 107, the first support column 294 is provided with a connecting portion 302, the casing 287 is correspondingly provided with a receiving portion 90, and the connecting portion 302 is received in the receiving portion 90. Specifically, in the illustrated embodiment, the first support column 294 is roughly a columnar structure, and the connecting portion 302 is provided on the top of the first support column 294 and has a spherical structure. The casing 287 is correspondingly provided with a rubber cap 291, the rubber cap 291 is fixedly connected to the casing 287, the receiving portion 90 is a spherical receiving cavity formed in the rubber cap 291, and the spherical connecting portion 302 is received in the spherical receiving cavity so as to achieve a fixed connection between the first support column 294 and the casing 287, so that when the casing 287 is moved by an external force, the first support column 294 will be driven to move correspondingly. In other embodiments, the first support post 294 and the housing 287 can be connected by other structures, as long as the first support column 294 and the casing 287 can be fixedly connected, which is not limited herein.

Figure 106:
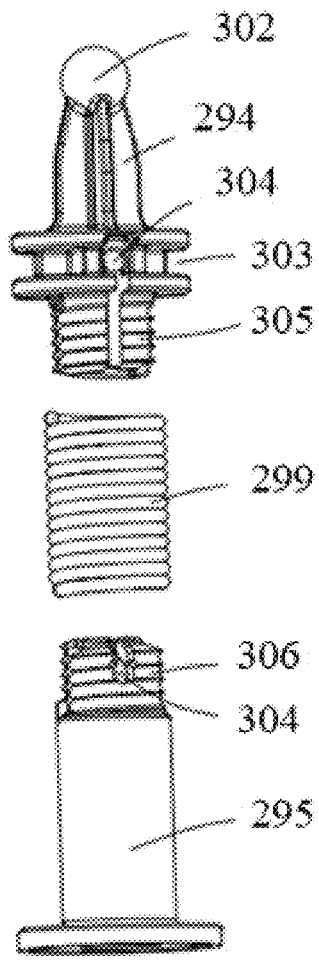
FIG. 106 is a schematic exploded view of FIG. 105.

As illustrated in FIG. 106, the first support column 294 is further provided with a groove 303 surrounding an axial direction thereof, and the groove 303 is approximately located at a middle position of the first support column 294.

As shown in FIG. 106, The flexible connecting member 299 includes a spring. One end of the first support column 294 is provided with a first thread 305 matching the spring, and one end of the second support column 295 is provided with a second thread 306 matching the spring. One end of the spring is threadedly connected with the first support column 294, and the other end is threadedly connected with the second support column 295. Specifically, in the vertical direction, the first thread 305 is provided on the bottom of the first support column 294, and the second thread 306 is provided on the top of the second support column 295.

Figure 107:
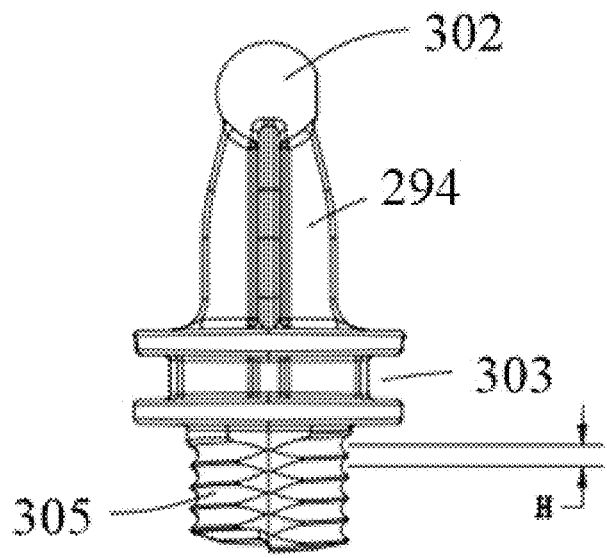
FIG. 107 is a schematic perspective view of a first support column in FIG. 106.

As illustrated in FIG. 107, a pitch H of the first thread 305 gradually increases from bottom to top, in this way, when the spring is screwed onto the first support column 294, the spring will gradually tighten, resulting in a pressure between the spring and the first support is increased, thereby increasing the friction between the spring and the first support column 294 and making it difficult for the spring to escape. Similarly, a pitch of the second thread 306 is correspondingly set to gradually increase from top to bottom.

As illustrated in FIG. 106, the flexible connecting member 299 further includes a rope (not shown). Both ends of the rope are provided with spherical fixing members. The first support column 294 and the second support column 295 are respectively provided with spherical grooves 304 for correspondingly accommodating the spherical fixing members. As shown in FIG. 106, the spherical groove 304 on the first support column 294 is recessed inwardly from an inner side wall of the groove 303, the spherical groove 304 on the second support column 295 is recessed on the second thread 306 and close to the top of the second support column 295.

As shown in FIG. 106, the flexible connecting member 299 can include the spring and the rope, and a length of the rope is greater than a length of the spring. This arrangement can ensure that the mower stops working when the mower is lifted in case of the spring is failed. In some embodiments, the flexible connecting member 299 may have other structures, as long as it can achieve the effect of stopping the mower when it is lifted, and thus it is not limited herein.

Referring to FIG. 102 through FIG. 104, and FIG. 108 through FIG. 111, the suspension device 288 further includes a fixing frame 296 fixedly connected to the body 286. The fixing frame 296 is provided with a through hole 311, and in the vertical direction, the top of the second support column 295 penetrates the fixing frame 296 via the through hole 311. Specifically, in the disclosure, the fixing frame 296 has a cylindrical structure, and the through hole 311 is formed at the center of the fixing frame 296.

Figure 108:
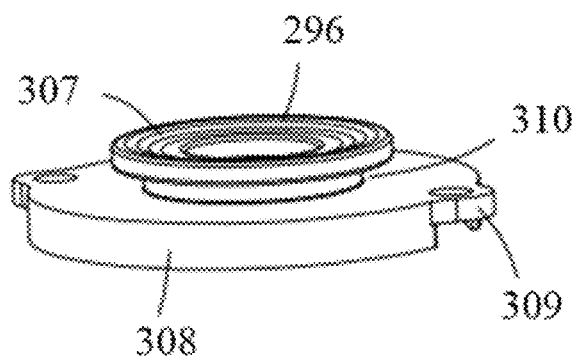
FIG. 108 is a schematic perspective view of a fixing frame in the suspension device shown in FIG. 103.

As illustrated in FIG. 108, the fixing frame 296 includes a first fixing portion 307 and a second fixing portion 308. A diameter of the first fixing portion 307 is smaller than a diameter of the second fixing portion 308. The through hole 311 penetrates through the first fixing portion 307 and the second fixing portion 308 in the vertical direction. The through hole 311 includes a first through hole 315 formed on the first fixing portion 307 and a second through hole 313 formed on the second fixing portion 308, and a diameter of the first through hole 315 is smaller than a diameter of the second through hole 313.

As shown in FIG. 108, the top of the first fixing portion 307 is slightly recessed downwardly so as to accommodate one end of the spring 299 and to positionally limit one end of the spring 299. An annular groove 314 is recessed at the bottom of the second fixing portion 308. The annular groove 314 is located at the periphery of the second through hole 313 and used for accommodating a sealing ring 301. The sealing ring 301 (also referred to as gasket) is used to strengthen waterproof performance of the body 286.

As illustrated in FIG. 108, the fixing frame 296 is fixed on the body 286, an annular protrusion (not labelled) protrudes from a position of the body 286 corresponding to the annular groove 314, so that the annular protrusion, the annular groove 314 and the sealing ring 301 are mutually cooperated, which not only enables the fixing frame 296 to be closely integrated with the body 286, but also has good waterproof performance.

Figure 109:
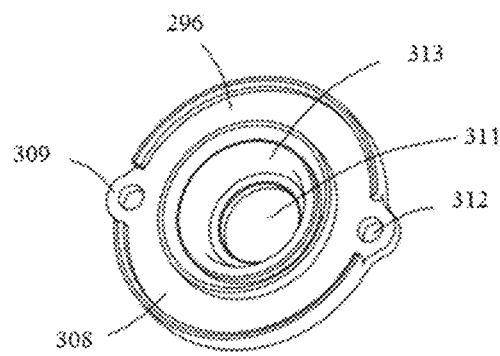
FIG. 109 and FIG. 110 are schematic views of the fixing frame shown in FIG. 108.
Figure 110:
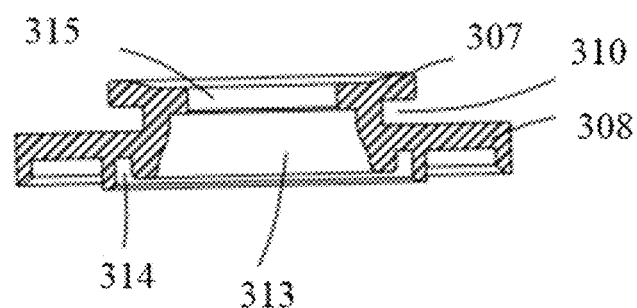
Figure 111:
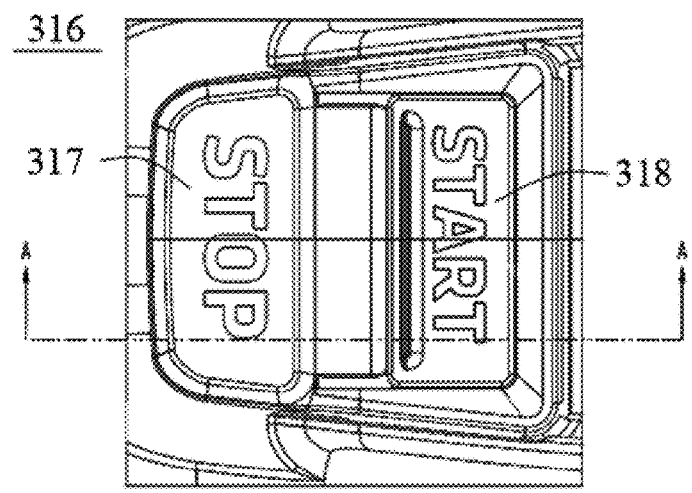
FIG. 111 is a schematic structural view of a switch of the disclosure in a closed state (on-state).

As illustrated in FIG. 109, the fixing frame 296 is installed and fixed on the fuselage 286 by screws 292. The second fixing portion 308 is provided with two lugs 309, and each lug 309 is provided with an opening 312. The two lugs 309 are arranged opposite to each other. The screws 292 pass through the openings 312 to fix the fixing frame 296 on the body 286. In other embodiments, the fixing frame 296 can be installed and fixed on the body 286 in other ways, such as snap-fit, hard interference, etc., without limiting herein.

Referring to FIG. 102 through FIG. 104 again, in the vertical direction, the bottom of the second support column 295 is provided with a fixing head 298, and a metal sheet 300 is installed on the fixing head 298. A displacement sensor 289 is provided in the body 286. The displacement sensor 289 is located under the metal sheet 300 and used to detect a displacement of the second support column 295. The suspension device 288 further includes a compression spring 293 arranged between the fixing frame 296 and the fixing head 298. One end of the compression spring 293 is received in the second through hole 313 and touches against an inner wall surface of the second fixing portion 308, and the other end touches against an upper surface of the fixing head 298.

As illustrated in FIG. 102 through FIG. 104, when the mower is lifted for some reasons, the casing 287 will drive the first support column 294, the flexible connecting member 299 and the second support column 295 to move upwards, and in this case, the compression spring 293 is compressed. If the displacement sensor 289 detects the second support column 295 is displaced and the displacement as detected exceeds a preset value, an induction signal is sent to the control assembly, and the control assembly then sends a control signal to the cutting assembly to make the mower stop working. When the external force disappears, a restoring force of the compression spring 293 will prompt the second support column 295, the flexible connecting member 299 and the first support column 294 to return to the initial position, and in this case, the mower can continue to work.

As shown in FIG. 102 through FIG. 104, the suspension device 288 further includes a dust-proof rubber sleeve 297 covering the first support column 294, the flexible connecting member 299 and the second support column 295. An open end at one side of the dustproof rubber sleeve 297 is positionally limited and received in the groove 303, and another open end at the other side is positionally limited and received in the fixing frame 296. Specifically, a limiting space 310 is provided between the first fixing portion 307 and the second fixing portion 308 of the fixing frame 296. The dust-proof rubber sleeve 297 is substantially in a cylindrical shape, and in the vertical direction, the top open end of the dust-proof rubber sleeve 297 is positionally limited and received in the groove 303, and the bottom open end is positionally limited and received in the limiting space 310, thereby protecting the flexible connecting member 299, a connecting position of the flexible connecting member 299 and the first support column 294, and a connecting position of the flexible connecting member 299 and the second support column 295.

Referring to FIG. 102 through FIG. 104 again, four suspension devices 288 can be arranged at the four corners of the body 286, respectively. In other embodiments, the number and positions of the suspension devices 288 can be changed, without limiting herein.

As illustrated in FIG. 102, when the mower of the disclosure works normally, the casing 287 cannot move disorderly. When the mower hits an obstacle during operation, the casing 287 will stop while the body 286 will continue to move forward, causing a relative displacement between the body 286 and the casing 287. In this case, the collision sensor on the body 286 (not shown) sends a collision signal to the control assembly, and the control assembly then controls the mower to retreat. In the event of a collision, since the rubber cap 291 is fixed on the casing 287, the rubber cap 291 will drive the first support column 294 to deflect. Moreover, since the second support column 295 is housed in a cylindrical hole of the body 286, a horizontal degree of freedom is small, and therefore the rubber cap 291 will drive the spring 299 to deflect at the same time.

As illustrated in FIG. 102, after the mower collides, the spring 299 will not directly return to its original state, but will continue to vibrate/shake. In this case, both the spring 299 and the rubber cap 291 will be deformed. Because the rubber cap 291 has a damping effect and can absorb vibration energy, and therefore the rubber cap 291 can be used to absorb part of the vibration energy to prevent the body 286 from cracking, thereby greatly extending the service life of the mower and reducing the use cost.

Accordingly, in the mower of the disclosure, the suspension device 288 is configured to include the first support column 294, the second support column 295 and the flexible connecting member 299 connecting the first support column 294 and the second support column 295. The first support column 294 is connected to the casing 287, and the second support column 295 is connected to the body 286. The casing 287 cannot move disorderly during normal operation, and the casing 287 can flexibly move relative to the body 286 in the direction perpendicular to the body 286 and/or in the horizontal direction when it touches an obstacle.

Referring to FIG. 111 through FIG. 114, according to an embodiment of the disclosure, a switch 316 includes a casing 1 and a pressing device disposed above the casing 1.

A magnet 319 is provided on the pressing device, and a reed switch 320 that senses a magnetic field of the magnet 319 is provided in the casing 1. The switch 316 is further provided with a fixing portion 322 fixed on the upper side of the casing 1. The pressing device is pivotally connected to the top of the fixing portion 322 via a pivot shaft 321 and can rotate above the casing 1 with the pivot shaft 321 as a center. The fixing portion 322 connects the casing 1 and the pressing device, and the fixing portion 322 may be separately provided and fixed to the casing 1, or it may be integrally formed with the casing 1. Positions of the reed switch 320 and the magnet 319 correspond to each other. A direction in which the magnet 319 and the reed switch 320 are oppositely arranged is defined as a first direction, when the pressing device is moved/triggered, a distance between the magnet 319 and the reed switch 320 in the first direction can be changed so as to switch on/off the reed switch 320.

Figure 112:
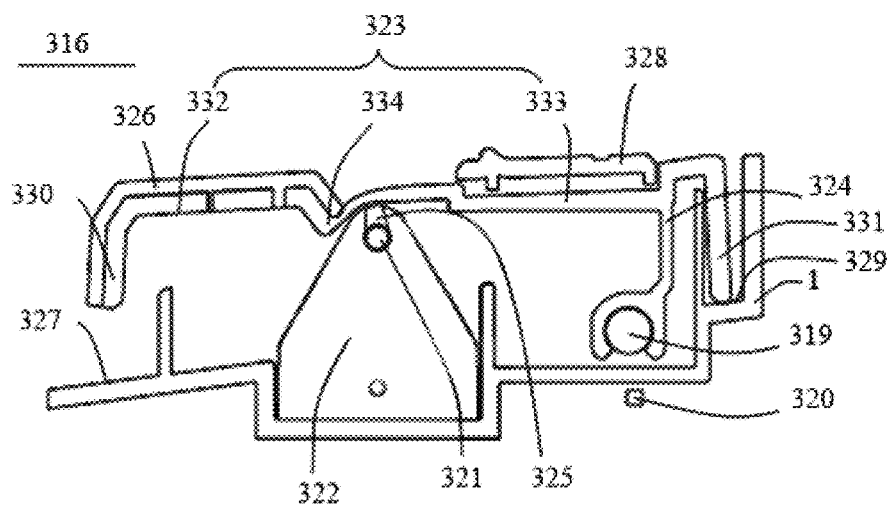
FIG. 112 is a schematic cross-sectional structural view of the switch of the disclosure taken along the line A-A in FIG. 111.
Figure 113:
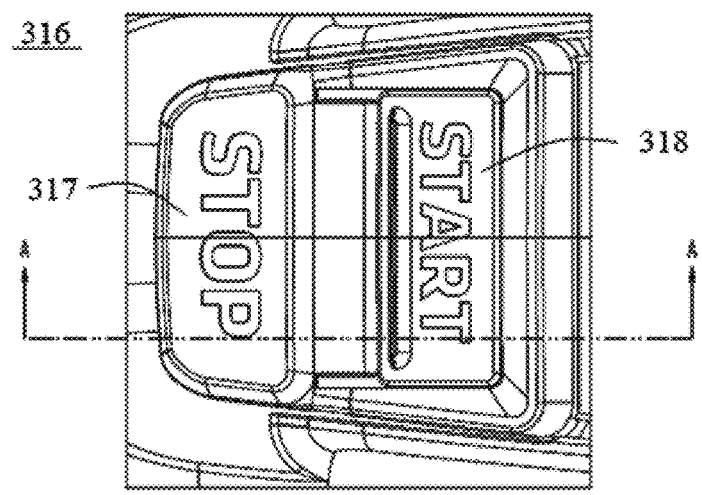
FIG. 113 is a schematic structural view of the switch in an open state (off-state) of the disclosure.
Figure 114:
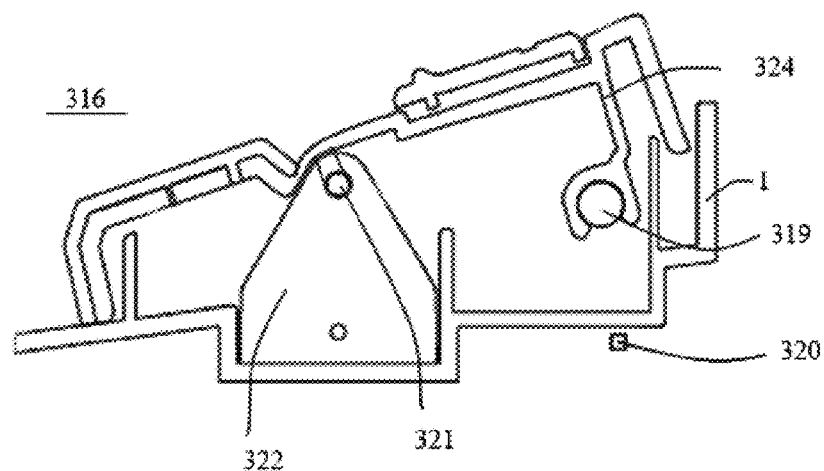
FIG. 114 is a schematic cross-sectional structural view of the switch of the disclosure taken along the line A-A in FIG. 113.

Referring to FIG. 112, in combination with the illustration of FIG. 114, the pressing device includes a main body portion 323. The main body portion 323 is substantially in the shape of a horizontal plate. A middle portion of the main body portion 323 is extended to form a connecting portion 325. The connecting portion 325 is connected with a pivot shaft 321 and used for rotatably fixing the pressing device to the fixing portion 322. The pressing device further includes a protruding portion 324 protruding from the main body portion 323 toward the reed switch 320. One end of the protruding portion 324 close to the reed switch 320 has a receiving groove (not labelled). The receiving groove has an opening toward the reed switch 320 and is used for receiving the magnet 319. The receiving groove fixes the magnet 319 and allows a side of the magnet 319 facing toward the reed switch 320 to be exposed.

As illustrated in FIG. 112, the main body portion 323 includes a first pressing part 332 and a second pressing part 333. For the convenience of description, taking FIG. 112 as the viewing angle, two sides of the connecting portion 325 are defined as right side and left side respectively. The magnet 319 and the reed switch 320 are located on the right side, the first pressing part 332 is located on the left side, and the second pressing part 333 is located on the right side. The protruding portion 324 protrudes from an end of the second pressing part 333 toward the reed switch 320.

The first pressing part 332 is located away from the magnet 319, and by pressing the second pressing part 333, which would cause the main body portion 323 to rotate clockwise around the pivot shaft 321 and thereby reduce a distance between the magnet 319 and the reed switch 320, the reed switch 320 senses a magnetic field of the magnet 319, two pieces of magnetic reeds of the reed switch 320 are contacted with each other, and the reed switch 320 is in a switched-on state. By pressing the first pressing part 332, which would cause the main body portion 323 to rotate counterclockwise around the pivot shaft 321 and thereby increase the distance between the magnet 319 and the reed switch 320, the reed switch 320 cannot sense the magnetic field of the magnet 319, the two pieces of magnetic reeds of the reed switch 320 will return to an original non-contact state, and the reed switch 320 is switched off.

Referring to FIG. 112, the pressing device further includes a first abutting part 330 extending downwards from an end of the first pressing part 332 and a second abutting part 331 extending downwards from an end of the second pressing part 333. The casing 1 is provided with a first mating surface 327 for being touched against the first abutting part 330 and a second mating surface 329 for being touched against the second abutting part 331. The first mating surface 327 and the second mating surface 329 are used to limit rotation ranges of the first pressing part 332 and the second abutting part 331.

As shown in FIG. 112, the pressing device further includes an abutting part 334 protruding downwards from a portion of the first pressing part 332 near the connecting portion 325. In particular, the abutting part 334 protrudes downwards from the bottom side of the main body portion 323. The abutting part 334 has an arc-shaped abutting surface, and the fixing portion 322 also has an arc-shaped contact surface, so as to facilitate the abutting part 334 and the fixing portion 322 to touch against each other and thereby limit a rotation range of the pressing device.

As illustrated in FIG. 112, the pressing device further includes a first switch cap 326 and a second switch cap 328 respectively provided on upper surfaces of the first pressing part 332 and the second pressing part 333. In the illustrated embodiment, the first switch cap 326 and the main body portion 323 are detachably connected, and the second switch cap 328 and the main body portion 323 also are detachably connected. In other embodiments, the first switch cap 326, the second switch cap 328, and the main body 323 may be integrally formed to form a one-piece structure.

As shown in FIG. 112, the switch 316 is installed on the lawn mower. The lawn mower has a start-stop switch and a main switch. The start-stop switch is the switch 316, or the main switch is the switch 316, or both the start-stop switch and the main switch are switches 316. In the illustrated embodiment, the lawn mower is a robotic lawn mower.

As illustrated in FIG. 114, a working process of the switch 316 will be described below. When the first switch cap 326 is pressed, the main body portion 323 rotates counterclockwise around the pivot shaft 321, the magnet 319 is moved far away from the reed switch 320, the reed switch 320 cannot senses the magnetic field of the magnet 319, the two pieces of magnetic reeds of the reed switch 320 return to the original non-contact state, the reed switch 320 is at the switched-off state, the switch 316 is turned off, and the lawn mower stops working. Whereas, when pressing the second switch cap 328, the main body portion 323 rotates clockwise around the pivot shaft 321, the magnet 319 moves toward the reed switch 320, the reed switch 320 can sense the magnetic field of the magnet 319, the two pieces of magnetic reeds of the reed switch 320 are contacted with each other, the reed switch 320 is at a switched-on state, the switch 316 is turned on, and the lawn mower works.

As shown in FIG. 114, it only takes the robotic lawn mower as an example. The switch 316 can be installed as an independent component on other garden tools or other control objects, especially as a control switch for products that require waterproofing. The solutions that are the same as or similar to the illustrated embodiment are all covered by the protection scope of the disclosure.

Therefore, regarding the switch 316 of the disclosure, the reed switch 320 is arranged inside the casing 1, and the magnet 319 is arranged outside the casing 1, so that the distance between the magnet 319 and the reed switch 320 can be controlled to control on-off states of the reed switch 320, thereby controlling the turned-on and turned-off states of the switch 316. In this arrangement, there is no need to require an opening on the casing 1, and the risk of water ingress to the switch can reduced, so that the service life of the switch is prolonged. In addition, the reed switch 320 is controlled by a magnetic field and does not require an external power supply, which saves electrical energy. The lawn mower with the switch 316 has a stable working state and a long battery life.

Figure 115:
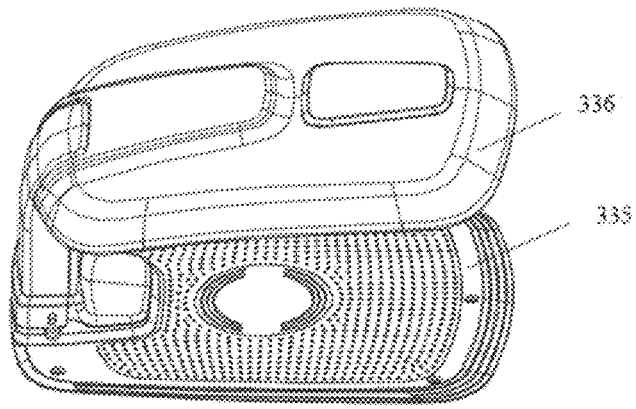
FIG. 115 through FIG. 117 are schematic perspective views of a charging station system according to an embodiment of the disclosure.
Figure 116:
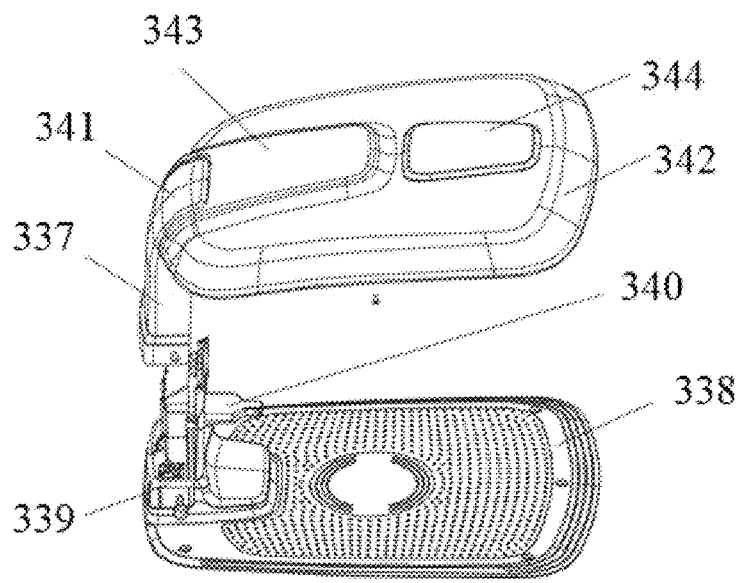

Referring to FIG. 115 and FIG. 116, a charging station system includes a charging station 335 and a ceiling 336. The charging station 335 includes a bottom plate 338 laid on the ground and a docking pile 339 on a side of the bottom plate 338. The docking pile 339 is provided with a protruding charging seat 340. The charging seat 340 is matched with the smart lawn mower and used for charging the battery pack in the smart lawn mower. The ceiling 336 includes a connecting base 337 detachably assembled on the docking pile 339 of the charging station 335 and a cover 342 pivotally connected to the connecting base 337. A projection of the ceiling 336 on the ground roughly covers the bottom plate 338, which effectively shields and protects the smart lawn mower, including sun shading, rain sheltering, and avoiding external collisions. The ceiling 336 of the charging station system of the disclosure is detachably fixed, and when repairs are needed, the ceiling 336 can be removed first and then repair is made, which makes the operation more convenient.

Figure 117:
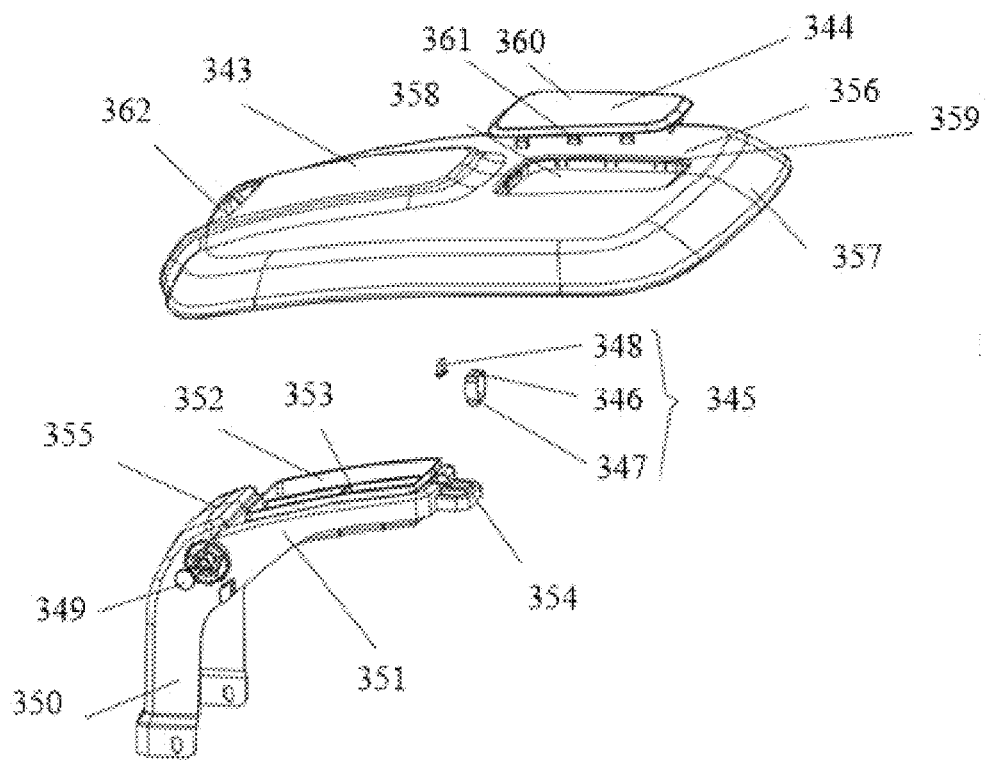
Figure 118:
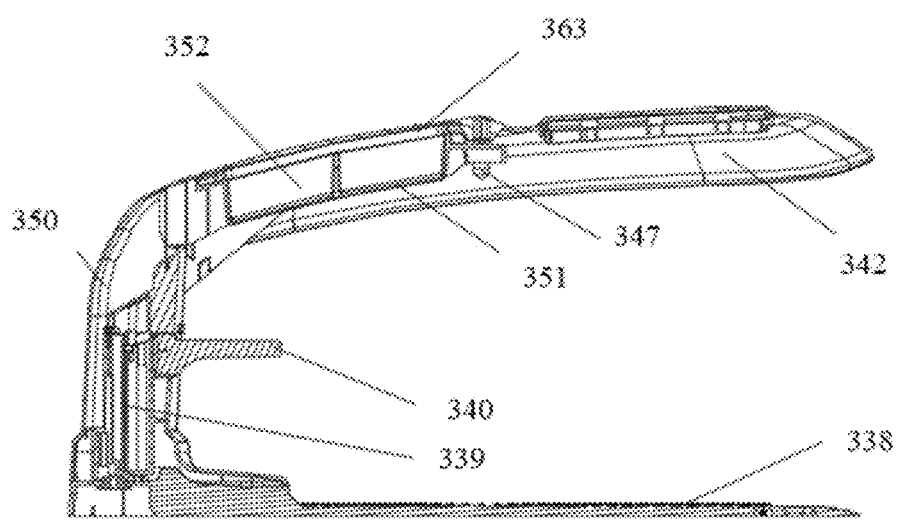
FIG. 118 is a schematic cross-sectional view of the charging station system of the disclosure along the direction A-A in FIG. 115.

In combination with the illustration of FIG. 117 and FIG. 118, the connecting base 337 includes a connecting portion 350 snapped on the periphery of the docking pile 339 of the charging station 335 and a supporting portion 351 extending laterally from the connecting portion 350. The supporting portion 351 extends laterally from the top end of the connecting portion 350 toward the bottom plate 338 and is used to stably support the cover 342 assembled on the connecting base 337. A cross section of the connecting portion 350 is roughly U-shaped and is arranged around the rear surface and opposite side surfaces of the docking pile 339.

Moreover, the connecting portion 350 covers the top of the docking pile 339. The bottom of the connecting portion 350 is detachably mounted to the side surfaces of the docking pile 339 by screws (not shown). The supporting portion 351 is provided with a storage space 352 with an opening upward, which is used for accommodating maintenance tools such as handles, screwdrivers, or screws for repairing the ceiling 336 or the charging station 335. The connecting base 337 further has multiple protruding ribs 353 arranged in the storage space 352. The protruding ribs 353 divide the storage space 352 into multiple areas, so that users can place tools of different types or sizes in different areas.

As shown in FIG. 116, the cover 342 is arranged roughly in the shape of a lid, which includes a top wall 356 and a side wall 357 extending downwards from the circumference of the top wall 356. The cover 342 can be used for shading sun and sheltering rain when the smart lawn mower is parked at the charging station 335 for charging. The cover 342 also has a protruding portion 343 bulging upwards and a groove 363 corresponding to the protruding portion 343. The protruding portion 343 is formed by a portion of the top wall 356 of the cover 342 corresponding to the storage space 352 of the connecting base 337 bulging upwards. The groove 363 is correspondingly disposed below the protruding portion 343 and directly above the storage space 352 of the connecting base 337. The protruding portion 343 can reinforce the strength of the cover 342, and the groove 363 can increase the volume of the storage space 352.

As shown in FIG. 116, the cover 342 further has a transparent observation window 344 buckled on the top wall 356. The observation window 344 is set at a position of the top wall 356 in front of the protruding portion 343 to allow the user to observe a charging state of the smart lawn mower at the charging station 335. The observation window 344 has a lid-shaped main body 360 and a snapping portion 441 extending downwardly from the periphery of the main body 360. The top wall 356 of the cover 342 has a through hole 358 at a position corresponding to the observation window 344. A side wall of the through hole 358 is provided with a fitting groove 401 that cooperates with the snapping portion 441 of the observation window 344. In the illustrated embodiment, the observation window 344 is made of a transparent material and is fitted into the through hole 358 of the cover 342. The observation window 344 is substantially rectangular and located at the front of the protruding portion 343, and further arranged staggered from the supporting portion 351. A size of the observation window 344 should be larger than a display area on the smart lawn mower to facilitate observation.

Referring to FIG. 117 and FIG. 118, the cover 342 is pivotally assembled on the supporting portion 351, and can be opened or closed relative to the connecting base 337. In order to prevent the user from accidentally opening the cover 342, the ceiling 336 further includes a resilient buckle 345 for movably buckling the cover 342 onto the connecting base 337. The buckle 345 can be fixed to one of the connecting base 337 and the cover 342, and can be connected with the other resilient buckle. The setting of the buckle 345 requires the user to apply a certain external force to open the cover 342, which can prevent the cover 342 from being blown over when the wind is strong, and can also improve the user's operating feel. The buckle feeling can help the operator to determine whether the cover 342 is in place or not.

As shown in FIG. 117, the buckle 345 is an inverted U-shaped metal resilient piece, which includes a fixing piece 346 fixed to the cover 342 by a screw 348 and two buckle arms extending downwards from opposite ends of the fixing piece 346 respectively 347. The fixing piece 346 is fixed to a screw post 367 on the bottom surface of the cover 342 by the screw 348. The fixing piece 346 is assembled on the bottom of the protruding portion 343 of the cover 342. The fixing piece 346 is located at an end of the protruding portion 343 of the cover 342 close to the observation window 344. The supporting portion 351 of the connecting base 337 is provided with a buckling portion 354 protruding forward at an end away from the connecting portion 350. The buckling portion 354 can be matched with the buckling arms 347 of the buckle 345, to buckle the cover on the connecting base 337.

Figure 119:
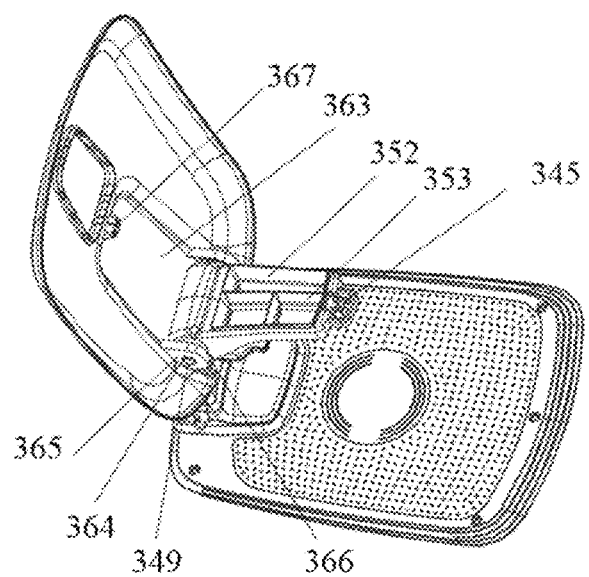
FIG. 119 is another schematic perspective view of the charging station system shown in FIG. 115 in an assembled state, and the ceiling being in an open state.

When the cover 342 is laid on the supporting portion 351, the buckling portion 354 of the supporting portion 351 of the connecting base 337 is accommodated in a space formed by the buckling arms 347 of the buckle 345. When the user needs to open the storage space 352, he/she needs to overcome a buckling force of the buckle 345, and then lift the cover 342 upwards. Referring to FIG. 119, which shows a state in which the cover 342 is opened, the buckle 345 is retained on the buckling portion 354, and the matching manner of the buckle 345 and the buckling portion 354 is clearly illustrated.

Referring to FIG. 115 through FIG. 117, an engagement between the cover 342 and the connecting base 337 will be described below. A rear edge of the cover 342 is provided with a notch 362 and two pivot ports 365 located on opposite sides of the notch 362. The pivot portions 365 protrude downwards from the cover 342 and are provided with pivot holes 364. Two pivot shafts 349 are respectively fixed to two sides of the connecting base 337 after passing through the two pivot holes 364, so as to pivotally connect the cover 342 to the connecting base 337.

As shown in FIG. 119, the pivot 349 is similar to the structure of a tack, and an end thereof is provided with an elastic buckle structure. The elastic buckle structure is inserted into a corresponding hole (not labeled) of the connecting base 337 and then buckles with an edge of the hole. The two sides of the connecting base 337 are further provided with stoppers 366 for the opened cover 342 to bear against, which can limit an opened angle of the cover 342, and prevent the cover 342 from overturning and causing inconvenience in use.

Referring to FIG. 115 through FIG. 117, the notch 362 of the cover 342 is located in an area of the aforementioned protruding portion 343, and the top of the connecting base 337 is further provided with a convex portion 355. After the connecting base 337 and the cover 342 are assembled together, the convex portion 355 is inserted into the notch 362, a top surface of the convex portion 355 and a top surface of the protruding portion 343 are coplanar, which can improve the overall appearance of the ceiling 336 and enhance the beauty of product.

As illustrated in FIG. 115 through FIG. 117, when assembling, the buckle 345 is firstly fixed to the cover 342, and then the cover 342 is pivotally connected to the connecting base 337 to form the ceiling 336. The buckle 345 is fastened/buckled to the buckling portion 354 of the connecting base 337 to keep the cover 342 in a closed state, and then the assembled ceiling 336 is fixed to the charging station 335. As a result, the installation of the charging station system with the ceiling 336 is completed.

As shown in FIG. 115 through FIG. 117, the ceiling 336 of the disclosure can be sold separately as a spare part, and can be installed on an existing charging station after the user purchases it. If the existing charging station has been installed with a casing protecting the docking pile 339, the casing can be removed first, and then the connecting base 337 can be detachably installed on the docking pile 339, so that the ceiling 336 can be assembled to the charging station 335 to form a charging station system. The ceiling 336 of the disclosure is convenient to disassemble, easy to maintain, and can be adapted to existing charging stations, and thus has a wide range of applications and flexibility.

Figure 120:
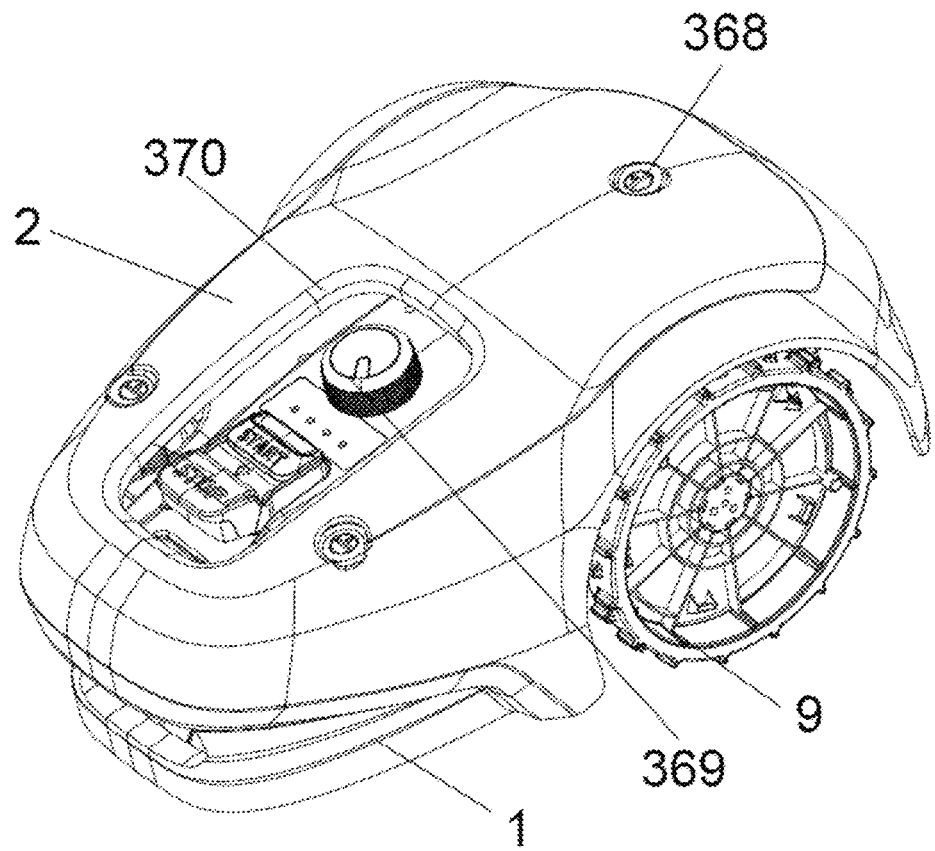
FIG. 120 and FIG. 121 are schematic perspective views of a smart lawn mower according to an embodiment of the disclosure.

As shown in FIG. 120, in the disclosure, an automatic working device is provided. The automatic working device may be a smart lawn mower, a vacuum cleaner, etc. In the illustrated embodiment, the smart lawn mower is taken as an example for description. Referring to FIG. 120, the smart lawn mower mainly includes a housing 1 and a movable upper cover 2. A walking wheel 9 is installed on the housing 1, a control circuit is installed inside the housing 1, and a manipulation area 369 is provided on the top of the housing 1. The movable upper cover 2 is installed above the casing 1. The movable upper cover 2 has an outer contour larger than that of the housing 1, and an opening 20 is provided to expose the manipulation area 369 and convenient for consumers to control the smart lawn mower.

A collision detector is provided between the movable upper cover 2 and the housing 1, such as a displacement sensor composed of a Hall sensor and a magnet. When a collision occurs to cause a relative displacement between the movable upper cover 2 and the housing 1, a change of relative position between the magnet and the Hall sensor brings about a change of magnetic field. The Hall sensor senses the change of magnetic field and outputs a signal to the control circuit, thereby controlling the smart lawn mower to change the walking direction and avoiding collisions.

In the disclosure, a connection device is also provided. In the illustrated embodiment, multiple manipulation areas 368 are movably connected between the movable upper cover 2 and the housing 1 of the smart lawn mower, so as to allow the movable upper cover 2 to be displaced relative to the housing 1. As an embodiment of the disclosure, there may be three manipulation areas 368, two of them are located at the rear of the smart lawn mower, and the other one is located at the front of the smart lawn mower. The manipulation areas 368 of the disclosure greatly facilitates the removal the upper cover and avoids the problem of the upper cover easily falling off.

Figure 121:
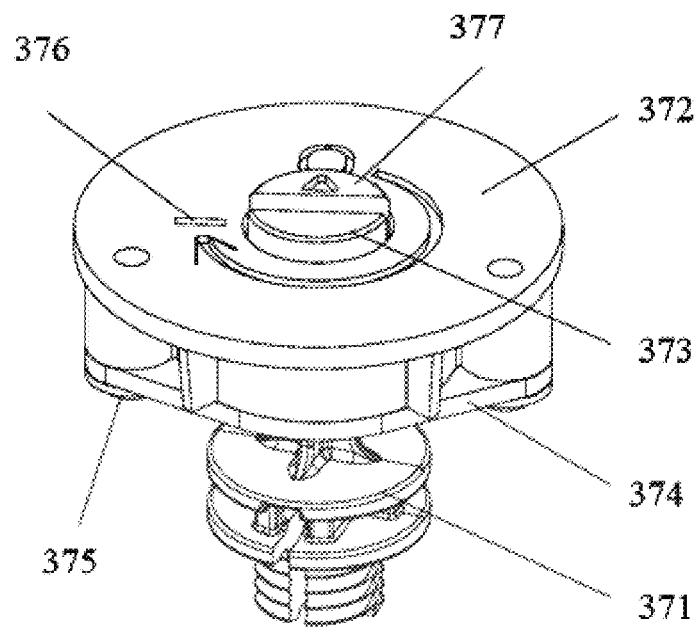

Referring to FIG. 121, the manipulation area 368 of the disclosure can include a connecting rod 371 and a connecting base. The connecting rod 371 is fixed on the housing 1, and the connecting base is fixed on the movable upper cover 2. The connecting rod 371 can include a connecting head 378. The connecting head 378 is movably arranged inside the connecting base so that the housing 1 and the movable upper cover 2 are movably connected. The connecting base can include a mounting base 372, a locking member 373, and a bottom plate 374. The bottom plate 374 is located on the bottom side of the mounting base 372, and the locking member 373 is located between the mounting base 372 and the bottom plate 374.

Figure 122:
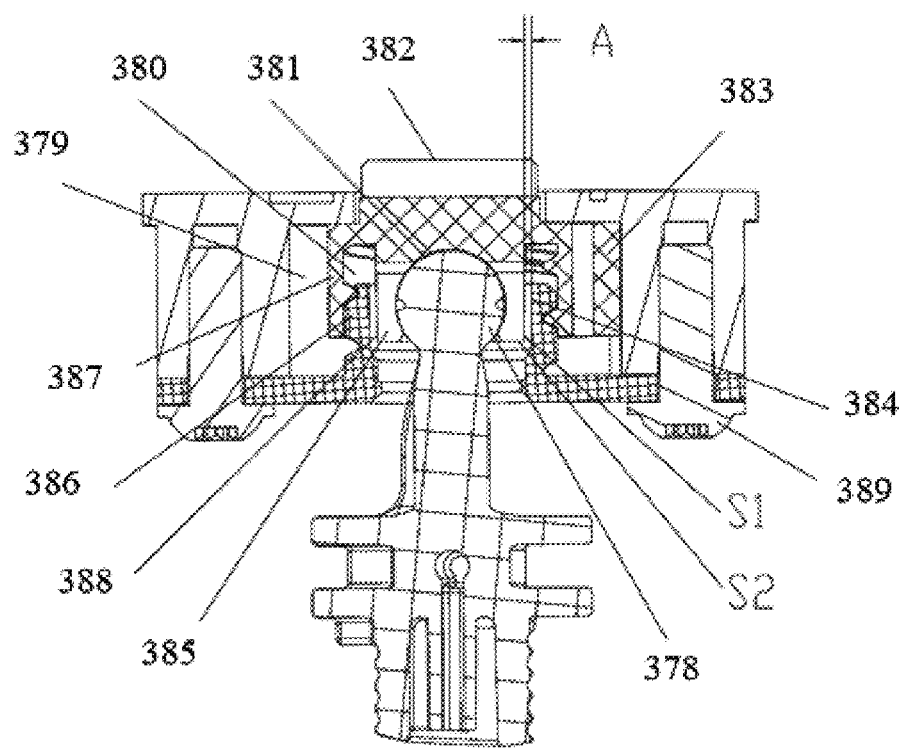
FIG. 122 and FIG. 123 are schematic cross-sectional views of a connection device in FIG. 121, and respectively showing a locking member being in a releasing position and in a locking position.
Figure 123:
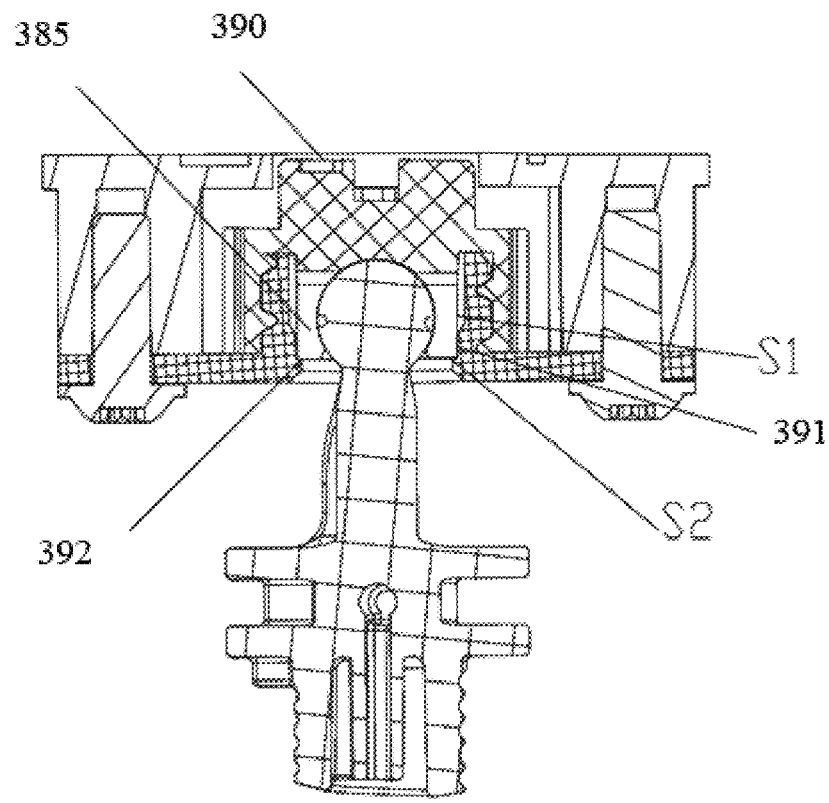

As illustrated in FIG. 122 and FIG. 123, the mounting base 372 is provided with a cavity 379, the locking member 373 is contained in the cavity 379 and the top thereof is exposed for operation by the operator. The locking member 373 is provided with an annular cavity 380, and an inner wall of the annular cavity 380 is provided with an internal thread 404. The locking member 373 is further provided with a recessed cavity 381 located in the annular cavity 380. The recessed cavity 381 is formed by multiple elastic connecting walls 385. Each of the elastic connecting walls 385 may have a certain elasticity and can be deformed appropriately to allow the connecting head 378 in the recessed cavity 381 to be detached from the recessed cavity 381. The connecting head 378 may be spherical, and the recessed cavity 381 may be a spherical recessed cavity.

As illustrated in FIG. 121 and FIG. 122, the bottom plate 374 is fixed on the mounting base 372 and the bottom plate 374 is provided with a protruding post 386. An outer side of the protruding post 386 is provided with an external thread 405, which can be threadedly connected with the internal thread 404 of the annular cavity 380. The protruding post 386 is a hollow structure, and the inner of the protruding post 386 has an adjustment cavity 388 that penetrates up and down. The locking member 373 and the bottom plate 374 are assembled from the bottom side of the mounting base 372. In particular, the locking member 373 and the bottom plate 374 may first be screwed together, and then assembled together on the mounting base 372.

After assembled, the annular cavity 380 of the locking member 373 is located in the cavity 379, the protruding post 386 of the bottom plate 374 extends into the annular cavity 380, the external thread 405 matches with the internal thread 404 of the annular cavity 380, and the recessed cavity 381 of the locking member 373 is located inside the adjustment cavity 388 of the protruding post 386. The connecting head 378 of the connecting rod 371 passes through the bottom plate 374 and is movably received in the recessed cavity 381.

As shown in FIG. 121 and FIG. 122, the bottom plate 374 is locked onto the bottom side of the mounting base 372 by screws 375, and its position remains unchanged relative to the mounting base 372. The threaded connection between the locking member 373 and the bottom plate 374 enables the locking member 373 to rotate and move up and down, which in turn drives the elastic connecting walls 385 to move up and down in the adjustment cavity 388. The adjustment cavity 388 may be substantially cylindrical with a stepped inner wall and a diameter of the adjustment cavity 388 near the bottom is smaller.

As shown in FIG. 122, when the elastic connecting walls 385 are located at a high place, there is a gap A between the inner wall surface of the adjustment cavity 388 and the outer side surface S1 of the elastic connecting walls 385. The gap A allows the elastic connecting walls 385 to deform outwards. In this case, the connecting head 378 may be detached from the recessed cavity 381 and separated from the movable upper cover 2, so that the movable upper cover 2 and the casing 1 can be separated. When the elastic connecting walls 385 are located at a low position, the inner wall surface of the adjustment cavity 388 restricts an outward deformation of the elastic connecting walls 385, thereby restricting the connecting head 378 in the cavity 381 and keeping the movable upper cover 2 connected to the housing 1.

Referring to FIG. 122 and FIG. 123, the above restriction can be that the inner wall surface of the adjustment cavity 388 touches against the elastic connecting walls 385, or the inner wall surface of the adjustment cavity 388 is very close to the elastic connecting walls 385. Although the elastic connecting walls 385 can be slightly expanded and deformed, the degree of deformation is insufficient to make the connecting head 378 being detached from the recessed cavity 381. It is defined that the locking member 373 has a releasing position and a locking position.

The locking member 373 can include a releasing position and a locking position. When the locking member 373 is located at the releasing position, the elastic connecting walls 385 can expand and deform outward, allowing the connecting head 378 to be detached from the recessed cavity 381, and the connecting base and the connecting rod 371 to be separated from each other. When the locking member 373 is in the locking position, the elastic connecting walls 385 are restricted by the inner wall surface of the adjustment cavity 388 and cannot expand outwards and deform enough, so that the connecting head 378 is restricted in the recessed cavity 381, and the connecting base and the connecting rod 371 are connected with each other. Therefore, the releasing position and the locking position of the locking member 373 can meet different usage requirements of the manipulation area 368.

As illustrated in FIG. 122, when the intelligent mower with the manipulation area 368 is in normal use, the locking member 373 is in the locking position. Since the connecting head 378 is restricted in the recessed cavity 381, even if the movable upper cover 2 is lifted during carrying of the intelligent mower, it will not cause a separation of the upper cover 2 from the housing 1. When an operator needs to remove the movable upper cover 2 for cleaning or maintenance, the locking member 373 can be rotated to the releasing position, and the movable upper cover 2 can be lifted up and easily removed. After the cleaning or maintenance, the operator can place the movable upper cover 2 on the housing 1, insert the connecting head 378 into the recessed cavity 381, then turn the locking member 373 from the releasing position to the locking position, and the intelligent mower can continue its normal work.

As shown in FIG. 121 and FIG. 122, the bottom plate 374 cannot move up and down, and the locking member 373 can move up and down when rotating. As a simple alternative, the locking member 373 can be set to not-able-to move up and down, the bottom plate 374 can be driven to move up and down when rotates the locking member 373, and other structures can remain unchanged. When the locking member 373 is in the releasing position, the bottom plate 374 is at a high position, and the connecting head 378 can escape from the recessed cavity 381. When the locking member 373 is in the locking position, the bottom plate 374 is at a low position, and the connecting head 378 is confined in the recessed cavity 381.

As illustrated in FIG. 121 and FIG. 122, when the locking member 373 is in the releasing position, the existence of the gap A between the inner wall surface of the adjustment cavity 388 and the outer side surface S1 of the elastic connecting walls 385 enables the elastic connecting walls 385 to expand outwards. As a simple alternative, the gap A may not exist, that is, when the locking member 373 is in the releasing position, the elastic connecting walls 385 are located outside the adjustment cavity 388, so that the elastic connecting walls 385 can expand outwards without restriction. The above embodiment can be utilized especially when the threaded connection between the locking member 373 and the bottom plate 374 can produce sufficient up and down displacement.

Referring to FIG. 121 and FIG. 124 through FIG. 129, in which specific structures of the mounting base 372, the bottom plate 374 and the locking member 373 are described in detail. The bottom plate 374 is fixed relative to the mounting base 372. The bottom plate 374 and the mounting seat 372 may be assembled together. Alternatively, the bottom plate 374 can be manufactured integrally with the mounting base 372 or riveted together after being manufactured separately. The locking member 373 is movably arranged relative to the mounting base 372, meaning the locking member 373 can rotate, or move up and down. The following description takes the bottom plate 374 and the mounting seat 372 set separately as an example.

Figure 124:
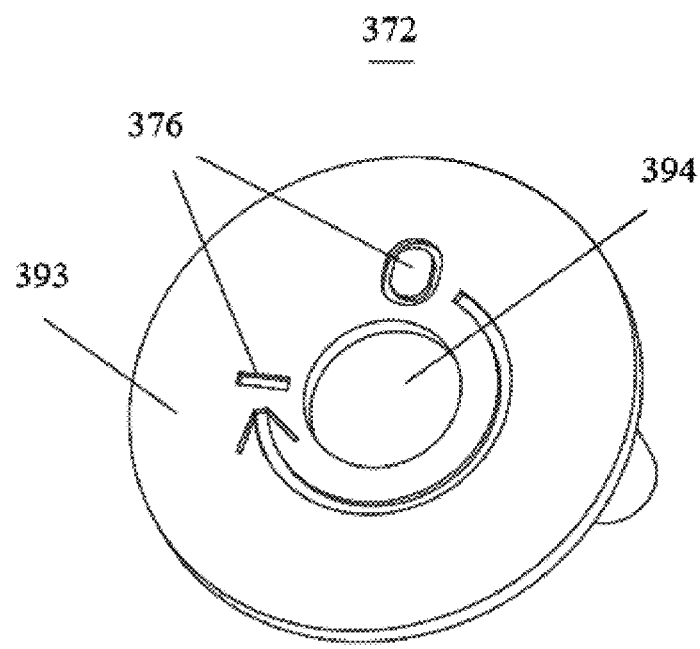
FIG. 124 and FIG. 125 are schematic perspective views of a mounting base of the connection device.
Figure 125:
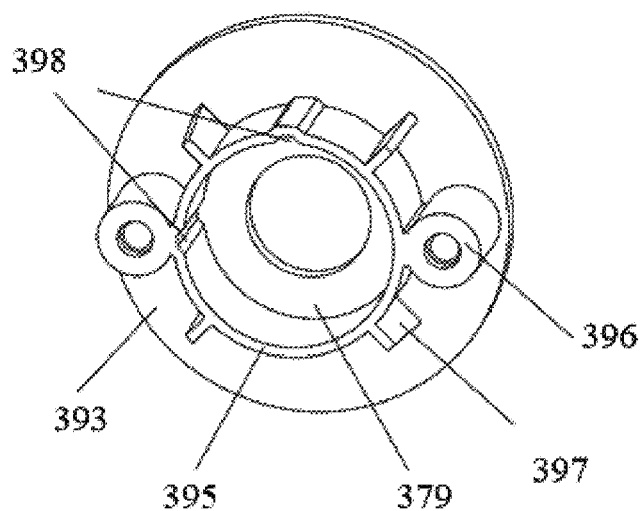

FIG. 124 and FIG. 125 are schematic perspective views of the mounting base 372. The mounting base 372 can include a top wall 393 and an annular side wall 395 extending downward from the middle of the top wall 393. The annular side wall 395 and the top wall 393 together form the aforementioned cavity 379. The bottom plate 374 is installed on the bottom surface of the annular side wall 395, and the locking member 373 is accommodated in the cavity 379. The top wall 393 is substantially circular, and a through hole 394 is provided at the center of the top wall 393 for the locking member 373 to be partially exposed. The lower side of the top wall 393 is provided with a pair of mounting posts 396, which are respectively located at opposite ends of the cavity 379 for fixing screws 375 and mounting the bottom plate 374 to the bottom surface of the mounting base 372. The annular side wall 395 is provided with several protruding ribs 397 connected to the top wall 393, the protruding ribs 397 can strengthen the strength of the annular side wall 395.

Figure 126:
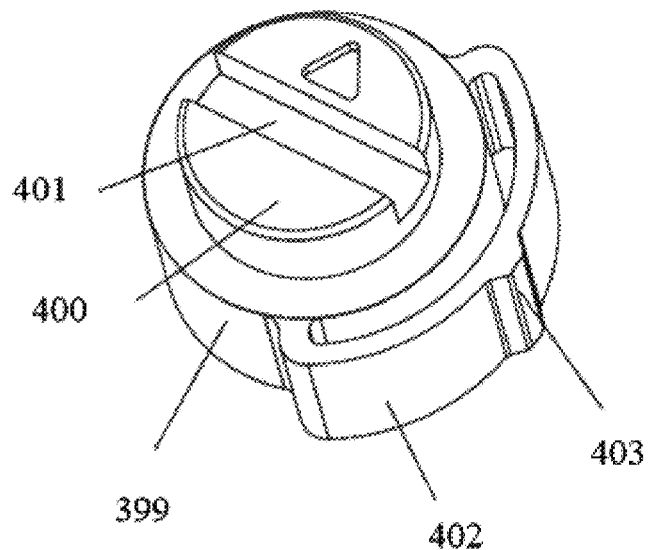
FIGS. 126-127 are schematic perspective views of the locking member of the connection device.
Figure 127:
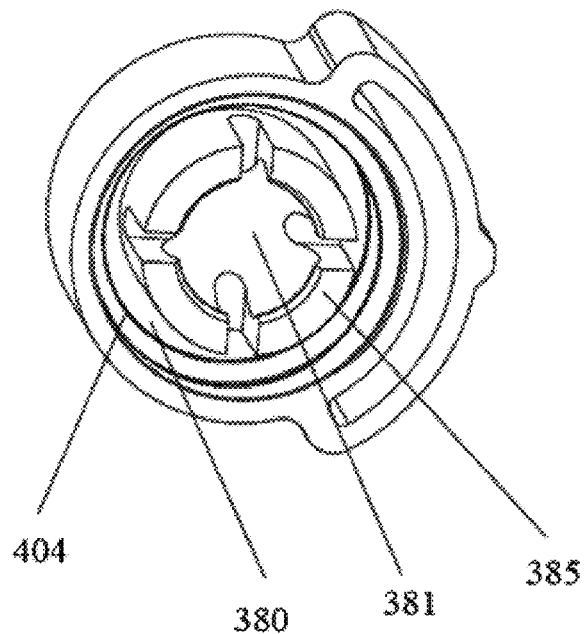

FIG. 126 and FIG. 127 are schematic perspective views of the locking member 373. The locking member 373 includes a column 399 and an operating part 400 on the top of the column 399. The column 399 is approximately cylindrical with an open bottom. The operating part 400 is also cylindrical and located at the center of the top surface of the column 399. A diameter of the operating part 400 is smaller than a diameter of the column 399.

In combination with the illustration of FIG. 124, a diameter of the through hole 394 of the top wall 393 of the mounting base 372 is larger than the diameter of the operating part 400, but smaller than the diameter of the column 399, so that the operating part 400 can protrude into the through hole 394 and expose at outside of the mounting base 372. The movable upper cover 2 is provided with a hole (not labeled) to expose the operating part 400 for consumers to operate. The column 399 is always restricted below the through hole 394. The top of the operating part 400 is provided with a groove 401, and when the operator needs to turn the locking member 373, a screwdriver or other tool can be used to snap into the groove 401 to drive the locking member 373.

Referring to FIG. 126 and FIG. 127, the aforementioned annular cavity 380 with the aforementioned internal thread 404 is formed in the column 399. The column 399 is also provided with the aforementioned elastic connecting walls 385 and the aforementioned recessed cavity 381 formed by the aforementioned elastic connecting walls 385. A center line of the recessed cavity 381 overlaps with a center line of the operation part 400, and when the operation part 400 is rotated, the recessed cavity 381 will not move eccentrically. In the illustrated embodiment, there are four elastic connecting walls 385, and adjacent ones of the elastic connecting walls 385 have a gap therebetween, so that the connecting walls 385 are elastic and can be deformed outwards.

Referring FIG. 125 and FIG. 126, the locking member 373 further includes a positioning member 402 beside the column 399. The positioning member 402 is roughly in the shape of an arc surrounding the column 399 and forms a gap with the column 399. One end of the positioning member 402 is connected to the column 399, so that the positioning member 402 has certain elasticity and can be deformed appropriately. A protrusion 403 is provided on an outer surface of the positioning member 402. In combination with the illustration of FIG. 124, the inner wall of the cavity 379 is further provided with two vertical positioning grooves 398 spaced apart.

When the locking member 373 rotates in the cavity 379, the positioning member 402 drives the protrusion 403 to rotate and thereby engage with corresponding positioning grooves 398 respectively in the aforementioned releasing position and the locking position. An engaging force of the positioning grooves 398 of the positioning member 402 can prevent the locking member 373 from rotating and shifting by itself when the consumer is not operating. Meanwhile, it is convenient for consumers to obtain a clear reminder (indication or feedback) whether the locking member 373 is turned in place or not during operation.

As illustrated in FIG. 126, a top surface of the top wall 393 is provided with an indication mark 376 around the through hole 394, which can further tell the consumer whether the locking member 373 has been rotated in place. The indication mark 376 includes "0" and "1". In combination with the illustration of FIG. 121, the top surface of the operating part 400 of the locking member 373 is provided with an arrow. The arrow is used together with the indication mark 376.

In the illustrated embodiment, the arrow pointing to "0" indicates that the locking member 373 is in the released position, and the arrow pointing to "1" indicates that the locking member 373 is in the locking position. In order to prevent mis-operation, a directional arrow 329 indicating a rotation direction of the locking member 373 can be arranged between "0" and "1". When the locking member 373 is rotated to "0" or "1", the protrusion 403 is engaged with the positioning groove 398. As a simple alternative, "0" and "1" can be represented by other words or graphics, such as "release" or "lock", "separation" or "connection", unlock and unlock icons, etc., without being limited herein.

Figure 128:
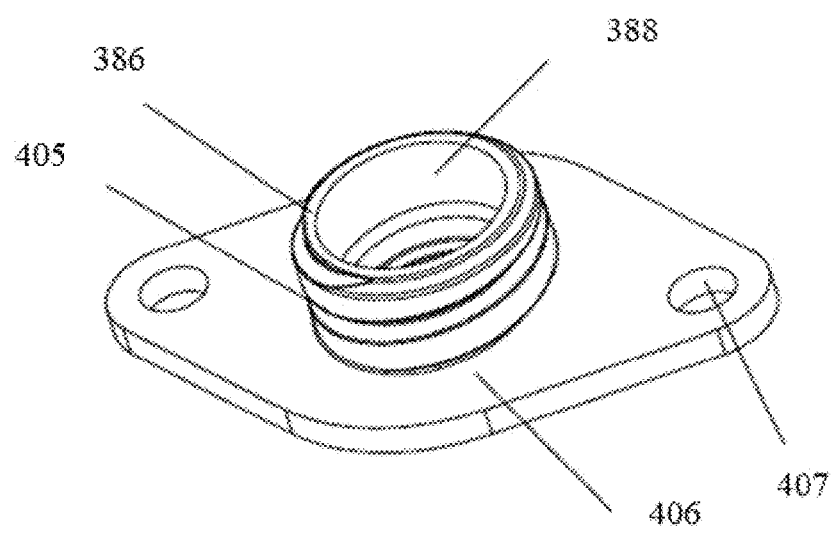
FIG. 128 and FIG. 129 are schematic views of a bottom plate of the connection device.

FIG. 128 is a schematic perspective view of the bottom plate 374. The bottom plate 374 is provided with a bottom wall 406 and the aforementioned protruding post 386 extending upward from the middle of the bottom wall 406. The bottom wall 406 is substantially diamond-shaped, and two opposite corners are provided with mounting holes 407. The screws 375 pass through the mounting holes 407 respectively and are fixed to the mounting posts 396 of the mounting base 372 to fix the bottom plate 374 on the mounting base 372.

Figure 129:
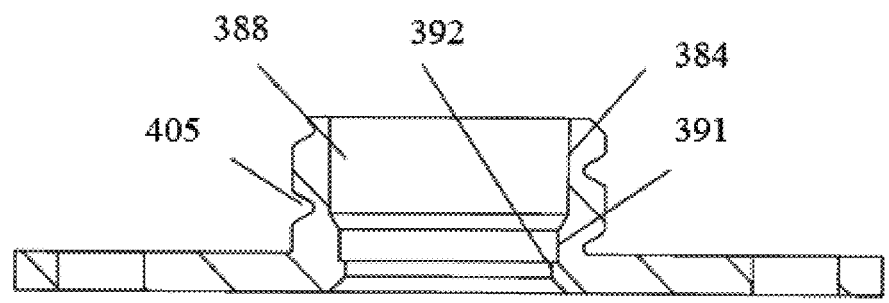

FIG. 129 is a schematic cross-sectional view of the bottom plate 374. The inner side wall of the adjustment cavity 388 is provided with a step, so that different height positions of the adjustment cavity 388 have different inner diameters. The inner wall of the adjustment cavity 388 is divided into an upper inner wall 384 and a lower inner wall 391 by the step. The step is located between the upper inner wall 384 and the upper inner wall 384 and is a chamfer.

Referring to FIG. 127 through FIG. 129, outer surfaces of the elastic connecting walls 385 are located on one circle, and a diameter of the circle is defined as an outer diameter of the elastic connecting walls 385. The inner diameter of the upper inner wall 384 is greater than the outer diameter of the elastic connecting walls 385, and the inner diameter of the lower inner wall 391 is equal to the outer diameter of the elastic connecting walls 385. It is noted that the term "equal to" herein means roughly equal, that is, the difference in size between the inner diameter of the lower inner wall 391 and the outer diameter of the elastic connecting walls 385 is not enough to allow the elastic connecting walls 385 to deform enough so that the connecting head 378 can escape from the recessed cavity 381.

Therefore, when the elastic connecting walls 385 are aligned with the upper inner wall 384 but staggered up and down with the lower inner wall 391, the elastic connecting walls 385 can be deformed outwards, which is corresponding to the releasing position of the aforementioned locking member 373. When the elastic connecting walls 385 are at least partially aligned with the lower inner wall 391, the elastic connecting walls 385 are restricted from deforming outwards, which is corresponding to the locking position of the aforementioned locking member 373.

As shown in FIG. 129, the adjustment cavity 388 is further provided with another ring-shaped stopping step 392 below the lower inner wall 391. An inner diameter of the stopping step 392 is smaller than the outer diameter of the elastic connecting walls 385. When the locking member 373 is at the locking position, that is, when the elastic connecting walls 385 are at a low position, bottom surfaces S2 of the elastic connecting walls 385 touch against the stopping step 392, and the stopping step 392 provides a stopping function.

Returning to FIG. 121, when the movable upper cover 2 is mounted on the mower body 1, the operating portion 400 of the locking member 373 is located in the through hole 394 of the mounting base 372, and the arrow on the operating portion 400 points to "0" of the mounting base 372, and in this case, the locking member 373 is at the releasing position. As shown in FIG. 122, in this case, the connecting head 378 can be easily inserted into the recessed cavity 381 formed by the elastic connecting walls 385, and the manipulation area 368 is movably connected to the mower body 1 and the movable upper cover 2. Afterwards, the operating portion 400 is rotated by a tool to rotate the locking member until the arrow on the operating portion 400 points to "1", which indicates that the rotation is in place. The locking member 373 moves downwardly to the locking position while rotating, as shown in FIG. 123, the connecting head 378 is held in the recessed cavity 381 in this case, which can prevent the movable upper cover 2 from being easily separated from the mower body 1.

As illustrated in FIG. 121 and FIG. 122, when the smart lawn mower is in normal use, the locking member 373 is always at the locking position to prevent the movable upper cover 2 from being separated from the mower body 1. When the movable upper cover 2 needs to be removed for cleaning or maintenance, the locking member 373 is rotated in a reverse direction, which makes it moves from the locking position to the releasing position, the connecting head 378 can be easily separated from the recessed cavity 381, and then the movable upper cover 2 can be removed simply and conveniently.

Figure 130:
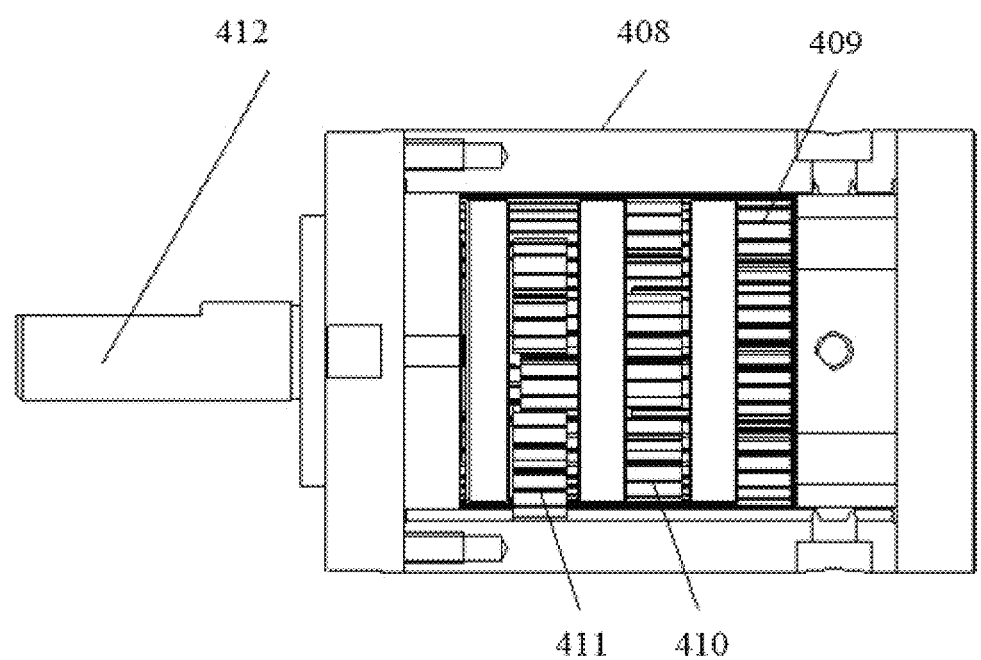
FIG. 130 through FIG. 132 are schematic structural views of an embodiment of a planetary gearbox of the disclosure.
Figure 131:
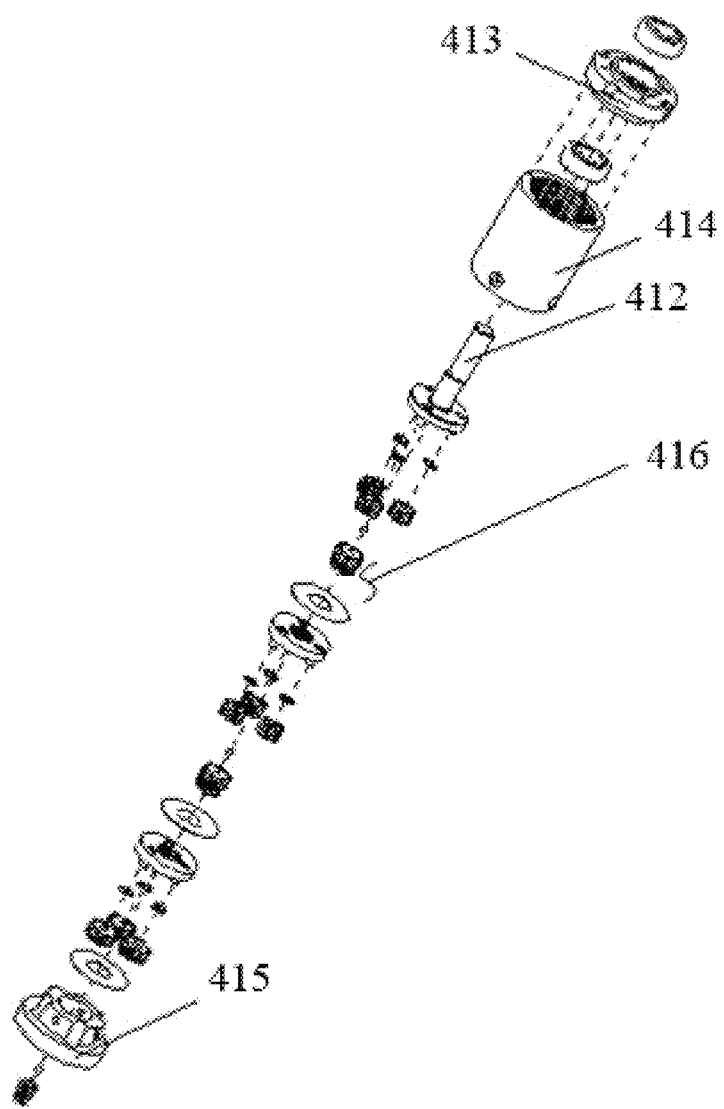
Figure 132:
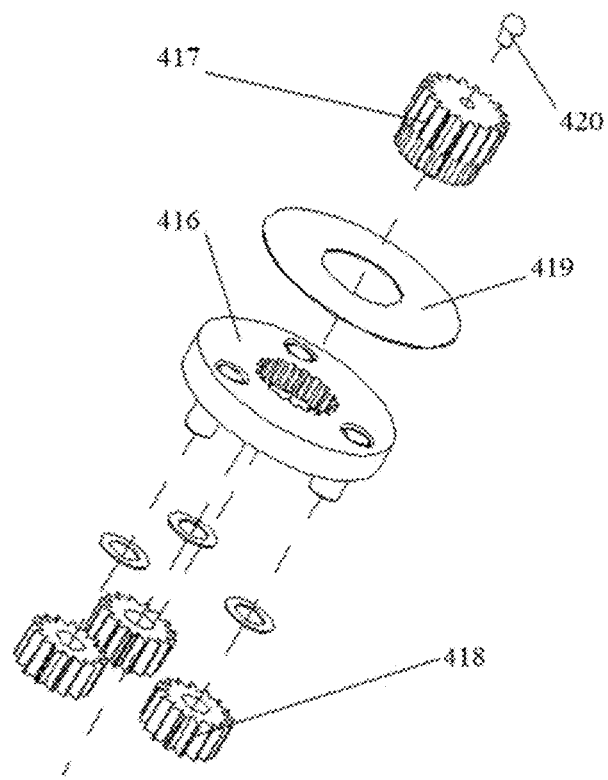

Referring to FIG. 130 through FIG. 132, a planetary gearbox includes a housing 408 composed of an upper cover 413, an internal ring gear 414 and a bottom casing 415. A planetary gear device 414 is arranged in the housing 408, and the planetary gear device 414 is connected with an output shaft 578 to output power. The planetary gear device 414 includes at least a first planetary gear assembly 409. The first planetary gear assembly 409 includes a planet carrier 416, a sun gear 417 and multiple planet gears 418. The planet gears 418 mesh with the sun gear 417 and the planet carrier 416 respectively. The sun gear 417 and the planet carrier 416 are separated structures, and the sun gear 417 and the planet gears 418 are installed on the planet carrier 416 in cooperation. The sun gear 417 and the planet carrier are processed separately, and then assembled. The gears and the planet carrier 416 are finished to improve the accuracy of the gears.

The precision of powder metallurgy parts generally is level 7, while the precision of gears after finishing is level 4-6, so it can significantly improve the degree of fit and reduce noise. Optionally, the teeth profile of the sun gear adopts involute spline teeth. Compared with rectangular splines, the involute splines have advantages of more teeth, thick teeth ends and roots, strong load-bearing capacity, easy self-centering and high installation accuracy. When it is used in garden tools such as an intelligent mower, better noise reduction and precise control effects can be achieved.

As illustrated in FIG. 132, a washer 419 is arranged between the planet carrier 416 and the sun gear 417 to avoid overheating friction between the sun gear 417 and the planet carrier 416. The sun gear 417 is equipped with a rolling pin shaft 420, and the usage of the rolling pin shaft 20 can reduce the friction area, the noise can be greatly reduced, and the transmission efficiency of the gearbox can be improved.

As illustrated in FIG. 132, the planetary gears 418 of the first planetary gear assembly 409 are plastic gears. The sun gear 417 and the internal ring gear 414 are metal gears. Plastic planetary gears mesh with metal gears, due to the elastic cushioning effect of plastics, noise can be effectively reduced.

As illustrated in FIG. 131, the planetary gear device 414 includes a first planetary gear assembly 409 and a second planetary gear assembly 410. The second planetary gear assembly 410 is disposed above the first planetary gear assembly 409 and connected to the output shaft. The planet gears 418 of the first planetary gear assembly 409 are plastic gears, the sun gear 417 and the internal ring gear 414 are metal gears. The planet gears 418, the sun gear 417 and the internal ring gear 414 of the second planetary gear assembly 410 are metal gears. Or, the planet gears 418 of the first planetary gear assembly 409 and the second planetary gear assembly 410 are plastic gears, and the sun gears 417 and the internal ring gears 414 are metal gears.

As illustrated in FIG. 130 through FIG. 132, the planetary gear device 414 includes a first planetary gear assembly 409, a second planetary gear assembly 410, and a third planetary gear assembly 411. The first planetary gear assembly 409, the second planetary gear assembly 410, and the third planetary gear assembly 411 are sequentially arranged from bottom to top. The third planetary gear assembly 411 is connected to the output shaft. The planet gears 418 of the first planetary gear assembly are plastic gears, the sun gear 417 and the internal ring gear 414 are metal gears. The planet gears 418, the sun gears 417 and the internal ring gears of the second planetary gear assembly 410 and the third planetary gear assembly 411 are metal gears.

Since the second planetary gear assembly 410 and the third planetary gear assembly 411 have low gear speeds and large transmission torques, the gears made of metal materials can support a large transmission ratio. In another embodiment, the planet gears 418 of the first planetary gear assembly 409, the second planetary gear assembly 410 and the third planetary gear assembly 411 are plastic gears, and the sun gears 417 and the internal ring gears 414 are metal gears. In the case of relatively small transmission ratio, the second planetary gear assembly 410 and the third planetary gear assembly 411 may also use plastic planetary gears. A transmission ratio of the first planetary gear assembly 409 is 6.3, a transmission ratio of the second planetary gear assembly 410 is 3.79, a transmission ratio of the third planetary gear assembly 411 is 3.79, and the total transmission ratio is 90.3.

As illustrated in FIG. 130, the planetary gearbox provided by the disclosure can reduce the noise generated in the transmission process, the transmission torque is more stable, and the degree of coordination is high.

Figure 133:
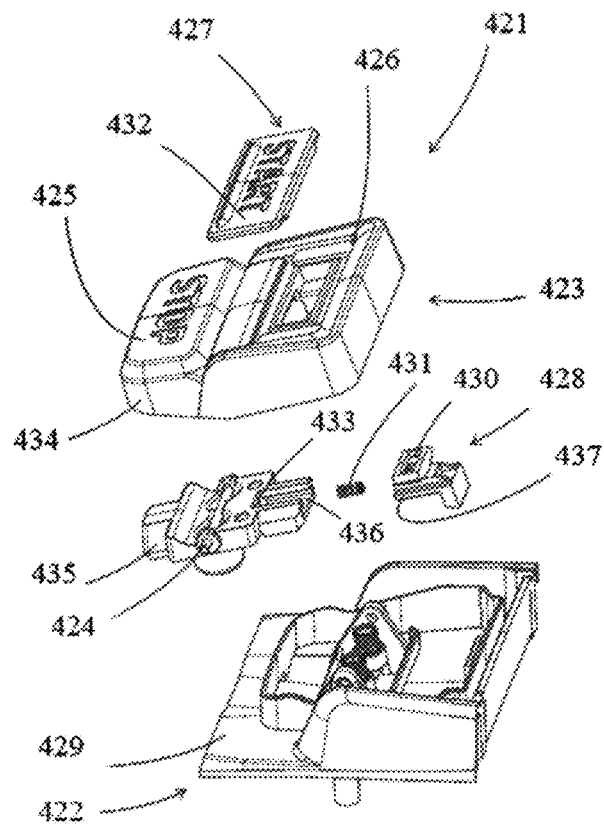
FIG. 133 and FIG. 134 are schematic views of a safety switch of the disclosure.
Figure 134:
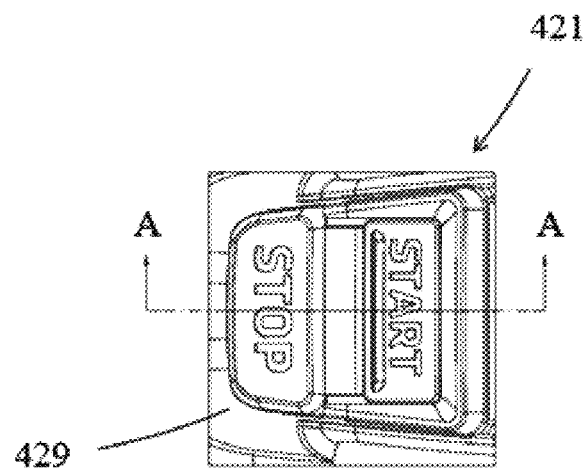
Figure 135:
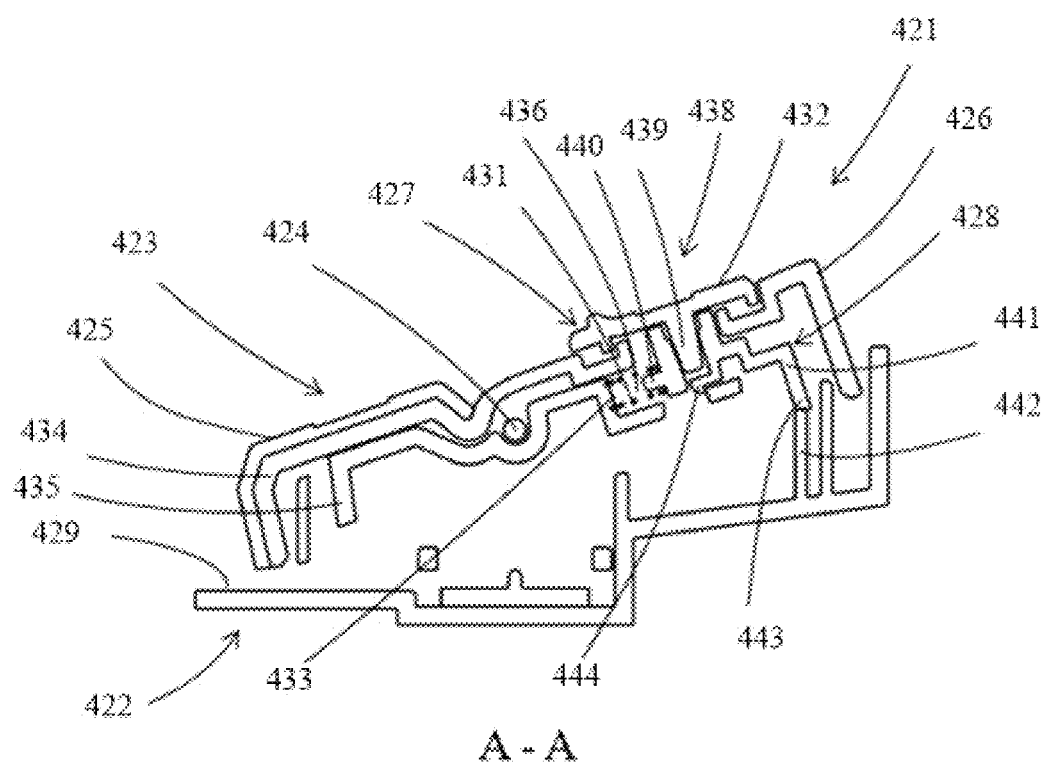
FIG. 135 is a schematic cross-sectional view of FIG. 134 taken along the A-A direction.
Figure 136:
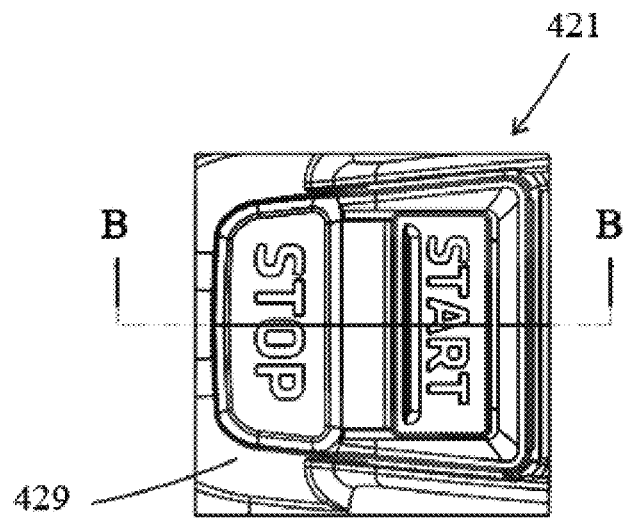
FIG. 136 is a schematic top view of the safety switch of the disclosure in a second position.
Figure 137:
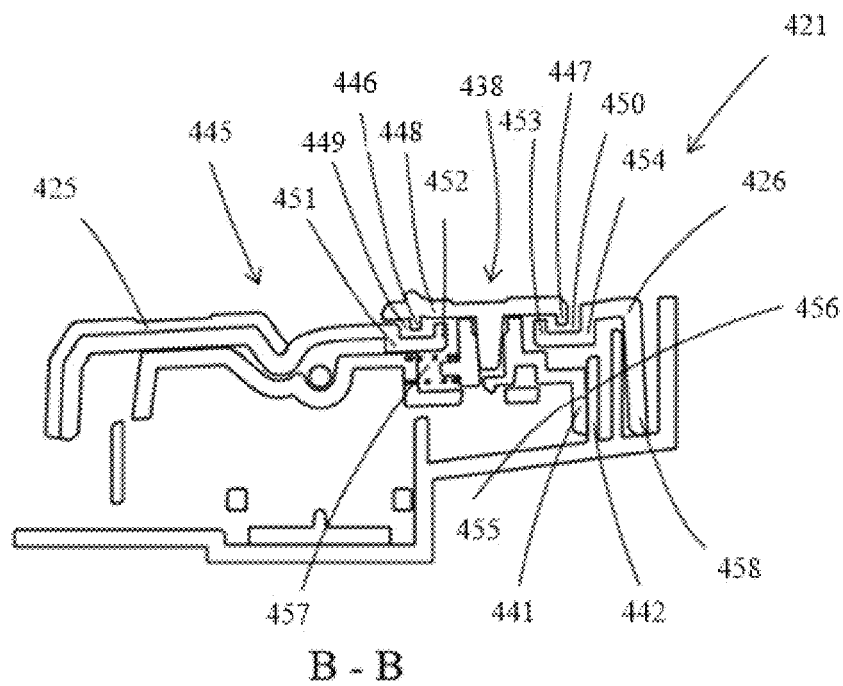
FIG. 137 is a schematic cross-sectional view of FIG. 136 taken along the B-B direction.

FIG. 133-135 show a safety switch 421 of the disclosure rotated to a first position. In this case, the safety switch 421 is in a stopped state. FIG. 136 and FIG. 137 show a state of use when the safety switch 421 is rotated to a second position, in this case, the safety switch 421 is in an activated state. Furthermore, in the disclosure, the safety switch 421 is installed on a casing 422 or a chassis of a garden tool. The garden tool can be a robotic lawn mower or any other garden tool to which the safety switch 421 can be applied. The garden tool is driven by an engine (not shown). Specifically, the engine may be an internal combustion engine or a driving engine. Optionally, the engine in the disclosure is an electric motor.

Referring to FIG. 133, which is a schematic exploded view of the safety switch 421 of the disclosure at the first position. The safety switch 421 is installed on the casing 422 of the garden tool. The safety switch 421 includes a first button 423 and a second button 438 arranged on the first button 423. The safety switch 421 can be used to start a power device (not shown) of the engine so as to provide power to the engine.

As illustrated in FIG. 133, the safety switch 421 further includes a pivot shaft 424 connected to the casing 422. The first button 423 is pivotally connected to the pivot shaft 424. The first button 423 includes a first part 425 and a second part 426. The first part 425 and the second part 426 are respectively provided on two sides of the pivot shaft 424, and the second button 438 is provided on the second part 426. Furthermore, the first button 423 can rotate around the pivot shaft 424 and between a first position and a second position. Defining that when a tail end of the first part 425 is close to the casing 422, the first button 423 is at the first position; and when a tail end of the second part 426 is close to the casing 422, the first button 423 is at the second position.

As shown in FIG. 133, the second button 438 includes a first sliding button 427 and a second sliding button 428. When the safety switch 421 is installed on a horizontal surface 429 of the casing 422, the second sliding button 428 is located beside the first button 423, the first sliding button 427 is located above the second sliding button 428. Furthermore, the first sliding button 427 and the second sliding button 428 are formed separately and further assembled together. The first sliding button 427 is provided with a protrusion 439 protruding toward the second sliding button 428 (downwardly). The second sliding button 428 is provided with a cavity 430, and the protrusion 439 is received in the cavity 430 to connect the first sliding button 427 with the second sliding button 428, such arrangement facilitates the assembling and disassembling of the safety switch 421.

As illustrated FIG. 133, the second button 438 is further provided with a biasing device 431. The biasing device 431 is positioned and installed on the second sliding button 428 via a guiding pin 440. Specifically, the guiding pin 440 is disposed on the second sliding button 428 and extends in a direction substantially parallel to a first upper surface 432 of the first sliding button 427. During the starting of the safety switch 421, the guiding pin 440 can be used to fix and guide the biasing device 431 to thereby ensure that the biasing device 431 is compressed and extended without deviating from its expansion and contraction direction, and in this case, the expansion and contraction direction of the biasing device 431 can be described as an axial direction of a central axis formed along a center of the biasing device 431. Furthermore, the biasing device 431 may be a coil spring or any other suitable spring device.

Referring to FIG. 133, the first button 423 includes a first snapping portion 434 and a second snapping portion 435. The first snapping portion 434 is disposed above the second snapping portion 435. The pivot shaft 424 is disposed on the second snapping portion 435. Alternately, the pivot shaft 424 is provided penetrating through the second snapping portion 435. The second snapping portion 435 is provided with a sliding groove 436 at an end close to the second sliding button 428. A side of the sliding groove 436 facing toward the second sliding button 428 is opened t, and the sliding groove 436 is provided with a limiting surface 16 facing toward the opening. The second sliding button 428 is provided with a protrusion 20 received in the sliding groove 436. When the safety switch 421 is switched between the stopped and activated states, the protrusion 20 can slide along the sliding groove 436. Furthermore, the biasing device 431 and the guiding pin 440 are fixedly housed in the protrusion 20. Optionally, the biasing device 431 is located in the sliding groove 436, and two ends of the biasing device 431 are pressed against the limiting surface 16 and the second sliding button 428 respectively.

As illustrated in FIG. 133, the first button 423 is provided with a second upper surface 445 extending in a longitudinal direction, and the second button 438 is slidably disposed on the second upper surface 445 along the longitudinal direction. The second button 438 is slidable in the front and rear directions toward two opposite outer boundaries of the casing 422. Furthermore, the second button 438 further includes a pressing portion 441 extending toward the casing 422. Specifically, the pressing portion 441 is disposed at an end of the second sliding button 428 facing away from the first button 423. The casing 422 includes an abutting portion 442 extending toward the safety switch 421 and the second sliding button 428 (i.e., extending upwards).

As shown in FIG. 133, the first sliding button 427 includes a first protrusion 446 and a second protrusion 447 protruding toward the casing 422. The first protrusion 446 and the second protrusion 447 are disposed on a third lower surface 448 of the first sliding button 427.

As illustrated in FIG. 133, the second part 426 of the first button 423 is provided with an accommodation chamber, the first sliding button 427 of the second button 438 covers the accommodation chamber, and the protrusion 439 is inserted into the accommodation chamber to connect with the second sliding button 428. The first button 423 is provided with a first receiving portion 449 for receiving the first protrusion 446 and a second receiving portion 450 for receiving the second protrusion 447. Specifically, the first accommodating portion 449 is provided with a first wall portion 451 and a second wall portion 452 extending toward the first sliding button 427; the second accommodating portion 450 is provided with a third wall portion 453 and a fourth wall portion 454 extending toward the first sliding button 427. The first receiving portion 449 and the second receiving portion 450 are both U-shaped.

A distance between the first wall portion 451 and the second wall portion 452, and a distance between the third wall portion 453 and the fourth wall portion 454 can be used to define a moving/sliding distance of the second button 438 relative to the first button 423. Furthermore, the first receiving portion 449, the first wall portion 451, the second wall portion 452 and the first protrusion 446 are arranged in a labyrinth manner. Meanwhile, the second receiving portion 450, the third wall portion 453, the fourth wall portion 454 and the second protrusion 447 are also arranged in a labyrinth manner. Such arrangement, on one hand, can effectively prevent garbage and dirt from entering the interior of the second button 438, on the one hand, can prevent garbage from entering a use area of the biasing device 431 to cause abnormal use of the second button 438.

Referring to FIG. 133, the first button 423 includes the first part 425 and the second part 426. The first part 425 and the second part 426 are respectively arranged on two sides of an axis in an extending direction of the pivot shaft 424. The second button 438 is arranged on the second part 426.

Referring to FIG. 133 through FIG. 135, it is defined that when the first button 423 is at the first position, a position where the second button 438 is located is the stopping position; and when the first button 423 is at the second position, a position where the second button 438 is located is the starting/activated position. When the first button 423 is at the first position, a rotation of the first button 423 is restricted and cannot be rotated toward the second position, and in this case, the first part 425 of the first button 423 is close to the casing 422, and the end 443 of the pressing portion 441 touches against the abutting portion 442 on the casing 422. In the disclosure, the second button 438 is slidably connected to the second part 426, the second button 438 can slide along the second upper surface 445 of the second part 426, so that the second button 438 can be slidably switched between the stopping position and the starting position. Furthermore, when the second button 438 is switched to the stopping position, the engine is in a power-off state; whereas, when the second button 438 is switched to the starting position, the engine is in the energized state.

Referring to FIG. 136 and FIG. 137, when the first button 423 rotates around the pivot shaft 424 to the second position, an extending direction of the second upper surface 445 located in a projection area of the safety switch 421 is substantially parallel to an extending direction of the casing 422. The end 443 of the pressing portion 441 touches against the casing 422, and in this case, the first side surface 455 of the pressing portion 441 and the second side surface 456 of the abutting portion 442 are arranged oppositely, and the first side surface 455 and the second side surface 456 are approximately parallel. Furthermore, when the safety switch 421 is rotated to the second position, the restoring force of the biasing device 431 acts on the abutting portion 442 via the pressing portion 441, so that the safety switch 421 is positioned at the activation/starting position.

Figure 37:
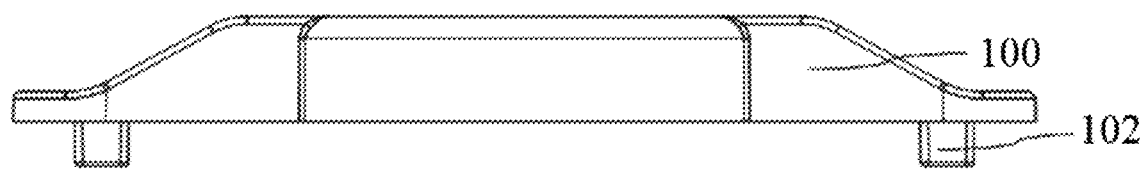
Figure 38:
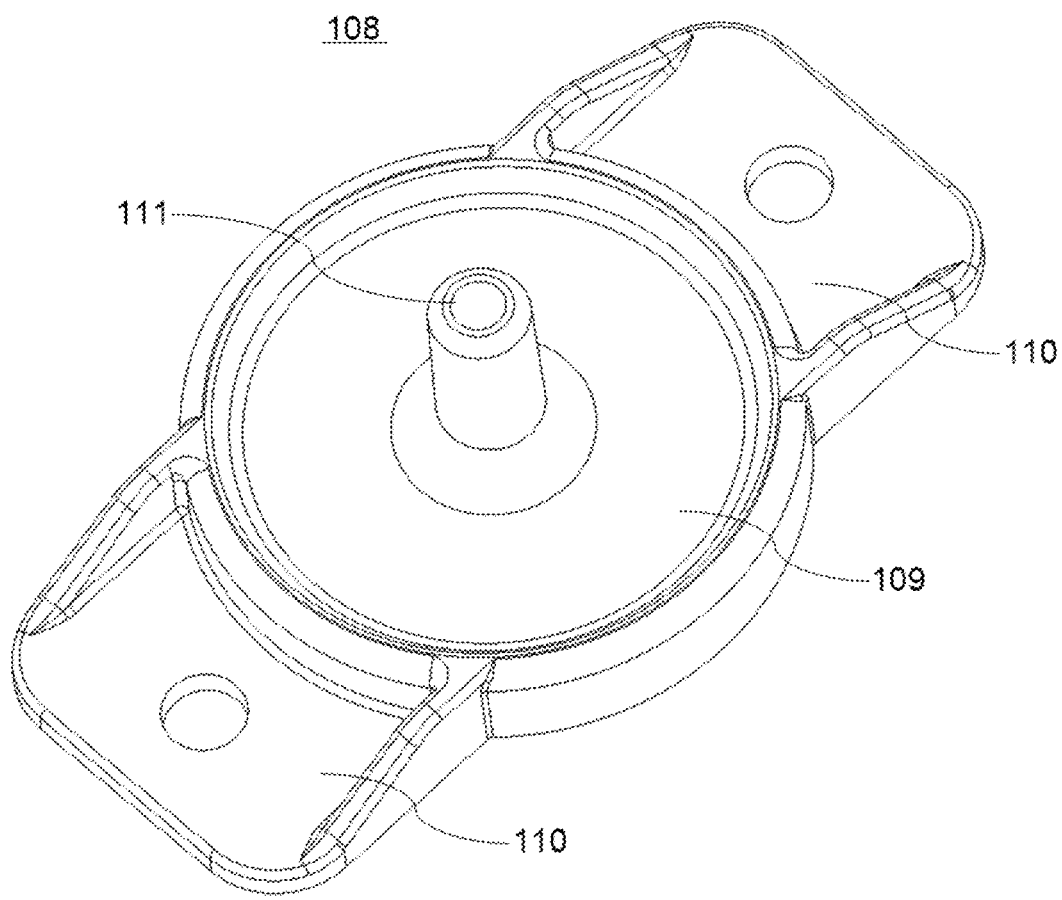
FIG. 38 through FIG. 41 are schematic structural views of an airtight nozzle in different directions.

As shown in FIG. 135, when the first button 423 is at the first position, the second sliding button 428 touches against the second snapping portion 435 through a buckling portion 38, and the second button 438 is at the stopping position. Whereas, when the first button 423 is at the second position (as shown in FIG. 37), the second button 438 moves toward the first button 423, the biasing device 431 is compressed, the restoring force of the biasing device 431 acts on the second button 438, the pressing portion 441 touches against the abutting portion 442, so that the second button 438 is in the activation position.

Referring to FIG. 135, when the first button 423 rotates to the first position, that is, the first part 425 of the first button 423 rotates about the pivot shaft 424 and obliquely leans against the casing 422, the safety switch 421 is in a disabled/deactivated state. When the safety switch 421 is in a deactivated state before being activated, the safety switch 421 is at a start/initial position, that is, at the first position shown in FIG. 133 through FIG. 135, and the second button 438 is at the stopping position.

Referring to FIG. 136, when the safety switch 421 of the disclosure is activated/started, the safety switch 421 needs to be switched from the stopping position to the starting position. In this process, an external force is applied firstly onto the first button 423 at the first position, the first sliding button 427 slides toward the first part 425 of the first button 423 and compresses the biasing device 431, the end 443 of the pressing portion 441 is disengaged from the top end of the abutting portion 442. Furthermore, an external force is applied to the second button 438, so that the second part 426 rotates around the pivot shaft 424 toward the casing 422 until a stopping portion 458 of the second button 438 touches against the casing 422, in this case the safety switch 421 reaches the starting position. Finally, the external force applied to the second button 438 is stopped, the biasing device 431 stretches on its own restoring force and drives the second button 438 to move away from the first part 425 and further drives the first side surface 455 of the pressing portion 441 to touch against the second side surface 456 of the abutting portion 442. In this case, the safety switch 421 is in the activated state, which can be used to activate the power device of the electric engine/motor and provide power to the electric engine.

Referring to FIG. 135 and FIG. 136, during stopping the motor, the first part 425 of the first button 423 is pushed to rotate around the pivot 424 toward the casing 422, the first side surface 455 and the second side surface 456 are separated, the biasing device 431 drives the second button 438 to move away from the first part 425, and finally, when the end 443 of the pressing portion 441 touches against the abutting portion 442, the safety switch 421 is in the stopping position and the motor stops working.

Therefore, the safety switch 421 of the disclosure is provided with the first button 423 and the second button 438, and meanwhile the second button 438 is controlled to slide during a using process to further control the first button 423 and the second button 438 to rotate with the pivot shaft 424 as an axis, so that the safety switch 421 is in the activated state. The safety switch 421 of the disclosure is activated/started by necessarily performing two different continuous control actions. Such arrangement makes the safety switch 421 of the disclosure have a good fool-proof function, and the accidental activation of the garden tool is avoided, so that the garden tool using the safety switch 421 of the disclosure has relatively good safety. The safety switch 421 of the disclosure can be applied to a robotic lawn mower, a power lawn mower or any other garden tools suitable for using the safety switch 421.

In an embodiment of the disclosure, a method is provided for providing power to an engine (or motor) of a garden tool. The garden tool is provided with the safety switch 421. The first button 423 can rotate between the first position and the second position with the pivot shaft 424 as an axis. The second button 438 can slide between the stopping position and the starting position. Furthermore, the method of using the safety switch 421 specifically can include the following steps.

Step 1, press the first part of the first button of the safety switch to make the first part be closer to the casing, in order to rotate the first button to the first position; Since the second button is located in the stopping position and touches against the casing, the rotation of the first button toward the second position is restricted.

Step 2: slide the second button to compress the biasing device, and separate the second button from the casing.

Step 3: downwardly press the second button so that the first button rotates around the pivot shaft from the first position to the second position, and the second button slides from the stopping position to the starting position under the effect of an elastic force of the biasing device.

Step 4: place the safety switch in the starting state, which allows the activation of the power plant/device and the starting of the engine.

Figure 138:
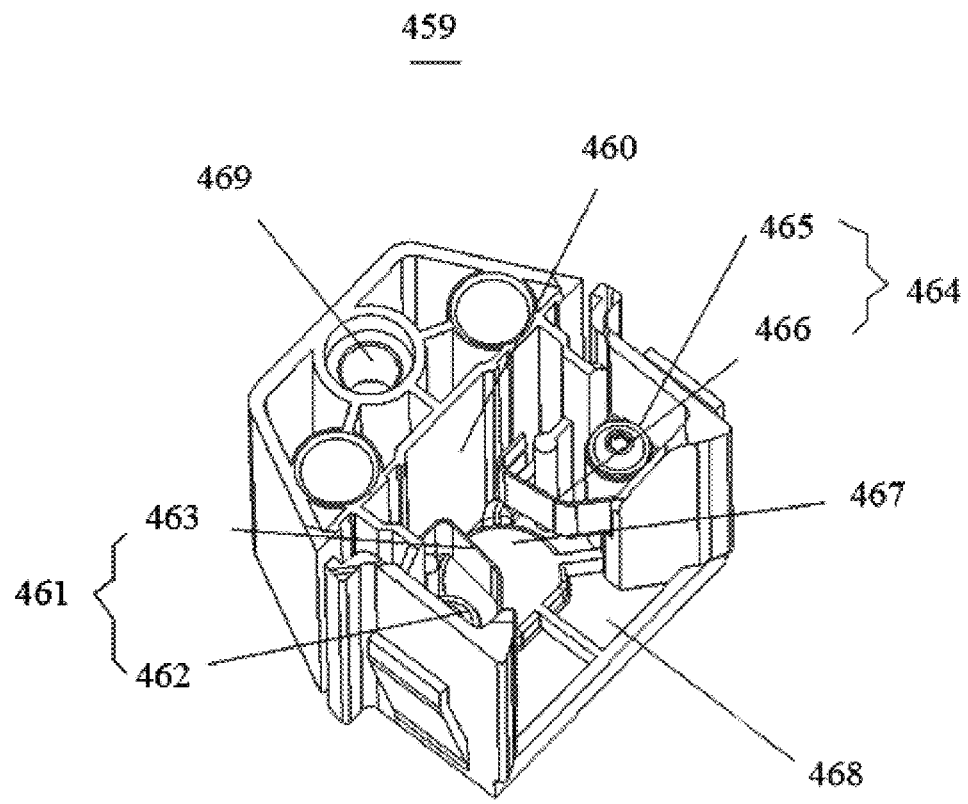
FIG. 138 is a schematic cross-sectional structural view of a first charging assembly of the disclosure.

FIG. 138 is a schematic cross-sectional structure diagram of the first charging assembly 459 in some embodiments of the disclosure. The first charging assembly 459 has a symmetrical structure. The first charging assembly 459 is provided with a receiving cavity 460 inside. The receiving cavity 460 is provided with a first resilient terminal assembly 461 and a second resilient terminal assembly 464. The first resilient terminal assembly 461 includes a first groove 462 and a first resilient terminal 463. The first groove 462 is located in the receiving cavity 460, and the first resilient terminal 463 is fixed in the first groove 462.

The second resilient terminal assembly 464 includes a second groove 465 and a second resilient terminal 466. The second groove 465 is located in the receiving cavity 460, and the second resilient terminal 466 is fixed in the second groove 465. An embedded space 467 is formed between the first resilient terminal 463 and the second resilient terminal 466. One side of the first charging assembly 459 is provided with a tapered opening 468, and the tapered opening 468 connects with the embedded space 467. An end of the first charging assembly 459 opposite to the tapered opening 468 is provided with a first mounting portion 469.

Figure 139:
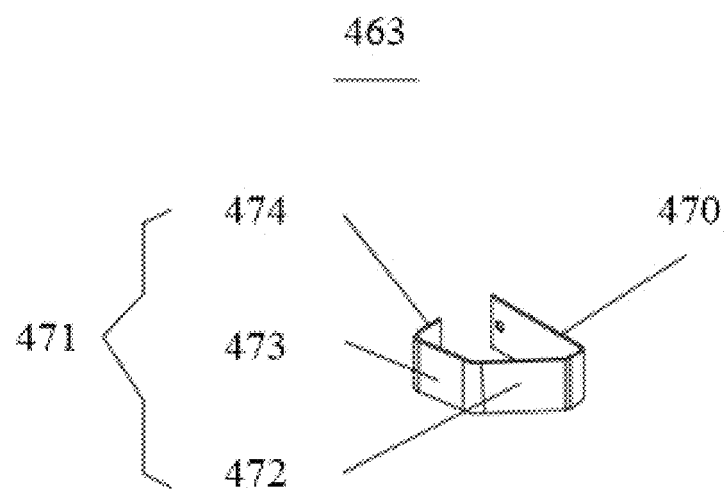
FIG. 139 is a schematic structural view of a first resilient terminal of the disclosure.

FIG. 139 is a schematic structural view of the first resilient terminal 463 in some embodiments of the disclosure. Referring to FIG. 138 and FIG. 139, the first resilient terminal 463 includes a first fixing part 470 and a first contact part 471. The first contact part 471 includes a first initial contact portion 472 and a first charging contact portion 473. The first charging contact portion 473 is connected to the first fixing portion 470 by the first initial contact portion 472. The first fixing part 470 is fixed in the first groove 462. The first contact part 471 further includes a first bend tail portion 474, and the first bent tail portion 474 is connected to the first charging contact portion 473.

The first fixing part 470 and the first initial contact portion 472 form a first rounded corner (not shown in the drawings), and an angle of the first rounded corner is less than 90 degrees. The first initial contact portion 472 and the first charging contact portion 473 form a second rounded corner (not labelled in the drawings), and an angle of the second rounded corner is greater than 90 degrees and less than 180 degrees. The first bent tail portion 474 faces away from the embedded space 467. The angle of the rounded corner should be understood as an intersection angle of extension lines of two sides of the rounded corner. The second resilient terminal 466 and the first resilient terminal 463 have the same structure.

Figure 140:
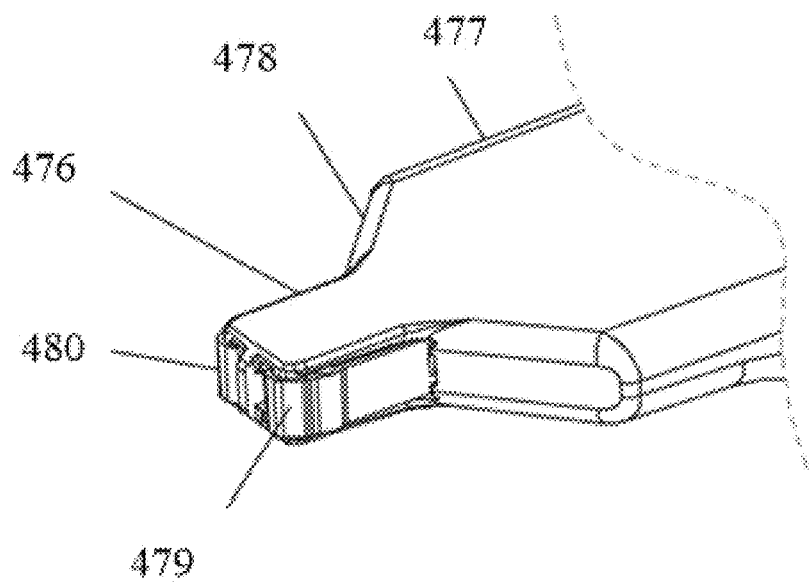
FIG. 140 is a schematic structural view of a second charging assembly of the disclosure.

FIG. 140 is a schematic structural view of the second charging assembly 475 in some embodiments of the disclosure. As shown in FIG. 140, the second charging assembly 475 has a symmetrical structure. One side of the second charging assembly 475 is provided with a protruding portion 476, and the other side of the second charging assembly 475 opposite to the protruding part 476 is provided with a second mounting portion 477. The protruding portion 476 is connected to the second mounting portion 477 through a tapered portion 478. The protruding portion 476 is provided with a third resilient terminal 479 and a fourth resilient terminal 480.

Figure 141:
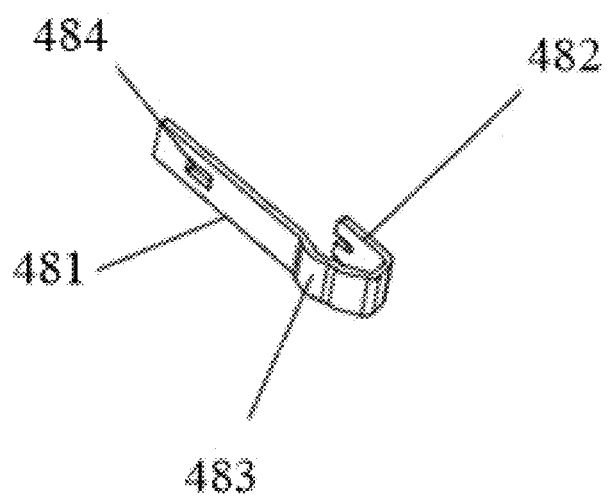
FIG. 141 is a schematic structural view of a third resilient terminal of the disclosure.

FIG. 141 is a schematic structural view of the third resilient terminal 479 in some embodiments of the disclosure. As illustrated in FIG. 141, the third resilient terminal 479 is in a shape of fish hook. The third resilient terminal 479 includes a third fixing part 481 and a first hook part 482. The third fixing part 481 is provided with a first bump 483 and a first fitting opening 484. The first bump 483 is located at an end of the third fixing part 481 connected to the first hook part 482, and the first bump 483 is located at a side of the third the fixing part 481 facing away from the first hook part 482. The first fitting opening 484 is located at an end of the third fixing part 481 away from the first hook part 482. The structure of the fourth resilient terminal 480 is the same as the structure of the third resilient terminal 479.

Figure 142:
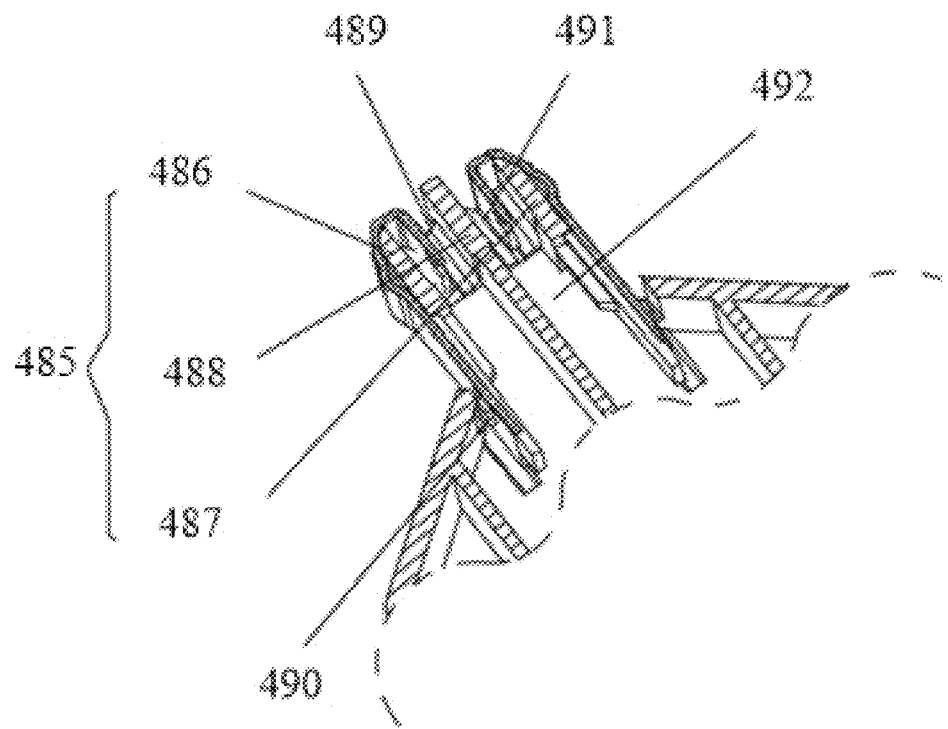
FIG. 142 is a schematic cross-sectional view of the second charging assembly of the disclosure.

FIG. 142 is a schematic cross-sectional view of the second charging assembly described in the disclosure. As illustrated in FIG. 140 through FIG. 142, the protruding portion 476 includes a terminal fixing assembly 485 of protruding portion, a lower cover plate 492, and an upper cover plate (not shown in the drawings). The terminal fixing assembly 485 is disposed between the lower cover plate 492 and the upper cover plate (not shown). The terminal fixing assembly 485 includes a first fixing plate 486, a second fixing plate 487, and a built-in plate 488. The first fixing plate 486 and the second fixing plate 487 are arranged on each side of the built-in plate 488. A first embedded groove 489 is provided between the first fixing plate 486 and the built-in plate 488. A first fixing buckle 490 is provided on the side of the first fixing plate 486 facing away from the built-in plate 488. The first hook part 482 is embedded in the first embedded groove 489. The first fitting opening 484 is detachably connected to the first fixing buckle 490.

A second embedded groove 491 is provided between the second fixing plate 487 and the built-in plates 488. A second fixing buckle (not labelled in the drawings) is provided on the side of the second fixing plate 487 facing away from the built-in plate 488. The second hook part (not labelled in the drawings) is embedded in the second embedded groove 491. The second fitting opening (not labelled in the drawings) and the second fixing buckle (not labelled in the drawings) are detachably connected with each other.

As illustrated in FIG. 142, the first hook part 482 is provided with a first block opening, the first embedded groove 489 is provided with a first block plate therein, and the first block plate is embedded in the first block opening so as to prevent the first hook part 482 from moving up and down. The second hook part is provided with a second block opening, the second embedded groove 491 is provided with a second block plate therein, and the second block plate is embedded in the second block opening so as to prevent the second hook part from moving up and down.

Figure 143:
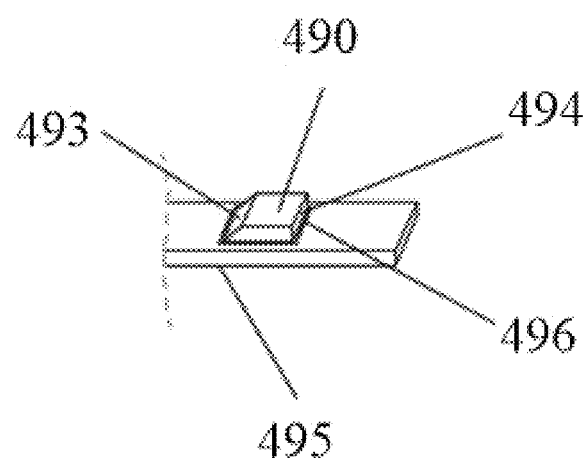
FIG. 143 is a schematic structural view of a first fixing buckle of the disclosure.

FIG. 143 is a schematic structural view of the first fixing buckle 490 in the disclosure. The structure of the second fixing buckle is the same as the structure of the first fixing buckle 490. As shown in FIG. 143, the first fixing buckle 490 has an inclined surface 493 and a perpendicular surface 494. The inclined surface 493 and the perpendicular surface 494 are located on opposite sides of the first fixing buckle 490, and the inclined surface 493 faces toward the first hook part (not labelled in the drawings). The inclined surface 493 facilitates the first fixing buckle 490 to be inserted into the first fitting opening 484. The perpendicular surface 494 prevents the first fixing buckle 490 from being separated from the first fitting opening 484.

Figure 144:
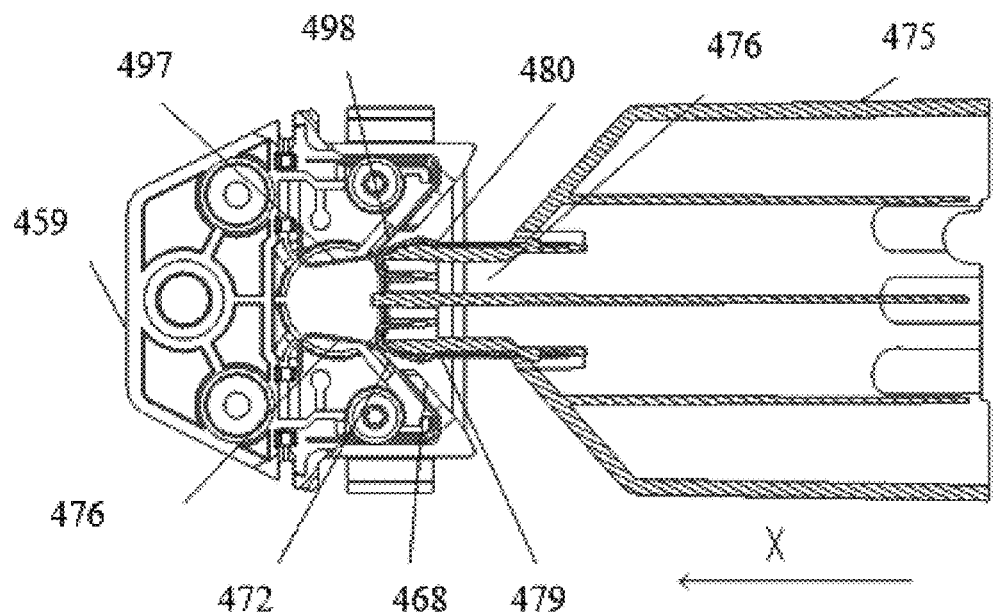
FIG. 144 and FIG. 145 are schematic views of first and second processes of using the first charging assembly and the second charging assembly of the disclosure.

FIG. 144 is a schematic diagram of a first process of using the first charging assembly 459 and the second charging assembly 475 in the disclosure. Referring to FIG. 138, FIG. 139, FIG. 140 and FIG. 144, a distance between the first charging contact portion 473 and the second charging contact portion 497 is smaller than a distance between the third resilient terminal 479 and the fourth resilient terminal 480. The second charging assembly 475 is inserted into the first charging assembly 459 along the X direction. During the first process of using the first charging assembly 459 and the second charging assembly 475, the third resilient terminal 479 is in resilient contact with the first initial contact portion 472, and the fourth resilient terminal 480 is in resilient contact with the second initial contact portion 498.

When the second charging assembly 475 is inserted into the first charging assembly 459 in the X direction, since the opening size of the tapered opening (also referred to as tapered port) 468 is relatively large, the protruding portion 476 is easy to be inserted into the tapered opening 468. The side walls of the tapered opening 468 can play a role of guiding the insertion direction of the protruding portion 476, and under the guiding of the side walls, it slides into the embedded space 467 along the side walls.

Figure 145:
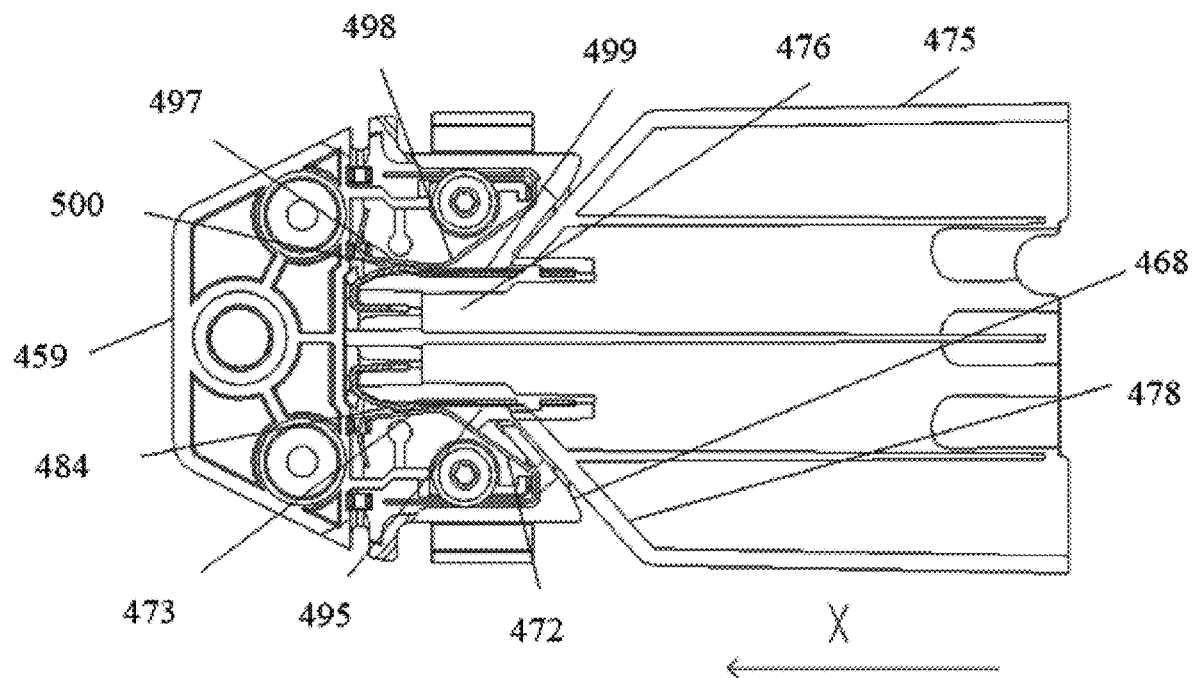

FIG. 145 is a schematic diagram of a second process of using the first charging assembly 459 and the second charging assembly 475 in the disclosure. Referring to FIG. 138, FIG. 139, FIG. 141 and FIG. 145, the second charging assembly 475 is inserted into the first charging assembly 459 along the X direction. During the second process of using the first charging assembly 459 and the second charging assembly 475, the protruding portion 476 is inserted into the embedded space (not labelled in the drawings), a connection between the first initial contact portion 472 and the first charging contact portion 473 is in resilient contact with the third fixing part 481, the first charging contact portion 473 is in resilient contact with the first bump 483, a connection between the second initial contact portion 498 and the second charging contact portion 497 is in resilient contact with the fourth fixing portion 499, the second charging contact portion 497 is in resilient contact with the second bump 500, shapes of the tapered portion 478 and the tapered port 468 are matched with each other, and the tapered portion 478 fully fills the tapered port 468.

As illustrated in FIG. 145, the first elastic terminal 463 and the third elastic terminal 479 are in resilient contact with each other, and there are two contact points between the first resilient terminal 463 and the third resilient terminal 479. The connection between the first initial contact portion 472 and the first charging contact portion 473 touches against the first bump. The second resilient terminal 466 and the fourth resilient terminal 480 are in resilient contact with each other, there are two contact points between the second resilient terminal 466 and the fourth resilient terminals 480, and the connection between the second initial contact portion and the second charging contact portion 498 touches against the second bump. Such arrangement not only ensures the stability of contact, but also prevents the second charging assembly 475 from detaching from the first charging assembly 459.

As illustrated in FIG. 139 through FIG. 141, the first resilient terminal 463, the second resilient terminal 466, the third resilient terminal 479 and the fourth resilient terminal 480 may be bent metal sheets.

In summary, the control assembly is for example, but not limited to, a single-chip microcomputer or a processor module, can control various mechanisms to perform different working processes through corresponding driving circuits. For example, the control assembly controls the battery pack assembly to provide power to the mower through the power management system. For another example, an airtightness of the housing can be detected through the airtight nozzle on the housing, and then the airtight nozzle can be replaced by the air filter hood to ensure that the mower maintains an air pressure balance inside the housing during a working process, so that a normal working state of the mower can be ensured.

For still another example, the blade carrier lifting assembly and the blade carrier height-adjustment assembly in the cutting mechanism are used to individually or jointly adjust the height of the blade carrier, and then the control assembly controls the rotation of the prime mover to drive the blade carrier to rotate, and thereby cutting grass through the blade(s).

For even still another example, during a working or walking of the mower, a relative displacement between the movable upper cover and the housing in the vertical direction can be detected by the suspension-lifting detection assembly in the detecting mechanism, so that when a relative displacement between the movable upper cove and the housing in the vertical direction occurs, a current signal change is formed and sent to a control module or a current sensor connected with the suspension-lifting detection assembly, to regulate a working state of the mower (such as stopping the mowing action or stopping the walking action); when the mower is working or walking, a relative displacement between the movable upper cover and the housing in the horizontal direction can be detected by the collision detection assembly in the detecting mechanism, so that when a relative displacement between the movable upper cover and the housing in the horizontal direction occurs, a current signal change is formed and delivered to the control module or a current sensor connected with the collision detection assembly to regulate the working state of the mower (such as stopping the mowing action or stopping the walking action). The suspension-lifting detection assembly and the collision detection assembly are set independently to detect the relative displacements between the movable upper cover and the housing in the horizontal direction and the vertical direction respectively, a false triggering can be effectively reduced.

For further another example, when the movable upper cover and the housing produce a relative displacement in the horizontal direction, the shock-absorbing assembly between the housing and the movable upper cover generates a deforming elastic force to reduce its vibration. For further still another example, when the movable upper cover and the casing produce a relative displacement in the vertical direction, the supporter between the housing and the movable upper cover prevents the movable upper cover from pressing the housing or the suspension-lifting detection assembly, so as to prevent false triggering. For further even still another example, the wheel cover trim can be detached and replaced on the walking wheel, the purpose of changing the color of the walking wheel can be achieved. In addition, the wheel balance weight can be detached and replaced on the walking wheel, and by setting the parameters of the wheel balance weight, the gripping force of the walking wheel can be adjusted. In the disclosure, the above working processes can be implemented individually or in combination, so that the mower can meet different functional or design requirements.

Therefore, although the disclosure has been described herein with reference to specific embodiments, freedom of modification, various changes and substitutions are intended to be included in the above disclosure, and it should be understood that, in some cases, on the premise of being without departing from the scope and sprit of the proposed disclosure, some features of the disclosure will be adopted without corresponding use of other features. Therefore, many modifications can be made to adapt specific environments or materials to the essential scope and spirit of the disclosure. The disclosure is not intended to be limited to specific terms used in the following claims and/or specific embodiments disclosed as best ways to implement the disclosure, but the disclosure will include any and all embodiments and equivalents falling within the scope of the appended claims. Therefore, the scope of the disclosure will only be determined by the appended claims.

What is claimed is:

1. A mower, comprising:
   a housing; and
   a cutting mechanism disposed on the housing, the cutting mechanism including a cutting blade, a blade carrier, a blade carrier height-adjustment assembly and a prime mover;
   wherein the blade carrier height adjustment assembly comprises at least three blade carrier connectors for connecting the blade carrier and the prime mover, and an adjusting part for adjusting the relative position of the at least three blade carrier connectors;
   wherein the at least three blade carrier connectors comprise:
   a first blade carrier connector connected on an output shaft of the prime mover;
   a second blade carrier connector connected the blade carrier; and
   at least one third blade carrier connector located between the first blade carrier connector and the second blade carrier connector;
   wherein, the at least one third blade carrier connector is configured such that
   during a height adjustment process, the blade carrier firstly drives the second blade carrier connector to move along a surface of the at least one third blade carrier connector so as to increase a height of the blade carrier distant from the ground, when a bottom of the second blade carrier connector touches against a bottom of the at least one third blade carrier connector, the second blade carrier connector is completely sleeved on an outside of the at least one third blade carrier connector, the second blade carrier connector continues to move upwards, the at least one third blade carrier connector is driven to move along a surface of the first blade carrier connector by the second blade carrier connector, so as to further increase a height of the blade carrier from the ground until the at least one third blade carrier connector is completely sleeved on an outside of the first blade carrier connector, and when the first blade carrier connector, the at least one third blade carrier connector and the second blade carrier connector are completely sleeved one after another in order from inside to outside, the blade carrier is adjusted to a higher position.

2. The mower according to claim 1, wherein the first blade carrier connector comprises a first body and at least one first guide groove formed on the first body.

3. The mower according to claim 2, wherein the first guide groove is provided on an outer side of the first body.

4. The mower according to claim 3, wherein the first body is in a hollow cylindrical shape and opened at both ends.

5. The mower according to claim 4, wherein the first blade carrier connector further comprises at least one a first limiter to prevent a connector adapted thereto from sliding out, the first limiter is located on the end of the first blade carrier connector.

6. The mower according to claim 5, wherein the second blade carrier connector comprises a second body, at least one protruding second guide portion, an open end, and a closed end.

7. The mower according to claim 6, wherein the at least one second guide portion is protruded on an inner side of the second body, the at least one second guiding portion is adapted to the at least one first guide groove.

8. The mower according to claim 7, wherein the second guide portions comprise at least one second long-protrusion guide portion and at least one second short-protrusion guide portion, the second long-protrusion guide portion is adapted to the first guide groove, the second short-protrusion guide portion is engaged with the first limiter.

9. The mower according to claim 6, wherein the first blade carrier connector is sleeved in the open end of the second blade carrier connector, the adjusting part is engaged with the closed end of the second blade carrier connector.

10. The mower according to claim 1, wherein the adjusting part is configured to drive the second blade carrier connector to move along the first blade carrier connector.

11. The mower according to claim 10, wherein the adjusting part comprises a height-adjustment rod, the height-adjust rod has a mounting end and an adjustment end, the mounting end is located in the first blade carrier connector.

12. The mower according to claim 11, wherein the blade carrier is provided with a threaded through hole suitable for the movement of the adjustment end, the height-adjustment rod is provided with thread and engaged with the blade carrier.

13. The mower according to claim 1, wherein the at least one third blade carrier connector are provided with at least two, the at least two third blade carrier connectors are provided with a same structure and different sizes so as to be movably sleeved from the inside to the outside.

14. The mower according to claim 1, wherein the third blade carrier connector comprises a hollow third body, at least one protruding third guide portion, and at least one third guide groove, each third guide portion comprises at least one third long-protrusion and at least one third short-protrusion arranged in an alternate manner, a height of the third long-protrusion is equal to a height of the third body, a height of the third short-protrusion is smaller than the height of the third body, and the third short-protrusion is arranged near a lower end of the third body to cooperate with a corresponding limiter, in order to prevent the second blade carrier connector from detaching from the surface of the at least one third blade carrier connector.

15. The mower according to claim 1, wherein the housing further comprises:
a casing whose inside is sealed,
a function hole, formed on the casing and connected with interior and exterior of the casing; and
an air filter hood or airtight nozzle, selectively and detachably mounted at the function hole, the airtight nozzle configured to detect a sealing state of the casing, and the air filter hood configured to maintain an air pressure balance between the interior and the exterior of the casing when the mower is working.

16. The mower according to claim 11, wherein
the first limiters are installed into first mounting holes, a wide head of the first limiter protrudes out of the first guide groove and touches against a bottom of a third short-protrusion to restrict the third blade carrier connector from detaching from the outside of the first blade carrier connector,
the wide head of the first limiter also protrudes out of a hollow portion of the first body and touches against a bottom of the mounting end of the height-adjustment rod, so as to restrict the height-adjustment rod from being detached from an inner side of the first blade carrier connector, and
there are at least one third limiter installed into a third mounting hole, a wide head of the third limiter protrudes out of a third guide groove and touches against the bottom of the second short-protrusion, so as to limit the second blade carrier from detaching from an outside of the third blade carrier connector.

17. A blade carrier height adjustment assembly of a mower, comprising:
a first blade carrier connector connected to an output axis of a prime mover;
a second blade carrier connector connected to a blade carrier, the second blade carrier sliding on the first blade carrier connector;
at least one third blade carrier connector located between the first blade carrier connector and the second blade carrier connector; and
an adjusting part for adjusting the relative position of the first blade carrier connector and the second blade carrier connector;
wherein, the at least one third blade carrier connector is configured such that during a height adjustment process, the blade carrier firstly drives the second blade carrier connector to move along a surface of the at least one third blade carrier connector so as to increase a height of the blade carrier distant from the ground,
when a bottom of the second blade carrier connector touches against a bottom of the at least one third blade carrier connector, the second blade carrier connector is completely sleeved on an outside of the at least one third blade carrier connector, the second blade carrier connector continues to move upwards, the at least one third blade carrier connector is driven to move along a surface of the first blade carrier connector by the second blade carrier connector, so as to further increase a height of the blade carrier from the ground until the at least one third blade carrier connector is completely sleeved on an outside of the first blade carrier connector, and when the first blade carrier connector, the at least one third blade carrier connector and the second blade carrier connector are completely sleeved one after another in order from inside to outside, the blade carrier is adjusted to a higher position.

18. The blade carrier height adjustment assembly according to claim 17, the adjusting part comprises a height-adjustment rod, the height-adjustment rod is provided with a mounting end and an adjustment end.

19. The blade carrier height adjustment assembly according to claim 18, the adjustment end is provided with an adjustment groove.

20. The blade carrier height adjustment assembly according to claim 19, the adjustment groove is protruded to the blade carrier.

\* \* \* \* \*